United States Patent
Ooi et al.

(10) Patent No.: US 7,035,548 B2
(45) Date of Patent: Apr. 25, 2006

(54) POLARIZATION-MODE DISPERSION DETECTING METHOD, AND A DISPERSION COMPENSATION CONTROLLING APPARATUS AND A DISPERSION COMPENSATION CONTROLLING METHOD

(75) Inventors: Hiroki Ooi, Kawasaki (JP); George Ishikawa, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 10/779,797

(22) Filed: Feb. 18, 2004

(65) Prior Publication Data

US 2004/0161243 A1 Aug. 19, 2004

Related U.S. Application Data

(62) Division of application No. 09/359,112, filed on Jul. 23, 1999, now Pat. No. 6,728,491, which is a continuation of application No. PCT/JP98/05336, filed on Nov. 27, 1998.

(30) Foreign Application Priority Data

Nov. 28, 1997 (JP) ............................ 09-328612

(51) Int. Cl.
    *H04B 10/18* (2006.01)

(52) U.S. Cl. .................. 398/159; 398/81; 398/147; 398/194; 398/209; 398/213

(58) Field of Classification Search .............. 398/147, 398/194, 195, 159, 201, 209, 213, 81
See application file for complete search history.

(56) References Cited

U.S. PATENT DOCUMENTS 5,311,346 A    5/1994   Haas et al. .......... 250/227.17
5,473,457 A    12/1995  Ono .................... 385/24
5,715,265 A    2/1998   Epworth ............... 372/38

(Continued)

FOREIGN PATENT DOCUMENTS

| DE | 19941150 | 8/1999 |
|----|----------|--------|
| JP | 6-34446  | 2/1994 |
| JP | 408201175| 8/1996 |
| JP | 9-72827  | 3/1997 |
| JP | 9-264814 | 10/1997|

OTHER PUBLICATIONS

EP Search Report for corresponding EP Application No. 98955951.

T. Takahashi, et al., "Automatic compensation technique for timewise fluctuating polarization mode dispersion in in–line amplifier systems," Electronics Letters, 17th Feb. 1994, vol. 30, No. 4, pp. 348–349.

(Continued)

*Primary Examiner*—Leslie Pascal
(74) *Attorney, Agent, or Firm*—Staas & Halsey LLP

(57) ABSTRACT

A dispersion compensation controlling apparatus used in a very high-speed optical communication system adopting optical time division multiplexing system comprises a first specific frequency component detecting unit (2a) detecting a first specific frequency-component in a baseband spectrum in a transmission optical signal inputted to a receiving side over a transmission fiber as a transmission line (6a), a first intensity detecting unit (3a) detecting information on an intensity of the first specific frequency component detected by the first specific frequency component detecting unit (2a and a polarization-mode dispersion controlling unit (220a) con trolling a polarization-mode dispersion quantity of the transmission line (6a) such that the intensity of the first specific frequency component detected by the first intensity detecting unit. (3a) becomes the maximum, thereby easily detecting and compensating polarization-mode dispersion generated in a high-speed optical signal.

15 Claims, 75 Drawing Sheets

U.S. PATENT DOCUMENTS

| | | | | |
|---|---|---|---|---|
| 5,717,489 A | | 2/1998 | Ozeki et al. | 356/364 |
| 5,930,414 A | | 7/1999 | Fishman et al. | 385/11 |
| 5,982,530 A | | 11/1999 | Akiyama et al. | 359/279 |
| 6,016,379 A | * | 1/2000 | Bulow | 385/147 |
| 6,081,360 A | | 6/2000 | Ishikawa et al. | 385/122 |
| 6,339,489 B1 | | 1/2002 | Bruyere et al. | |
| 6,370,300 B1 | * | 4/2002 | Eggleton et al. | 385/37 |
| 6,411,416 B1 | | 6/2002 | Ooi et al. | |
| 6,710,904 B1 | * | 3/2004 | Penninckx et al. | 398/111 |

OTHER PUBLICATIONS

Akihide Sano, et al., "Automatic dispersion equalization by monitoring extracted–clock power level in 40 Gbit/s, 200–km transmission line," $22^{nd}$ European Conference on Optical Communications–ECOC–'96, vol. 2, Sep. 15, 1996; pp. 207–210.

Japanese Patent Abstract No. 59–157524, Publication Date: Sep. 6, 1984.

* cited by examiner

Δτ =0 ps

Δτ =10 ps

Δτ =12.5 ps

Δτ =17.5 ps

Δτ =25 ps

METHOD OF USING REFLECTING MIRROR

METHOD OF USING CORNER CUBE

METHOD OF MOVING FIBER

20GHz Intensity(40G NRZ;0ps+PC+10ps; $\gamma$=0.5)

Eye-opening(40G NRZ;0ps+PC+10ps; $\gamma$=0.5)

20GHz Intensity(40G NRZ;5ps+PC+10ps; $\gamma=0.5$

Eye-opening(40G NRZ,5ps+PC+10ps, $\gamma=0.5$)

20GHz Intensity (40G NRZ;20ps+PC+10ps;$\gamma$=0.5)

Eye-opening (40G NRZ;20ps+PC+10ps;$\gamma$=0.5)

IN THE CASE WHERE A DELAY QUANTITY $\Delta\tau_C$ IS THE MINIMUM

IN THE CASE WHERE A DELAY QUANTITY $\Delta\tau_C$ IS THE MAXIMUM

RESULTS OF EXPERIMENT

F I G. 74
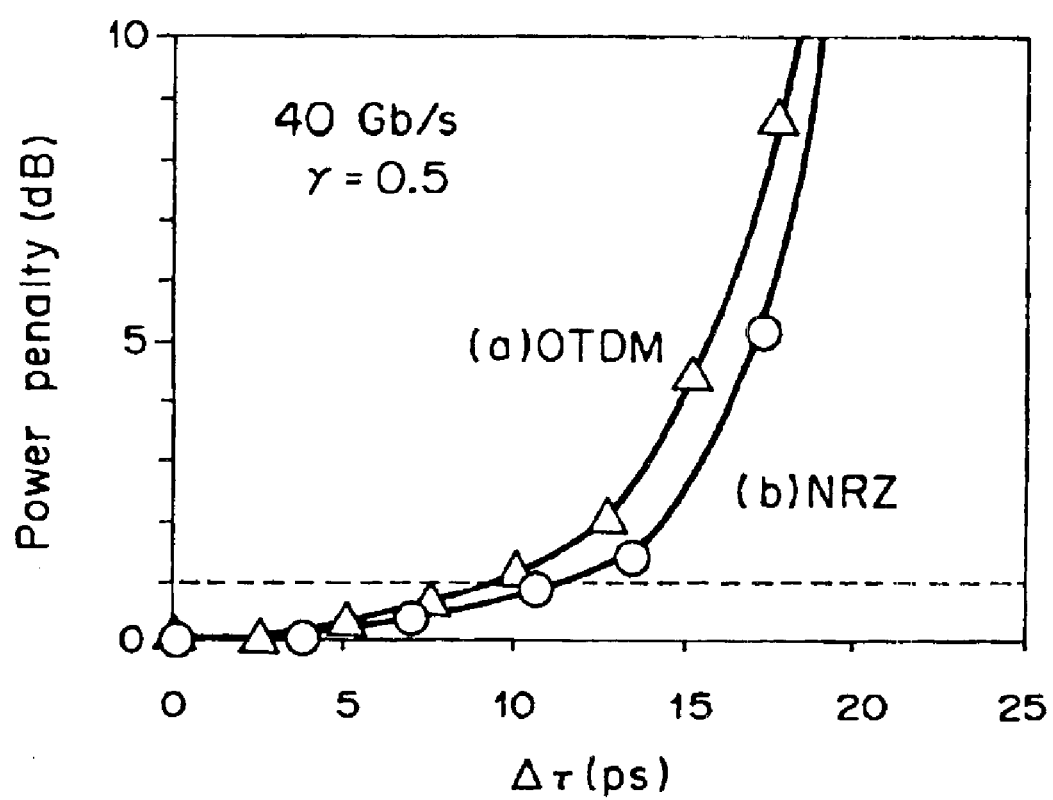

POLARIZATION-MODE DISPERSION DETECTING METHOD, AND A DISPERSION COMPENSATION CONTROLLING APPARATUS AND A DISPERSION COMPENSATION CONTROLLING METHOD

CROSS-REFERENCE TO RELATED APPLICATIONS

This application is a divisional of Ser. No. 09/359,112 filed Jul. 23, 1999, now U.S. Pat. No. 6,728,491. Application Ser. No. 09/359,112 is a continuation of International Application PCT/JP98/05336, filed Nov. 27, 1998, it being further noted that priority is based upon Japanese Patent Application HEI 09-328612, filed Nov. 28, 1997.

TECHNICAL FIELD

The present invention relates to a polarization-mode dispersion detecting method, and a dispersion compensation controlling apparatus and a dispersion compensation controlling method used when polarization-mode dispersion of chromatic dispersion of a transmission optical signal which becomes a factor of limitation on a transmission distance of a high-speed optical signal in a very high-speed optical communication system adopting, for example, optical time division multiplexing.

BACKGROUND

In a trunk-line optical communication system, a system with a transmission rate 10 GB/s (gigabit/second) is in stage of practical application. On the other hand, there is a demand for a larger capacity of the optical communication system with a rapid increase of an information quality. Considered as candidates for employable system are time division multiplexing (including optical time) division multiplexing) and wavelength division multiplexing. Particularly, in time division multiplexing, a lot of researches on a very high-speed optical communication system with a transmission rate 40 Gb/s (hereinafter referred to as a 40 Gb/s optical communication system) are conducted inside and outside the country.

However, the 40 Gb/s optical communication system has a problem that a transmission distance of an optical signal is limited since a transmission waveform is deteriorated by effects of polarization-mode dispersion and chromatic dispersion. Namely, in this system transmission line, a chromatic dispersion value and a polarization-mode dispersion value are factors of limitations of a transmission rate and a transmission distance. Hereinafter, results of simulation and results of experiment on chromatic dispersion will be described with reference to FIGS. 66 through 72, and polarization-mode dispersion will be described with reference to FIGS. 73 through 75.

Although a term "dispersion" is generally used to mean "chromatic dispersion", when merely the term "dispersion" is used hereinafter, it means both "polarization-mode dispersion" and "chromatic dispersion" unless specifically mentioned.

First, chromatic dispersion will be schematically described. Since a chromatic dispersion tolerance (tolerance means an allowance) is inversely proportional to the square of a bit rate, a chromatic dispersion tolerance of 10 Gb/s is 800 ps/nm, while a chromatic dispersion tolerance of 40 Gb/s is about 50 ps/nm that is one sixteenth of 800 ps/nm, which is severer.

FIG. 66 shows a structure of an experimental system to evaluate dispersion compensation tolerance after 50 km transmission over a 1.3 μm zero-dispersion fiber (SMF: Single Mode Fiber) in 40 Gb/s optical time division multiplexing (OTDM: Optical Time Division Multiplexing). Here are used a chromatic dispersion value=18.6 ps/nm/km, and a total dispersion value=930 ps/nm. A 40 Gb/s optical transmitter 121a shown in FIG. 66 is a signal light source. A signal light intensity-modulated in an intensity modulator 121b is inputted to a receiving side (hereinafter referred to as a receiving terminal, occasionally) over a DCF (Dispersion Compensating Fibers) 124 via the SMF 123. On the receiving side, a preamplifier 122a and a 40 Gb/s optical receiver 122b perform a demodulating process.

FIG. 67 shows a result of an evaluation experiment in this experimental system, wherein a transverse axis represents total dispersion quantity (unit: ps/nm) while a vertical axis represents power penalty (unit: dB). If here is required a power penalty 1 dB or less as an evaluation reference of the transmission line, a dispersion compensation tolerance (dispersion width) is 30 ps/nm, this value corresponding to 2 km or less in transmission using SMF. Namely, when a repeater spacing, that is, a distance between stations, is not constant as in a ground system, it is necessary to optimize a dispersion compensation quantity (high-accuracy dispersion compensation of about 100%) of each repeater section.

Additionally, a chromatic dispersion value of an optical fiber transmission line changes with time with a change of laying environment such as temperature, pressure and the like. For example, in the case of a change in temperature from −50 to 100° C., a quantity of the change in dispersion of SMF 50 km is estimated to be 16 ps/nm as shown by the following formula:

$$\begin{aligned}[\text{dispersion change quantity}] &= [\text{temperature dependency of zero dispersion wavelength}] \times \\ &\quad [\text{temperature change}] \times \\ &\quad [\text{dispersion slope}] \times \\ &\quad [\text{transmission distance}] \\ &= 0.03 \ (\text{nm}/°\text{C.}) \times 150 \ (°\text{C.}) \times \\ &\quad 0.07 \ (\text{ps}/\text{nm}^2/\text{km}) \times 50 \ (\text{km}) \\ &= 16 \ \text{ps}/\text{nm}\end{aligned}$$

This value is more than a half of the dispersion tolerance 30 ps/nm, which has to be considered in full in system designing. The reason is that when a temperature becomes 100° C. during system operation, the value does not meet the reference of penalty 1 dB in the worst case, even if the dispersion compensation quantity is optimized at −50° C. when the operation of the system is started. Depending on characteristics or a structure of the dispersion compensator, it is impossible to continuously set a dispersion compensation quantity, so that there is a case where the dispersion compensation quantity can be set to only a value slightly deviated from an optimum value when the operation of the system is started. In this case, the value might not meet the reference of penalty 1 dB even with a change in temperature below 150° C.

In the above consideration, in order to realize a very high-speed optical communication system above 40 Gb/s, it is necessary to first optimize dispersion equalization (dispersion compensation quantity) in each repeater section when the system operation is started, and to secondary configure "an automatic dispersion equalization (compensation) system" optimizing dispersion equalization (dispersion compensation value) correspondingly to a change with time of a transmission line dispersion value even during the system operation. Meanwhile, this automatic dispersion equalization system is required not only in the SMF transmission system but also in the case where a 1.55 µm wavelength dispersion shifted fiber (DSF: Dispersion Shifted Fiber) having a small chromatic dispersion value is used. Elemental techniques for realizing the automatic dispersion equalization system are summarized into three points, (a) through (c) below:

(a) realization of a variable dispersion equalizer (compensator);

(b) method of monitoring a chromatic dispersion value (or a total dispersion quantity after dispersion equalization [compensation]) of a transmission line; and (c) method of controlling feedback optimization of a variable dispersion equalizer (compensator).

As a method of measuring a chromatic dispersion value of an optical fiber, there has been used a pulse method or a phase method in which light having plural different wavelengths is inputted to an optical fiber, and a group delay difference or a phase difference in the output light is measured. However, in order to always measure dispersion during the system operation using these methods, a set of chormatic dispersion measuring devices are required in each repeater section. Further, in order to measure a dispersion quantity without interrupting transmission of data signal light, it is necessary to wavelength-multiplex measuring light having a wavelength different from that of the data signal light.

Assembling the pulse method or the phase method in an optical transmission apparatus is not realistic from the points of view of size and economy. Further, when a wavelength different from that of the main signal light, there is a possibility of lacking accuracy since it is necessary to perform a process to assume a dispersion value at a wavelength of the signal light from a measured value at a wavelength of the measuring light. For this, a method being able to directly monitor a wavelength dispersion value from the main signal light is desirable.

As this wavelength dispersion monitoring method, there has been already proposed in the Conferrence and the like a method using a 40 GHz component intensity in a baseband spectrum of a 40 Gb/s OTDM signal and an NRZ (Non-Return-to-Zero) signal.

FIG. 68 shows a relationship (simulation results) between 40 GHz component intensity and eye-opening with respect to dispersion quantity of a 40 Gb/s OTDM signal. Between two curves shown in FIG. 68, one having a pair of peaks represents 40 GHz component intensity, while the other one having a single peak represents eye-opening, wherein the minimum point between the pair of peaks of the 40 GHz component intensity is zero dispersion point, at which the eye-opening is the maximum.

FIG. 69 shows a structure of an experimental system at the time of DSF 100 km transmission. Signal light is sent from a transmitting side (hereinafter referred to as a transmitting terminal, occasionally) 131 shown in FIG. 69, and a temperature of a fiber that is a transmission line can be changed in a thermostat 133. On a receiving side 132, a 40 GHz component intensity is measured.

FIG. 70 shows results of the experiment in the experimental system, wherein a transverse axis represents signal light wavelength, while a vertical axis represents monitor voltage at a 40 GHz component intensity. The signal light wavelength that is the transverse axis is swept in a range from 1535 to 1565 nm [nanometer: (nano represents the minus ninth power of 10)], while the monitor voltage represents results at three kinds of temperatures. In each of these three kinds of waveforms, the minimum point between a pair of peaks of the waveform shows zero dispersion wavelength, like the simulation result shown in FIG. 68. Following a change in temperature (−35 to +65° C.) of DSF 100 km, it is known that the zero dispersion wavelength is changed (0.027 nm/° C.).

FIG. 71($a$) shows a relationship (simulation results) between 40 GHz component intensity and eye-opening with respect to a dispersion quantity of a 40 Gb/s NRZ signal ($\alpha$=−0.7). In FIG. 71($a$), one having a plurality of peaks represents 40 GHz component intensity, while the other one having a single peak represents eye-opening, as well. In the case of $\alpha$<0, the 40 Gb/s component intensity has the maximum peak in the vicinity of +30 ps/nm, and the monitor value shows zero that is the minimum value in zero dispersion at the foot on the negative dispersion's side.

FIG. 71($b$) shows results of an experiment at the time of DSF 100 km transmission when a temperature is changed from −35 to +65° C. As well as the simulation results [refer to FIG. 71($a$)], the minimum value at the foot on the long wavelength's side of the maximum peak [refer to a point denoted by 134 in FIG. 71($b$)] shows zero dispersion wavelength, and the zero dispersion wavelength is changed at 0.026 nm/° C., which coincides with the results in FIG. 70. FIG. 71($a$) shows simulation results in the case of a 40 Gb/s NRZ signal ($\alpha$=+0.7). FIG. 72($b$) shows simulation results in the case of a 40 Gb/s RZ (Return-to-Zero) signal ($\alpha$=0, Duty=50%). In such the automatic dispersion compensation system, it is necessary to feedback-control an operation point of a variable dispersion (equalization) compensator such that the eye-opening becomes the maximum using the above chromatic dispersion monitor.

Next, polarization-mode dispersion (PMD: Polarization-Mode Dispersion) that is the second factor having an effect on a transmission distance in the 40 Gb/s system will be schematically described. Polarization-mode dispersion (PMD) is caused by that propagation delay times of polarization components (light in two modes such as TE mode and TM mode, for example) of a light signal are different, which might generate in any optical fiber. Generally, the larger a transmission rate of an optical signal or the longer a transmission distance of an optical signal, the larger is an effect of polarization-mode dispersion, which cannot be ignored. It is said that some optical fibers configuring old optical transmission lines laid mainly in countries other than Japan have a large PMD value above 1 ps/km$^{1/2}$ [picosecond/km$^{1/2}$ (pico represents minus twelfth power of 10) per unit length. In the case of a short distance transmission (for example, 50 km transmission) using such optical fibers, an optical delay difference ($\Delta\tau$) is 7 ps or larger per one time slot 25 ps of 40 Gb/s, where an effect of polarization-mode dispersion cannot be ignored. Incidentally, this value is determined according to a type of optical fiber, which does not depend on a transmission rate of an optical signal. Further, since it is practically necessary to provide devices generating polarization-mode dispersion such as an optical amplifier, a wavelength dispersion compensator and the like in an optical communication system, a transmission distance of an optical signal is further limited.

Accordingly, in order to increase a transmission rate of an optical signal while still using an optical transmission line having been already laid or perform long-distance in-line repeater transmission while still using an optical transmission line having been already laid, a technique of compensating polarization-mode dispersion generated in a transmit optical signal is demanded.

As methods of compensating polarization-mode dispersion, there are compensating methods described in publications shown below, for example. Incidentally, it is difficult to thoroughly compensate transmit waveform deterioration since mode coupling due to fluctuation of birefringence in a longitudinal direction of an optical fiber is complicatedly generated even with an optical fiber configuring an actual optical transmission line., moreover, the mode coupling is changed with time due to temperature change and the like. In order to relieve transmission waveform deterioration, methods described in publications ① through ③ shown below are effective.

① Method of providing a polarization controller (PC: Polarization Controller) at a transmitting terminal of an optical signal, feeding back transmission characteristic from the receiving terminal so as to control a splitting ratio γ of an optical intensity to two polarization modes to be 0 or 1 (J. H. Winters et al., "Optical equalization of polarization dispersion", SPIE Vol. 1787 Multigigabit Fiber Communications, 1992, pp. 346–357).

② Method of providing a polarization controller and a polarization maintaining fiber (PMF: Polarization Maintaining Fiber) at a receiving terminal of an optical signal, and controlling the polarization controller to give a delay difference (fixed value) between two polarization modes of an inverse code to an optical transmission line (T. Takahashi et al., "Automatic compensation technique for timewise fluctuating polarization-mode dispersion in in-line amplifier systems", Electro. Lett., vol. 30, No. 4, 1994, pp. 348–349); and ③ Method of providing a polarization controller, a polarization beam splitter (PBS: Polarization Beam Splitter), photo receivers receiving two optical signal components split by the polarization beam splitter, and a variable delay element giving a delay difference between two electric signals obtained by the photo receivers to control the polarization controller and the variable delay element (T. Ono et al., "Polarization Control Method for Suppressing Polarization-mode Dispersion Influence in Optical Transmission Systems", J. of Lightwave Tecnol., vol. 12, no. 5, 1994, pp. 891–898).

In any of these methods ① through ③, it is necessary to detect a state of polarization-mode dispersion at a receiving terminal of an optical signal to perform a feed-back control. However, there is required not a complicated method using a result of detection of a code error rate or the like but a technique of easily detecting a state of polarization-mode dispersion. Such an optical communication systems will be required in future that a bit rate, a transmission distance, a signal modulation format and the like can be freely changed. For this, even in a technique of compensating polarization-mode dispersion, it is required to comply with fluctuations of a state of polarization-mode dispersion generated in a transmission line.

FIG. 73 shows an experimental system for studying transmission waveform deterioration of a 40 Gb/s signal by PMD. An optical intensity splitting ratio (or an optical power ratio) γ of each polarization component of signal light sent out from a transmitting side 133 shown in FIG. 73 is changed in a polarization controller 134, the signal light is added PMD generated in a transmission line in a PMD emulator (PMD emulator) 135 and demodulated in a receiving terminal 136. The PMD emulator 135 simulates PMD generated in the transmission line, wherein a commercially available PMD emulator is used. Principles upon which the PMD emulator 135 operates are as follows. Namely, the signal light is split into two polarization components by the polarization beam splitter (PBS) 135a shown in FIG. 73, one of which is given an optical delay difference Δτ (ps) in an optical delay device 135b, the other of which is given a loss in an optical attenuator 135 such that optical losses in the both optical paths are equal. Further, they are multiplexed while they are still in an orthogonal state by a polarization beam splitter (PBS) 135d. The output signal is amplified by an optical preamplifier 136a in the receiving terminal 136, and demodulated in an optical DEMUX (Demultiplex) 136b.

FIG. 74 shows results of an experiment of evaluation of power penalty to optical delay difference Δτ of a 40 Gb/s OTDM signal and a NRZ signal. The transversal axis represents optical delay difference Δτ, while a vertical axis represents power penalty. Incidentally, γ is set to 0.5 in the polarization controller 134 (refer to FIG. 73) such that transmission waveform deterioration is the maximum. A curved line denoted by (a) in FIG. 74 represents transmission waveform deterioration of the OTDM signal. When a reference value of receiver sensitivity degradation (power penalty [vertical axis]) is below 1 dB, a PMD allowable value (PMD tolerance) is 9 ps. A curved line denoted by (b) in FIG. 74 represents transmission waveform deterioration of the 40 Gb/s NRZ signal. When a reference value of receiver sensitivity degradation at this time is below 1 dB, the PMD allowable value (PMD tolerance) is 11 ps.

In consideration of a value of the receiver sensitivity degradation, some relatively old fibers having been already laid have a large PMD value above 1.0 ps/km$^{1/2}$ per unit length. In such case, a value of the receiver sensitivity degradation is above 10 ps even in a relatively short distance transmission of 100 km or less. Further, since polarization-mode dispersion is generated even in an optical amplifier, a chromatic dispersion compensator and the like other than a transmission line fiber in an actual optical transmission system, a transmission distance is further limited. In order to increase a transmission distance in a fiber transmission line having been already laid, or in order to perform long-distance in-line repeater transmission, "PMD compensating technique" is required. However, this compensating technique has three problems (d) through (f) below.

(d) realization of a PMD compensating device;

(e) method of detecting a PMD state (optical delay difference Δτ and optical intensity splitting ratio γ); and (f) method of controlling feedback-optimization of a PMD compensating device.

Although a PMD measuring device has been commercially available, introducing such PMD measuring device as a part of an optical transmission system is not realistic in the view of size and economy. A method being able to directly monitor a PMD value is desirable. As such method, there is a method using a frequency component intensity in a baseband spectrum of a received signal, which is theoretically determined as below.

Assuming that F(t) is a change of an optical intensity with time when PMD is not given, a change of an optical intensity with time when PMD (optical delay difference Δτ and optical density splitting ratio γ) is given by the following formula:

$$\gamma F(t-\Delta\tau)+(1-\gamma)F(t)$$

An electric field intensity of an electric signal having been received is proportional to its value, and the square of the value is detected as a change of the intensity with time by the intensity detector. Baseband spectrum P(f) is expressed as its Fourier transform by the following formula (11):

$$P(f) = \left| \int \{\gamma F(t - \Delta\tau) + (1-\gamma)F(t)\} \cdot \exp(i\omega t) dt \right|^2 \quad (11)$$

$$= \left| \gamma \int F(t-\Delta\tau)\exp(i\omega t)dt + (1-\gamma)\int F(t)\exp(i\omega t)dt \right|^2$$

$$= \left| \gamma \exp(i\omega\Delta\tau) \int F(t)\exp(i\omega t)dt + (1-\gamma)\int F(t)\exp(i\omega t)dt \right|^2$$

$$= K(f) \cdot \left| \int F(t)\exp(i\omega t)dt \right|^2$$

wherein a factor of proportionality K(f) is expressed as below, and $\omega = 2\pi f$.

$$K(f) = |\gamma\exp(i\omega\Delta\tau) + (1-\gamma)|^2 \quad (12)$$

$$= |\gamma\{\cos(\omega\Delta t) + i\sin(\omega\Delta\tau)\} + (1-\gamma)|^2$$

$$= 1 - 4\gamma(1-\gamma)\sin^2(\pi f \Delta\tau)$$

In formula (11), parameters (optical delay difference $\Delta\tau$ and optical intensity splitting ratio γ) relating to a PMD state are included in only K(f), and separated from the baseband spectrum $|\int F(t)\exp(i\omega t)dt|^2$ in the case of no PMD. When a frequency component f=fe(Hz) is extracted by a filter or the like and an intensity thereof is detected, dependency on optical delay difference $\Delta\tau$ and the optical intensity splitting ratio γ is expressed by K(fe). Moreover, from that the formula (11) is established for a general formula F(t) representing an optical waveform, the above result that the PMD state can be detected with K(fe) is established irrespective of a modulating system (NRZ or RZ) or a waveform change due to such as wavelength dispersion, nonlinear effect or the like.

FIG. 75 shows a result of an experiment showing $\Delta\tau$ dependency of 20 GHz components intensity in a 40 Gb/s NRZ system in the case of γ=0.5. In this intensity detecting method, an optical signal is converted into an electric signal using a photo receiver (PD) in the receiving terminal, a signal of a 20 GHz component is extracted by a 20 GHz narrow-band band-pass filter (BPF), and an intensity is detected by a power meter. As shown in FIG. 75, the intensity is the maximum at optical delay difference $\Delta\tau=0$ ps, decreases with increasing the optical delay difference $\Delta\tau$, and becomes zero at the optical delay difference $\Delta\tau=25$ ps.

Using that the fe (Hz) component intensity is the maximum when the PMD state is the best, a method of feedback-controlling the polarization-mode dispersion compensator controlling the optical delay difference $\Delta\tau$ and the optical intensity splitting ratio γ inserted in the optical transmission line (transmitting terminal, optical repeater and receiving terminal) according to a PMD monitor signal is possible.

Incidentally, there are publications relating to equalization as shown in ④ through ⑥ below.

④ Publications Relating to Variable Dispersion (Equalization) Compensator:

R. I. Laming et al., "A Dispersion Tunable Grating in a 10-Gb/s 100–200-km-Step IndexFibe Link", IEEE Photon. Technol. Lett., vol. 8., pp. 428–430,1996. (being able to vary a dispersion compensation quantity by changing a temperature slope in a longitudinal direction of a chirped fiber grating);

M. M. Ohm et al., "Tunable fiber grating dispersion using a piezoelectric stack", OFC'.97 WJ3. (being able to vary a dispersion compensation quantity by changing a stress in a longitudinal direction of a chirped fiber grating);

K. Takiguchi et al., "Planar Lightwave Circuit Optical Dispersion Equalizer", IEEE Photon. Technol., Lett., vol. 6, no. 1, pp. 86–88 (PLC variable dispersion compensator);

A. Sano et al., "Automatic dispersion equalization by monitoring extracted-clockpower level In a 40-Gbit/s, 200-km transmission line" ECOC'96 TuD.3.5 (discreet variable dispersion compensator in which fibers having a positive or negative dispersion value are cascade-connected by a 1×4 mechanical switch);

⑤ Publications Relating to Automatic Dispersion Equalizing System:

G. Ishikawa and H. Ooi, "Demonstration of automatic dispersion equalization in 40-Gbit/s OTDM transmission," ECOC'98 WdCO6. (introduced in Sep. 23, 1998);

Ooi, Akiyama and Ishikawa, "Experiment on 40 Gbit/s automatic dispersion equalization using a wavelength tunable laser", EIC. Soc., 1998 (Introduced in Sep., 30, 1998);

M. Tomizawa et al., "Automatic Dispersion Equalization for Installing High-Speed Optical Transmission Systems", J. Lightwave Technol., vol. 16, no. 2, pp. 184–191;

⑥ publications relating to automatic PMD compensating system:

H. Ooi, Y. Akiyama, G. Ishikawa, "Automatic polarization-mode dispersion compensation in 40-Gbit/s transmission" (tentative title), submitted to OFC'99 (method of using a polarization controller (PC: Polarization Controller) and a polarization maintaining fiber (PMF: Polarization Maintaining Fiber) in a receiving terminal to control PC in a 40 Gb/s NRZ system, thereby giving a delay difference of an inverse code to a transmission line);

J. H. Winters et al., "optical equalization of polarization dispersion", SPIE Vol. 1787 Multigigabit Fiber Communications, 1992 00.346–357 (method of using a polarization controller in a transmitting terminal, feeding-back the transmission characteristic from a receiving terminal to control in such a direction as γ=0 or 1)

T. Takahashi et al., "Automatic compensation technique for timewise fluctuating polarization-mode dispersion in in-line amplifier systems", Electron. Lett., vol. 30, no. 4, 1994, pp. 348–349 (method of giving a delay difference of an inverse code to a transmission line by using a polarization controller (PC) and a polarization maintaining fiber (PMF) in a receiving terminal to control PC), wherein a 5 GHz component intensity in a baseband spectrum of a 10 Gb/s NRZ signal is detected and a control is performed such that the intensity becomes the maximum;

T. Ono et al., "Polarization Control Method for Suppressing Polarization-mode Dispersion Influence in Optical Transmission Systems", J. Lightwave Technol., vol. 12, no. 5, 1994, pp. 891–898 (method of using a polarization controller, a polarization beam splitter, photo receivers for respective light paths and a variable delay element giving a delay difference between both electric signals to control the PC and the variable delay element).

In the light of the above problems, an object of the present invention is to provide a polarization-mode dispersion quantity detecting method in which polarization-mode dispersion generated in a high-speed optical signal can be easily detected and monitored, a dispersion compensation controlling method in which these detected polarization-mode dispersion and chromatic dispersion can be compensated, thereby enabling a long-distance transmission of a high-speed optical signal, and a dispersion compensation controlling apparatus for simultaneously compensating transmission optical waveform deterioration caused thereby using the polarization-mode dispersion quantity detecting method and the chromatic dispersion detecting method.

DISCLOSURE OF INVENTION

Therefore, a dispersion compensation controlling apparatus of this invention comprises a first specific frequency component detecting unit for detecting a first specific frequency component in a baseband spectrum in a transmission optical signal inputted to a receiving side over a transmission fiber as a transmission line, a first intensity detecting unit for detecting information on an intensity of the first specific frequency component detected by the first specific frequency component detecting unit, and a polarization-mode dispersion controlling unit for controlling a polarization-mode dispersion quantity of the transmission line such that the intensity of the first specific frequency component detected by the first intensity detecting unit becomes the maximum.

Accordingly, it is thereby possible to compensate polarization-mode dispersion so as to prevent deterioration of a transmission waveform of an optical signal. This advantageously contributes to long-distance transmission of a high-speed optical signal.

Further, a dispersion compensation controlling apparatus of this invention comprises a first specific frequency component detecting unit for detecting a first specific frequency component in a baseband spectrum in a transmission optical signal inputted to a receiving side over a transmission fiber as a transmission line, a first intensity detecting unit for detecting information on an intensity of the first specific frequency component detected by the first specific frequency component detecting unit, a polarization-mode dispersion controlling unit for controlling a polarization-mode dispersion quantity of the transmission line such that the intensity of the first specific frequency component detected by the first intensity detecting unit becomes the maximum, a second specific frequency component detecting unit for detecting a second specific frequency component in the baseband spectrum in the transmission optical signal, a second intensity detecting unit for detecting information on the intensity of the second specific frequency component detected by the second specific frequency component detecting unit, and a chromatic dispersion controlling unit for controlling a chromatic dispersion quantity of the transmission line such that the intensity of the second specific frequency component detected by the second specific frequency intensity detecting unit becomes the maximum.

Accordingly, it is thereby possible to compensate polarization-mode dispersion to prevent deterioration of a transmission waveform of an optical signal. It is also possible to compensate chromatic dispersion of a transmission optical signal, so as to prevent deterioration of the transmission waveform of the optical signal by effects of polarization-mode dispersion and chromatic dispersion. This more advantageously contributes to long-distance transmission of a high-speed optical signal.

Still further, a dispersion compensation controlling apparatus of this invention comprises a first specific frequency component detecting unit for detecting a first specific frequency component in a baseband spectrum in a transmission optical signal inputted to a receiving side over a transmission fiber as a transmission line, a first intensity detecting unit for detecting information on an intensity of the first specific frequency component detected by the first specific frequency component detecting unit, a polarization-mode dispersion controlling unit for controlling a polarization-mode dispersion quantity of the transmission line such that the intensity of the first specific frequency component detected by the first intensity detecting unit becomes the maximum, and a chromatic dispersion controlling unit for controlling a chromatic dispersion quantity of the transmission line such that the intensity of the first specific frequency component detected by the first intensity detecting unit becomes the maximum or the minimum.

Accordingly, it is thereby possible to compensate polarization-mode dispersion to prevent deterioration of a transmission waveform of an optical signal. It is also possible to compensate chromatic dispersion of a transmission optical signal, so as to prevent deterioration of the transmission waveform of the optical signal by effects of polarization-mode dispersion and chromatic dispersion. This more advantageously contributes to long-distance transmission of a high-speed optical signal.

A polarization-mode dispersion quantity detecting method of this invention comprises the steps of a specific frequency component detecting step of detecting a specific frequency component in a baseband spectrum in a transmission optical signal inputted over a transmission optical fiber, an intensity detecting step of detecting an intensity of the specific frequency component detected at the specific frequency component detecting step, and a dispersion quantity detecting step of detecting a polarization-mode dispersion quantity of the transmission optical signal from information on the intensity of the specific frequency component detected at said intensity detecting step by performing a predetermined functional operation.

Accordingly, it is thereby possible to easily detect polarization-mode dispersion generated in a transmission optical signal.

In addition, a dispersion compensation controlling method of this invention comprises the steps of a first specific frequency component detecting step of detecting a first specific frequency component in a baseband spectrum in a transmission optical signal inputted to a receiving side over a transmission fiber as a transmission line, a first intensity detecting step of detecting information on an intensity of the first specific frequency component detected at the first specific frequency component detecting step, and a polarization-mode dispersion controlling step of controlling a polarization-mode dispersion quantity of the transmission line such that the intensity of the first specific frequency component detected at the first intensity detecting step becomes the maximum.

Accordingly, it is thereby possible to easily detected polarization-mode dispersion generated in a transmission optical signal.

Further, a dispersion compensation controlling method comprises the steps of a first specific frequency component detecting step of detecting a first specific frequency component in a baseband spectrum in a transmission optical signal inputted to a receiving side over a transmission fiber as a transmission line, a first intensity detecting step of detecting information on an intensity of the first specific frequency component detected at the first specific frequency component detecting step, a polarization-mode dispersion controlling step of controlling a polarization-mode dispersion quantity of the transmission line such that the intensity of the first specific frequency component detected at the first intensity detecting step becomes the maximum, a second specific frequency component detecting step of detecting a second specific frequency component in the baseband spectrum in the transmission optical signal, a second intensity detecting step of detecting information on an intensity of the second specific frequency component detected at the second specific frequency component detecting step, and a chromatic dispersion controlling step of controlling a chromatic dispersion quantity of the transmission line such that the intensity of the second specific frequency component detected at the second intensity detecting step becomes the maximum or the minimum.

Accordingly, it is thereby possible to perform the controls independently and simultaneously.

Still further, a dispersion compensation controlling method of this invention comprises the steps of a first specific frequency component detecting step of detecting a first specific frequency component in a baseband spectrum in a transmission optical signal inputted to a receiving side over a transmission fiber as a transmission line, a first intensity detecting step of detecting information on an intensity of the first specific frequency component detected at the first specific frequency component detecting step, a polarization-mode dispersion controlling step of controlling a polarization-mode dispersion quantity of said transmission line such that the intensity of the first specific frequency component detected at the first intensity detecting step becomes the maximum, and a chromatic dispersion controlling step of controlling a chromatic dispersion quantity of the transmission line such that the intensity of the first specific frequency component detected at the first intensity detecting step becomes the maximum or the minimum.

Accordingly, it is thereby possible to prevent deterioration of a transmission waveform of an optical signal by effects of polarization-mode dispersion and chromatic dispersion, which further contributes to long-distance transmission of a high-speed optical signal.

BRIEF DESCRIPTION OF DRAWINGS

FIG. 71(*b*) is a diagram showing experimental results at the time of DSF 100 km transmission when the temperature is changed from $-35$ to $+65°$ C.;

FIG. 72(*b*) is a diagram showing results of simulation in the case of a 40 Gb/s NRZ signal ($\alpha=0$, Duty=50%);

FIG. 74 is a diagram showing results of a power penalty evaluation experiment to an optical delay difference $\Delta\tau$ on a 40 Gb/s OTDM signal and an NRZ signal.

BEST MODE FOR CARRYING OUT THE INVENTION (A) Description of a Basic Structure of the Invention (A1) Description of a Structure of a First Basic Block FIG. 1 is a block diagram showing a structure of a first basic block of a dispersion compensation controlling apparatus of this invention, which comprises, as shown in FIG. 1, a polarization-mode dispersion compensator 7*a* disposed in a transmission line 6*a* and a dispersion compensation controlling apparatus 251*a*.

Figure 1:
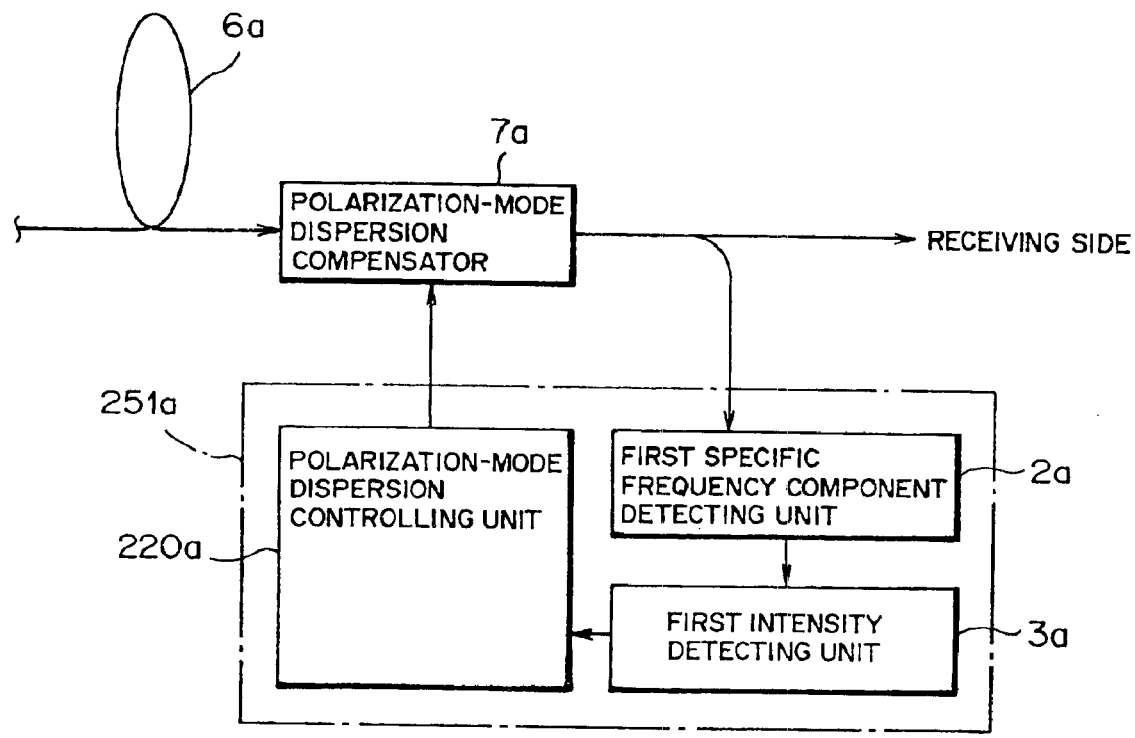
FIG. 1 is a diagram showing a structure of a first basic block of this invention.

Here, the transmission line 6*a* is an optical fiber transmission line. The polarization-mode dispersion compensator 7*a* receives a control signal from the dispersion compensation controlling apparatus 251*a* to compensate polarization-mode dispersion generated in a transmitted optical signal.

The dispersion compensation controlling apparatus 251*a* monitors a state of polarization-mode dispersion generated in an optical signal transmitted over the transmission line 6*a* on the basis of the received optical signal, and controls the polarization-mode dispersion compensator 251*a* according to a result of the monitoring, which comprises a first specific frequency component detecting unit 2*a*, a first intensity detecting unit 3*a* and a polarization-mode dispersion controlling unit 220*a*.

A term "dispersion" is generally used to mean "chromatic dispersion". In this structure, the term "dispersion" is used to mean "polarization-mode dispersion". Accordingly, the dispersion compensation controlling apparatus 251*a* according to this structure represents "polarization-mode dispersion controlling apparatus".

The first specific frequency component detecting unit 2*a* detects a first specific frequency component in a baseband spectrum in a transmission optical signal inputted to a receiving side over a transmission fiber as the transmission line 6*a*. The first intensity detecting unit 3*a* detects information on an intensity of the first specific frequency component detected by the first specific frequency component detecting unit 2*a*. The polarization-mode dispersion controlling unit 220*a* controls a polarization-mode dispersion quantity of the transmission line such that the intensity of the first specific frequency component detected by the first specific frequency component detecting unit 2*a* becomes the maximum.

When the above transmission optical signal is an RZ optical signal or an optical time division multiplex signal, the first specific frequency component detecting unit 2*a* may detect a frequency corresponding to a bit rate as the first specific frequency component. When the above transmission optical signal is in any optical modulation system, the first specific frequency component detecting unit 2*a* may detect a frequency corresponding to ½ of a bit rate as the first specific frequency component.

A dispersion compensation controlling method of this invention comprises the steps of a first specific frequency component detecting step of detecting a first specific frequency component in a baseband spectrum in a transmission optical signal inputted to a receiving side over a transmission fiber as a transmission line, a first intensity detecting step of detecting information on an intensity of the above first specific frequency component detected at the first specific frequency component detecting step, and a polarization-mode dispersion controlling step of controlling a polarization-mode dispersion quantity of the transmission line 6*a* such that the intensity of the first specific frequency component detected at the first intensity detecting step becomes the maximum.

(A2) Description of a Structure of a Second Basic Block

Figure 2:
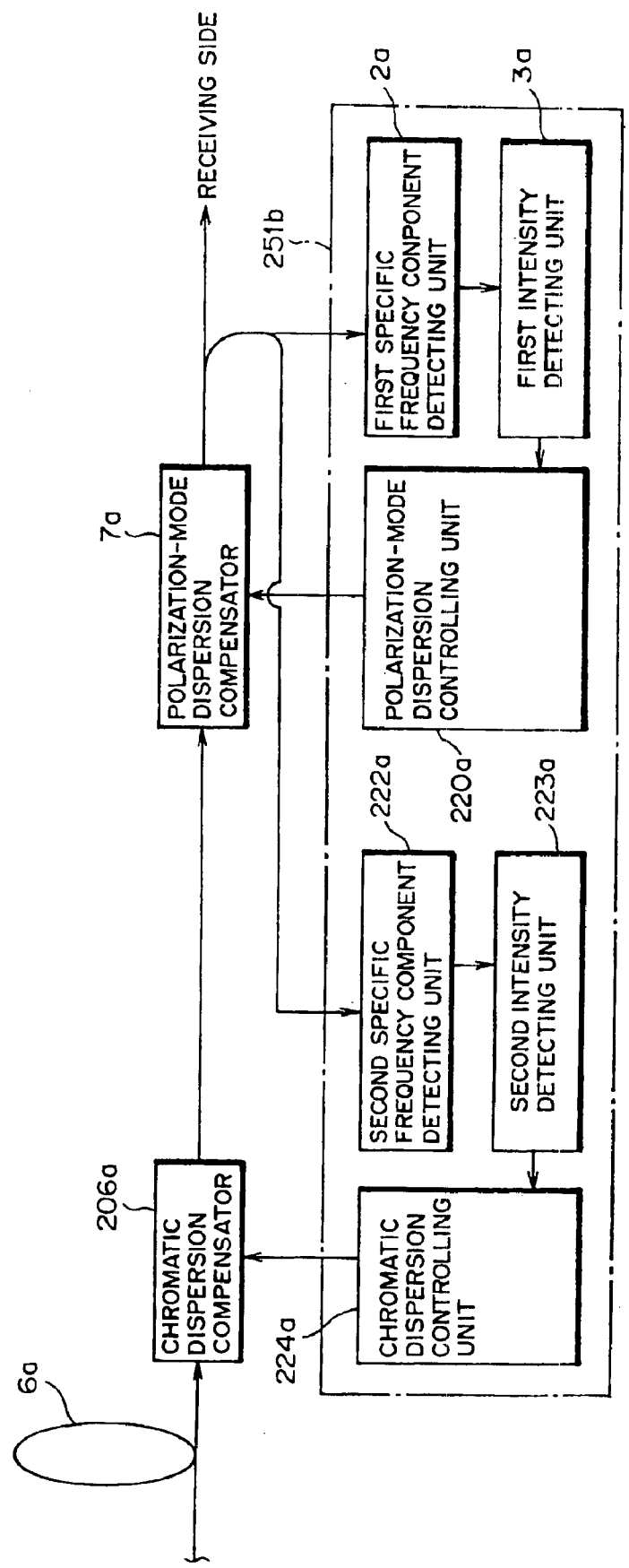
FIG. 2 is a diagram showing a structure of a second basic block of this invention.

FIG. 2 is a block diagram showing a structure of a second basic block of a dispersion compensation controlling apparatus of this invention, which comprises, as shown in FIG. 2, a chromatic dispersion compensator 206*a* and a polarization-mode dispersion compensator 7*a* disposed in a transmission line 6*a*, and a dispersion compensation controlling apparatus 251*b*. The transmission line 6*a* is an optical fiber transmission line. The chromatic dispersion compensator 206*a* receives a control signal from the dispersion compensation controlling apparatus 251*b* to compensate a chromatic dispersion quantity generated in a transmitted optical signal. The polarization-mode dispersion compensator 7*a* receives a control signal from the dispersion compensation controlling apparatus 251*b* to compensate polarization-mode dispersion generated in a transmitted optical signal.

The dispersion compensation controlling apparatus 251*b* monitors states of chromatic dispersion and polarization-mode dispersion generated in an optical signal transmitted over the transmission line 6*a* on the basis of a received optical signal, and controls the chromatic dispersion compensator 206*a* and the polarization-mode dispersion compenstor 7*a* according to results of the monitoring, which comprises a first specific frequency component detecting unit 2*a*, a first intensity detecting unit 3*a*, a polarization-mode dispersion controlling unit 220*a*, a second specific frequency component detecting unit 222*a*, a second intensity detecting unit 223*a* and a chromatic dispersion controlling unit 224*a*.

A term "dispersion" is generally used to mean "chromatic dispersion". In this structure, the term "dispersion" is used to mean both "polarization-mode dipsersion" and "chromaic dispersion". In consequence, the dispersion compensation controlling apparatus 251b according to this structure represents "polarization-mode dispersion-chromatic dispersion compensation controlling apparatus".

The first specific frequency component detecting unit 2a detects a first specific frequency component in a baseband spectrum in a transmission optical signal inputted to a receiving side over a transmission line as the transmission line 6a. The first intensity detecting unit 3a detects information on an intensity of the first specific frequency component detected by the first specific frequency component detecting unit 2a. The polarization-mode dispersion controlling unit 220a controls a polarization-mode dispersion quantity of the transmission line 6a such that the intensity of the first specific frequency component detected by the first intensity detecting unit 3a becomes the maximum. The second specific frequency component detecting unit 222a detects a second specific frequency component in the baseband spectrum in the transmission optical signal. The second intensity detecting unit 223a detects information on an intensity of the above second specific frequency component detected by the second specific frequency component detecting unit 222a. The chromatic dispersion controlling unit 224a controls a chromatic dispersion quantity of the transmission line 6a such that the intensity of the second specific frequency component detected by the second intensity detecting unit 223a becomes the maximum or the minimum.

When the above transmission optical signal is an NRZ optical signal, the first specific frequency component detecting unit 2a may detect a frequency corresponding to ½ of a bit rate as the first specific frequency component, while the second specific frequency component detecting unit 222a may detect a frequency corresponding to the bit rate as the second specific frequency component.

A dispersion compensation controlling method of this invention comprises the steps of a first specific frequency component detecting step of detecting a first specific frequency component in a baseband spectrum in a transmission optical signal inputted to a receiving side over a transmission fiber as a transmission line, a first intensity detecting step of detecting information on an intensity of the above first specific frequency component detected at the first specific frequency component detecting step, a polarization-mode dispersion controlling step of controlling a polarization-mode dispersion quantity of the transmission line 6a such that the intensity of the first specific frequency component detected at the first intensity detecting step becomes the maximum, a second specific frequency component detecting step of detecting a second specific frequency component in the baseband spectrum of the transmission optical signal, a second intensity detecting step of detecting information on an intensity of the second specific frequency component detected at the second specific frequency component detecting step, and a chromatic dispersion controlling step of controlling a chromatic dispersion quantity of the transmission line 6a such that the intensity of the second specific frequency component detected at the second intensity detecting step becomes the maximum or the minimum.

(A3) Description of a Structure of a Third Basic Block

Figure 3:
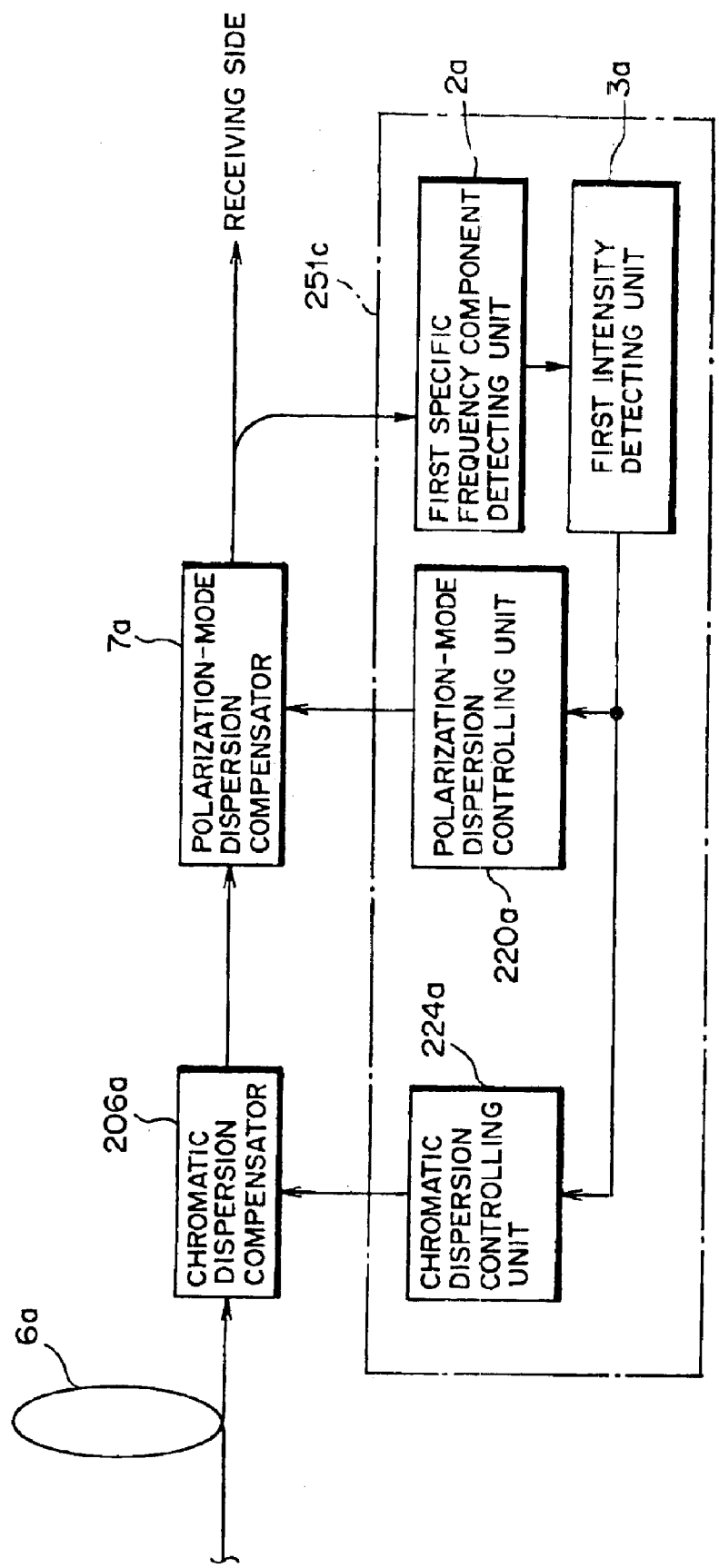
FIG. 3 is a diagram showing a structure of a third basic block of this invention.

FIG. 3 is a diagram showing a structure of a third basic block of a dispersion compensation controlling apparatus of this invention, which comprises, as shown in FIG. 3, a chromatic dispersion compensator 206a and a polarization-mode dispersion compensator 7a disposed in a transmission line 6a, and a dispersion compensation controlling apparatus 251c. The transmission line 6a is an optical fiber transmission line. The chromatic dispersion compensator 206a receives a control signal from the dispersion compensation controlling apparatus 251c to compensate a chromatic dispersion quantity generated in a transmitted optical signal. The polarization-mode dispersion compensator 7a receives a control signal from the dispersion compensation controlling apparatus 251c to compensate polarization-mode dispersion generated in a transmitted optical signal.

The dispersion compensation controlling apparatus 251c monitors states of chromatic dispersion and polarization-mode dispersion generated in an optical signal transmitted over the transmission line 6a on the basis of a received optical signal, and controls the chromatic dispersion compensator 206a and the polarization-mode dispersion compensator 7a according to results of the monitoring, which comprises a first specific frequency component detecting unit 2a, a first intensity detecting unit 3a, a polarization-mode dispersion controlling unit 220a and a chromatic dispersion controlling unit 224a.

A term "dispersion" is generally used to mean "chromatic dispersion". In this structure, the term "dispersion" is used to mean both "polarization-mode dispersion" and "chromatic dispersion". In consequence, the dispersion compensation controlling apparatus 251 according to this structure represents "polarization-mode dispersion-chromatic dispersion compensation controlling apparatus".

The first specific frequency component detecting unit 2a detects a first specific frequency component in a baseband spectrum in a transmission optical signal inputted to a receiving side over a transmission fiber as the transmission line 6a. The first intensity detecting unit 3a detects information on an intensity of the above first specific frequency component detected by the first specific frequency component detecting unit 2a. The polarization-mode dispersion controlling unit 220a controls a polarization-mode dispersion quantity of the transmission line 6a such that the intensity of the first specific frequency component detected by the first intensity detecting unit 3a becomes the maximum. The chromatic dispersion controlling unit 224a controls a chromatic dispersion quantity of the transmission line 6a such that the intensity of the first specific frequency component detected by the first intensity detecting unit 3a becomes the maximum or the minimum.

When the above transmission optical signal is an RZ optical signal or an optical time division multiplex signal, the first specific frequency component detecting unit 2a may detect a frequency corresponding to a bit rate or ½ of the bit rate as the first specific frequency component. When the above transmission optical signal is an NRZ optical signal, the first specific frequency component detecting unit 2a may detect a frequency corresponding to ½ of the bit rate as the first specific frequency component.

The chromatic dispersion controlling unit 206a may set a chromatic dispersion control quantity in the chromatic dispersion compensator 206a disposed in the transmission line 6a such that the intensity of the first specific frequency component detected by the first intensity detecting unit 3a becomes the maximum or the minimum. The chromatic dispersion controlling unit 206a may comprise a chromatic dispersion quantity detecting unit for detecting a chromatic dispersion quantity of the above transmission optical signal from the intensity of the above first specific frequency component detected by the first intensity detecting unit 3a by performing an operation with a predetermined second function, and a chromatic dispersion control quantity setting unit for setting a chromatic dispersion control quantity in the chromatic dispersion compensator 206a on the basis of the above chromatic dispersion quantity detected by the chromatic dispersion quantity detecting unit in order to compensate chromatic dispersion of the above transmission optical signal. The chromatic dispersion controlling unit 206a may feedback-control the chromatic dispersion compensator 206a disposed in the transmission line 6a such that the intensity of the first specific frequency component detected by the first intensity detecting unit 3a beocmes the maximum or the minimum.

A dispersion compensation controlling method of this invention comprises the steps of a first specific frequency component detecting step of detecting a first specific frequency component in a baseband spectrum in a transmission optical signal inputted to a receiving side over a transmission fiber as a transmission line, a first intensity detecting step of detecting information on an intensity of the above first specific frequency component detected at the first specific frequency component detecting step, a polarization-mode dispersion controlling step of controlling a polarization-mode dispersion quantity of the transmission line 6a such that the intensity of the first specific frequency component detected at the first intensity detecting step becomes the maximum, and a chromatic dispersion controlling step of controlling a chromatic dispersion quantity of the transmission line 6a such that the intensity of the first specific frequency component detected at the first intensity detecting step becomes the maximum or the minimum.

(A4) Description of Polarization-Mode Dispersion

Hereinafter, description will be made of polarization-mode dispersion with respect to the first to third basic blocks.

The polarization-mode dispersion controlling unit 220a may set a polarization-mode dispersion control quantity in the polarization-mode dispersion compensator 7a disposed in the transmission line 6a such that the intensity of the first specific frequency component detected by the first intensity detecting unit 3a becomes the maximum.

The polarization-mode dispersion controlling unit 220a may comprise a polarization-mode dispersion quantity detecting unit for detecting a polarization-mode dispersion quantity of the above transmission optical signal from the intensity of the above first specific frequency component detected by the first intensity detecting unit 3a by using a first function which is a function representing an intensity of a frequency component in a baseband spectrum in an optical waveform forming an arbitrary transmission optical signal and in which the frequency information and parameters showing a polarization-mode dispersion quantity are variables, and a parameter setting unit for outputting a parameter setting control signal having parameter information as a control quantity for compensating polarization-mode dispersion of the above transmission optical signal on the basis of the above polarization-mode dispersion quantity detected by the polarization-mode dispersion quantity detecting unit to the polarization-mode dispersion compensator 7a.

The dispersion compensation controlling apparatus 251a (or 251b or 251c) may further comprise a third specific frequency component detecting unit for detecting a third specific frequency component in the baseband spectrum of the transmission optical signal, a third intensity detecting unit for detecting information on an intensity of the above third specific frequency component detected by the third specific frequency component detecting unit. Besides, the polarization-mode dispersion controlling unit 220a may comprise a polarization-mode dispersion quantity detecting unit for detecting a polarization-mode dispersion quantity of the above transmission optical signal from the intensity of the first specific frequency component and the intensity of the third specific frequency component detected by the first intensity detecting unit and the third intensity detecting unit, respectively, by using a first function which is a function showing an intensity of a frequency component in a baseband spectrum in an optical waveform forming an arbitrary transmission optical signal and in which the frequency information and parameters showing a polarization-mode dispersion quantity are variables, and a parameter setting unit for outputting a parameter setting control signal having parameter information as a control quantity for compensating polarization-mode dispersion of the above transmission optical signal on the basis of the above polarization-mode dispersion quantity detected by the polarization-mode dispersion quantity detecting unit to the polarization-mode dispersion compensator.

The above parameter information may be at least either a delay quantity $\Delta\tau$ between two polarization modes or a splitting ratio $\gamma$ of an optical intensity to the above two polarization modes, and the parameter setting unit may output a parameter setting control signal for setting the above parameter information to the polarization-mode dispersion compensator disposed in a receiving terminal apparatus which is a receiving terminal of the above transmission optical signal.

Further, the parameter setting unit may output a parameter setting control signal for setting the above parameter information to a polarization-mode dispersion compensator disposed in a transmitting terminal apparatus transmitting the above transmission optical signal or a repeating apparatus amplifying and repeating the above transmission optical signal, or output a first parameter setting control signal for setting a splitting ratio of an optical intensity to two polarization-mode to a first polarization-mode dispersion compensator disposed at an arbitrary position on the transmission line 6a, while outputting a second parameter setting control signal for setting a delay quantity between the above two polarization modes to a second polarization-mode dispersion compensator arranged in a rear stage of the first polarization-mode dispersion compensator.

The dispersion compensation controlling apparatus may further comprise a compensation quantity optimization controlling unit for superimposing a predetermined low frequency signal set in advance on the parameter setting control signal outputted from the parameter setting unit, and controlling a parameter setting in the parameter setting unit such that the above low frequency signal component included in the intensity of the above first specific frequency signal from the first intensity detecting unit 3a becomes zero so as to optimize a compensation quantity of polarization-mode dispersion of the above transmission optical signal.

The compensation quantity optimization controlling unit may superimpose two low frequency signals having low frequency components different from each other as the above predetermined low frequency signal on the above parameter setting control signal, control a setting of a splitting ratio of an optical intensity to two polarization modes in the parameter setting unit such that either one of the above two low frequency signal components included in the intensity of the above first specific frequency component from the first intensity detecting unit 3a becomes zero, and control a setting of a delay quantity between the above two polarization modes in the parameter setting unit such that the other of the two low frequency signal components included in the intensity of the above first specific frequency component from the first intensity detecting unit 3a becomes zero. In addition, the compensation quantity optimization controlling unit may switch a setting control on the splitting ratio of an optical intensity to the above two polarization modes and a setting control on the delay quantity between two polarization modes with respect to time, and perform the setting controls.

The distribution compensation controlling unit may still further comprise a sweep controlling unit for largely sweeping and controlling the parameters showing the above polarization-mode dispersion quantity to be given by the polarization-mode dispersion compensator 7a when a system is actuated or the system is re-actuated.

The polarization-mode dispersion controlling unit 220a may feedback-control at least either a polarization controller or an inter-polarization-mode delay unit disposed in the transmission line 6a such that the intensity of the first specific frequency component detected by the first intensity detecting unit 3a becomes the maximum. The inter-polarization-mode delay unit may be configured as a device splitting polarization-mode components by a polarization beam splitter, giving a delay difference between the polarization-mode components by a variable optical delay path and multiplexing the polarization-mode components. The inter-polarization-mode delay unit may be configured as a device in which a plurality of polarization maintaining fibers having different polarization dispersion values are arranged in parallel and the polarization maintaining fibers transmitting an optical signal are switched by an optical switch according to a polarization-mode dispersion quantity of the transmission line 6a.

Further, the polarization-mode dispersion controlling unit 220a may perform a control in a first control mode in which any one of an azimuth angle of a ¼ wave plate, an azimuth angle of a ½ wave plate in the polarization controller and a delay quantity between polarization modes of the inter-polarization-mode delay unit such that the intensity of the first specific frequency component becomes the maximum while the remaining control parameters among the above azimuth angles and the delay quantity between polarization modes are fixed, after the first control mode, perform a control in a second control mode in which one of the remaining control parameters is changed such that the intensity of the first specific frequency component becomes the maximum while the control parameter having been first changed and the other one of the remaining control parameters are fixed, finally perform a control in the third control mode in which the other one of the remaining control parameters is changed such that the intensity of the first specific frequency component becomes the maximum while the control parameter having been first changed and the one of the control parameters are fixed.

In addition, the polarization-mode dispersion controlling unit 220a may perform a control in a fourth control mode in which any one of an azimuth angle of a ¼ wave plate, an azimuth angle of a ½ wave plate in the polarization controller and a delay quantity between polarization modes of the inter-polarization-mode delay unit is changed such that the intensity of the first specific frequency component increases while the remaining parameters among the above azimuth angles and the delay quantity between polarization modes are fixed, after the fourth control mode, perform a control in a fifth control mode in which one of the remaining control parameters is changed such that the intensity of the first specific frequency component increases while the control parameter having been first changed and the other one of the remaining control parameters are fixed, finally perform a control in a sixth mode in which the other one of the remaining parameters is changed such that the intensity of the first frequency component increases while the control parameter having been first changed and the one of the remaining control parameters are fixed, after that, repeatedly execute the above fourth control mode, the fifth control mode and the sixth control mode until the intensity of the first specific frequency component becomes the maximum.

Further, the dispersion compensation controlling apparatus may still further comprise a compensation quantity optimization controlling unit for superimposing a predetermined low frequency signal set in advance on a control signal to be outputted from the polarization-mode dispersion controlling unit 220a to the above polarization controller and the inter-polarization-mode delay unit, and control the above polarization controller and the inter-polarization-mode delay unit such that the above low frequency signal component included in the intensity of the above first specific frequency component from the first intensity detecting unit 3a becomes zero so as to optimize a compensation quantity of polarization-mode dispersion of the above transmission optical signal. The compensation quantity optimization controlling unit may low-frequency-modulate an azimuth angle of a ¼ wave plate, an azimuth angle of a ½ wave plate in the polarization controller and a delay quantity between polarization modes of the inter-polarization-mode delay unit with different frequencies, detect the first frequency component intensity in the baseband spectrum of a transmission optical signal, and optimize the azimuth angle of the ¼ wave plate and azimuth angle of the ½ wave plate in the above polarization controller and the delay quantity between polarization modes of the inter-polarization-mode delay unit such that an intensity modulation component of a low frequency component included therein becomes zero. Further, polarization-mode dispersion controlling unit 220a may control only the polarization controller during system operation, and control the inter-polarization-mode delay unit at the time of start of system operation or when an element determining conditions of polarization-mode dispersion in the transmission line 6a is switched.

Further, the polarization-mode dispersion controlling unit 220a may further comprise a maximum allowable polarization-mode dispersion quantity setting means for setting a maximum allowable polarization-mode dispersion quantity, set a delay quantity of the inter-polarization mode delay to a value above a lower limit value defined as a value obtained by subtracting the maximum allowable polarization-mode dispersion quantity from one time slot and below an upper limit value defined as a value having a magnitude twice the maximum allowable polarization-mode dispersion quantity during system operation when feedback-controlling at least either the polarization controller or the inter-polarization-mode delay unit disposed in the transmission line 6a such that an intensity of a frequency component corresponding to ½ of a bit rate as the first specific frequency component detected by the first intensity detecting unit becomes the maximum. The polarization-mode dispersion controlling unit 220a may set a delay quantity of the inter-polarization-mode delay unit at the time of system operation to the lower limit value, or set a delay quantity of the inter-polarization-mode delay unit at the time of system operation to the upper limit value.

In addition, the inter-polarization-mode delay unit may be configured with a polarization maintaining fiber, or an inter-polarization-mode variable delay unit in a state where a delay quantity is fixed.

In summary, a polarization-mode dispersion quantity detecting method of this invention comprises the steps of a step of detecting a specific frequency component in a baseband spectrum in a transmission optical signal inputted over a transmission fiber (specific frequency component detecting step), a step of next detecting an intensity of the above specific frequency component detected at the specific frequency component detecting step (intensity detecting step), after that, a step of detecting a polarization-mode dispersion quantity of the above transmission optical signal from information on the intensity of the specific frequency component detected at the intensity detecting step by performing a predetermined functional operation (dispersion quantity detecting step).

At this time, at the dispersion quantity detecting step, the above predetermined functional operation is performed by using a function which is a function representing an intensity of a frequency component in a baseband spectrum in an optical waveform forming an arbitrary transmission optical signal and in which the frequency information and parameters showing the polarization-mode dispersion quantity are variables.

Further, the specific frequency at which a component is detected at the specific frequency component detecting step may be set to a frequency at which a component of a baseband spectrum in the above transmission optical signal can be stably obtained with respect to time.

When the above transmission optical signal is an RZ optical signal or an optical time division multiplex signal, the specific frequency at which the component is detected at the specific frequency component detecting step may be set to a frequency corresponding to a bit rate. When the above transmission optical signal is in any optical modulation system, the specific frequency at which the component is detected at the specific frequency component detecting step may be set to a frequency corresponding to ½ of a bit rate.

(A5) Description of a Chromatic Dispersion Compensating Method

Hereinafter, description will be made of a chromatic dispersion compensating method with respect to the second and third basic blocks.

The chromatic dispersion controlling unit 224a may set a chromatic dispersion control quantity in the chromatic dispersion compensator 206a disposed in the optical transmission line 6a such that the intensity of the second specific frequency component detected by the second intensity detecting unit 223a becomes the maximum or the minimum. Further, the chromatic dispersion controlling unit 224a may comprise a chromatic dispersion quantity detecting unit for detecting a chromatic dispersion quantity of the above transmission optical signal from the intensity of the above second specific frequency component detected by the second intensity detecting unit 223a by performing an operation with a predetermined second function, and a chromatic dispersion control quantity setting unit for setting a chromatic dispersion control quantity in the chromatic dispersion compensator 206a on the basis of the above chromatic dispersion quantity detected by the chromatic dispersion quantity detecting unit in order to compensate chromatic dispersion of the above transmission optical signal.

The chromatic dispersion controlling unit 224a may feedback-control a chromatic dispersion controller 206a disposed in the transmission line 6a such that the intensity of the second specific frequency component detected by the second intensity detecting unit 223a becomes the maximum or the minimum.

Further, the second intensity detecting unit 223a may output information on the detected intensity of the above second specific frequency component as a monitor signal.

In the dispersion compensation controlling method of this invention, the above polarization-mode dispersion controlling step and the chromatic dispersion controlling step may be executed independently, or the above polarization-mode dispersion controlling step and the chromatic dispersion controlling step may be executed in time series.

(A6) Description of other Supplementary Functions

The dispersion compensation controlling apparatus 251a (or 251b or 251c) of this invention may further comprise a timing extracting unit for extracting a timing of a received signal on the basis of the above first specific frequency component detected by the first specific frequency component detecting unit 2a. In the dispersion compensation controlling apparatus 251a (or 251b or 251c), the first intensity detecting unit 3a may output information on the detected intensity of the above first specific frequency component as a monitor signal.

Incidentally, a term "dispersion" is used to mean both "polarization-mode dispersion" and "chromatic dispersion". The dispersion compensation controlling apparatus 251a thus represents "polarization-mode dispersion controlling apparatus". The dispersion compensation controlling apparatus 251b and the dispersion compensation controlling apparatus 251c represent "polarization-mode dispersion-chromatic dispersion compensation controlling apparatus".

(B) Description of a First Embodiment of the Invention

Figure 4:
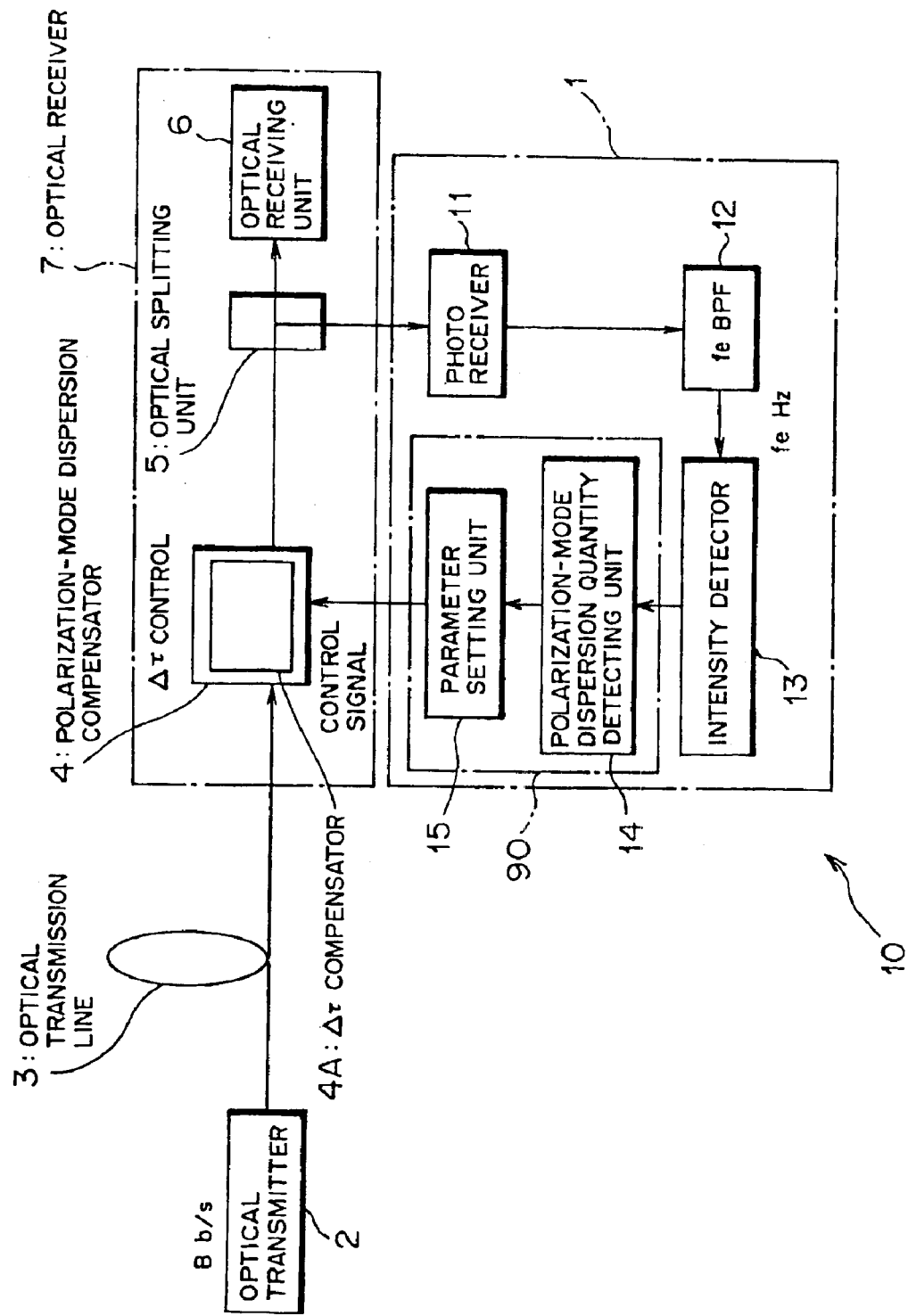
FIG. 4 is a block diagram showing a structure of an optical transmission system to which dispersion compensation controlling apparatus according to a first embodiment of this invention is applied.

FIG. 4 is a block diagram showing a structure of an optical transmission system to which a dispersion compensation controlling apparatus according to a first embodiment of this invention is applied.

The optical transmission system 10 shown in FIG. 4 is an optical communication system with a transmission rate B(b/s) (for example, 40 Gb/s, 10 Gb/s or the like) adopting time division multiplexing (TDM: Time Division Multiplexing).

In the transmission system 10, an optical transmitter 2 as a transmitting terminal apparatus transmitting a transmission optical signal and an optical receiver 7 as a receiving terminal apparatus receiving the transmission optical signal are connected over an optical transmission line (transmission fiber) 3, and a dispersion compensation controlling apparatus 1 is disposed on the receiving side.

The optical receiver 7 comprises a polarization-mode dispersion compensator 4, an optical splitting unit 5 and an optical receiving unit 6. The polarization-mode dispersion compensator 4 receives a control signal from the outside to compensate polarization-mode dispersion generated in a transmitted optical signal. The optical splitting unit 5 is disposed in the optical receiver 7 to take out a part of the transmission optical signal inputted to the receiving side over the optical transmission line 3, and sends it out as monitor light to the dispersion compensation controlling apparatus 1. The optical receiving unit 6 receives the transmission optical signal.

The dispersion compensation controlling apparatus 1 monitors a state of polarization-mode dispersion generated in the optical signal transmitted over the optical transmission line 3 on the basis of the optical signal taken out by the optical splitting unit 5, and controls the polarization-mode dispersion compensator 4 according to a result of the monitoring. The dispersion compensation controlling apparatus 1 comprises a photo receiver 11, a band-pass filter (fe BPF) 12, an intensity detector 13 and a polarization-mode dispersion controlling unit 90.

A term "dispersion" is generally used to mean "chormatic dispersion". In this embodiment, the term "dispersion" is used to mean "polarization-mode dispersion", thus the dispersion compensation controlling apparatus 1 represents "polarization-mode dispersion compensation controlling apparatus 1".

The photo receiver 11 receives the optical signal taken out by the optical splitting unit 5, and converts it into an electric signal. The band-pass filter 12 detects a first specific frequency component [fe (Hz) component] in a baseband spectrum of the transmission optical signal inputted to the receiving side over the optical transmission line 3, which functions as a first specific frequency component detecting unit.

Here, the first specific frequency component is appropriately set according to a transmission rate or a signal waveform of an optical signal. For example, when the transmission optical signal is a 40 Gb/s RZ optical signal (or OTDM signal), the band-pass filter 12 detects a frequency (40 GHz) corresponding to the bit rate as the first specific frequency component. When the transmission optical signal is a 10 Gb/s NRZ optical signal, the band-pass filter 12 detects a frequency (5 GHz) corresponding to ½ of the bit rate as the first specific frequency.

The intensity detector 13 detects an intensity of the above first specific frequency component detected by the band-pass filter 12, which functions as a first intensity detecting unit. The intensity detector (first intensity detecting unit) 13 can output information on the detected intensity of the above first specific frequency component as a monitor signal.

The polarization-mode dispersion controlling unit 90 detects a polarization-mode dispersion quantity of the above transmission optical signal from the intensity of the first specific frequency component detected by the intensity detector 13. This function is achieved by a polarization-mode dispersion quantity detecting unit 14 and a parameter setting circuit (parameter setting unit) 15.

The polarization-mode dispersion quantity detecting unit 14 detects a polarization-mode dispersion quantity of the above transmission optical signal from the intensity of the above first specific frequency component detected by the intensity detecting unit 13 using a first function which is a function showing an intensity of a frequency component in a baseband spectrum in an optical waveform forming an arbitrary transmission optical signal, and in which the frequency information and parameters showing a polarization-mode dispersion quantity are variables.

The parameter setting circuit 15 outputs a parameter setting control signal having parameter information as a control quantity for compensating polarization-mode dispersion of the above transmission optical signal on the basis of the above polarization-mode dispersion quantity detected by the polarization-mode dispersion quantity detecting unit 14 to the polarization-mode dispersion compensator 4 disposed in the optical transmission line 3. Incidentally, the parameter information concretely signifies a delay quantity (optical delay difference) $\Delta\tau$ between two polarization modes.

In other words, in order to compensate polarization-mode dispersion of a transmission optical signal, the parameter setting circuit 15 outputs a parameter setting control signal for setting such parameter information as to cancel a polarization-mode dispersion quantity detected by the polarization-mode dispersion quantity detecting unit 14 to the polarization-mode dispersion compensator 4 disposed in the optical receiver 7. The parameter setting circuit 15 sets the above parameter information such that the intensity of the above first specific frequency component detected by the intensity detector 13 becomes the maximum, as will be described later.

Here, "such that an intensity of the first specific frequency component becomes the maximum" means that this control mode is a mode in which a polarization-mode dispersion quantity of the optical transmission line 3 is controlled such that the intensity of the first specific frequency component detected by the intensity detector 13 becomes maximum. In concrete, the polarization-mode dispersion quantity detecting unit 14 extracts an intensity of a frequency component in a baseband spectrum in an optical waveform forming an arbitrary transmission optical signal, and detects a maximum point of the intensity of the first specific frequency component using a function (first function) in which the frequency information and parameters showing a polarization-mode dispersion quantity are variables, a controlling method thereof will be described in detail later.

Steps to execute a dispersion compensation control are as follows. Namely, the first specific frequency component in a baseband spectrum in a transmission optical signal inputted to the receiving side over the transmission fiber as a transmission line is detected (first specific frequency component detecting step), information on an intensity of the above first specific frequency component detected at the first specific frequency component detecting step is detected (first intensity detecting step), and a polarization-mode dispersion quantity of the optical transmission line 3 is controlled such that the intensity of the first specific frequency component detected at the first intensity becomes the maximum (polarization-mode dispersion controlling step).

Figure 5:
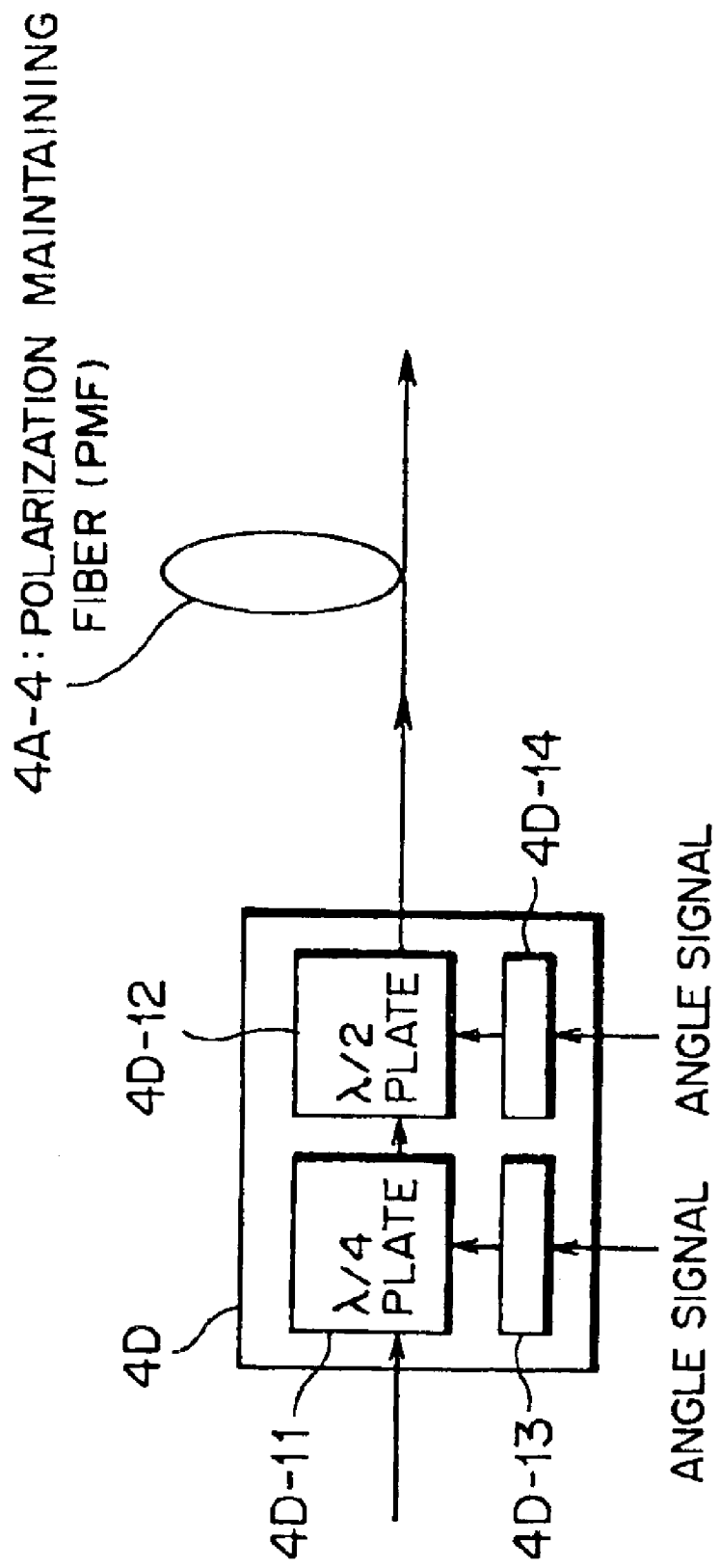
FIG. 5 is a diagram showing a structure of a delay quantity compensator.

On the other hand, the polarization-mode dispersion compensator 4 in the optical receiver 7 receives a parameter setting control signal from the parameter setting circuit 15 of the dispersion compensation controlling apparatus 1, and sets parameter information on the basis of the control signal, thereby compensating polarization-mode dispersion generated in an optical signal transmitted over the optical transmission line 3. The polarization-mode dispersion compensator 4 comprises, as shown in FIG. 5, an optical axis adjuster 4D and a polarization maintaining fiber (PMF: Polarization Maintaining Fiber) 4A-4.

The optical axis adjuster (polarization controller) 4D adjusts an axis when a received light is inputted to the polarization maintaining fiber 4A-4. Namely, the optical axis adjuster 4D adjusts a polarization state of an inputted optical signal in a direction of the polarization primary axis of the polarization maintaining fiber 4A-4, also adjusts a polarization direction such that a code of a delay quantity to be given by the polarization maintaining fiber 4A-4 cancels a delay quantity of the optical transmission line 3. The optical axis adjuster 4D comprises, for example, wave plates [a ½ wave plate ($\lambda/2$ plate) 4D-11 and a ¼ wave plate ($\lambda/4$ plate) 4D-12], and actuators 4D-13 and 4D-14 to perform a polarization control at a predetermined angle, adjusting to a major axis and a minor axis of the optical fiber being used.

The polarization maintaining fiber 4A-4 gives a predetermined delay difference to two orthogonal polarization mode components, which actually has a function as a delay quantity compensator of a fixed delay quantity. Namely, a function as a delay compensator ($\Delta\tau$ compensator) relates to a delay quantity $\Delta\tau$ between two poralization modes, which is achieved by the polarization maintaining fiber 4A-4.

An optical signal transmitted from the optical transmitter 2 passes through the optical transmission line 3, and is inputted to the optical receiver 7. In the optical axis adjuster 4D, a polarization state of the inputted optical signal is such that a polarization direction thereof is so adjusted that a code of a delay quantity given by the polarization maintaining fiber 4A-4 cancels a delay quantity in the optical transmission line 3. Further, a part of the transmission optical signal is sent out as monitor light from the optical splitting unit 5 to the dispersion compensation controlling apparatus 1, while the other part of the transmission optical signal is sent out to the optical receiving unit 6. The optical signal inputted to the dispersion compensation controlling apparatus 1 is converted from an optical signal to an electric signal (O/E-converted) in the photo receiver 11, and the first specific frequency component (fe [Hz] component) in a baseband spectrum of the inputted transmission optical signal is detected by the band-pass filter 12. Further, information on an intensity of the first specific frequency component is obtained by the intensity detector 13, and a polarization-mode dispersion quantity is detected by the polarization-mode dispersion quantity detecting unit 14. A parameter setting control signal for setting parameter information Δτ compensating a polarization-mode dispersion of the transmission optical signal is outputted from the parameter setting circuit 15 to the polarization-mode dispersion compensator 4 disposed in the optical receiver 7, whereby polarization-mode dispersion of the transmission optical signal is compensated. An optimum control as the delay quantity compensator (optical axis adjuster 4D, polarization maintaining fiber 4A-4) is performed in a polarization direction given by the optical axis adjuster 4D.

Figure 6:
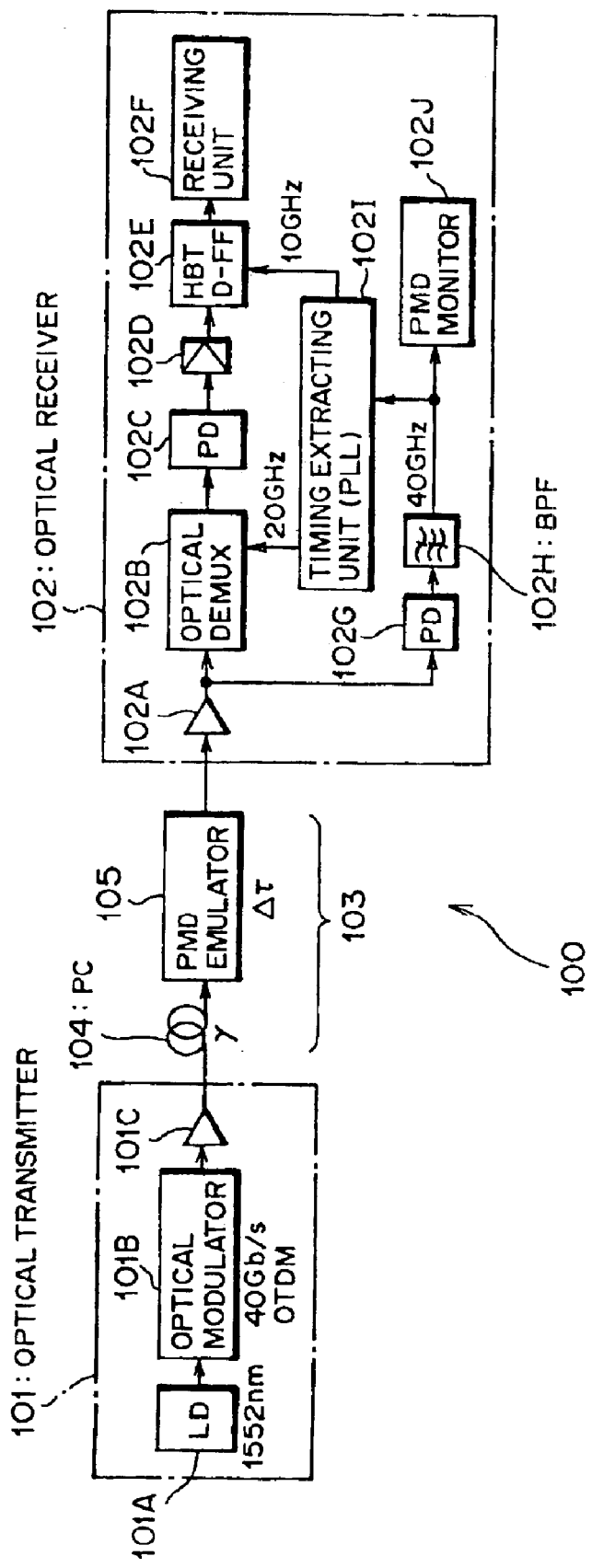
FIG. 6 is a diagram showing a structure of an experimental system of a 40 Gb/s optical time division multiplexing transmission system according to the first embodiment of this invention.
Figure 7:
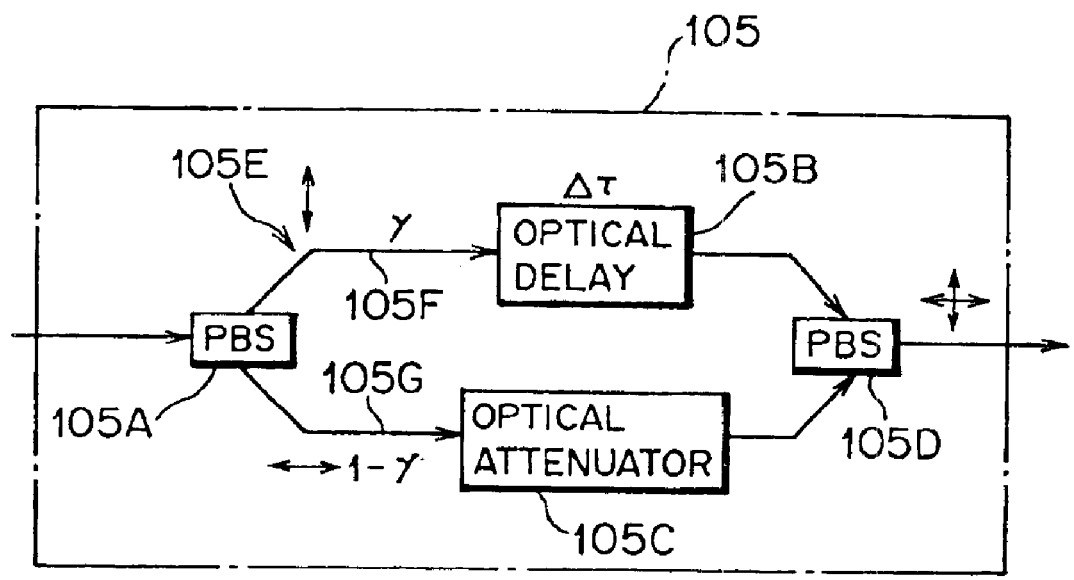
FIG. 7 is a diagram showing a structure of a PMD emulator.
Figure 8A:
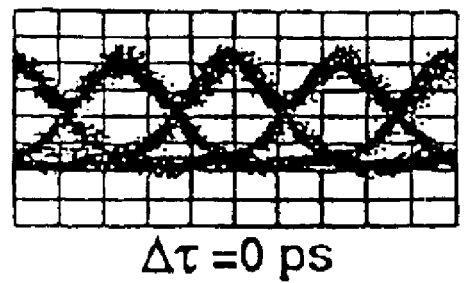
FIGS. 8(a) through 8(e) are diagrams showing deteriorated 40 Gb/s optical time division multiplexed waveforms when the PMD emulator changes an optical delay difference Δτ and gives it thereto.
Figure 8B:
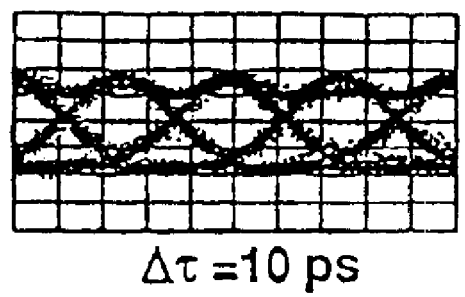
Figure 8C:
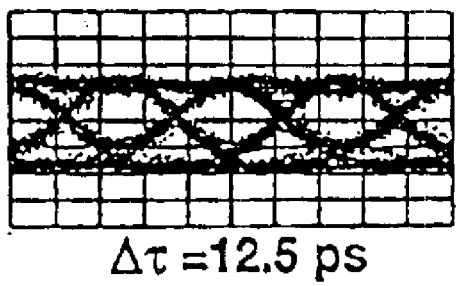
Figure 8D:
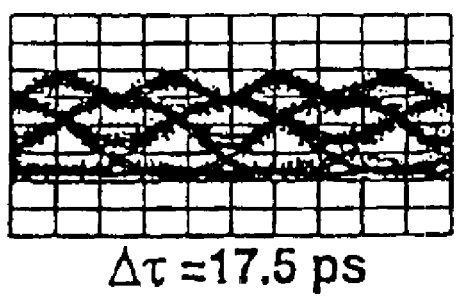
Figure 8E:
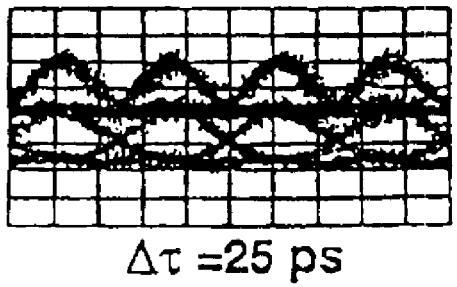

Next, FIG. 6 and FIG. 7 show a structure of an experimental system researching an effect of polarization-mode dispersion on an optical signal in a 40 Gb/s optical transmission system. Results of the research using this experimental system are shown in FIGS. 8(a) through 8(e), 9, 10(a) and 10(b).

The 40 G b/s optical transmission system 100 shown in FIG. 6 simulates a 40 Gb/s optical communication system adopting optical time division multiplexing. In the optical transmission system 100, an optical transmitter 101 and an optical receiver 102 are connected over an optical transmission line 103. In order to simulatively give polarization-mode dispersion to an optical signal, a polarization controller (PC) 104 and a commercially available polarization-mode dispersion emulator (PMD emulator) 105 are disposed in the optical transmission line 103. When an RZ optical signal is used, it is as well possible to monitor in this experimental system.

The optical transmitter 101 comprises a laser diode (LD) 101A, an optical modulator 101B and an optical post-amplifier 101C. The laser diode 101A is a signal light source. The optical post-amplifier 101C is an optical amplifier. The optical modulator 101B modulates light from the laser diode 101A into a 40 Gb/s optical time division multiplex (OTDM) optical signal. As the optical modulator 101B, here is used an optical time division multiplexing modulator (hereinafter referred to as an OTDM modulator, occasionally) as shown in FIG. 15.

Figure 15:
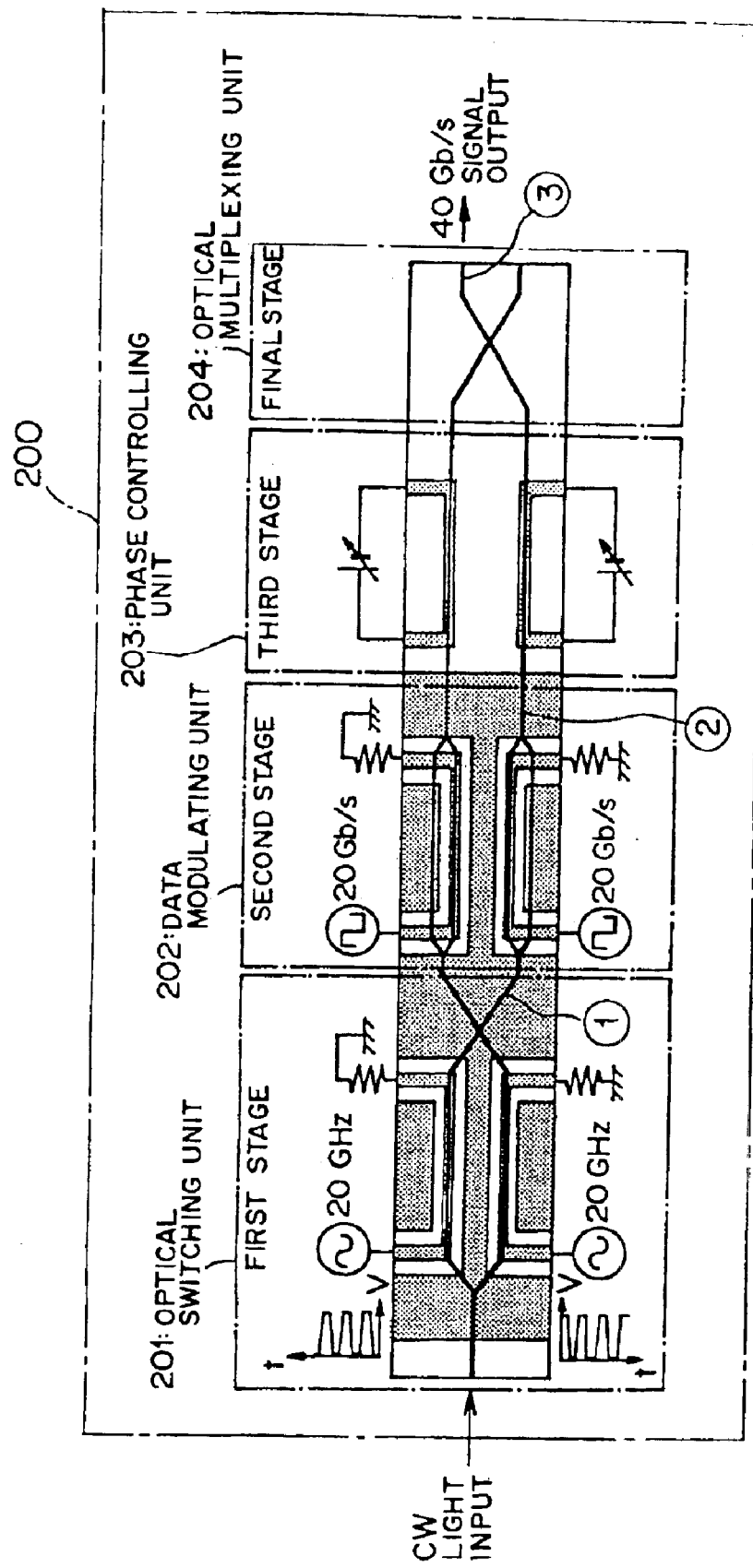
FIG. 15 is a diagram showing a structure of an optical time division multiplex modulator.
Figure 16A:
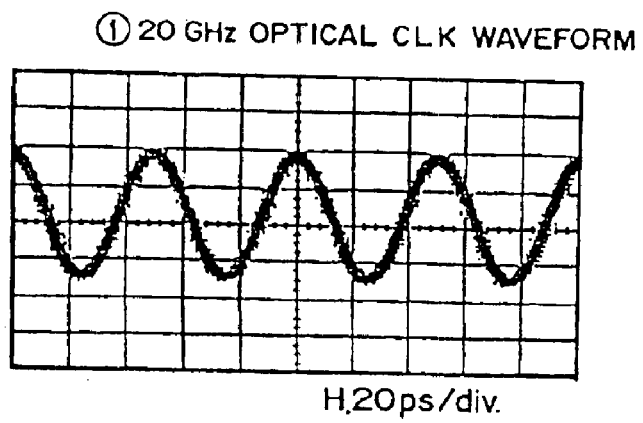
FIGS. 16(a) through 16(c) are diagrams for illustrating an operating principle of an TODM modulator.
Figure 16B:
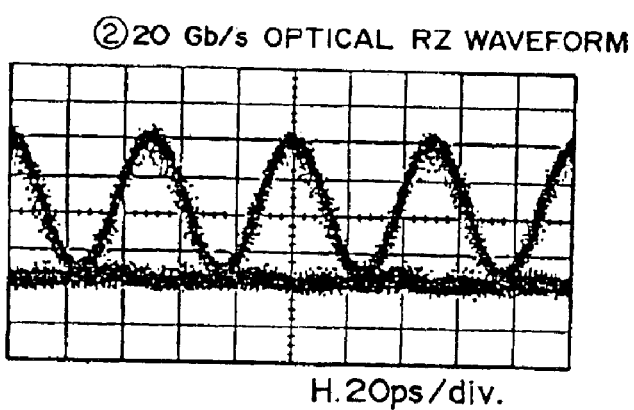
Figure 16C:
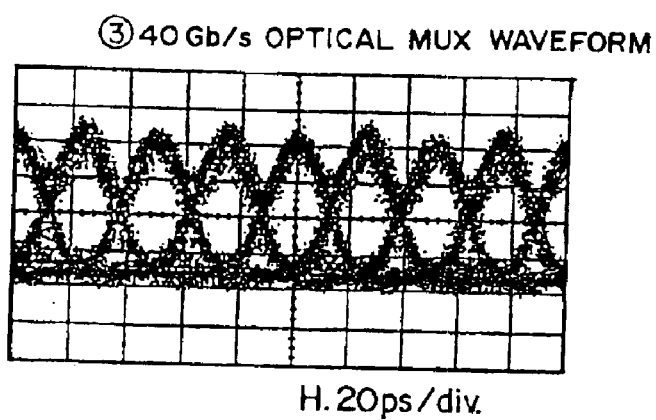

As shown in FIG. 15, the OTDM modulator 200 comprises a 20 GHz optical switching unit (1×2 switch) 201, a 20 Gb/s data modulating unit 202, a phase controlling unit (Phase controller) 203 and an optical multiplexing unit (Multiplexer) 204. The 20 GHz optical switching unit 201 is a 1×2 optical switch. The 20 Gb/s data modulating unit 202 performs data-modulation separately on optical clock signals in two systems split by the 20 GHz optical switching unit 201, which comprises two modulating units (Two modulators). The phase controlling unit 203 controls a phase difference between optical waves of the optical signals in two systems outputted from the 20 Gb/s data modulating unit 202. The optical multiplexing unit 204 multiplexes the optical signals in two systems outputted from the phase controlling unit 203. FIGS. 16(a) through 16(c) show optical waveforms (optical waveforms at positions denoted by ① through ③ in FIG. 15) outputted from the optical switching unit 201, the data modulating unit 202 and the optical multiplexing unit 204. FIGS. 16(a) through 16(c) are diagrams for illustrating an operating principle of the OTDM modulator operates. An optical waveform of the optical signal outputted from the OTDM modulator 200 shown in FIG. 15 corresponds to FIG. 16(c).

FIGS. 8(a) through 8(e) show deteriorated 40 Gb/s optical time division multiplex waveforms when an optical delay difference Δτ is changed and given thereto by the PMD emulator 105.

Back to FIG. 6, in the PMD emulator 105, a polarization beam splitter (PBS) 105A is disposed at a branching portion of an optical waveguide of a branching type, a polarization beam splitter (PBS9 105D is disposed at a combining portion of the optical waveguide 105E, an optical delay (optical delay) 105B is disposed in one parallel optical waveguide 105F of the optical waveguide 105E, and an optical attenuator (optical attenuator) 105C is disposed in the other one of the parallel optical waveguide 105G of the optical waveguide 105E, as shown in detail in FIG. 7.

In the PMD emulator 105, an inputted optical signal is split into two polarization components by the polarization beam splitter 105A. A polarization component propagating through the parallel optical waveguide 105F is given a delay quantity (optical delay difference) Δτ between two polarization modes by the optical delay 105B. In order to equalize optical losses of the parallel optical waveguides 105F and 105G, a level of a polarization component propagating through the parallel optical waveguide 105G is adjusted by the optical attenuator 105C. Further, the polarization components otuputted from the parallel optical waveguides 105G and 105G are coupled still in an orthogonal state by the polarization beam splitter 105D, and outputted.

The polarization controller 104 is disposed on the inputting side of the PMD emulator 105 to change a splitting ratio (hereinafter referred to as an optical intensity splitting ratio, occasionally) of an optical intensity of polarization components at the polarization beam splitter (PBS: Polarization Beam Splitter) 105A of the PMD emulator 105.

As above, polarization-mode dispersion (delay quantity Δτ, optical intensity splitting ratio γ) is simulatively given to an optical signal by the polarization controller 104 and the PMD emulator 105.

Again back to FIG. 6, the optical receiver 102 comprises an optical preamplifier 102A, an optical DEMUX (Demultiplex) 102B, a photodiode (PD) 102C, an amplifier 102D, an HBT D-FF 102E, a receiving unit 102F, a photodiode (PD) 102G, a band-pass filter (BPF) 102H, a timing extracting unit (PLL) 102I, and a polarization-mode dispersion monitor (PMD monitor) 102J.

In the optical receiver 102, a method of monitoring a state of polarization-mode dispersion uses an optical signal (the one inputted to the photodiode 102G) split from the main signal system outputted from the optical preamplifier 102A shown in FIG. 6. Namely, the 40 Gb/s optical signal is converted into an electric signal (O/E-converted) by the photodiode 102G, a 40 GHz component in a baseband spectrum of the optical signal is extracted by the band-pass filter 102H of 40 GHz, and an intensity of the extracted 40 GHz component is measured by a power meter of the PMD monitor 102J.

Next, Δτ (delay quantity) and γ dependency of receiver sensitivity deterioration will be described with reference to FIG. 9 (denoted by I) and FIG. 10(a). Δτ and γ dependency of a 40 GHz component intensity will be described with reference to FIG. 9 (denoted by II) and FIG. 10(b). Here, I and II in FIG. 9 show $\Delta\tau$ dependency of receiver sensitivity deterioration and γ dependency of a 40 GHz component intensity when an optical intensity splitting ratio γ=0.5.

Figure 9:
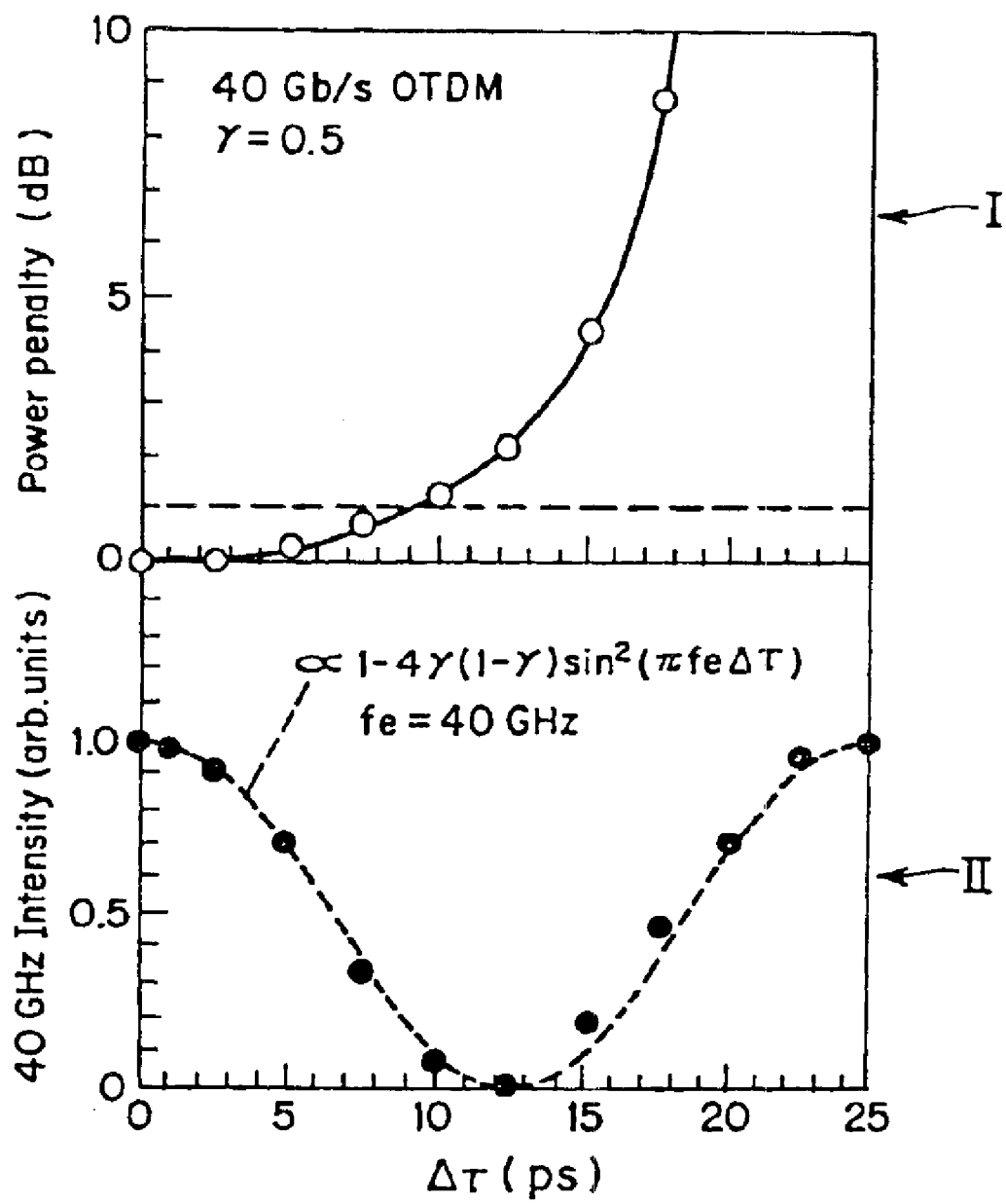
FIG. 9 is a diagram for illustrating a method of detecting a polarization-mode dispersion quantity generated in a transmission optical signal.

The one denoted by a reference character I in FIG. 9 depicts $\Delta\tau$ dependency of receiver sensitivity deterioration (power penalty) due to transmission, while the other one denoted by a reference character II in FIG. 9 depicts $\Delta\tau$ dependency of a 40 GHz component intensity when an optical intensity splitting ratio γ=0.5. As shown in the one denoted by a reference character II in FIG. 9, a 40 GHz component intensity is the maximum when $\Delta\tau$=0 (ps), decreases with increasing $\Delta\tau$, and is the minimum when $\Delta\tau$=12.5 (ps). When $\Delta\tau$ further increases, the 40 GHz component intensity turns to an increase, and is equal to the original intensity when it becomes an equal value of one time slot ($\Delta\tau$=25 ps).

Figure 10A:
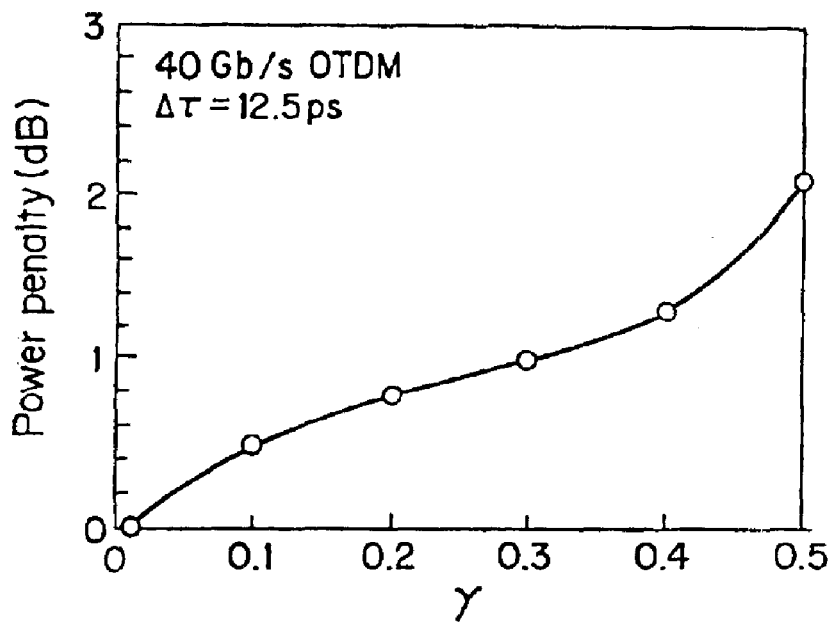
FIGS. 10(a) and 10(b) are diagrams for illustrating a method of detecting a polarization-mode dispersion quantity generated in a transmission optical signal.
Figure 10B:
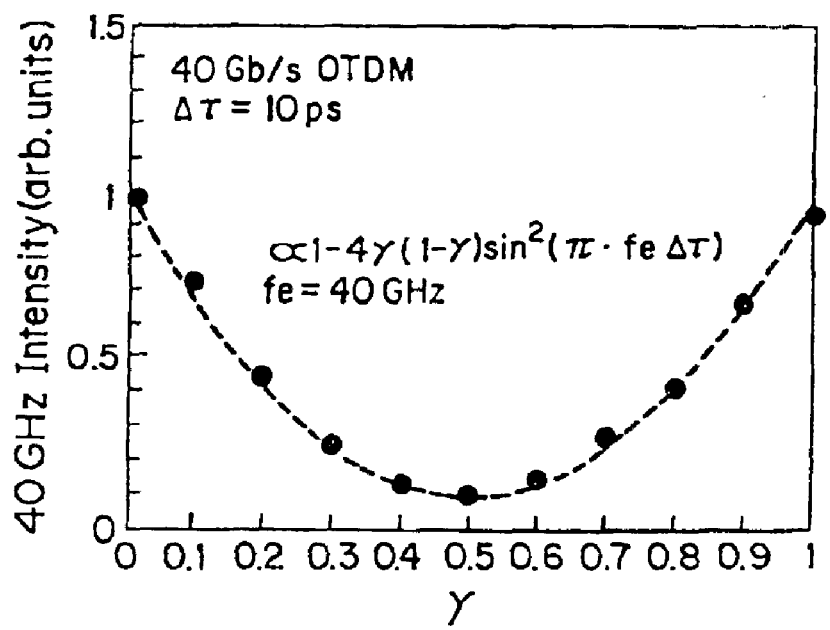

FIG. 10(b) depicts optical intensity splitting ratio γ dependency of the 40 GHz component intensity when a delay quantity $\Delta\tau$=10 (ps). As shown in FIG. 10(b), the 40 GHz component intensity is the minimum when γ=0.5, and is the maximum when γ=0 or 1.

On the other hand, as seen from the other one denoted by a reference character I in FIG. 9 and FIG. 10(a), it is known that, from results of measuring $\Delta\tau$ dependency of receiver sensitivity deterioration due to transmission, the best state with respect to $\Delta\tau$ in which the receiver sensitivity deterioration due to transmission is the minimum is when $\Delta\tau$=0 (ps), and the best state with respect to the optical intensity splitting ratio γ in which the receiver sensitivity deterioration due to transmission is the minimum is when γ=0 or 1. This coincides with a case where the 40 GHz component intensity is the maximum, as stated above. When γ=0.5 at which waveform deterioration due to polarization-mode dispersion is the maximum, an allowable value (PMD tolerance) of polarization-mode dispersion at which the receiver sensitivity deterioration after transmission is below 1 dB is about 0 ps.

Figure 11:
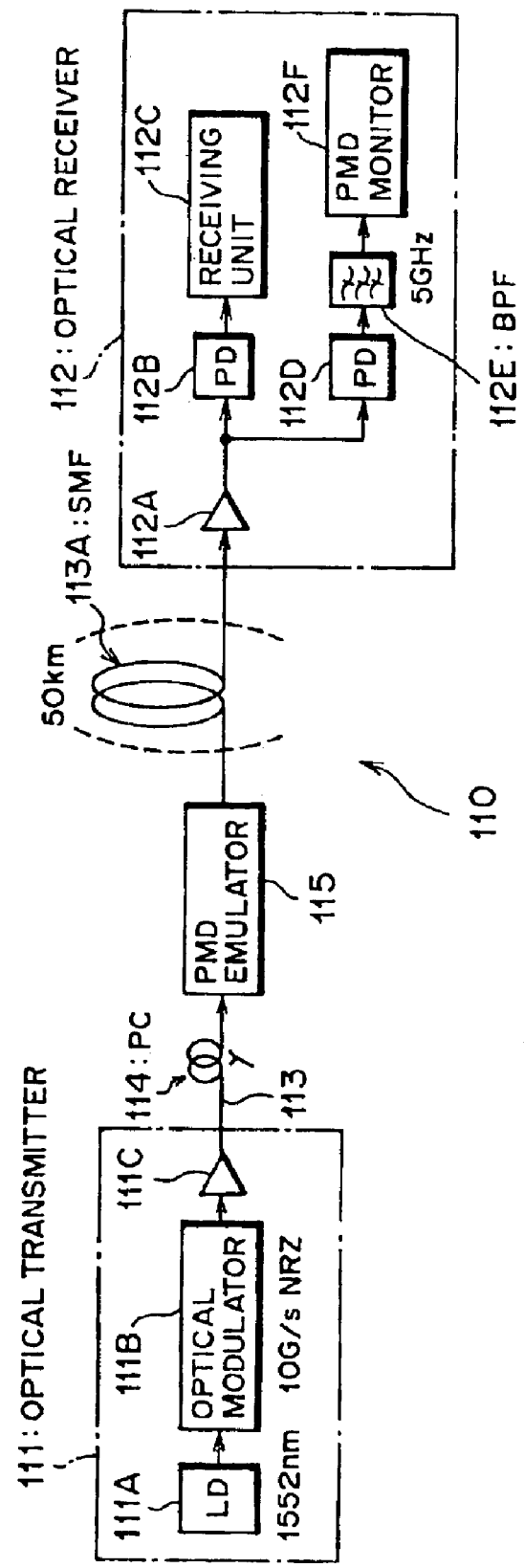
FIG. 11 is a diagram showing a structure of an experimental system of a 10 Gb/s NRZ transmission system according to the first embodiment of this invention.
Figure 12:
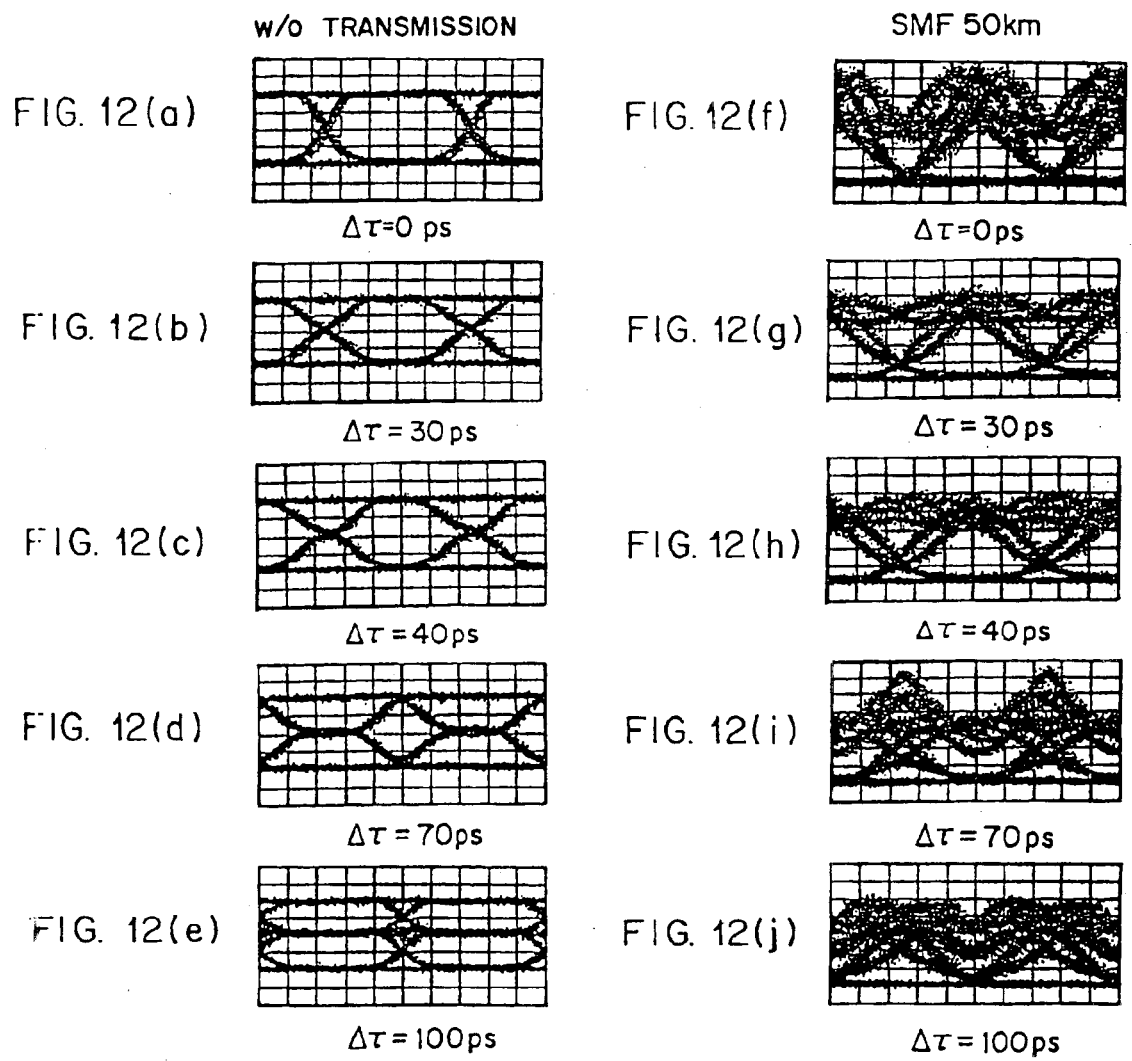
FIGS. 12(a) through 12(j) are diagrams showing deteriorated 10 Gb/s NRZ waveforms at a receiving terminal when the PMD emulator changes an optical delay difference Δτ and gives it thereto.

FIG. 11 shows a structure of an experimental system of a 10 Gb/s NRZ transmission system whose value of the transmission rate B is not 40 GHz. The 10 Gb/s NRZ transmission system 110 shown in FIG. 11 simulates a 10 Gb/s optical communication system transmitting an NRZ signal. Results of researching an effect on an optical signal by the polarization-mode dispersion control are shown in FIGS. 12(a) through 12(j), 13, 14(a) and 14(b).

In the NRZ transmission system 110 shown in FIG. 11, an optical transmitter 111 and an optical receiver 112 are connected over an optical transmission line 113. In order to simulatively give polarization-mode dispersion to an optical signal, a polarization controller (PC) 114 and a commercially available polarization-mode dispersion emulator (PMD emulator) are disposed in the optical transmission line 113. In the optical transmission line 113, a 1.3 μm band zero-dispersion fiber (SMF) 113A of 50 km long is interposed according to the experiment.

The polarization controller 114 and the PMD emulator 115 simulatively give polarization-mode dispersion (delay quantity $\Delta\tau$ and optical intensity splitting ratio γ) to an optical signal, which are similar to the polarization controller 104 and the PMD emulator 105 (refer to FIG. 6) described above. The optical transmitter 111 comprises a laser diode (LD) 11A, an optical modulator 111B and an optical post-amplifier 111C.

The optical modulator 111B of the optical transmitter 111 modulates light from the laser diode 111A into a 10 Gb/s NRZ optical signal. As the optical modulator 111B, here is used a lithium niobate optical modulator (LiNbO₃ optical modulator; not shown) of a Mach-Zehnder type. Incidentally, a 10 Gb/s NRZ waveform is generated by driving the lithium niobate optical modulator by a 10 Gb/s NRZ electric signal.

FIGS. 12(a) through 12(j) show deteriorated 10 Gb/s NRZ waveforms at a receiving terminal in the case where an optical delay difference $\Delta\tau$ is varied by the PMD emulator 115 and given to the 10 Gb/s NRZ optical signal outputted from the optical modulator 111B shown in FIG. 11. FIGS. 12(a) through 12(e) show 10 Gb/s NRZ waveforms in the case transmission over the SMF 113A is not performed, while FIGS. 12(f) through 12(j) show 10 Gb/s NRZ waveforms in the case transmission over the SMF 113A is performed.

Back to FIG. 11, the optical receiver 112 comprises an optical preamplifier 112A, a photodiode (PD) 112B, a receiving unit 112C, a photodiode (PD) 112D, a band-pass filter (BPF) 112E, and a polarization-mode dispersion monitor (PMD monitor) 112F. A flow of a process of monitoring polarization-mode dispersion in the optical receiver 112 is as follows. Namely, an optical signal split from the main signal system is converted into an electric signal (O/E-converted) by the photodiode 112D, a 5 GHz component in a baseband spectrum of the optical signal is extracted by the band-pass filter 112E of 5 GHz, and an intensity of the extracted 5 GHz component is measured by a power meter as the PMD monitor 102F. Incidentally, since the 10 Gb/s NRZ signal does not have a 10 GHz component intensity, a 5 GHz component that is a half thereof is extracted and an intensity of it is measured.

Figure 13:
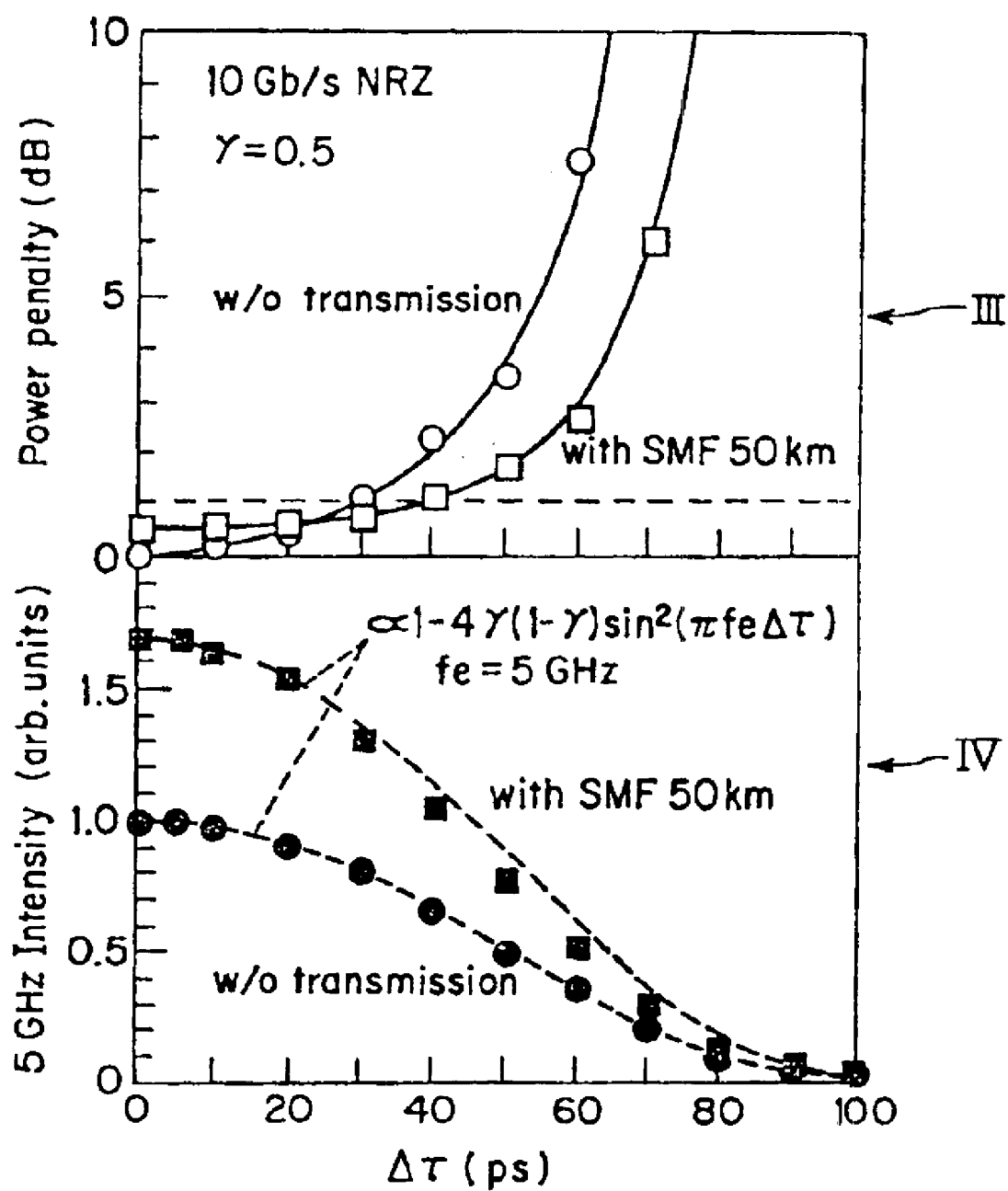
FIG. 13 is a diagram for illustrating a method of detecting a polarization-mode dispersion quantity generated in a transmission optical signal.

FIG. 13 shows $\Delta\tau$ (delay quantity, group delay) dependency of receiver sensitivity deterioration (power penalty) due to transmission (refer to a reference character III in FIG. 13), and $\Delta\tau$ dependency of 5 GHz component intensity (refer to a reference character IV in FIG. 13) when an optical intensity splitting ratio γ=0.5. As shown in the one denoted by a reference character IV in FIG. 13, the 5 GHz component intensity is the maximum when $\Delta\tau$=0 (ps), similarly to the case of the transmission rate 40 Gb/s OTDM signal. However, this case differs in point that a cycle for $\Delta\tau$ is twice one time slot from the case of the transmission rate 40 Gb/s OTDM signal.

Figure 14A:
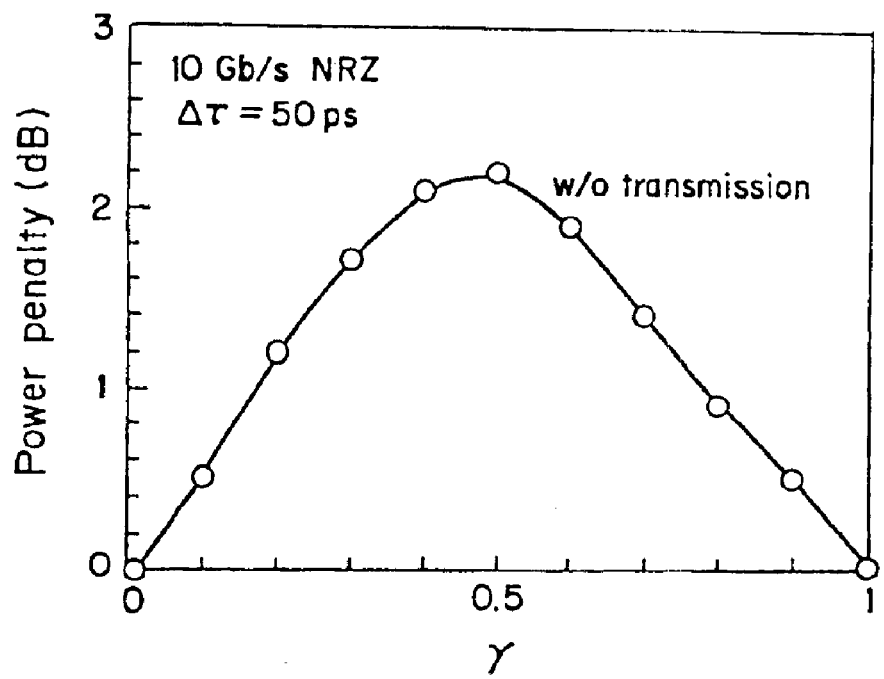
FIGS. 14(a) and 14(b) are diagrams for illustrating a method of detecting a polarization-mode dispersion quantity generated in a transmission optical signal.
Figure 14B:
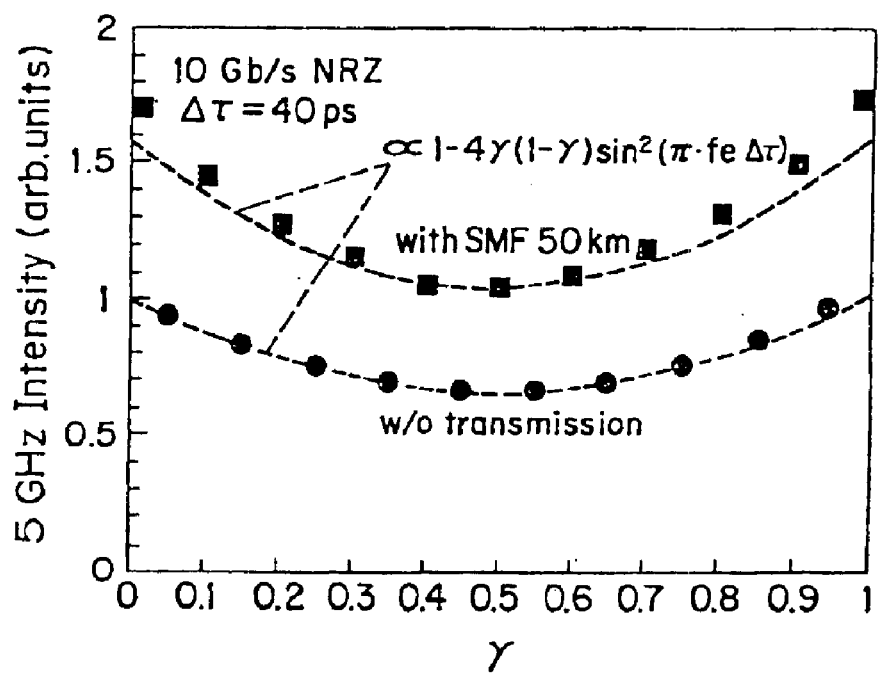

FIG. 14(a) shows results of measuring optical intensity splitting ratio γ dependency of receiver sensitivity deterioration. FIG. 14(b) shows γ dependency of 5 GHz component intensity when a delay quantity $\Delta\tau$=40 ps. As shown in FIG. 14(a), the receiver sensitivity deterioration is the maximum when γ=0.5, and is the minimum when γ=0 or 1. As shown in FIG. 14(b), the 5 GHz component intensity is the minimum when γ=0.5, and is the maximum when γ=0 or 1, similarly to the case of the transmission rate 40 Gb/s OTDM signal.

As seen from FIGS. 13, 14(a) and 14(b), when $\Delta\tau$=0 (ps) with respect to $\Delta\tau$, and when γ=0 or 1 with respect to γ, the state is the bast in which receiver sensitivity deterioration due to transmission is the minimum. This coincides with the case where the 5 GHz component is the maximum, as stated above.

When γ=0.5 at which waveform deterioration due to polarization-mode dispersion is the maximum [refer to FIG. 14(a)], an allowable value (PMD tolerance) of polarization-mode dispersion at which receiver sensitivity deterioration after transmission is below 1 dB is about 30 ps as shown by a reference character III in FIG. 13 when no fiber transmission is performed.

As above, the PMD tolerance is almost inversely proportional to a transmission rate (bit rate) of an optical signal.

Namely, the greater the transmission rate of an optical signal and the larger the transmission distance of an optical signal, the more an effect by polarization-mode dispersion cannot be ignored.

Meanwhile, a method of detecting an intensity of a predetermined frequency component is as follows. Namely, the polarization-mode dispersion quantity detecting unit 14 (refer to FIG. 4) extracts an intensity of a frequency component in a baseband spectrum in an optical waveform forming an arbitrary transmission optical signal, and detects a maximum point of the intensity of the first specific frequency component using a function (first function) in which the frequency information and parameters showing a polarization-mode dispersion quantity are variables. The first function mentioned here is a function quantitatively representing dependency of a 20 GHz component intensity in the 40 Gb/s RZ waveform on $\Delta\tau$, or dependency of a 5 GHZ component intensity in the 10 Gb/s NRZ waveform on $\Delta\tau$, which is determined according to $\Delta\tau$ and $\gamma$. Hereinafter, description will be made of the first function, in which a controlling method using this function will be referred to as a control mode 1 in order to discriminate it from a control method to be described later.

Assuming that a time change of an optical intensity is F(t) when no polarization-mode dispersion (delay quantity $\Delta\tau$, optical intensity splitting ratio $\gamma$) is given, a time change of an optical intensity when polarization-mode dispersion is given is expressed by the following formula (1):

$$\gamma F(t)+(1-\gamma)F(t+\Delta\tau) \quad (1)$$

An electric field intensity of an electric signal after received is proportional to the value. The intensity detector 13 (refer to FIG. 4) detects a value of the square of it as a change with time of the intensity. Therefore, a baseband spectrum P(f) of an optical signal is given by the Fourier transform as shown in formula (2):

$$P(f) = \left| \int \{\gamma F(t) + (1-\gamma)F(t+\Delta\tau)\} \cdot \exp(i\omega t)dt \right|^2 \quad (2)$$

$$= \left| \gamma \int F(t) \cdot \exp(i\omega t)dt + (1-\gamma)\int F(t+\Delta\tau) \cdot \exp(i\omega t)dt \right|^2$$

$$= \left| \gamma \int F(t) \cdot \exp(i\omega t)dt + (1-\gamma) \cdot \exp(-i\omega\Delta\tau)\int F(t) \cdot \exp(i\omega t)dt \right|^2$$

$$= K(f) \cdot \left| \int F(t) \cdot (i\omega t)dt \right|^2$$

where the factor of proportionality K(f) is expressed by a formula (3):

$$K(f) = |\gamma + (1-\gamma) \cdot \exp(-i\omega\Delta\tau)|^2 \quad (3)$$

$$= |\gamma + (1-\gamma) \cdot \{\cos(\omega\Delta\tau) - i \cdot \sin(\omega\Delta\tau)\}|^2$$

$$= 1 - 4\gamma(1-\gamma)\sin^2(\pi f \Delta\tau)$$

where $\omega = 2\pi f$.

As above, since parameters $\Delta\tau$ and $\gamma$ in terms of a state of polarization-mode dispersion are included in only K(f), it is possible to separate it from a baseband spectrum $|\int F(t) \cdot \exp(i\omega t)dt|^2$ of an optical signal without polarization-mode dispersion.

Since K=K(f, $\Delta\tau$, $\gamma$) from the formula (3), when the above first specific frequency component fe (Hz) is extracted by the band-pass filter 12 (refer to FIG. 4) and an intensity thereof is detected by the intensity detetor 13, K(f, $\Delta\tau$, $\gamma$)=K(fe|$\Delta\tau$, $\gamma$), so that K is dependent on the delay quantity $\Delta\tau$ and the optical intensity splitting ratio $\gamma$, where K(fe|$\Delta\tau$, $\gamma$) is a function having variables $\Delta\tau$ and $\gamma$ when fe is given. Accordingly, by measuring optical intensities (factors of proportionality thereof) K(f) at two kinds of frequencies fe (Hz) on the receiving side, it is possible to uniquely determine $\Delta\tau$ and $\gamma$ in the transmission line.

Moreover, since the formula (2) is established with respect to a general formula F(t) representing an optical waveform, the above result that a state of polarization-mode dispersion can be detected with K(fe) is established irrespective of a signal form (NRZ or RZ) and a change in waveform such as chromatic dispersion, nonlinear effect or the like. Incidentally, in the results of the experiment with the 10 Gb/s NRZ transmission system, the 5 GHz component intensity is large at the time of fiber (SMF) transmission. A reason of this is that $|\int F(t)\cdot\exp(i\omega t)dt|^2$ is large, which meets a result that it is proportional to K(fe) with respect to polarization-mode dispersion.

When a state of polarization-mode dispersion is the bast, that is, when waveform deterioration due to polarization-mode dispersion is the minimum, it coincides with when an intensity of the fe(Hz) component is the maximum, as stated above. Therefore, it is possible to detect a polarization-mode dispersion quantity using the formulae (2) and (3) when the polarization-mode dispersion compensator 4 disposed in the optical transmission line 3 controls a delay quantity $\Delta\tau$ and compensates polarization-mode dispersion. Accordingly, the above parameter inforamtion is a delay quantity $\Delta\tau$ between two polarization modes.

Namely, the formulae (2) and (3) are so generalized as to quantitatively detect a state of polarization-mode dispersion (function of a delay quantity $\Delta\tau$ and an optical intensity splitting ratio $\gamma$) from a frequency component intensity extracted from a baseband spectrum of an optical signal irrespective of a change in waveform such as a signal form (NRZ, RZ or the like) and a change in waveform such as chromatic dispersion, nonlinear effect or the like.

In other words, the formulae (2) and (3) correspond to the first function (function in which frequency information and parameters showing a polarization-mode dispersion quantity are variables) of an intensity of a frequency component in a baseband spectrum in an optical waveform forming an arbitrary transmission optical signal (for example, a 40 Gb/s OTDM signal or a 10 Gb/s NRZ signal) used when the polarization-mode dispersion quantity detecting unit 14 detects a polarization-mode dispersion quantity of the transmission optical signal.

A flow of a signal in the optical transmission system 10 shown in FIG. 4 is as follows. An optical signal at a transmission rate B (b/s) transmitted from the optical transmitter 2 is transmitted to the optical receiver 7 over the optical transmission line 3, a part of the optical signal transmitted over the optical transmission line 3 is taken out by the optical splitting unit 5, and the optical signal (monitor light) taken out is sent to the dispersion compensation controlling apparatus 1 in order to compensate polarization-mode dispersion generated in the transmitted optical signal in the receiving terminal. In the dispersion compensation controlling apparatus 1, a state of polarization-mode dispersion generated in the optical signal transmitted over the optical transmission line 3 is monitored on the basis of the optical signal taken out by the optical splitting unit 5, and a control by the polarization-mode dispersion compensator 4 is performed according to a result of the monitoring.

This polarization-mode dispersion quantity detecting step (detecting step in a control mode 1) is as follows. In the dispersion compensation controlling apparatus 1, the optical signal taken out by the optical splitting unit 5 is first received by the photo receiver 11, converted into an electric signal (O/E-converted), then inputted to the band-pass filter 12.

The first specific frequency component [fe (Hz) component] in a baseband spectrum in the transmission optical signal inputted to the receiving side over the transmission fiber is detected by the band-pass filter 12 (specific frequency component detecting step), and an intensity of the above specific frequency component detected at the specific frequency component detecting step is detected by the intensity detecting unit 13 (intensity detecting step). Further, in the polarization-mode dispersion quantity detecting unit 14, a predetermined functional operation [functional operation using the above formulae (1) and (2)] is performed from information on the intensity of the above specific frequency component detected at the intensity detecting step, whereby a polarization-mode dispersion quantity of the above transmission optical signal is detected (dispersion quantity detecting step).

Here, when the above transmission optical signal is a 40 Gb/s RZ optical signal or a 40 Gb/s OTDM signal, for example, the specific frequency whose component is detected at the specific frequency component detecting step is set to a frequency (40 GHz) corresponding to the bit rate. Further, when the above transmission optical signal is a 10 Gb/s NRZ optical signal, the specific frequency whose component is detected at the specific frequency component detecting step is set to a frequency (5 GHz) corresponding to ½ of the bit rate. Namely, the specific frequency whose component is detected at the specific frequency component detecting step is set to a frequency whose component in a baseband spectrum in the above transmission signal can be stably obtained over a period of time.

In the polarization-mode dispersion quantity detecting unit 14 (corresponding to the dispersion quantity detecting step), the above predetermined functional operation (first functional operation) is performed using the first function that is a function which shows an intensity of a frequency component in a baseband spectrum in an optical waveform configuring an arbitrary transmission optical signal, and in which the frequency information and parameters showing a polarization-mode dispersion quantity are variables.

In the parameter setting circuit 15, a parameter setting control signal for setting such parameter information (delay quantity Δτ) as to cancel a polarization-mode dispersion quantity detected by the polarization-mode dispersion quantity detecting unit 14 is outputted to the polarization-mode dispersion compensator 4 disposed in the optical receiver 7 in order to compensate polarization-mode dispersion of the transmission optical signal.

Namely, in the dispersion compensation controlling apparatus 1, a state of polarization-mode dispersion [this is expressed as a function of a delay quantity Δτ and γ [the above formulae (2) and (3)]] of the optical transmission line 3 is detected by the polarization-mode dispersion quantity detecting unit 14 from a value of an fe (Hz) component intensity detected by the intensity detector 13, and information thereon is fed back to the polarization-mode dispersion compensator 4 through the parameter setting circuit 15 in order to control the polarization-mode dispersion compensator 4.

The polarization-mode dispersion compensator 4 sets parameter information on the basis of the control signal when receiving the parameter setting control signal so as to compensate polarization-mode dispersion generated in an optical signal transmitted over the optical transmission line 3.

According to the dispersion compensation controlling apparatus 1 according to the first embodiment of this invention, in the control mode 1 (method using the first function), an intensity of the first specific frequency component in a baseband spectrum in a transmission optical signal is detected, and a predetermined first functional operation is performed to detect a polarization-mode dispersion quantity of the transmission optical signal from the intensity of the detected first specific frequency component, so that polarization-mode dispersion generated in the transmission optical signal is easily detected.

As in the above way, a polarization-mode dispersion quantity is detected at all times, and parameter information for compensating polarization-mode dispersion generated in a transmission optical signal is set on the basis of the detected polarization-mode dispersion quantity, whereby deterioration of a transmission wavform of the optical signal by compensating the polarization-mode dispersion, which contributes to long-distance transmission of a high-speed optical signal.

Figure 17:
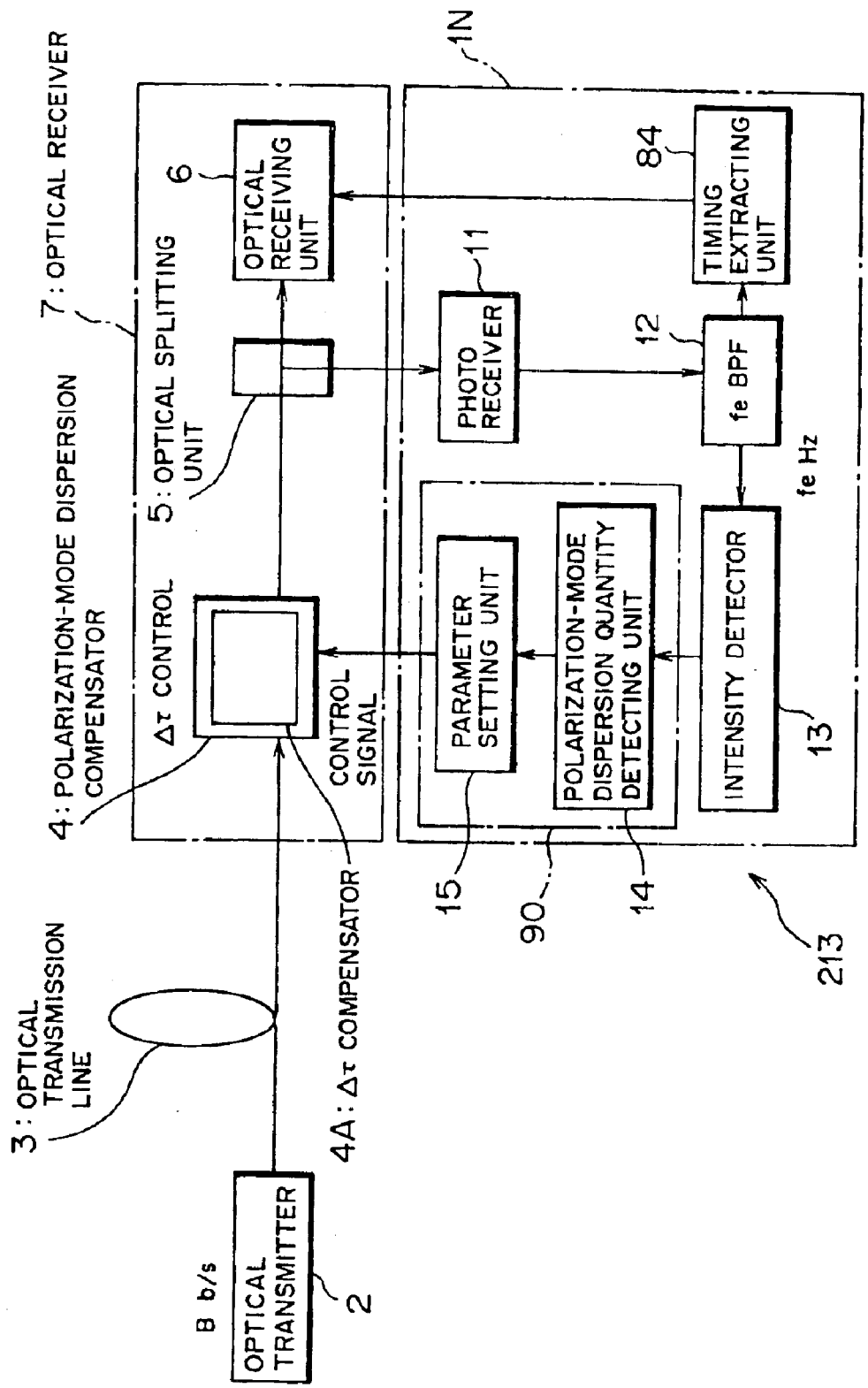
FIG. 17 is a block diagram showing a structure of an optical transmission system provided with a dispersion compensation controlling apparatus with a timing extracting unit according to the first embodiment of this invention.

Incidentally, in FIG. 4 described above, it is possible to extract a timing of a received signal on the basis of the above first specific frequency component detected by the band-pass filter (first specific frequency component detecting unit) 12. FIG. 17 is a block diagram showing a structure of an optical transmission system having a dispersion compensation controlling apparatus 1M provided with a timing extracting unit 84 according to the first embodiment of this invention. The timing extracting unit 84 extracts a timing of a received signal on the basis of the first specific frequency component detected by the band-pass filter 12. As the timing extracting unit 84, a PLL (Phase-Locked Loop) or the like is used. Incidentally, like reference characters in FIG. 17 designate like or corresponding parts in FIG. 4, further descriptions of which are thus omitted.

Since a fe (Hz) component is a signal in synchronization with a received waveform as above, it is possible to take out a clock signal by the timing extracting unit 84, and use it for discrimination or the like in the optical receiver 7.

(B1) Description of a First Modification of the First Embodiment

Figure 18:
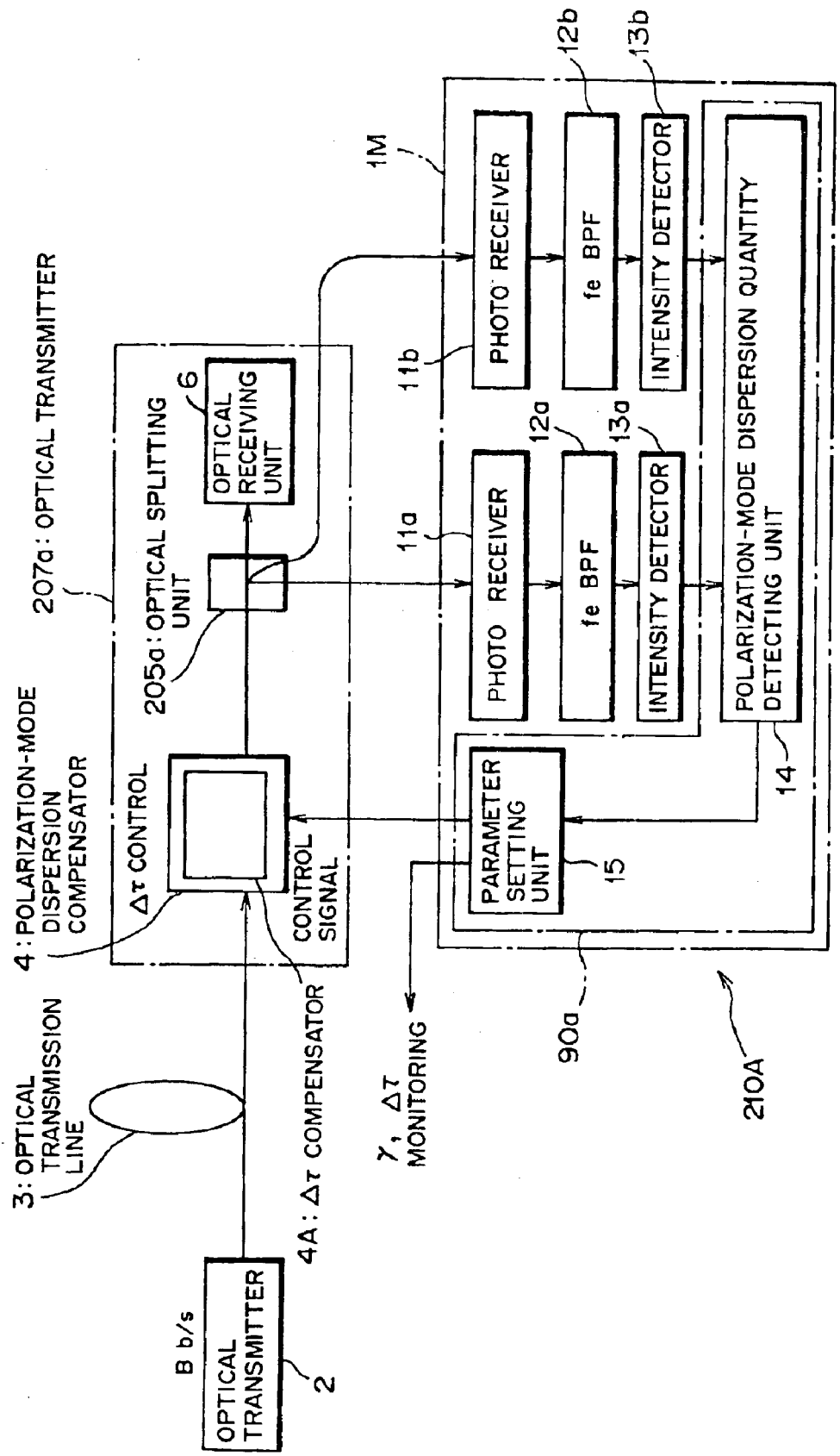
FIG. 18 is a block diagram showing a structure of an optical transmission system to which a dispersion compensation controlling apparatus according to a first modification of the first embodiment of this invention is applied.

FIG. 18 is a block diagram showing a structure of an optical transmission system to which a dispersion compensation controlling apparatus according to a first modification of the first embodiment is applied. The optical transmission system 210A shown in FIG. 18 is as well an optical communication system with a transmission rate B (b/s) (for example, 40 Gb/s, 10 Gb/s or the like) adopting timing division multiplexing. In the optical transmission system 210A, an optical transmitter 2 and an optical receiver 207a are connected over an optical transmission line (transmission fiber) 3, and a dispersion compensation controlling apparatus 1M is provided on the receiving side. Here, the optical transmitter 2 and the optical transmission path 3 are similar to those described above, further descriptions of which are thus omitted.

The optical transmission system 210A differs from the one according to the first embodiment in that signals in two systems are outputted from the optical splitting unit 205a. Namely, a frequency value to detect the specific frequency component is of one kind according to the first embodiment, whereas frequency values to detect the specific frequency component are of two kinds according to this modification. Hereinafter, the former will be referred to as a detection form 1, whereas the latter will be referred to as a detection form 2, for the sake of explanation. Summarizing the control modes, the first embodiment adopts the control mode 1 using the detection form 1, whereas this modification adopts the control mode 1 using the detection form 2. As to a relationship between the first function and its parameters, F=K(f, Δτ, γ). For this, the receiving side using the detection form 1 can detect only one kind of frequency $f_1$ and an optical intensity $K_1$ thereat, but cannot determine values of Δτ and γ if the receiving side does not know either one of the values Δτ and γ, thus the receiving side cannot determine a control value. In consequence, it is necessary to use a control system being capable even if values of Δτ and γ cannot be uniquely determined, such as a maximum value control system or the like.

On the other hand, the receiving side using the detection form 2 can detect two kinds of frequencies $f_1$, and $f_2$ and optical intensities $K_1$ and $K_2$ thereat, so that the receiving side can determine the both values Δτ and γ, and thus a control value. Meanwhile, since it is practically difficult for the receiving side to directly adjust a value of γ, γ is used for monitoring rather than for control (refer to an output of the parameter setting circuit 15 in FIG. 18). Incidentally, the detection form 2 means a form in which different frequencies in two systems are used to perform one polarization-mode dispersion compensation (used in the same meaning when chromatic dispersion compensation to be described later is performed).

The optical receiver 207a comprises a polarization-mode dispersion compensator 4, an optical splitting unit 205a and an optical receiver 6. The polarization-mode dispersion compensator 4 and the optical receiving unit 6 are similar to those described above, further descriptions of which are thus omitted. The optical splitting unit 205a takes out a part of a transmission optical signal inputted to the receiving side over the optical transmission line 3, and sends it out as monitor light in two systems to the dispersion compensation controlling apparatus 1M.

The dispersion compensation controlling apparatus 1M monitors a state of polarization-mode dispersion generated in an optical signal transmitted over the optical transmission line 3 on the basis of the optical signal taken out by the optical splitting unit 205a, and controls the polarization-mode dispersion compensator 4 according to a result of the monitoring, which comprises photo receivers 11a and 11b, band-pass filters (fe BPF) 12a and 12b, intensity detecting units 13a and 13b, and a polarization-mode dispersion controlling unit 90a. The photo receivers 11a and 11b, the band-pass filters 12a and 12b, the intensity detectors 13a and 13b are similar to the photo receiver 11, the band-pass filter 12 and the intensity detector 13 described above, respectively, further descriptions of which are thus omitted.

Although a term "dispersion" is generally used to mean "chromatic dispersion", the term "dispersion" is used to mean "polarization-mode dispersion" in this modification, the dispersion compensation controlling apparatus 1M thus represents "polarization-mode dispersion controlling apparatus 1M".

The polarization-mode dispersion controlling unit 90a performs a control using the detection form 2 using the control mode 1. Namely, the polarization-mode dispersion controlling unit 90a detects a polarization-mode dispersion quantity of the above transmission optical signal from an intensity of the first specific frequency component detected by the intensity detector 13b and an intensity of a third specific frequency component detected by the intensity detector 13b. This function is achieved by a polarization-mode dispersion quantity detecting unit 14 and a parameter setting circuit 15. Incidentally, the polarization-mode dispersion quantity detecting unit 14 and the parameter setting circuit 15 are similar to those described above, further descriptions of which are thus omitted.

A controlling method by the polarization-mode dispersion controlling unit 90a is as follows. Namely, with two kinds of frequency information (first specific frequency component information and the third specific frequency component information) obtained by the two intensity detectors 13a and 13b, parameters Δτ and γ are determined as in a way of solving simultaneous equations with two unknowns in terms of the first function. Δτ is controlled, while γ is used for monitoring. Here, the first function is an established form relating to dependency of the 40 GHz component intensity in a 40 Gb/s OTDM waveform on Δτ, or dependency of the 5 GHz component intensity in a 10 Gb/s NRZ waveform on Δτ. When γ can be fed back to the transmitting side as well, it is possible to control a splitting ratio of an optical intensity (as to this embodiment, description will be made in another modification).

Namely, the dispersion compensation controlling apparatus 1M comprises a third specific frequency component detecting unit (band-pass filter 12b) detecting the third specific frequency component in a baseband spectrum in a transmission optical signal, and a third intensity detecting unit (polarization-mode dispersion quantity detecting unit 14) detecting information on an intensity of the above third specific frequency component detected by the third specific frequency component detecting unit. Besides, the polarization-mode dispersion controlling unit 90a comprises the polarization-mode dispersion quantity detecting unit 14 detecting a polarization-mode dispersion quantity from the intensity of the first specific frequency component and the intensity of the third specific frequency component detected by the first intensity detecting unit and the third intensity detecting unit (polarization-mode dispersion quantity detecting unit 14), respectively, using the first function which is a function representing an intensity of a frequency component in a baseband spectrum in an optical waveform configuring an arbitrary transmission optical signal and in which the frequency information and parameters showing a polarization-mode dispersion quantity are variables, and the parameter setting circuit 15 outputting a parameter setting control signal having parameter information as a control quantity for compensating polarization-mode dispersion of the above transmission optical signal on the basis of the above polarization-mode dispersion quantity detected by the polarization-mode dispersion quantity detecting unit 14 to the polarization-mode dispersion compensator 4. Incidentally, the parameter information is a delay quantity (optical delay difference) Δτ between two polarization modes. The parameter setting circuit 15 outputs a parameter setting control signal for setting the above parameter information to the polarization-mode dispersion compensator 4 disposed in the receiving terminal apparatus (optical receiver 7a) which is a receiving terminal of the above transmission optical signal.

In the above structure, received light is split into two by the optical splitting unit 205a, O/E-converted by the photo receivers 11a and 11b, then inputted to the band-pass filters 12a and 12b. In the band-pass filter 12a, the first specific frequency component in a baseband spectrum in the transmission optical signal inputted to the receiving side over the optical transmission fiber is detected, while in the band-pass filter 12b, the third specific frequency component in the baseband spectrum of the transmission optical signal inputted to the receiving side over the transmission optical fiber is detected (specific frequency component detecting step). Further, intensities of the above first specific frequency component and the third specific frequency component detected by the intensity detectors 13a and 13b at the specific frequency component detecting step are detected (intensity detecting step). Still further, in the polarization-mode dispersion quantity detecting unit 14, a polarization-mode dispersion quantity of the above transmission optical signal is detected from information on the intensities of the above two kinds of specific frequency components detected at the intensity detecting step by performing a predetermined functional operation [functional operation using the above formulae (2) and (3)] (dispersion quantity detecting step).

By using that a time at which waveform deterioration due to polarization-mode dispersion is the minimum and a time at which the fe (Hz) component intensity is the maximum coincide, and since a polarization-mode dispersion quantity is detected in the control mode 1 and the detection form 2, as above, it is possible to control a delay quantity $\Delta\tau$ to compensate polarization-mode dispersion by the polarization-mode dispersion compensator 4 disposed in the optical transmission path 3.

It is possible as well to quantitatively detect a state of polarization-mode dispersion (function of a delay quantity $\Delta\tau$) from a frequency component intensity extracted from a baseband spectrum of an optical signal irrespective of a signal form (NRZ, RZ or the like) and a waveform change such as chromatic dispersion, nonlinear effect or the like.

(B2) Description of a Second Modification of the First Embodiment

Although the polarization-mode dispersion compensator 4 is disposed on the side of the optical receiver 7 in FIGS. 4, 17 and the like above, it is alternatively possible to dispose the polarization-mode compensator 4 on the side transmitting signal light.

Figure 19:
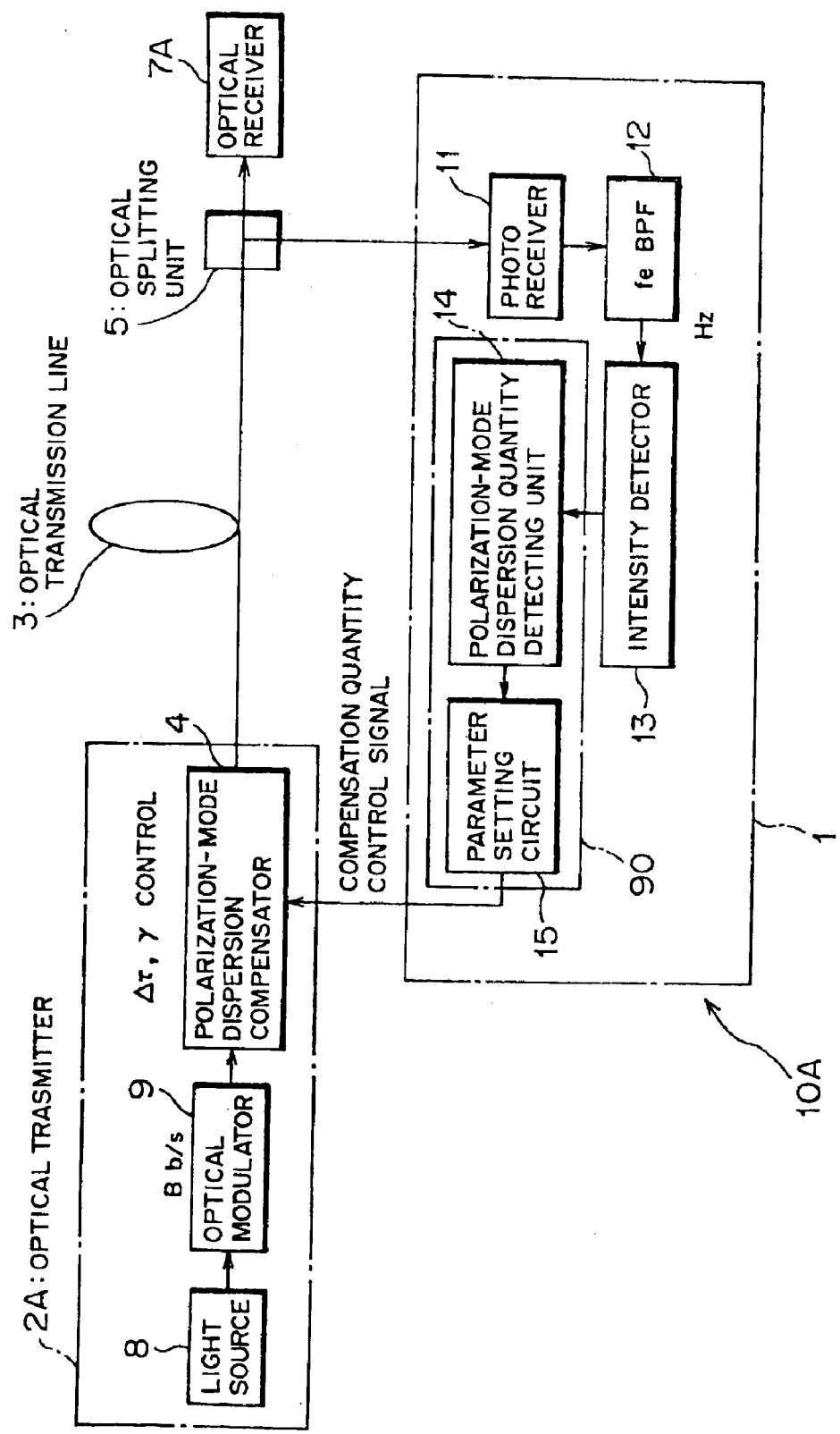
FIG. 19 is a block diagram showing a structure of an optical transmission system to which a dispersion compensation controlling apparatus according to a second modification of the first embodiment of this invention is applied.

FIG. 19 is a block diagram showing a structure of an optical transmission system to which a dispersion compensation controlling apparatus according to a second modification of the first embodiment of this invention is applied. The optical transmission system 10A shown in FIG. 19 is as well an optical communication system with a transmission rate B (b/s) (for example, 40 Gb/s, 10 Gb/s or the like) adopting time division multiplexing. The optical transmission system 10A differs from the optical transmission system 10 according to the first embodiment in that a polarization-mode dispersion compensator 4 is disposed in an optical transmitter 2A. Namely, the optical transmission system 10A comprises an optical transmitter 2A, an optical transmission line 3, an optical splitting unit 5, an optical receiver 7A and a dispersion compensation controlling apparatus 1. The optical transmitter 2A comprises a signal light source 5, an optical modulator 9 and a polarization-mode dispersion compensator 4.

The dispersion compensation controlling apparatus 1 sends back a result obtained by detecting a polarization state of an optical signal on the side of the optical receiver 7A up to the optical transmitter 2A that is the transmitting side. This sending-back method may be a method of preparing another line with a low speed or a method of multiplexing information on a transmission optical signal in the opposite direction. A term "dispersion" is generally used to mean "chromatic dispersion". In this modification, the term "dispersion" is used to mean "polarization-mode dispersion", the dispersion compensation controlling apparatus 1 thus represents "polarization-mode dispersion controlling apparatus".

The polarization-mode dispersion compensator 4 disposed in the optical transmitter 2A can change the optical intensity splitting ratio γ of transmission light and send the light. Although not shown, an optical amplifier is disposed on the output's side of the polarization-mode dispersion compensator 4, and this optical amplifier transmits to the optical transmission line 3. Incidentally, the other parts having the same reference characters have the same or similar functions, further descriptions of which are thus omitted. Since a frequency provided for intensity detection is one system, here is employed the detection form 1.

Namely, in the dispersion compensation controlling apparatus 1 according to the second modification of the first embodiment, a parameter setting circuit 15 outputs a parameter setting control signal for setting the above parameter information to the polarization-mode dispersion compensator 4 disposed in the optical transmitter 2A (transmitting terminal apparatus) transmitting the above transmission optical signal.

With the above structure, the optical transmission system 10A operates in the almost similar manner to the optical transmission system 10 to which the dispersion compensation controlling apparatus 1 according to the first embodiment is applied. Here, the dispersion compensation controlling apparatus 10A uses the detection form 1 in the control mode 1.

According to the dispersion compensation controlling apparatus 1 according to the second modification of the first embodiment, it is possible to attain similar effects to the first embodiment described above. In addition, it is possible to control a polarization direction such that the optical intensity splitting ratio γ is in the best state (γ=0 or 1) according to a state of the optical transmission path 3 by controlling the polarization-mode dispersion compensator 4 disposed in the optical transmitter 2A, so that polarization-mode dispersion generated in the transmission optical signal is more effectively compensated.

Incidentally, the polarization-mode dispersion compensator 4 may be formed as a linear repeater or the like in the optical transmission line 3.

Figure 20:
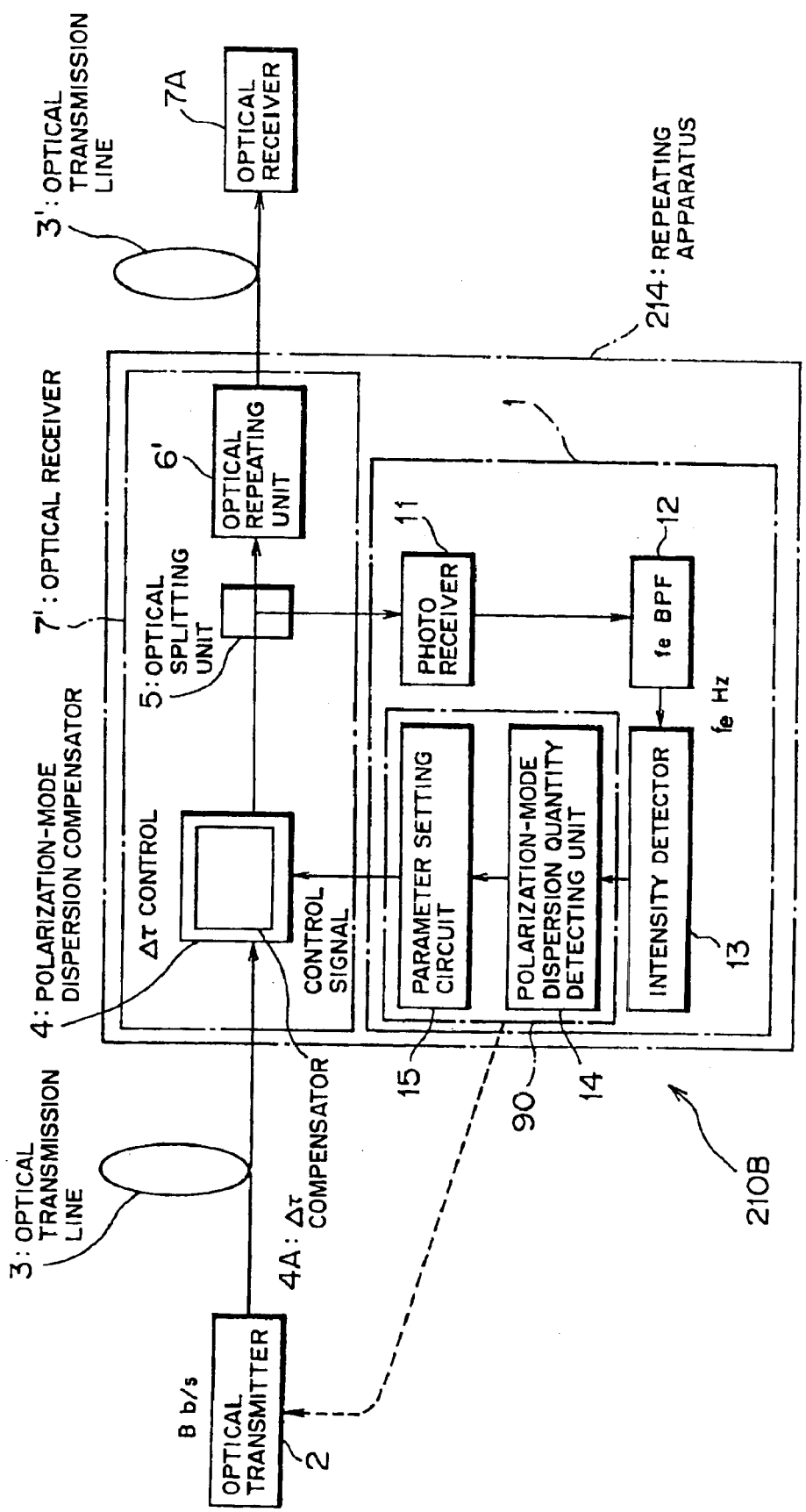
FIG. 20 is a block diagram showing a structure of another optical transmission system to which a dispersion compensation controlling apparatus according to the second modification of the first embodiment of this invention is applied.

FIG. 20 is a block diagram showing a structure of another optical transmission system to which the dispersion compensation controlling apparatus according to the second modification of the first embodiment is applied. The optical transmission system 210B shown in FIG. 20 is as well an optical communication system with a transmission rate B (b/s) (for example, 40 Gb/s, 10 Gb/s or the like) adopting time division multiplexing. The optical transmission system 210B differs from the optical transmission system 10 according to the first embodiment in that a polarization-mode dispersion compensator 4 is disposed in an optical repeating apparatus (Optical Repeater) 214.

Namely, the optical transmission system 210 comprises the optical repeating apparatus 214 along with an optical transmitter 2, an optical transmission lines 3 and 3' and an optical receiver 7A. The optical repeating apparatus 214 amplifies and repeats the above transmission optical signal, which comprises an optical repeater 7' and a dispersion compensation controlling apparatus 1.

The optical repeater 7' receives signal light from the optical transmitter 2, and optically amplifies and transmits it to the optical receiver 7A, which comprises an optical repeating unit 6' performing optical amplification and optical re-transmission along with the polarization-mode dispersion compensator 4 and an optical splitting unit 5. Incidentally, the optical transmitter 2, the optical transmission lines 3 and 3', the optical receiver 7A and the dispersion compensation controlling apparatus 1 other than the above have similar functions to those of the optical transmission system 10 according to the first embodiment, further descriptions of which are thus omitted.

The dispersion compensation controlling apparatus 1 sends back a result of detection on a polarization state of an optical signal by the optical repeater 7' using the detection form 1 and the control mode 1 to the optical transmitter 2 that is the transmitting side, and outputs a parameter setting control signal for setting the above parameter information to the polarization-mode dispersion compensator 4. A sending-back method may be a method of preparing another line with a low speed or a method of multiplexing information on a transmission optical signal in the opposite direction. Incidentally, the other parts denoted by the same reference characters have the same or similar functions, further descriptions of which are thus omitted.

With the above structure, the optical transmission system 210B operates in the almost similar manner to the optical transmission system 10 to which the dispersion compensation controlling apparatus 1 according to the first embodiment using the detection form 1 and the control mode 1 is applied. As this, it is possible to attain the same effects as the first embodiment described above. In addition, by controlling the polarization-mode dispersion compensator 4 disposed in the repeating apparatus 214, it is possible to more effectively compensate polarization-mode dispersion generated in a transmission optical signal according to a state of the optical transmission line 3.

Further, a structure of the polarization-mode dispersion compensation may be varied.

Figure 21:
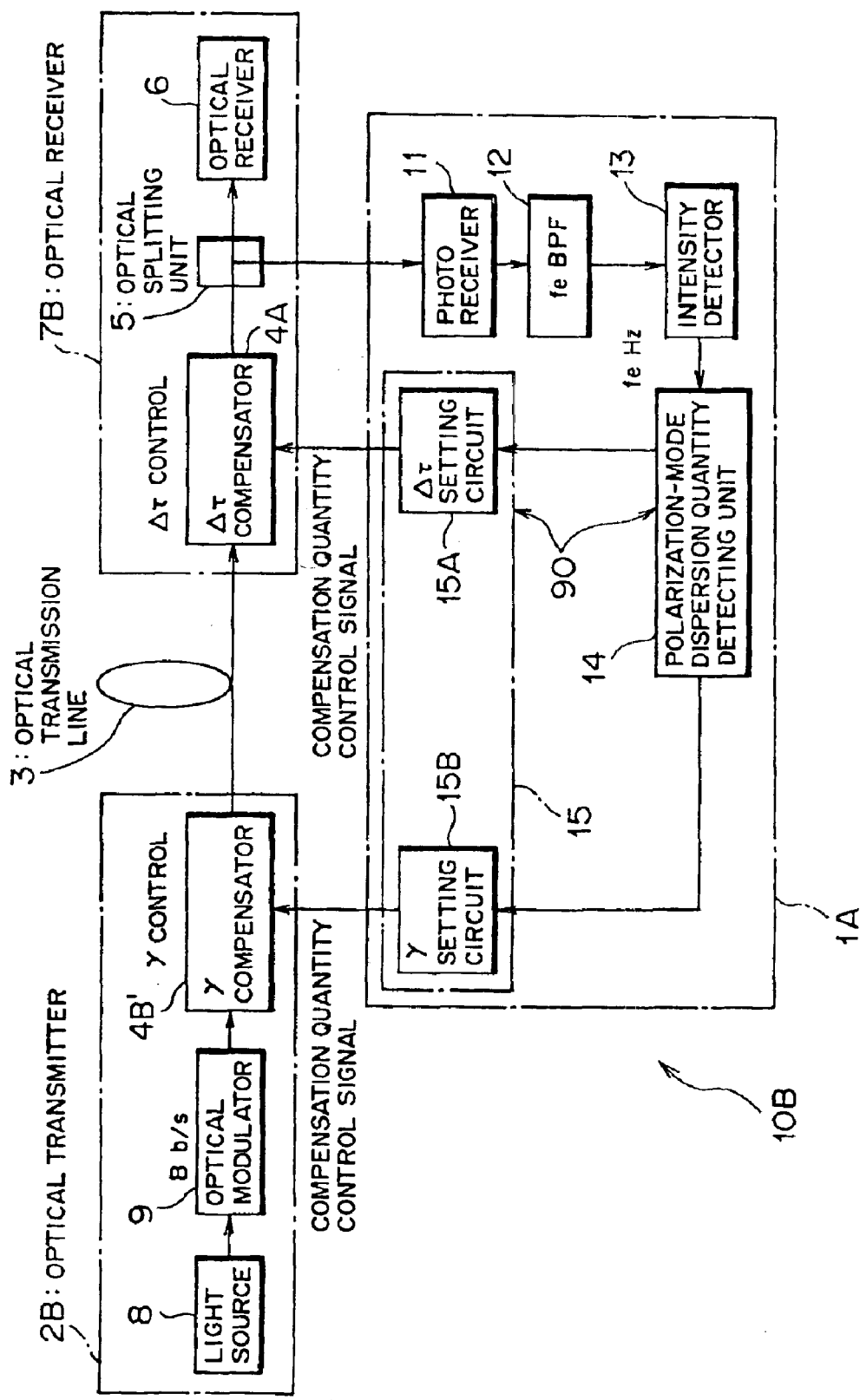
FIG. 21 is a block diagram showing a structure of an optical transmission system to which another dispersion compensation controlling apparatus according to the second modification of the first embodiment of this invention is applied.

FIG. 21 is a block diagram showing an optical transmission system to which still another dispersion compensation controlling apparatus according to the second modification of the first embodiment of this invention is applied. The optical transmission system 10B shown in FIG. 21 is as well an optical communication system with a transmission rate B (b/s) (for example, 40 Gb/s, 10 Gb/s or the like) adopting time division multiplexing.

The optical transmission system 10B differs from the optical transmission system 10 according to the first embodiment in that the polarization-mode dispersion compensator 4 is divided into a γ compensator 4B' and a Δτ compensator 4A, and disposed in an optical transmitter 2B and an optical receiver 7B, the other parts are similar to those of the optical transmission system 10 according to the first embodiment. Namely, the optical transmission system 10B comprises a dispersion compensation controlling apparatus 1A along with the optical transmitter 2B, an optical transmission line 3, and the optical receiver 7B.

Here, the optical transmitter 2B is a transmitting terminal apparatus transmitting a transmission optical signal, which comprises a γ compensator 4B' along with a signal light source 8 and the optical modulator 9. The optical transmission path 3 is a transmission fiber. The optical receiver 7B is a receiving terminal apparatus receiving a transmission optical signal, which has a Δτ compensator 4A along with an the optical splitter 5 and an optical receiving unit 6.

The dispersion compensation controlling apparatus 1A is a control apparatus for compensating polarization-mode dispersion generated in an optical signal transmitted, using the control mode 1, which comprises a photo receiver 11, a band-pass filer (fe BPF) 12, an intensity detector 13, a polarization-mode dispersion quantity detecting unit 14, and a parameter setting circuit 15. The parameter setting circuit 15 comprises a Δτ setting circuit 15A for setting Δτ, and a γ setting circuit 15B for setting γ. Incidentally, since a frequency provided for intensity detection is one system, here is employed the detection form 1.

Information on a polarization state detected by the polarization-mode dispersion quantity detecting unit 14 is set in the γ compensator 4B' in the optical transmitter 2B by the γ setting circuit 15B in the parameter setting circuit 15, and set in the Δτ compensator 4A in the optical receiver 7B by the Δτ setting circuit 15A in the parameter setting circuit 15 as well. The polarization-mode dispersion quantity detecting unit 14 and the parameter setting circuit 15 function as a polarization-mode dispersion controlling unit 90b.

Namely, in the optical transmission system 10B, the dispersion compensation controlling apparatus 1A sends information relating to γ from which a polarization state of an optical signal is obtained on the receiving side (the side of the optical receiver 7B) of an optical signal to the transmitting side (the side of the optical transmitter 2B), so as to variably control the optical intensity splitting ratio γ.

In the dispersion compensation controlling apparatus 1A, the parameter setting circuit 15 outputs a first parameter setting control signal for setting a splitting ratio γ of an optical intensity to two polarization modes to a first polarization-mode dispersion compensator (γ compensator 4B') disposed at an arbitrary position (in the optical transmitter 2B) in the transmission line, while outputting a second parameter setting control signal for setting a delay quantity Δτ between the above two modes to a second polarization-mode dispersion compensator (Δτ compensator 4A) arranged in the rear stage (in the optical receiver 7B) of the first polarization-mode dispersion compensator.

With the above structure, the optical transmission system 10B operates in the almost similar manner to the optical transmission system 10 to which the dispersion compensation controlling apparatus 1 according to the first embodiment using the detection form 1 and the control mode 1 is applied.

According to the dispersion compensation controlling apparatus 1A, it is possible to attain the same effects as the first embodiment described above. In addition, it is possible to appropriately control both a delay quantity Δτ and an optical intensity splitting ratio γ since the γ compensator 4B' and the Δτ compensator 4A disposed in the optical transmitter 2B and the optical receiver 7B, respectively, are independently controlled.

(B3) Description of a Third Modification of the First Embodiment

Figure 22:
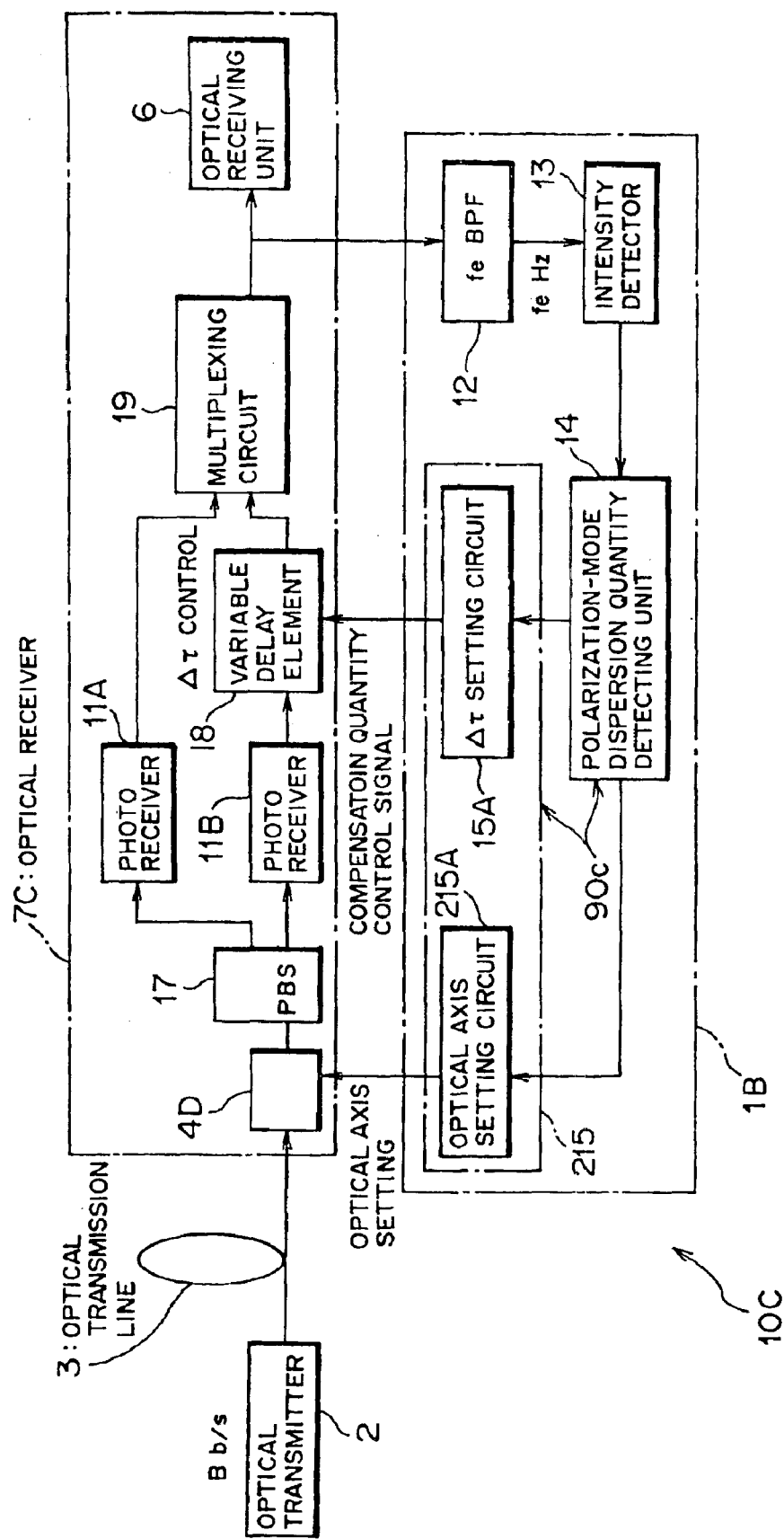
FIG. 22 is a block diagram showing a structure of an optical transmission system to which a dispersion compensation controlling apparatus according to a third modification of the first embodiment of this invention is applied.

FIG. 22 is a block diagram showing a structure of an optical transmission system to which a dispersion compensation controlling apparatus according to a third modification of the first embodiment of this invention is applied. The optical transmission system 10C shown in FIG. 22 is as well an optical communication system with a transmission rate B (b/s) (for example, 40 Gb/s, 10 Gb/s or the like) adopting time division multiplexing. The optical transmission system 10C differs from the optical transmission system 10B according to the second modification of the first embodiment in that a control on a delay quantity Δτ is performed on an electric stage on the receiving side, the other parts of which are almost similar to the optical transmission system 10B. In the optical transmission system 10C, detection using the detection form 1 and the control mode 1 is performed.

The optical transmission system 10C comprises an optical transmitter 2, an optical transmission line 3, an optical receiver 7C and a dispersion compensation controlling apparatus 1B. The dispersion compensation controlling apparatus 1B comprises a band-pass filter (fe BPF) 12, an intensity detector 13, a polarization-mode dispersion quantity detecting unit 14 and a parameter setting circuit 215.

A term "dispersion" is generally used to mean "chromatic dispersion". In this modification, the term "dispersion" is used to mean "polarization-mode dispersion", the dispersion compensation controlling apparatus 1B thus represents "polarization-mode dispersion controlling apparatus 1B".

The polarization-mode dispersion quantity detecting unit 14 and the parameter setting circuit 215 function as a polarization-mode dispersion controlling unit 90c. The parameter setting circuit 215 comprises an optical axis setting circuit 215A for setting a set value of an optical axis adjuster (polarization controlling unit) 4D, and a $\Delta\tau$ setting circuit 15A.

A flow of a received optical signal in the optical transmission system 10C is as follows. First, an optical axis of the received light is adjusted in the optical axis adjuster 4D in the optical receiver 7C, polarization-mode components are split by a polarization beam splitter (PBS) 17, and the both mode components are received and converted into electric signals (O/E-convertded) by photo receivers 11A and 11B. A delay difference $\Delta\tau$ is given between both optical paths by a variable delay element 18, after that, the signals are multiplexed by a multiplexing circuit 19, and undergo a light receiving process in an optical receiving unit 6. Incidentally, the variable delay element will be described later.

A part of the electric signal multiplexed by the multiplexing circuit 19 is split and inputted to the dispersion compensation controlling apparatus 1B, an fe (Hz) component intensity is detected by the band-pass filter 12 and the intensity detector 13, a state of polarization-mode dispersion of the optical transmission line 3 is detected by the polarization-mode dispersion quantity detecting unit 14, and the variable delay element 18 and the optical axis adjuster 4D are such controlled that the fe (Hz) component intensity becomes the maximum, in order that the parameter setting circuit 215 compensates polarization-mode dispersion.

In the above manner, it is possible to appropriately control a delay quantity $\Delta\tau$ like the dispersion compensation controlling apparatus 1A according to the second modification of the first embodiment.

(B4) Description of a Fourth Modification of the First Embodiment

Figure 23:
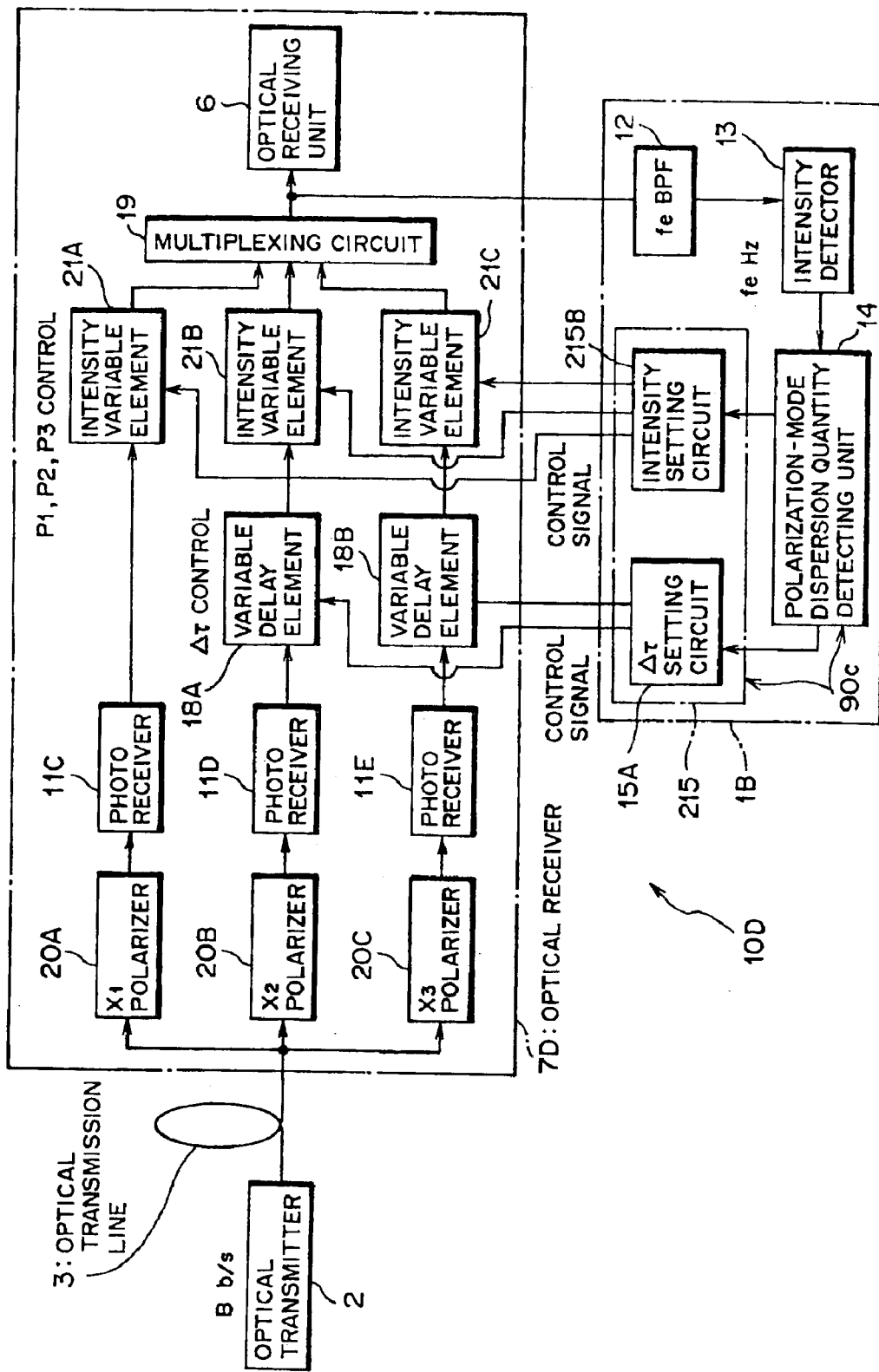
FIG. 23 is a block diagram showing a structure of an optical transmission system to which a dispersion compensation controlling apparatus according to a fourth modification of the first embodiment of this invention is applied.

As an optical transmission system performing a control on a delay quantity $\Delta\tau$ on the electric stage on the receiving side, one shown in FIG. 23 is also possible. A controlling method in this case uses the control mode 1 as well, but the method is slightly different. Since a frequency provided for intensity detection is one system, it means that here is employed the detection form 1.

FIG. 23 is a block diagram showing a structure of an optical transmission system to which a dispersion compensation controlling apparatus according to a fourth modification of the first embodiment of this invention is applied. The optical transmission system 10D is as well an optical communication system with a transmission rate B (b/s) (for example, 40 Gb/s, 10 Gb/s or the like) adopting time division multiplexing, which comprises an optical transmitter 2, an optical transmission line 3, an optical receiver 7D and a dispersion compensation controlling apparatus 1B.

A term "dispersion" is generally used to mean "chromatic dispersion". In this modification, the term "dispersion" is used to mean "polarization-mode dispersion", the dispersion compensation controlling apparatus 1B thus represents "polarization-mode dispersion compensation controlling apparatus 1B".

The optical receiver 7D splits inputted transmission signal light into three directions, and controls them in only an electric stage. The optical receiver 7D comprises an $X_1$ polarizer 20A, an $X_2$ polarizer 20B, an $X_3$ polarizer 20C, photo receivers 11C, 11D and 11E connected thereto, respectively, an intensity variable element 21A connected to the photo receiver 11C, a variable delay element 18A connected to the photo receiver 11D, a variable delay element 18B connected to the photo receiver 11E, intensity variable elements 21B and 21C connected to the variable delay elements 18A and 18B, respectively, a multiplexing circuit 19 and an optical receiving unit 6.

Here, the $X_1$ polarizer 20A, the $X_2$ polarizer 20B and the $X_3$ polarizer 20C extract three components, that is, $X_1$, $X_2$ and $X_3$, respectively, of Stokes vector (Stokes vector) showing a polarization state of an optical signal. The photo receivers 11C, 11D and 11E O/E-convert the components of the optical signal, respectively.

The variable delay element 18A gives a delay quantity $\Delta\tau_2$ corresponding to the Stokes vector $X_2$. The variable delay element 18B gives a delay quantity $\Delta\tau_3$ corresponding to the Stokes vector $X_3$. Further, the intensity variable elements 21A, 21B and 21C give intensity ratios P1, P2 and P3 (here a relationship of P1+P2+P3=1 is satisfied), respectively. The intensity variable element 21A gives an intensity ratio p1 corresponding to the Stokes vector $X_1$, the intensity variable element 21B an intensity ratio P2 corresponding to the Stokes vector $X_2$, and the intensity variable element 21C an intensity ratio P3 corresponding to the Stokes vector $X_3$. These five kinds of parameters ($\Delta\tau_2$, $\Delta\tau_3$, P1, P2 and P3) are appropriately controlled in order to maximize the fe (Hz) component intensity. These intensity ratios P1, P2 and P3 are parameters corresponding to a $\lambda/4$ plate azimuth (rotation) angle $\alpha$ and a $\lambda/2$ plate azimuth (rotation) angle $\beta$. The multiplexing circuit 19 multiplexes output signals from the intensity variable elements 21A, 21B and 21C. The optical receiving unit 6 performs a light receiving process.

The dispersion compensation controlling apparatus 1B performs a $\Delta\tau$ control in the electric stage, which comprises a band-pass filter 12, an intensity detector 13, a polarization-mode dispersion quantity detecting unit 14 and a parameter setting circuit 215. The polarization-mode dispersion quantity detecting unit 14 and the parameter setting circuit 215 function as a polarization-mode dispersion controlling unit 90c. The $\Delta\tau$ setting circuit 15A in the parameter setting circuit 215 inputs control signals to the variable delay element 18A and the variable delay element 18B in the optical receiver 7D. The intensity setting circuit 215B in the parameter setting circuit 215 inputs intensity ratios to the intensity variable elements 21A, 21B and 21C in the optical receiver 7D.

As an example of algorithm of a control on P1, P2 and P3, here is employed a method of moving two among the three at a time. Namely, P1 and P2 are varied while P3 is fixed such that P1+P2 is constant, thereby controlling the fe (Hz) component intensity to be of the maximum value. Next, P2 and P3 are varied while P1 is fixed such that P2+P3 is constant, thereby controlling the fe (Hz) component intensity to be of the maximum value. Further, P1 and P3 are varied while P2 is fixed such that P1+P3 is constant, thereby controlling the fe (Hz) component intensity to be of the maximum value. Incidentally, it is needless to say that the controlling method is possible in another manner.

A flow of a received optical signal in the optical transmission system 10D is as follows. Transmission signal light inputted over the optical transmission line 3 is split into three in the optical receiver 7D, received by the photo receivers 11C, 11D and 11E through the polarizers ($X_1$ polarizer 20A, $X_2$ polarizer 20B and $X_3$ polarizer 20C) each transmitting only a corresponding polarization component, and converted into electric signals (O/E-converted). The optical components received by the photo receivers 11D and 11E are given delay quantities $\Delta\tau_2$ and $\Delta\tau_3$ by the variable delay elements 18A and 18B, respectively. Further, the three optical components, that is, outputs of these two systems and an output of the photo receiver 11C, undergo intensity ratio adjustment by the intensity variable elements 21a, 21B and 21C, respectively.

In this occasion, a part of the electric signal multiplexed by the multiplexing circuit 19 is split and inputted to the dispersion compensation controlling apparatus 1B, the fe (Hz) component intensity is detected by the band-pass filter 12 and the intensity detector 13 in the similar manner to the first embodiment, and a state of polarization-mode dispersion of the optical transmission line 3 is detected by the polarization-mode dispersion quantity detecting unit 14. Further, in order to compensate the polarization-mode dispersion, the parameter setting circuit 215 controls the variable delay elements 18A and 18B and the intensity variable elements 21A, 21B and 21C such that the fe (Hz) component intensity becomes the maximum.

Incidentally, the variable delay elements 18A and 18B, and the intensity variable elements 21A, 21B and 21C are both controlled in FIG. 23. However, it is possible to use either one of these elements for the control when sufficient characteristics can be obtained on the receiving side.

As above, it is possible to attain the same effects as the dispersion compensation controlling apparatus 1B according to the third modification of the first embodiment.

(B5) Description of a Fifth Modification of the First Embodiment

Figure 24:
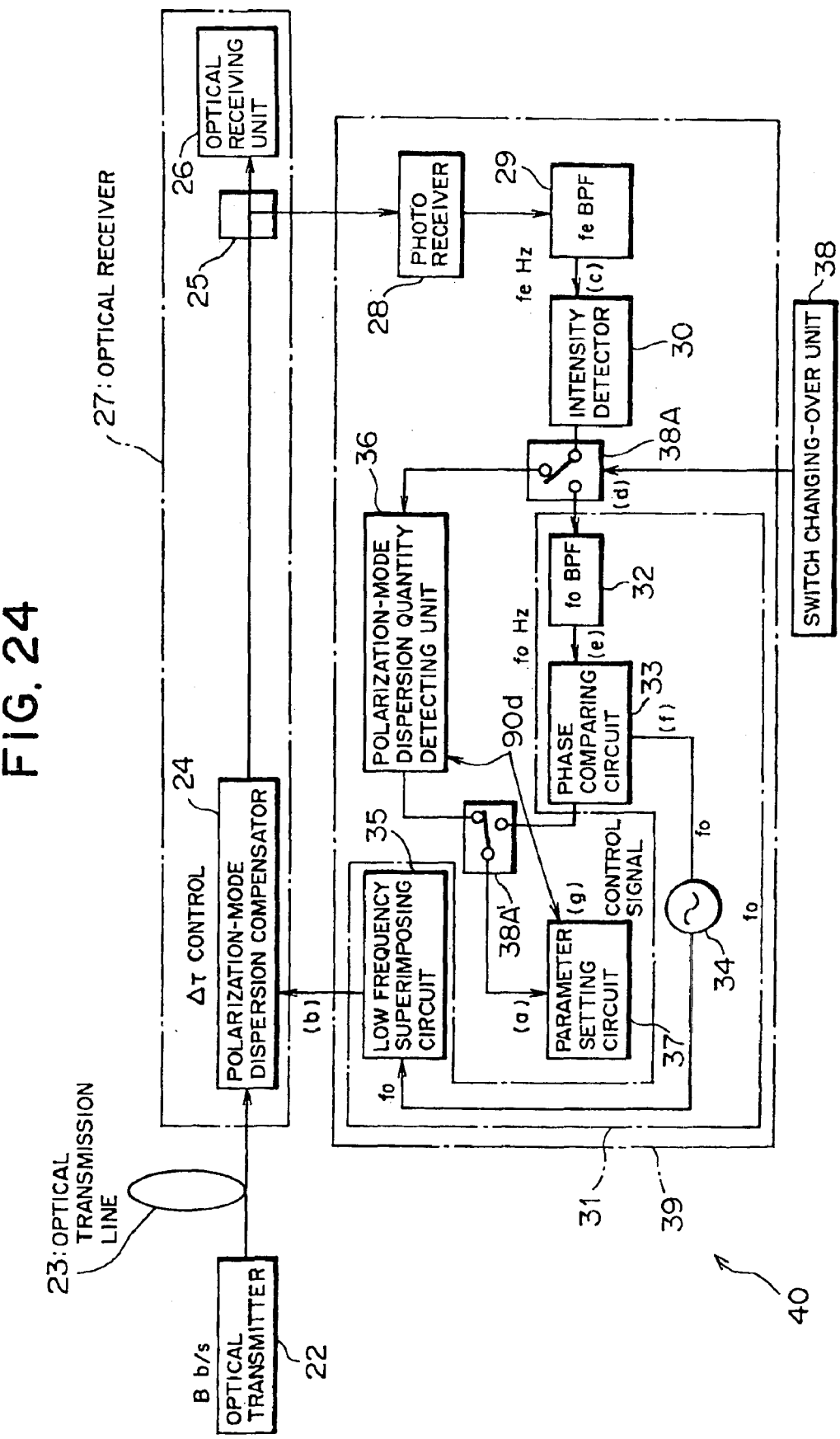
FIG. 24 is a block diagram showing a structure of an optical transmission system to which a dispersion compensation controlling apparatus according to a fifth modification of the first embodiment of this invention is applied.

FIG. 24 is a block diagram showing a structure of an optical transmission system to which a dispersion compensation controlling apparatus according to a fifth modification of the first embodiment is applied, in which an object of a control can be changed between before system operation (before a start of system operation) and during system operation (after a start of system operation). A method of controlling a polarization-mode dispersion quantity takes the control mode 1, and the detection form 1 is employed since a frequency provided for intensity detection is one system.

The optical transmission system 40 shown in FIG. 24 is as well an optical communication system with a transmission rate B (b/s) (for example, 40 Gb/s, 10 Gb/s or the like) adopting time division multiplexing. In the optical transmission system 40, an optical transmitter 22 as a transmitting terminal apparatus transmitting a transmission optical signal and an optical receiver 27 as a receiving terminal apparatus receiving the transmission optical signal are connected over an optical transmission line (transmission fiber) 23, and a dispersion compensation controlling apparatus 39 and a switch changing-over unit 38 are disposed on the optical receiving side.

In order to compensate polarization-mode dispersion generated in an optical signal transmitted, the optical receiver 27 comprises a polarization-mode dispersion compensator 24, an optical splitting unit 25 and an optical receiving unit 26. The polarization-mode dispersion compensator 24 more efficiently compensates polarization-mode dispersion generated in the transmission optical signal according to a state of the optical transmission line 3. The optical splitting unit 25 takes out a part of the transmission optical signal inputted to the receiving side over the optical transmission line 3, and sends it out as monitor light to the dispersion compensation controlling apparatus 39. The optical receiving unit 26 receives the transmission optical signal.

The dispersion compensation controlling apparatus 39 comprises, similarly to the dispersion compensation controlling apparatus 1 according to the first embodiment, a photo receiver 28, a band-pass filter (fe BPF) 29, an intensity detector 30, a polarization-mode dispersion quantity detecting unit 36 and a parameter setting circuit 37. The dispersion compensation controlling apparatus 39 further comprises a compensation quantity optimization controlling unit 31 in order to automatically perform a feedback control when polarization-mode dispersion is compensated, a switch 38A switching an output of an intensity detector 30A between before and during system operation, and a switch 38A' operating in association with the switch 38A.

In this embodiment, a term "dispersion" is used to mean "polarization-mode dispersion", as well, the dispersion compensation controlling apparatus 39 thus represents "polarization-mode dispersion compensation controlling apparatus 39".

Here, the photo receiver 28, the band-pass filter 29 and the intensity detector 30 are similar to the photo receiver 11, the band-pass filter 12 and the intensity detector 13, respectively, according to the first embodiment, further descriptions of which are thus omitted. The polarization-mode dispersion quantity detecting unit 36 and the parameter setting circuit 37 are similar to the polarization-mode dispersion quantity detecting unit 14 and the parameter setting circuit 15, respectively, which function as a polarization-mode dispersion controlling unit 90d. Since a frequency provided for intensity detection is one system, here is employed the detection form 1.

The switch 38A drives the polarization-mode dispersion quantity detecting unit 36 before operation of the optical transmission system 40 in order to determine the optimum value of parameter information showing a polarization-mode dispersion compensation quantity, while driving the compensation quantity optimization controlling unit 31 during the operation in order to prevent fluctuation in the optimum value of the parameter information, which switches an output from the intensity detector 30. Here, "before system operation" means a time when the optical transmission system 40 is actuated or when the optical transmission system 40 is re-actuated if the polarization-mode dispersion compensation control largely deviates from the optimum point, for example. The change-over control is performed by the switch changing-over unit 38. The switch 38A' inputs an output of the polarization-mode dispersion detecting unit 36 or a phase comparing circuit 33 to the parameter setting circuit 37, in association with the switch 38A.

Incidentally, a switching controlling method to "optimize a compensation quantity in order to prevent fluctuations in the optimum value of parameter information during operation" will be described later.

The compensation quantity optimization controlling unit 31 superimposes a predetermined low frequency signal set in advance on a parameter setting control signal outputted from the parameter setting circuit 37, and controls a parameter setting in the parameter setting circuit 37 such that the above low frequency signal included in the intensity of the above first specific frequency component from the intensity detector 30 beocmes zero, thereby optimizing a compensation quantity of polarization-mode dispersion of the above transmission optical signal. The compensation quantity optimization controlling unit 31 comprises a band-pass filter ($f_0$ BPF) 32, a phase comparing circuit 33, a low frequency oscillator 34 and a low frequency superimposing circuit 35.

The band-pass filter 32 extracts a low frequency signal component [$f_0$ (Hz) component] included in the intensity of the first specific frequency component [fe (Hz) component] detected by the intensity detector 30. The phase comparing circuit 33 compares the low frequency signal component extracted by the band-pass filter 32 with the low frequency signal from the low frequency generator 34 to detect a difference in phase, and controls the parameter setting in the parameter setting circuit 37 such that the low frequency signal component extracted by the band-pass filter 32 becomes zero.

The low frequency superimposing circuit 35 superimposes a predetermined low frequency signal ($f_0$ signal) set in advance inputted from the low frequency oscillator 34 on the parameter setting control signal outputted from the parameter setting circuit 37 to give a minute modulation thereto, and sends out the modulated parameter setting control signal to the polarization-mode dispersion compensator 24.

The compensation quantity optimization controlling unit 31 drives the polarization-mode dispersion quantity detecting unit 36 to determine the optimum value of parameter information showing a polarization-mode dispersion quantity before system operation, while performing a control to keep at all times a delay quantity $\Delta\tau$ of the optical transmission line 3 at the optimum value during system operation.

A controlling method during system operation is as follows. Namely, the compensation quantity optimization controlling unit 31 minutely modulates a delay quantity $\Delta\tau$ be given by the polarization-mode dispersion compensator 24 with a low frequency $f_0$ in order to automatically fix the intensity of the first specific frequency component in a baseband spectrum of a transmission optical signal inputted to the receiving side over the optical transmission line 23 to the maximum value, so as to perform a tracking control in order to keep the delay quantity $\Delta\tau$ at the optimum value at all times against a change with time of the optical transmission line 23. As an example of the tracking control, in the feed-back control at the time of compensation of polarization-mode dispersion, the delay quantity $\Delta\tau$ is minutely varied (dithered) in the vicinity of the maximum point $\Delta\tau_0$ to detect a new maximum point, thereby automatically determining it. Here, a principle of the feedback control by the compensation quantity optimization controlling unit 31 will be described with reference to FIGS. 25(a) through (c) and FIGS. 26(a) through (g).

Figure 25A:
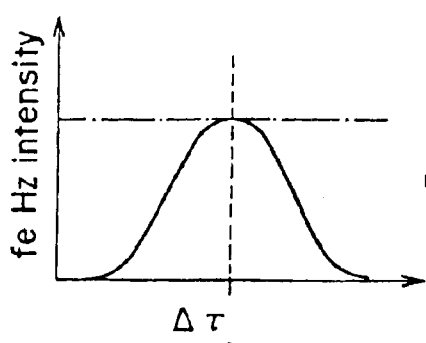
FIGS. 25(a) through 25(c) are diagrams for illustrating a principle of a feedback control by a compensation quantity optimization controlling unit.
Figure 25C:
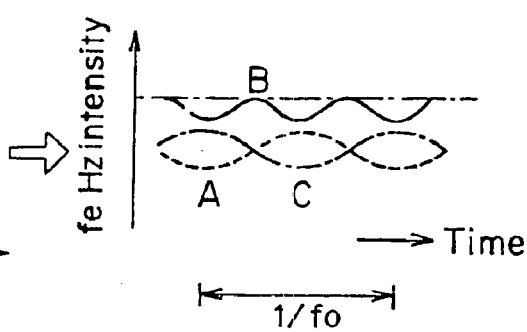
Figure 25B:
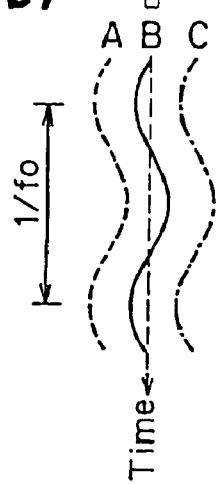

FIG. 25(a) shows a relationship between the delay quantity $\Delta\tau$ (transverse axis) and the fe (Hz) component intensity (vertical axis) after polarization-mode dispersion compensation, which schematically illustrates a situation [FIG. 25(c)] of changes in the fe (Hz) component intensity when three kinds of low frequency signals (for example, signals of about 1 kHz) A, B and C shown in FIG. 25(b) are added to the delay quantity $\Delta\tau$ (transverse axis). A signal waveform B shown in FIG. 25(b) is a waveform changing with time at a frequency $f_0$ (Hz) in the case where the parameter information is the maximum value. In this case where the delay quantity $\Delta\tau$ after polarization-mode dispersion compensation is at the maximum value and the fe (Hz) component intensity is the maximum, the fe (Hz) component intensity changes with time at a frequency $2 \times f_0$ as shown in FIG. 25(c), and contains no component of the frequency $f_0$.

To the contrary, when the parameter information deviates from the optimum value, that is, when the delay quantity $\Delta\tau$ deviates from the optimum value as A or C deviates from a state of B shown in FIG. 25(b), the frequency $f_0$ (Hz) appears in a change with time of the fe (Hz) component frequency as shown in FIG. 25(c), moreover, codes of the components of A and C are opposite (the phase is inverted).

Back to FIG. 24, the band-pass filter 32 detects a frequency $f_0$ (Hz) component from the fe (Hz) component intensity, and the parameter setting circuit 37 sets a delay quantity $\Delta\tau$ to be given by the polarization-mode dispersion compensator 24 in such a direction that the frequency component $f_0$ is cancelled. Accordingly, it is possible by such feedback to optimize a compensation quantity of polarization-mode dispersion of the transmission optical signal. Incidentally, a direction of the change can be determined from a phase of the component of the frequency $f_0$ (Hz) detected by the phase comparing circuit 33.

Whereby, the optical signal at a transmission rate B (b/s) transmitted from the optical transmitter 22 is transmitted to the optical receiver 27 over the optical transmission line 23 in the optical transmission system 40.

In this occasion, in the optical transmission system 40, the optical splitting unit 25 takes out a part of the optical signal transmitted over the optical transmission line 23, and the optical signal taken out (monitor light) is sent to the dispersion compensation controlling apparatus 39 in order to compensate polarization-mode dispersion generated in a transmitted optical signal.

In the dispersion compensation controlling apparatus 39, a state of polarization-mode dispersion generated in an optical signal transmitted over the optical transmission line 23 is monitored on the basis of the optical signal taken out by the optical splitting unit 25, and the polarization-mode dispersion compensator 24 is controlled according to a result of the monitoring. First, before operation of the optical transmission system 40, the switch changing-over unit 38 changes over the switch 38A and the switch 38A' in order to drive the polarization-mode dispersion quantity detecting unit 36 (contact points as shown in FIG. 24).

The optical signal taken out by the optical splitting unit 25 is then received by the photo receiver 28, converted into an electric signal (O/E-converted), and inputted to the band-pass filter 29. In the band-pass filter 29, as having been described in the first embodiment, the first specific frequency component [fe (Hz) component] in a baseband spectrum of a transmission optical signal appropriately set according to a transmission rate or a signal waveform of the optical signal is detected (specific frequency component detecting step).

Following that, an intensity of the first specific frequency component detected by the band-pass filter 29 is detected by the intensity detector 30 (intensity detecting step). Further, by the polarization-mode dispersion quantity detecting unit 36, a polarization-mode dispersion quantity of the above transmission optical signal is detected from the intensity of the first specific frequency component detected by the intensity detector 30 by performing a predetermined first functional operation [that is, a functional operation using the above formulae (2) and (3)] (dispersion quantity detecting step).

In order to compensate polarization-mode dispersion of the transmission optical signal, a parameter setting control signal for setting such parameter information (delay quantity $\Delta\tau$) as to cancel the polarization-mode dispersion quantity detected by the polarization-mode dispersion quantity detecting unit 36 is outputted from the parameter setting circuit 37 to the polarization-mode dispersion compensator 24 disposed in the optical receiver 25 through the low frequency superimposing circuit 35 of the compensation quantity optimization controlling unit 31. Incidentally, the low frequency superimposing circuit 35 superimposes a low frequency signal ($f_0$ signal) from the low frequency oscillator 34 on the parameter setting control signal from the parameter setting circuit 37, and outputs it.

When the polarization-mode dispersion compensator 24 receives the parameter setting control signal, parameter information is set on the basis of the control signal so as to compensate polarization-mode dispersion generated in the optical signal transmitted over the optical transmission line 23. Following that, during operation of the optical transmission system 40, the switch changing-over unit 38 changes over the switch 38A and the switch 38A' (contact positions opposite to those shown in FIG. 24) in order to drive the compensation quantity optimization controlling unit 31.

The optical signal taken out by the optical splitting unit 25 is inputted to the compensation quantity optimization controlling unit 31 via the photo receiver 28, the band-pass filter 29 and the intensity detector 30 in a similar manner described above. The compensation quantity optimization controlling unit 31 controls a parameter setting in the parameter setting circuit 37 such that a low frequency signal component included in the intensity of the first specific frequency component from the intensity detector 30 becomes zero, thereby optimizing a compensation quantity of polarization-mode dispersion of the above transmission optical signal.

With the above structure, compensation is performed. An operation in the dispersion compensation controlling apparatus 39 at this time will be further described with reference to FIGS. 26(a) through 26(g). Here, signal waveforms shown in FIGS. 26(a) through 26(g) correspond to signal waveforms in portions denoted by reference characters (a) through (g) in the dispersion compensation controlling apparatus 39 shown in FIG. 24. The waveforms shown in FIGS. 26(a) through 26(g) show a case where the delay quantity $\Delta\tau$ deviates from the maximum point of the fe (Hz) component intensity toward the negative side (namely, in the case of A in FIG. 25(b)).

Figure 26A:
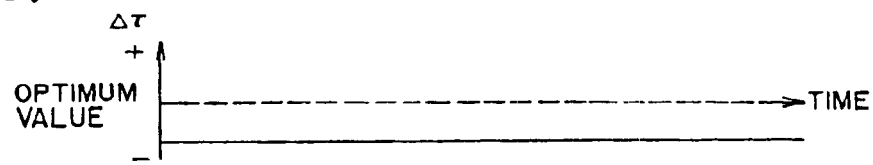
FIGS. 26(a) through 26(g) are diagrams for illustrating an operation in a dispersion compensation controlling apparatus.
Figure 26B:
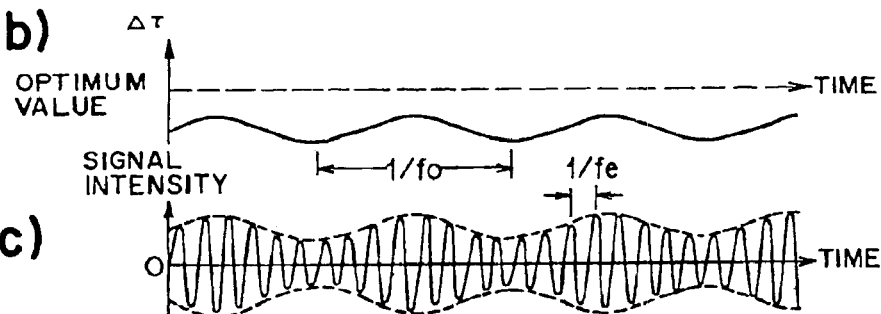
Figure 26C:
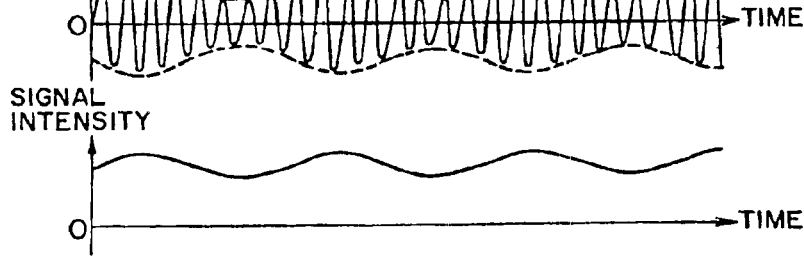

First, a part of the transmission optical signal is split by the optical splitting unit 25 disposed in the rear stage of the polarization-mode dispersion compensator 24, received by the photo receiver 28, and the fe (Hz) component is extracted by the band-pass filter 29. A signal waveform denoted by (c) at an output of the band-pass filter 29 shown in FIG. 24 has, as shown in FIG. 26(c), an envelope in which the fe (Hz) component varies at a low frequency $f_0$ (Hz). This signal is converted into an intensity modulated signal at the low frequency $f_0$ by the intensity detector 30, and inputted to the compensation quantity optimization controlling unit 31.

Figure 26D:
Figure 26E:
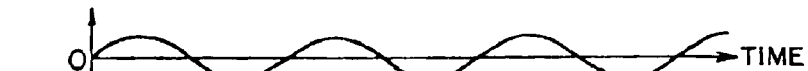
Figure 26F:
Figure 26G:
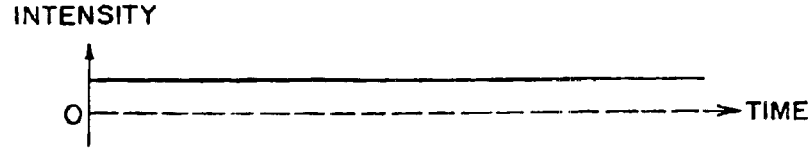

A component of the low frequency $f_0$ is extracted by the band-pass filter 32 in the compensation quantity optimization controlling unit 31, and a waveform as shown in FIG. 26(e) is obtained. Further, a phase of the component is compared with a phase of the $f_0$ (Hz) intensity component from the low frequency oscillator 34 by the phase comparing circuit 33, and a signal according to a phase difference as shown in FIG. 26(g) is obtained. In this case, in the case of A shown in FIG. 25(b), a signal intensity shown in FIG. 26(g) increases proportionally as the delay quantity $\Delta\tau$ at the receiving terminal (optical receiving unit 26) increases.

In contrast, when the delay quantity $\Delta\tau$ deviates from the maximum point of the fe (Hz) component intensity toward the positive side (namely, in the case of C in FIG. 25(b)), the fe (Hz) component intensity decreases as the delay quantity $\Delta\tau$ increases, so that a phase of an envelope varying at the low frequency $f_0$ (Hz) shown in FIG. 26(c) is shifted by a half cycle (½ $f_0$). With this, a signal waveforms shown in FIGS. 26(d) and 26(e) are shifted with time by a half cycle, thus a code of a signal [refer to FIG. 26(g)] obtained as a result of the phase comparing is inverted.

Accordingly, the parameter setting circuit 37 detects a code of a signal obtained as a result of the phase comparing by the phase comparing circuit 33 to determine whether the delay quantity $\Delta\tau$ is shifted to the positive or negative direction, so that a parameter setting control signal for changing the delay quantity $\Delta\tau$ in such a direction as to cancel the $f_0$ (Hz) intensity modulated component in the Fe (Hz) component is generated, and outputted.

When receiving the parameter setting control signal, the polarization-mode dispersion compensator 24 sets parameter information on the basis of the control signal so as to compensate polarization-mode dispersion generated in an optical signal transmitted over the optical transmission line 23.

As above, the dispersion compensation controlling apparatus 39 according to the fifth modification of the first embodiment detects an intensity of the first specific frequency component in a baseband spectrum in a transmission optical signal, and detects a polarization-mode dispersion quantity in the transmission optical signal from the detected intensity of the first specific frequency component by performing a predetermined first functional operation, so that polarization-mode dispersion generated in the transmission optical signal is easily detected.

As above, the polarization-mode dispersion quantity is detected, and parameter information for compensating polarization-mode dispersion generated in the transmission optical signal is set on the basis of the detected polarization-mode dispersion quantity, whereby polarization-mode dispersion is compensated and deterioration of a transmission waveform of an optical signal is thus prevented, which contributes to a long-distance transmission of a high-speed optical signal. In addition, it is advantageous that, during system operation, the delay quantity $\Delta\tau$ is at all times kept at the optimum value against a change with time of the optical transmission path 23.

Further, it is possible to optimize a compensation quantity of polarization-mode dispersion of a transmission optical signal by the compensation quantity optimization controlling unit 31, and automatically perform a feedback control when the polarization-mode dispersion is compensated.

(B6) Description of a Sixth Modification of the First Embodiment

Figure 27:
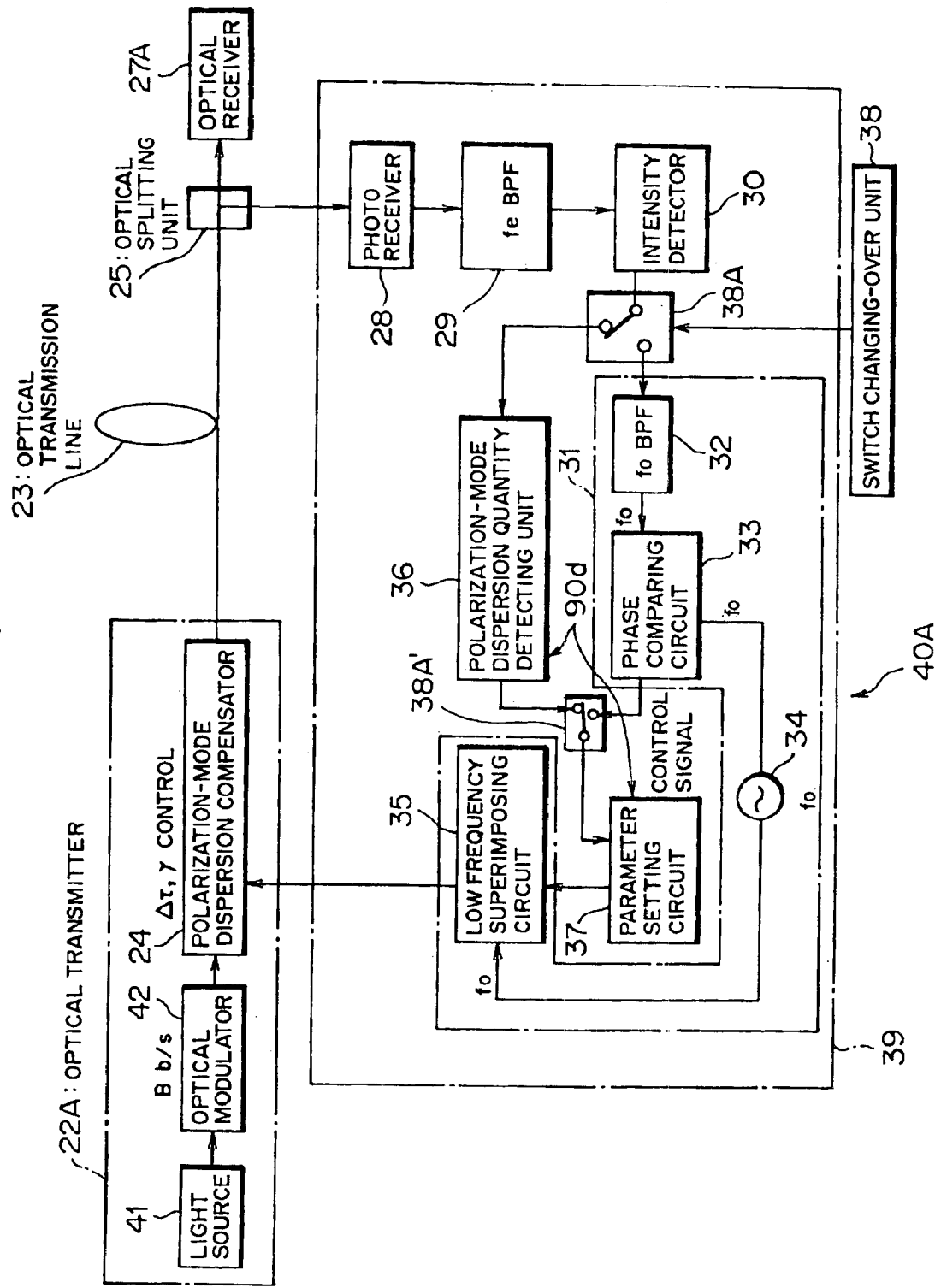
FIG. 27 is a block diagram showing a structure of an optical transmission system to which a dispersion compensation controlling apparatus according to a sixth modification of the first embodiment of this invention is applied.

FIG. 27 is a block diagram showing a structure of an optical transmission system to which a dispersion compensation controlling apparatus according to a sixth modification of the first embodiment is applied, in which an object of a control is changeable between before system operation and after start of system operation. A method of controlling a polarization-mode dispersion quantity uses the detection form 1 and the control mode 1.

The optical transmission system 40A shown in FIG. 27 is as well an optical communication system with a transmission rate B (b/s) (for example, 40 Gb/s, 10 Gb/s or the like) adopting time division multiplexing. The optical transmission system 40A differs from the optical transmission system 40 according to the fifth modification of the first embodiment in that a polarization-mode dispersion compensator 24 is disposed in an optical transmitter 22A, other parts of which are similar to those of the optical transmission system 40 according to the fifth modification of the first embodiment.

Namely, in the optical transmission system 40A, an optical transmitter 22A as a transmitting terminal apparatus transmitting a transmission optical signal and an optical receiver 27A as a receiving terminal apparatus receiving the transmission optical signal are connected over an optical transmission line (transmission fiber) 23, and a dispersion compensation controlling apparatus 39 is disposed in the optical transmitter 22A. Incidentally, it is alternatively possible to dispose the dispersion compensation controlling apparatus 39 on the receiving side, and send back a result of a polarization state of an optical signal detected in the optical receiver 27A to the optical transmitter 22A (not shown). As a method of sending-back in such case, a method of preparing another line with a low speed, or a method of multiplexing information on a transmission optical signal in the opposite direction, for example, is employable. In this modification, a term "dispersion" is used to mean "polarization-mode dispersion", the dispersion compensation controlling apparatus 39 thus represents "polarization-mode dispersion controlling apparatus 39".

Here, the optical transmitter 22A comprises a signal light source 41 and an optical modulator 42 along with a polarization-mode dispersion compensator 24 in order to compensate polarization-mode dispersion generated in an optical signal to be transmitted. As this, when the polarization-mode dispersion compensator 24 is disposed on the transmitting side, it is possible to set the optical splitting ratio $\gamma$.

Light for reference is taken out at an optical splitting unit 25 between the optical transmission line 23 and the optical receiver 27A, and inputted to the dispersion compensation controlling apparatus 39. In the dispersion compensation controlling apparatus 39, a parameter setting circuit 37 outputs a parameter setting control signal for setting the above parameter information to the polarization-mode dispersion compensator 24 disposed in the transmitting terminal apparatus transmitting a transmission optical signal via a low frequency superimposing circuit 35, and a detection signal (output signal from a phase comparing circuit 33) obtained by comparing phases on the receiving side (on the side of the optical receiver 27A) of the optical signal is sent back to the side of the optical transmitter 22A. As this method of sending-back, a method of preparing another line with a low speed, or a method of multiplexing information on a transmission optical signal in the opposite direction is employable. A compensation quantity optimization controlling unit 31 superimposes a predetermined low frequency signal set in advance on a parameter setting control signal outputted from the parameter setting circuit 37, and controls a parameter setting in the parameter setting circuit 37 such that the above low frequency signal component included in the intensity of the above first specific frequency component from an intensity detector (first intensity detecting unit) 30 becomes zero, thereby optimizing a compensation quantity of polarization-mode dispersion of the above transmission optical signal, as well.

Switches 38A and 38A' in the dispersion compensation controlling apparatus 39 are switches driving a polarization-mode dispersion quantity detecting unit 36 in order to determine the optimum value of parameter information showing a polarization-mode dispersion compensation quantity before operation of the optical transmission system 40A, and, after start of the operation, operating in association to drive the compensation quantity optimization controlling unit 31 in order to prevent fluctuations in the optimum value of the parameter information. This switching control is performed by a switch changing-over unit 38 outside the dispersion compensation controlling apparatus 39.

Incidentally, the other parts denoted by the same reference characters have the same functions as those of the optical transmission system 10 according to the first embodiment, further descriptions of which are thus omitted.

With the above structure, the optical transmission system 40A operates almost in the similar manner to the optical transmission system 40 to which the dispersion compensation controlling apparatus 39 according to the fifth modification of the first embodiment described above is applied.

Even when the polarization-mode dispersion compensator 24 is disposed in the transmitting terminal apparatus, the compensation quantity optimization controlling unit 31 minutely modulates the delay difference $\Delta\tau$ between two polarization components or the intensity splitting ratio $\gamma$ with a low frequency, thereby optimizing a compensation quantity of polarization-mode dispersion of a transmission optical signal.

As above, according to the dispersion compensation controlling apparatus 39 according to the sixth modification of the first embodiment, it is possible to attain the same advantages as the fifth modification of the first embodiment described above. In addition, it is possible to control a polarization direction such that the optical intensity splitting ratio $\gamma$ is in the best state according to a state of the optical transmission line 23 by controlling the polarization-mode dispersion compensator 24 disposed in the optical transmitter 22A, so that polarization-mode dispersion generated in the transmission optical signal is more effectively compensated. It is also possible to keep at all times the delay quantity $\Delta\tau$ at the optimum value against a change with time of the optical transmission line 23 during system operation.

(B7) Description of a Seventh Modification of the First Embodiment

Figure 28:
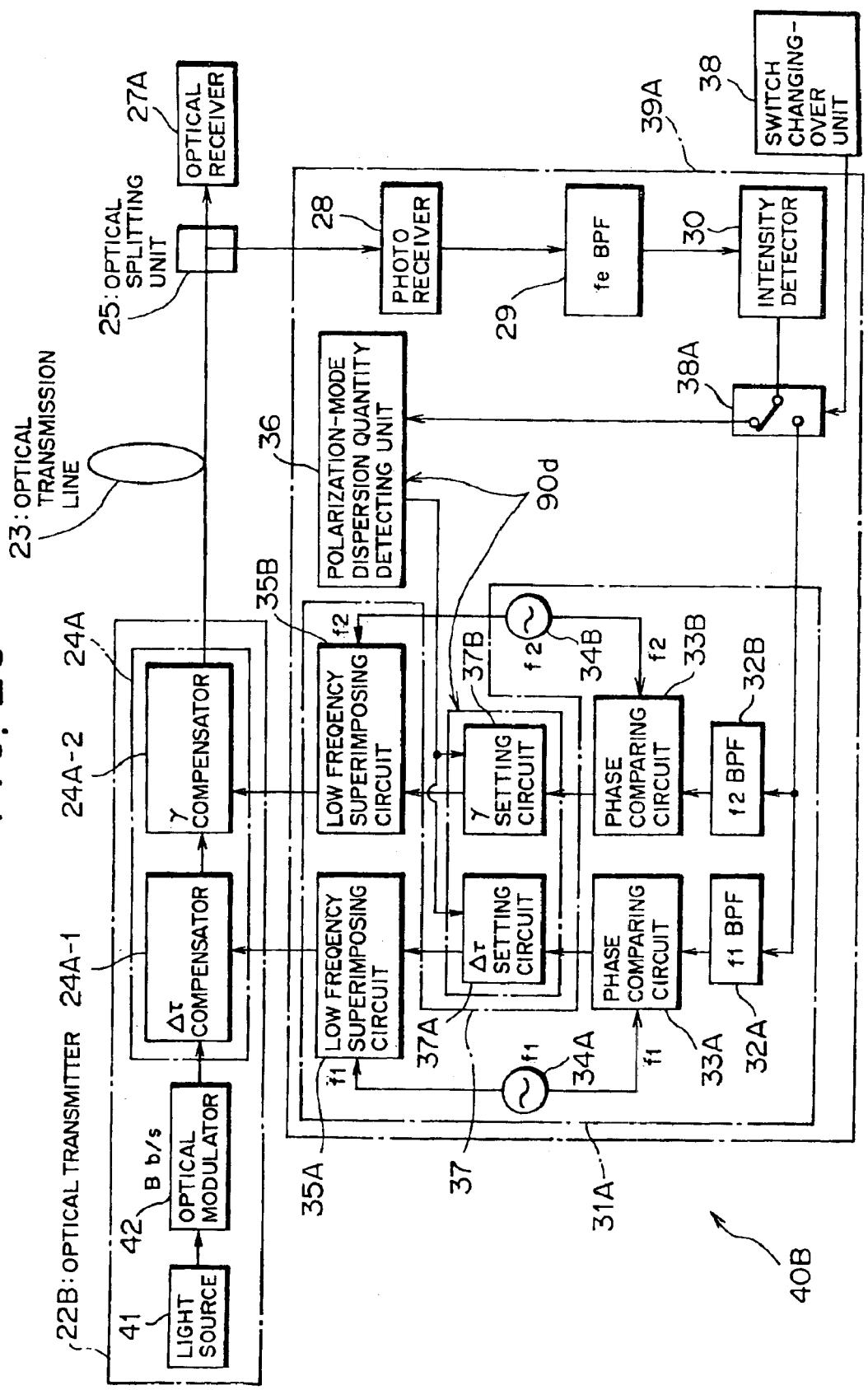
FIG. 28 is a block diagram showing a structure of an optical transmission system to which a dispersion compensation controlling apparatus according to a seventh modification of the first embodiment of this invention is applied.

FIG. 28 is a block diagram showing a structure of an optical transmission system to which a dispersion compensation controlling apparatus according to a seventh modification of the first embodiment is applied, in which an object of a control is changeable between before system operation and after start of system operation. A method of controlling a polarization-mode dispersion quantity adopts the detection form 1 and the control mode 1, as well.

The optical transmission system 40B shown in FIG. 28 is as well an optical communication system with a transmission rate B (b/s) (for example, 40 Gb/s, 10 Gb/s or the like) adopting time division multiplexing. The optical transmission system 40B differs from the optical transmission system 40A according to the sixth modification of the first embodiment in that a $\Delta\tau$ compensator 24-A1 and a $\gamma$ compensator 24-A2 configuring a polarization-mode dispersion compensator 24A disposed in an optical transmitter 22B are independently controlled, the other parts of which are almost similar to those of the optical transmission system 40A according to the sixth modification of the first embodiment.

Namely, in the optical transmission system 40B, the optical transmitter 22B as a transmitting terminal apparatus transmitting a transmission optical signal and an optical receiver 27A as a receiving terminal apparatus receiving the transmission optical signal are connected over an optical transmission line (transmission fiber) 23, and a dispersion compensation controlling apparatus 39A and a switch changing-over unit 38 are disposed on the side of the optical transmitter 22B. Incidentally, it is possible to dispose the dispersion compensation controlling apparatus 39A and the switch changing-over unit 38 on the receiving side, and send back a result of a polarization state of an optical signal detected in the optical receiver 27A to the optical transmitter 22B (not shown). As a method of sending-back in such case, a method of preparing another line with a low speed, or a method of multiplexing information on a transmission optical signal in the opposite direction, for example, is employable. In this modification, a term "dispersion" is used to mean "polarization-mode dispersion", the dispersion compensation controlling apparatus 39A thus represents "polarization-mode dispersion compensation controlling apparatus 39A".

The optical transmitter 22B comprises a signal light source 41 and an optical modulator 42 along with the polarization-mode dispersion compensator 24A in order to compensate polarization-mode dispersion generated in an optical signal to be transmitted. The polarization-mode dispersion compensator 24A can set not only $\Delta\tau$ but also $\gamma$ therein, comprises the $\Delta\tau$ compensator and the $\gamma$ compensator, and can independently control them.

Light for reference is taken out by an optical splitting unit 25 between the optical transmission line 23 and the optical receiver 27A and inputted to the dispersion compensation controlling apparatus 39A, and a control signal is outputted to the $\Delta\tau$ compensator 24A-1 and the $\gamma$ compensator 24A-2 in the above polarization-mode dispersion compensator 24A.

The dispersion compensation controlling apparatus 39A comprises a photo receiver 28, a band-pass filter (fe BPF) 29, an intensity detector 30, a switch 38A, a polarization-mode dispersion quantity detecting unit 36 along with a compensation quantity optimization controlling unit 31A and a parameter setting circuit 37. Further, the polarization-mode dispersion quantity detecting unit 36 and the parameter setting circuit 37 function as a polarization-mode dispersion controlling unit 90d. The photo receiver 28, the band-pass filter 29, the intensity detector 30, the switch 38A and the polarization-mode dispersion quantity detecting unit 36 have similar or the same functions as those described above, further descriptions of which are thus omitted.

The compensation quantity optimization controlling unit 31A comprises a band-pass filter ($f_1$ BPF) 32A, a band-pass filter ($f_2$ BPF) 32B, phase comparing circuits 33A and 33B, low frequency oscillators 34A and 34B, and low frequency superimposing circuits 35A and 35B, in order to independently control the $\Delta\tau$ compensator 24A-1 and the $\gamma$ compensator 24A-2. Namely, the dispersion compensation controlling apparatus 39A minutely modulates parameter setting control signals to the compensators 24A-1 and 24A-2 with different frequencies $f_1$ and $f_2$, respectively. Incidentally, these have similar or the same functions and structures as those described above.

In other words, the compensation quantity optimization controlling unit 31A superimposes two low frequency signals ($f_1$ and $f_2$ signals) having different low frequency components as the above predetermined low frequency signals on the above parameter setting control signals, controls a setting of the splitting ratio $\gamma$ of an optical intensity to two polarization modes in the parameter setting circuit 37 such that either one of the above low frequency signal components [$f_1$ (Hz), $f_2$ (Hz) signal components] included in the intensity of the above first specific frequency component from the intensity detector 30 becomes zero, while controlling a setting of the delay quantity $\Delta\tau$ between the above two polarization modes in the parameter setting circuit 37 such that the other one of the above two low frequency signal components included in the intensity of the above first specific frequency component from the intensity detector 30 becomes zero.

In FIG. 28, the parameter setting circuit 37 outputs parameter setting control signals for setting the above parameter information to the polarization-mode dispersion compensator 24A disposed in the optical transmitter 22B transmitting a transmission optical signal via the low frequency superimposing circuits 35A and 35B, which comprises a $\Delta\tau$ setting circuit 37A setting $\Delta\tau$ and a $\gamma$ setting circuit 37B setting $\gamma$. From the parameter setting circuit 37, detection signals (output signals from the phase comparing circuit 33A and the phase comparing circuit 33B) obtained by comparing phases on the receiving side (on the side of the optical receiver 27A) of an optical signal is sent back to the side of the optical transmitter 22A. Incidentally, the low frequency superimposing circuits 35A and 35B superimpose low frequency signals ($f_1$ and $f_2$ signals) from the low frequency oscillators 34A and 34B on the parameter setting control signals from the setting circuits 37A and 37B, respectively, of the parameter setting circuit 37.

With the above structure, the optical transmission system 40B operates almost in the similar manner to the optical transmission system 40A to which the dispersion compensation controlling apparatus 39 according to the fifth modification of the first embodiment described above is applied.

Namely, in the dispersion compensation controlling apparatus 39A, an optical signal taken out by the optical splitting unit 25 is inputted to the polarization-mode dispersion quantity detecting unit 36 via the photo receiver 28, the band-pass filter 29 and the intensity detector 30 similarly to the case described above, before operation of the optical transmission system 40B.

A polarization-mode dispersion quantity of a transmission optical signal is detected by the polarization-mode dispersion quantity detecting unit 36, and parameter setting control signals based on a result of the detection are outputted from the setting circuits 37A and 37B of the parameter setting circuit 37 to the compensators 24A-1 and 24A-2 of the polarization-mode dispersion compensator 24A disposed in the optical transmitter 22B via the low frequency superimposing circuits 35A and 35B of the compensation quantity optimization controlling unit 31A.

When receiving the parameter setting control signals, the polarization-mode dispersion compensator 24A sets parameter information on the basis of the control signals so as to compensate polarization-mode dispersion generated in an optical signal to be transmitted over the optical transmission line 23.

On the other hand, during operation of the optical transmission system 40B, in the dispersion compensation controlling apparatus 39A, an optical signal taken by the optical splitting unit 25 is inputted to the compensation quantity optimization controlling unit 31A via the photo receiver 28, the band-pass filter 29 and the intensity detector 30, similarly to the case described above.

The compensation quantity optimization controlling unit 31A controls parameter settings in the setting circuits 37A and 37B of the parameter setting circuit 37 such that low frequency signal components included in the intensity of the first specific frequency component from the intensity detector 30 become zero, thereby optimizing a compensation quantity of polarization-mode dispersion of the above transmission optical signal.

Namely, an fe (Hz) component intensity signal from the intensity detector 30 is split, components of the low frequencies $f_1$ and $f_2$ (Hz) are extracted by the band-pass filters 32A and 32B with different frequencies $f_1$, and $f_2$, respectively, and phases of these low frequency components and the $f_1$ and $f_2$ (Hz) components from the low frequency oscillators 34A and 34B are compared by the phase comparing circuits 33A and 33B, respectively. The setting circuits 37A and 37B of the parameter setting circuit 37 detect codes of signals obtained from results of comparing by the phase comparing circuits 33A and 33B as described above, thereby determining whether the delay quantity $\Delta\tau$ or the optical intensity splitting ratio γ is shifted to either a positive or negative direction, generate parameter setting control signals for changing the delay quantity Δτ or the optical intensity splitting ratio γ in such a direction that the $f_1$ and $f_2$ (Hz) intensity modulated components in the fe (Hz) component are cancelled, and output the same.

When receiving the parameter setting control signals, the compensators 24A-1 and 24A-2 of the polarization-mode dispersion compensator 24A set parameter information on the basis of the control signals so that polarization-mode dispersion generated in an optical signal to be transmitted over the optical transmission line 23 is compensated.

As above, according to the dispersion compensation controlling apparatus 39A according to the seventh modification of the first embodiment of this invention, it is possible to attain the same advantages as the sixth modification of the first embodiment described above. In addition, it is advantageously possible to independently control the compensators 24A-1 and 24A-2 of the polarization-mode dispersion compensator 24A disposed in the optical transmitter 22B, thereby appropriately controlling both the delay quantity Δτ and the optical intensity splitting ratio γ.

(B8) Description of an Eighth Modification of the First Embodiment

Figure 29:
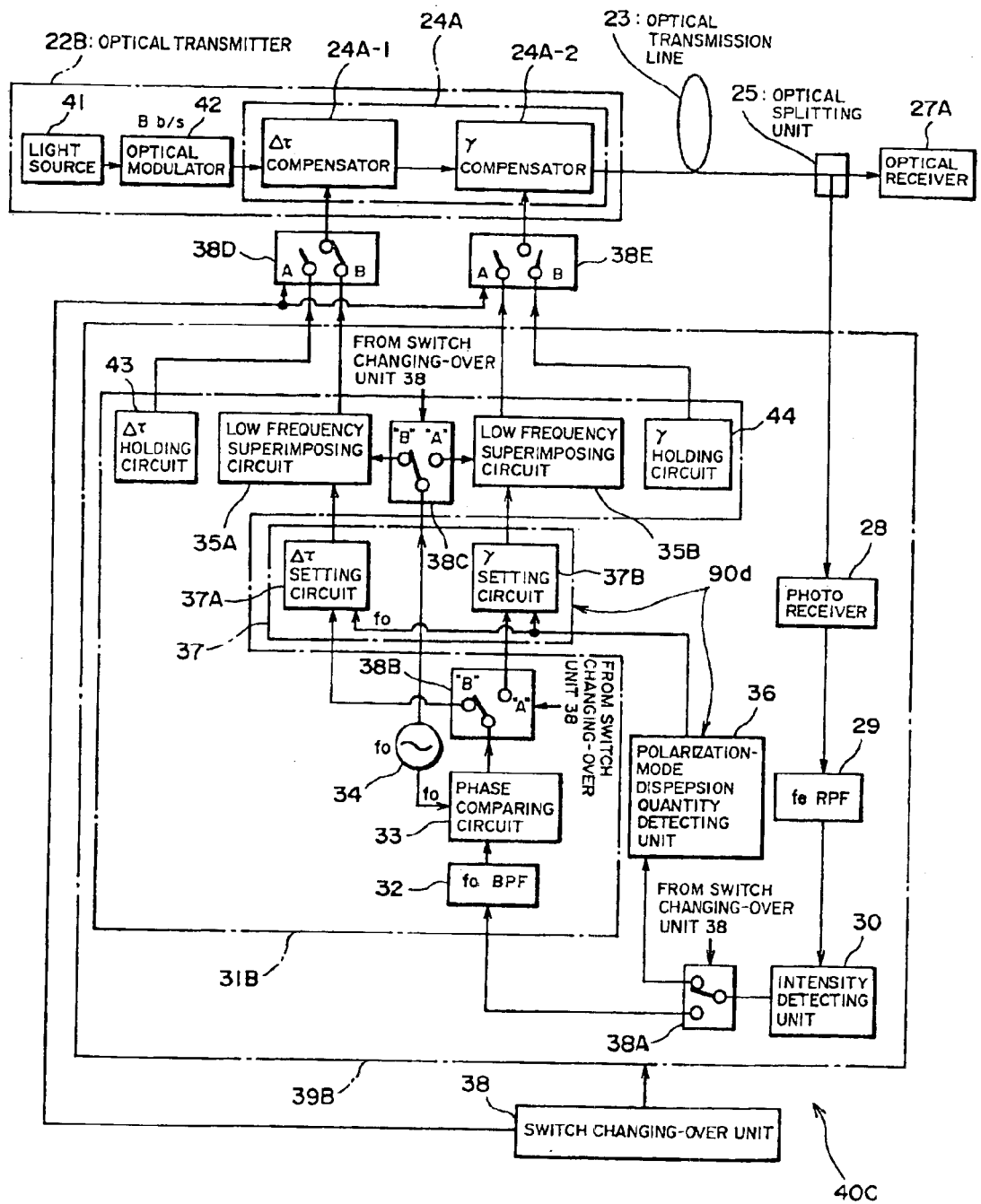
FIG. 29 is a block diagram showing a structure of an optical transmission system to which a dispersion compensation controlling apparatus according to an eighth modification of the first embodiment of this invention is applied.

As an optical system independently controlling the compensators 24A-1 and 24A-2 of the polarization-mode dispersion compensator 24A disposed in the optical transmitter 22B, one shown in FIG. 29 is also possible.

FIG. 29 is a block diagram showing a structure of an optical transmission system to which a dispersion compensation controlling apparatus according to an eighth modification of the first embodiment of this invention is applied, in which an object of control is changeable between before system operation and after system operation. A method of controlling a polarization-mode dispersion quantity uses the detection form 1 and the control mode 1, as well.

The optical transmission system 40C is as well an optical communication system with a transmission rate B (b/s) (for example, 40 Gb/s, 10 Gb/s or the like) adopting time division multiplexing. Namely, in the optical transmission system 40C, an optical transmitter 22B as a transmitting terminal transmitting a transmission optical signal and an optical receiver 27A as a receiving terminal apparatus receiving the transmission optical signal are connected over an optical transmission line (transmission fiber) 23, and a dispersion compensation controlling apparatus 39B, a switch changing-over unit 38 and switches 38D and 38E are disposed on the optical transmitting side. Light for reference is taken out by an optical splitting unit 25 between the optical transmission line 23 and the optical receiver 27A and inputted to the dispersion compensation controlling apparatus 39B, and control signals are outputted to a Δτ compensator 24A-1 and a γ compensator 24A-2 in a polarization-mode dispersion compensator 24A via switches 38D and 38E. Incidentally, it is alternatively possible to dispose the dispersion compensation controlling apparatus 39B and the switch changing-over unit 38 on the receiving side, and send back a result of a polarization state of an optical signal detected in the optical receiver 27A to the optical transmitter 22B (now shown). As a method of sending-back in such case, a method of preparing another line with a low speed, or a method of multiplexing information on a transmission optical signal in the opposite direction is employable. According to this modification, a term "dispersion" is used to mean "polarization-mode dispersion", the dispersion compensation controlling apparatus 39 thus represents "polarization-mode dispersion controlling apparatus 39B".

The dispersion compensation controlling apparatus 39B comprises a photo receiver 28, a band-pass filter (fe BPF) 29, an intensity detector 30, a switch 38A, a polarization-mode dispersion quantity detecting unit 36 along with a compensation quantity optimization controlling unit 31B and a parameter setting circuit 37. Further, the polarization-mode dispersion quantity detecting unit 36 and the parameter setting circuit 37 function as a polarization-mode dispersion controlling unit 90d. Incidentally, the photo receiver 28, the band-pass filter (fe BPF) 29, an intensity detector 30, the switch 38A and the polarization-mode dispersion quantity detecting unit 36 have similar or the same functions as those described above, further descriptions of which are thus omitted.

The compensation quantity optimization controlling unit 31B comprises, as shown in FIG. 29, a band-pass filter ($f_0$ BPF) 32, a phase comparing circuit 33, a low frequency oscillator 34, low frequency superimposing circuits 35A and 35B, a Δτ holding circuit 43, a γ holding circuit 44 and switches 38B and 38C (on the output's side of the phase comparing circuit 33).

The switches 38B and 38C change over a setting control on the optical intensity splitting ratio γ and a setting control on the delay quantity Δτ according to a time, which are changed-over to a switch terminal "A" or a switch terminal "B" in association with each other according to a control signal outputted from the switch changing-over unit 38. Namely, when the control signal from the switch changing-over unit 38 is for the switch terminal "A", an output of the phase comparing circuit 33 is inputted to a γ setting circuit 37B and an output of the low frequency oscillator 34 is inputted to the low frequency superimposing circuit 35B, whereby a value of γ is controlled. To the contrary, when the control signal from the switching changing-over unit 38 is for the switch terminal "B", an output of the phase comparing circuit 33 is inputted to a Δτ setting circuit 37A, and an output of the low frequency oscillator 34 is inputted to the low frequency superimposing circuit 35A, whereby a value of Δτ is controlled. The parameter setting circuit 37 comprises the Δτ setting circuit 37A setting Δτ and the γ setting circuit 37B setting γ.

The Δτ holding circuit 43 holds a value of the delay quantity Δτ before switching-over, and outputs the value of the delay quantity Δτ when a setting control on the optical intensity splitting ratio γ is performed. The γ holding circuit 44 holds a value of the optical intensity splitting ratio γ before switching-over, and outputs a value of the optical intensity splitting ratio γ when a setting control on the delay quantity Δτ is performed.

The switch 38D is inputted a control signal thereto from the switch changing-over unit 38 to select either an output of the Δτ holding circuit 43 or an output of the low frequency superimposing circuit 35A and is changed-over to the selected one, and inputs it to the Δτ compensator 24A-1. Similarly, the switch 38E is inputted thereto a control signal from the switch changing-over unit 38 to select either an output of the γ holding circuit 44 or an output of the low frequency superimposing circuit 35B and is changed-over to the selected one, and inputs it to the γ compensator 24A-2.

The parts denoted by the same reference characters have similar functions and structures to those in the other modifications described above.

A controlling method according to this modification is as follows. Namely, in the control mode 1, an appropriate compensation quantity is determined from a value obtained by detection, and adjustment of the compensators 24A-1 and 24A-2 of the polarization-mode dispersion compensator 24A is changed-over according to a time and performed alternately.

Namely, during a predetermined time, a minute modulation is performed on the delay difference $\Delta\tau$ with a low frequency, whereas during another predetermined time, a minute modulation is performed on the intensity splitting ratio $\gamma$ with a low frequency, that is, two modulations are performed alternately. In concrete, the switch changing-over unit 38 shown in FIG. 29 interlocks the plural switches 38B and 38C to change-over them between the switch terminal "A" and the switch terminal "B" at predetermined time intervals. At this time, control points of the compensators 24A-1 and 24A-2 not controlled are held at positions before changed-over by the $\Delta\tau$ holding circuit 43 or the $\gamma$ holding circuit 44. A reason why the controls are alternately performed with respect to time is that even if the polarization-mode dispersion compensator 24A operates in order to compensate polarization-mode dispersion, it takes a time from about several minutes to a several hours until a change in polarization-mode dispersion state of the optical transmission path 23 actually appears.

Namely, the compensation quantity optimization controlling unit 31B of the dispersion compensation controlling apparatus 39B according to the eighth modification switches and alternately performs with respect to time the setting control on the splitting ratio $\gamma$ to two polarization modes and the setting control on the delay quantity $\Delta\tau$ between the two plarization modes.

Whereby, controls on the compensators 24A-1 and 24A-2 are performed independently.

With the above structure, the optical transmission system 40C operates in almost the similar manner to the optical transmission system 40 to which the dispersion compensation controlling apparatus 39 according to the first embodiment described above.

Namely, before system operation, the switch changing-over unit 38 switches an output signal of the intensity detector 30 to the polarization-mode dispersion quantity detecting unit 36 to determine the optimum value of the parameter information showing a polarization-mode dispersion compensation quantity.

On the other hand, during system operation, the switch changing-over unit 38 switches an output signal of the intensity detector 30 to the band-pass filter 32 to drive the compensation quantity optimization controlling unit 31B in order to prevent fluctuations in the optimum value of the parameter information.

The switch changing-over unit 38 switches the plural switches 38B and 38C at predetermined time intervals, and in the compensators 24A-1 and 24A-2 of the polarization-mode dispersion compensator 24a disposed in the optical transmitter 22B, minute modulations are alternately performed with respect to time on the delay difference $\Delta\tau$ to and the intensity splitting ratio $\gamma$ of the two polarization components with a low frequency.

As above, according to the dispersion compensation controlling apparatus 39B of the eighth modification of the first embodiment of this invention, it is possible to attain the similar advantages to the case of the sixth modification of the first embodiment described above. In addition, it is advantageously possible to decrease a load of the controls as compared with a case of simultaneous controls by switching with respect to time the controls on the compensators 24A-1 and 24A-2 of the polarization-mode dispersion compensator 24A disposed in the optical transmitter 22B.

(B9) Description of a Ninth Modification of the First Embodiment

Figure 30:
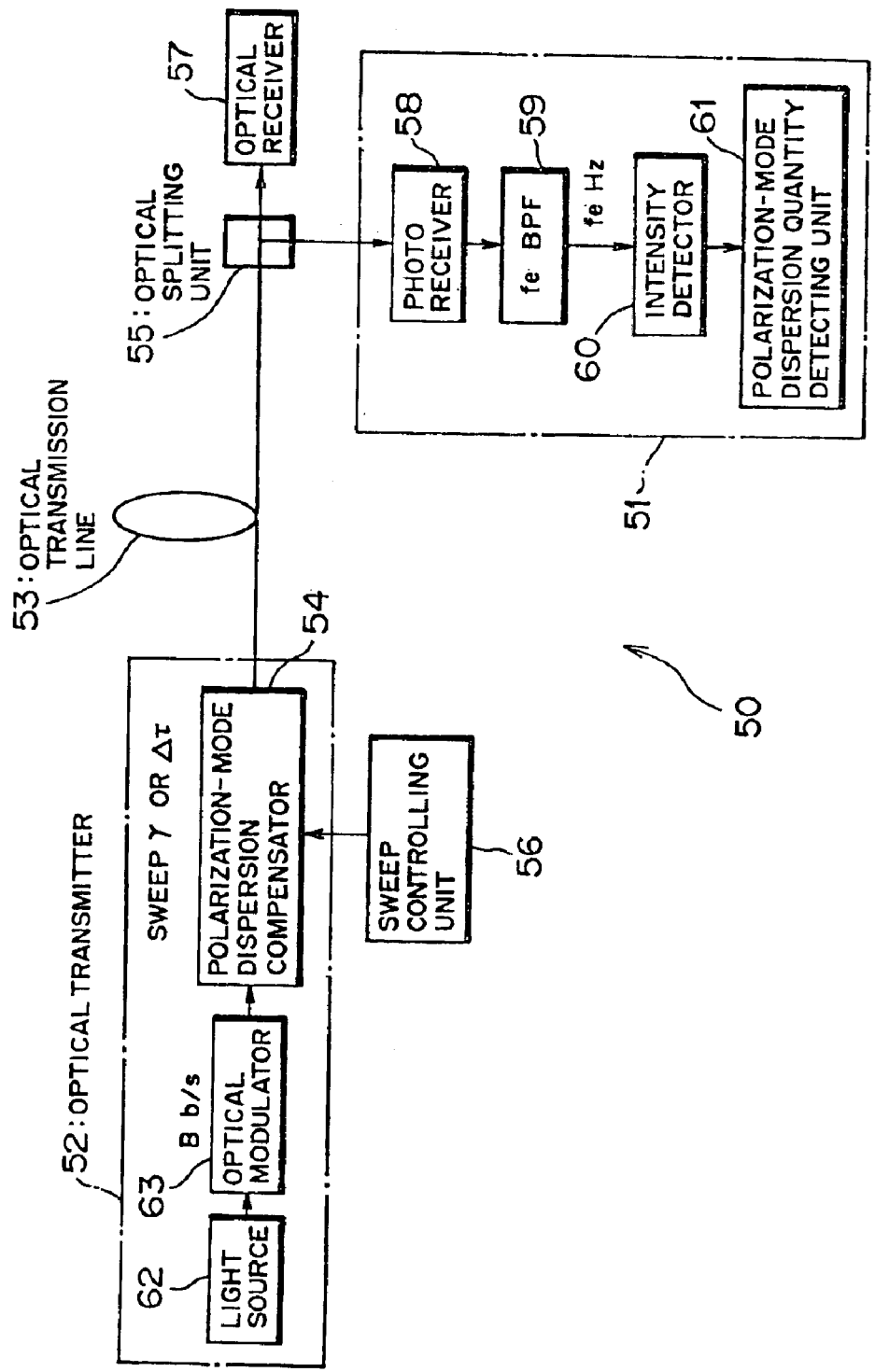
FIG. 30 is a block diagram showing a structure of an optical transmission system to which a dispersion compensation controlling apparatus according to a ninth modification of the first embodiment of this invention is applied.

FIG. 30 is a block diagram showing a structure of an optical transmission system according to a ninth modification of the first embodiment of this invention. As a method of controlling a polarization-mode dispersion, here are used the detection form 1 and the control mode 1.

The optical transmission system 50 shown in FIG. 30 is as well an optical communication system with a transmission rate B (b/s) (for example, 40 Gb/s, 10 Gb/s or the like) adopting time division multiplexing. In the optical transmission system 50, an optical transmitter 52 as a transmitting terminal apparatus transmitting a transmission optical signal and an optical receiver 57 as a receiving terminal apparatus receiving the transmission optical signal are connected over an optical transmission line (transmission fiber) 53, and signal light is split by an optical splitting unit 55 on the receiving side, one of which is inputted to the optical receiver 57 while the other of which is inputted to a dispersion quantity detecting apparatus 51. The dispersion quantity detecting apparatus 51 will be described later. Incidentally, in this modification, a term "dispersion quantity detection" is used to mean "polarization-mode dispersion detection" as well, the dispersion quantity detecting apparatus 51 thus represents "polarization-mode dispersion quantity detecting apparatus 51".

In the optical transmission system 50, a signal light source 62 and an optical modulator 63 are disposed in the optical transmitter 52, along with a polarization-mode dispersion compensator 54 for artificially giving polarization-mode dispersion to an optical signal to be transmitted. Since the polarization-mode dispersion compensator 54 is on the transmitting side, it is possible to set the optical intensity splitting ratio $\gamma$.

A sweep controlling unit 56 is disposed on the optical transmitting side. The sweep controlling unit 56 largely sweeps and controls parameters showing the above polarization-mode dispersion quantity to be artificially given by the polarization-mode dispersion compensator 54 in order to obtain the optimum value of parameter information showing a polarization-mode dispersion quantity, before operation of the optical transmission system (namely, when the optical transmission system 50 is actuated, or when the optical transmission system 50 is re-actuated if the polarization-mode dispersion compensating control largely deviates from the optimum point). Namely, there is provided the sweep controlling unit 56 largely sweeping and controlling parameters showing the above polarization-mode dispersion quantity to be given by the polarization-mode dispersion compensator 54 when the system is actuated or when the system is re-actuated.

In the optical transmission system 50, a dispersion quantity detecting apparatus 51 is disposed in the optical receiver 57. The dispersion quantity detecting apparatus 51 monitors a state of polarization-mode dispersion generated in an optical signal transmitted over the optical transmission line 53 on the basis of an optical signal taken out by the optical splitting unit 55, which comprises, as shown in FIG. 30, a photo receiver 58, a band-pass filter (fe BPF) 59, an intensity detector 60 and a polarization-mode dispersion quantity detecting unit 61. Incidentally, these parts have similar functions and structures to those of the first embodiment described above.

In the optical transmission system 50, an optical signal at a transmission rate B (b/s) transmitted from the optical transmitter 52 is transmitted to the optical receiver 57 over the optical transmission line 53. At this time, in the optical transmitter 52, polarization-mode dispersion is artificially given to the optical signal by the polarization-mode dispersion compensator 54 under a control of the sweep controlling unit 56.

Following that, a part of the optical signal transmitted over the optical transmission line 53 is taken out by the optical splitting unit 55, and the optical signal taken out (monitor light) is sent to the dispersion quantity detecting apparatus 51. In the dispersion quantity detecting apparatus 51, a state of polarization-mode dispersion generated in the optical signal transmitted over the optical transmission path 53 is monitored on the basis of the optical signal take out by the optical splitting unit 55.

In the above structure, a sweep control is performed before system operation. First, a parameter (at least either the delay quantity $\Delta\tau$ or the optical intensity splitting ratio $\gamma$) showing a polarization-mode dispersion quantity to be given to an optical signal by the polarization-mode dispersion compensator 54 is swept and controlled in a wide range. For example, the delay quantity $\Delta\tau$ is swept in a range from $\Delta\tau_1$ to $\Delta\tau_2$, and the optical splitting ratio $\gamma$ is swept in a range from 0 to 1.

In the dispersion quantity detecting apparatus 51, an intensity of the first specific frequency component [fe (Hz) component] in a baseband spectrum in the optical signal artificially given the above polarization-mode dispersion is detected by the photo receiver 58, the band-pass filter 59, and the intensity detector 60, and a polarization-mode dispersion quantity of the transmission optical signal is detected by the polarization-mode dispersion quantity detecting unit 61 in a manner similar to the above.

Figure 31A:
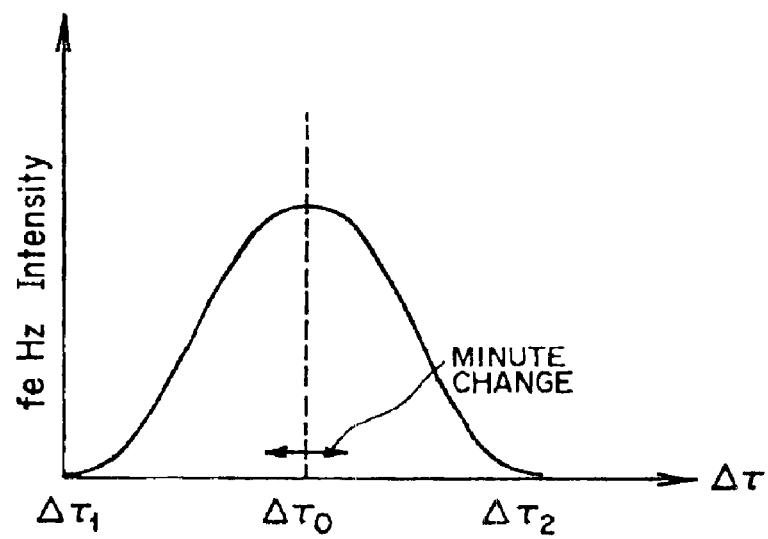
FIGS. 31(a) and 31(b) are diagrams showing a change in intensity of a specific frequency component when parameters showing a polarization-mode dispersion quantity to be given to an optical signal by a polarization-mode dispersion compensator undergoes a sweep control in a wide range.
Figure 31B:
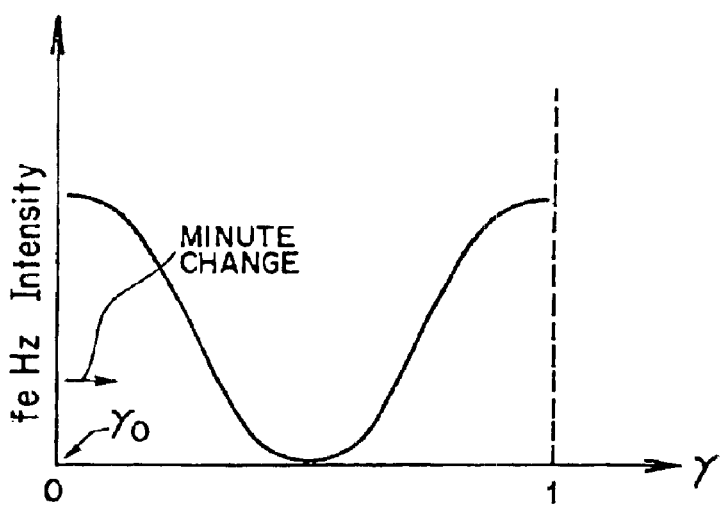

Here, the sweep control before operation of the optical transmission system 50 will be described with reference to FIGS. 31(a) and 31(b). FIG. 31(a) shows a change in intensity of the first specific frequency component when the delay quantity $\Delta\tau$ is swept in a range from $\Delta\tau_1$ to $\Delta\tau_2$. FIG. 31(b) shows a change in intensity of the first specific frequency component when the optical splitting ratio $\gamma$ is swept in a range from 0 to 1. As seen from FIGS. 31(a) and 31(b), the intensity of the first specific frequency component is the maximum when the delay quantity is $\Delta\tau_0$ or the optical intensity splitting ratio is $\gamma_0$.

In consequence, a delay quantity $\Delta\tau_0$ or an optical intensity splitting ratio $\gamma_0$ is determined as the optimum value of the parameter information showing a polarization-mode dispersion quantity, an operating point of the polarization-mode dispersion compensator 54 is such set as the delay quantity $\Delta\tau=\Delta\tau_0$ or the optical intensity splitting ratio $\gamma=\gamma_0$, and the operation of the optical transmission system 50 is started.

Incidentally, it is possible to perform a tracking control during operation of the optical transmission system 50 in order to keep the delay quantity $\Delta\tau$ or the optical intensity splitting ratio $\gamma$ at the optimum values at all times against a change with time of the optical transmission path 53. As an example of the tracking control, it is possible to use a method of automatically performing a feedback control when polarization-mode dispersion is compensated, as described above in the fifth modification of the first embodiment. And, as shown in FIGS. 31(a) and 31(b), the delay quantity $\Delta\tau$ or the optical intensity splitting ratio $\gamma$ is minutely varied (dithered) in the vicinity of the maximum point $\Delta\tau_0$ or $\gamma_0$, thereby detecting a new maximum point.

As above, according to the dispersion quantity detecting apparatus of the ninth modification of the first embodiment of this invention, the sweep controlling unit 56 largely sweeps and controls a parameter showing the above polarization-mode dispersion quantity to be artificially given by the polarization-mode dispersion compensator 54 before operation of the optical transmission system 50, whereby the optimum value of parameter information showing a polarization-mode dispersion quantity is determined.

Meanwhile, in the optical transmission system 50 shown in FIG. 30, the polarization-mode dispersion compensator 54 is disposed in the optical transmitter 52. It is alternatively possible that the polarization-mode dispersion compensator 54 is disposed in another position where, for example, the optical receiver 57, a linear repeater (not shown) or the like is disposed, and a similar control is performed.

(C) Description of a Second Modification

The method of controlling a polarization-mode dispersion quantity in the first embodiment and the modifications thereof described above is in the control mode (control mode 1) using the first function. This method may be performed in another way.

Figure 32:
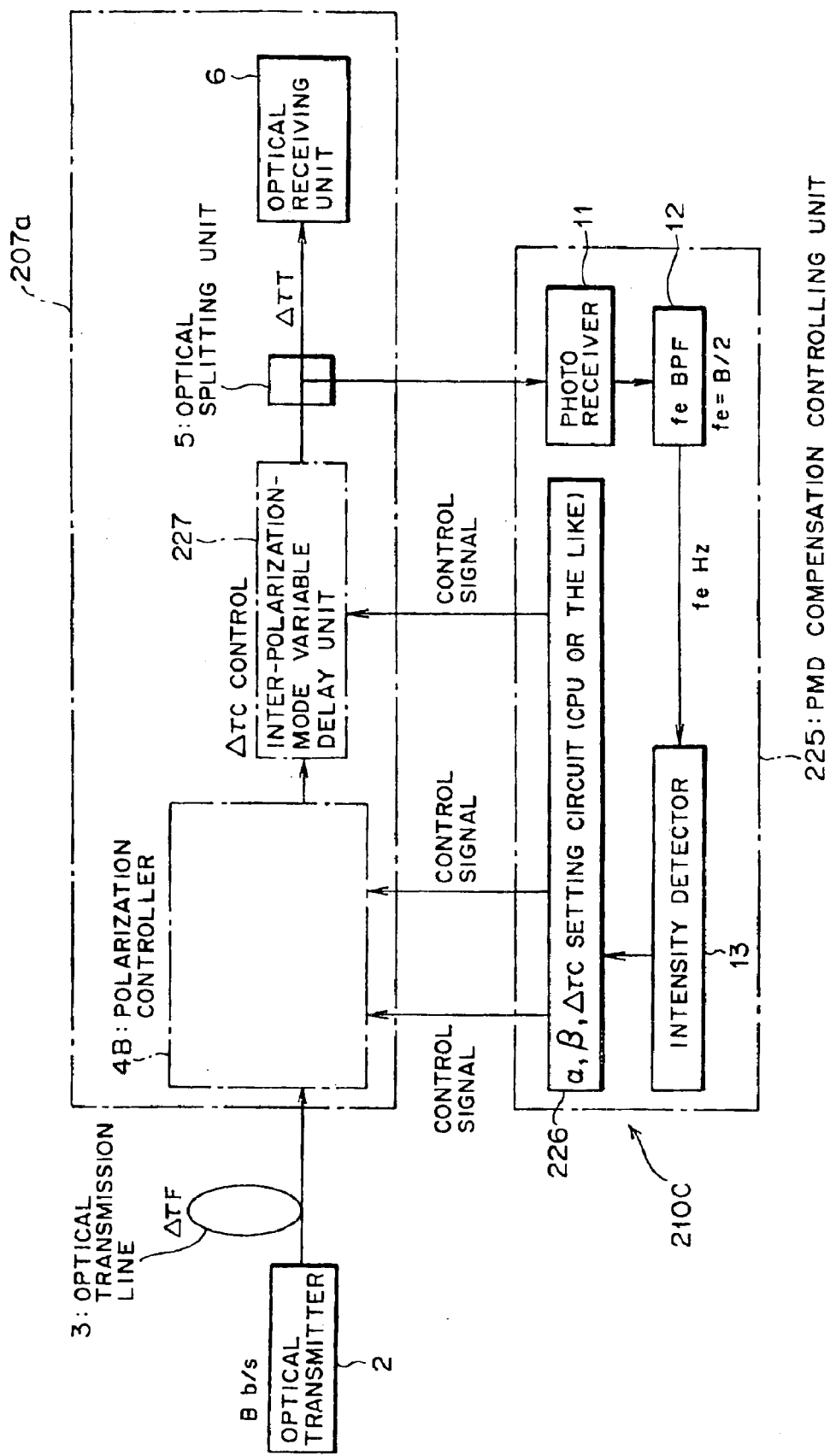
FIG. 32 is a block diagram showing a structure of an optical transmission system to which a dispersion compensation controlling apparatus according to a second embodiment of this invention is applied.

FIG. 32 is a block diagram showing a structure of an optical transmission system to which a dispersion compensation controlling apparatus according to a second embodiment of this invention is applied (the same structure is also adopted in a first modification of the second embodiment to be described later). The optical transmission system 210C shown in FIG. 32 is as well an optical communication system with a transmission rate B (b/s) (for example, 10 Gb/s or the like) adopting time division multiplexing. In the optical transmission system 210C, an optical transmitter 2 as a transmitting terminal apparatus transmitting a transmission optical signal and an optical receiver 207a as a receiving terminal apparatus receiving the transmission optical signal are connected over an optical transmission line (transmission fiber) 3, and a dispersion compensation controlling apparatus 225 is disposed on the receiving side. Incidentally, a term "dispersion" is generally used to mean "chromatic dispersion". In the second embodiment, the term "dispersion" is used to mean "polarization-mode dispersion", and "polarization-mode dispersion compensation controlling apparatus 225" is mentioned as "PMD compensation controlling unit" in FIG. 32.

The optical receiver 207a comprises a polarization controller 4B, an inter-polarization-mode variable delay unit 227, an optical splitting unit 5 and an optical receiving unit 6. The optical splitting unit 5 and the optical receiving unit 6 have the same functions as those described above, further descriptions of which are thus omitted. The inter-polarization-mode variable delay unit 227 gives a delay difference $\Delta\tau_c$ between polarization modes to perform polarization-mode dispersion compensation (Polarization-Mode Dispersion compensation), which is variable. Enlarged diagrams of the polarization controller 4B and the inter-polarization-mode variable delay unit 227 are shown in FIG. 33.

Figure 33:
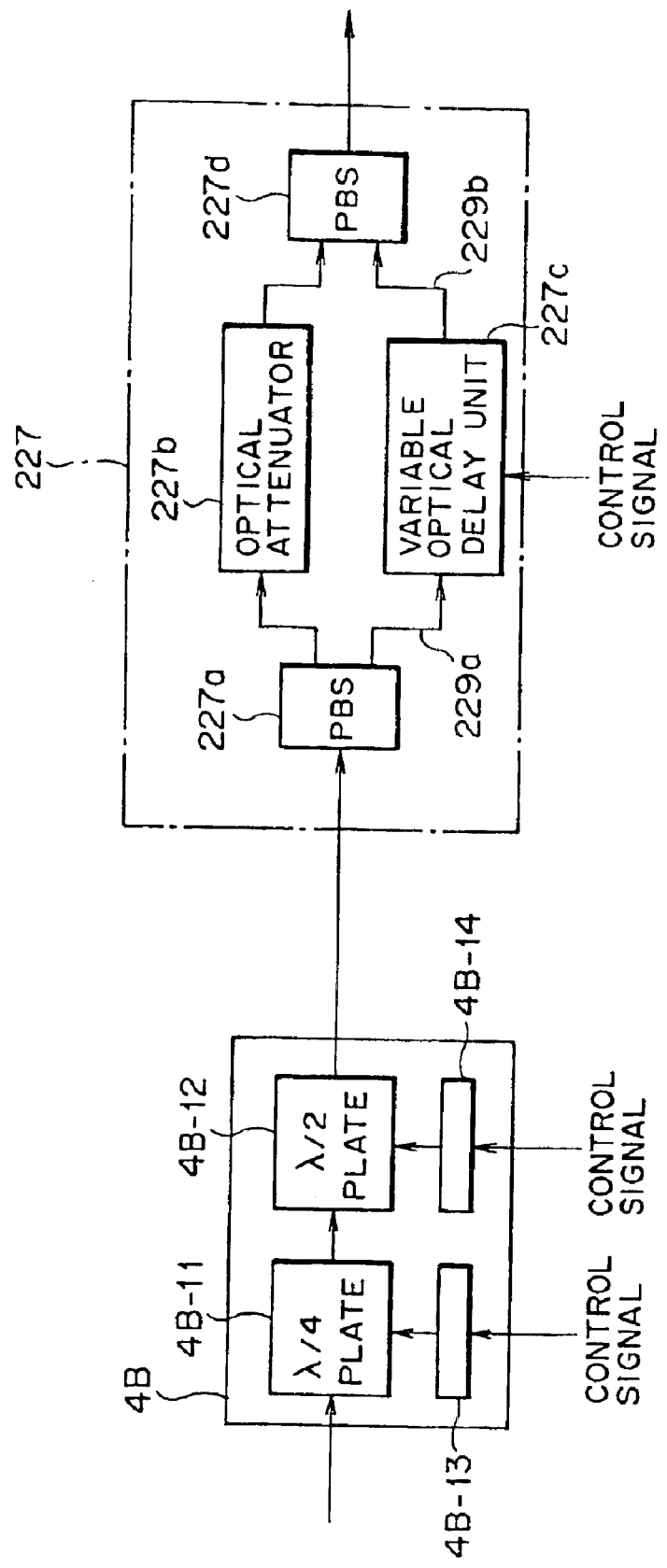
FIG. 33 is an enlarged diagram of a polarization controller and an inter-polarization-mode variable delay.

The polarization controller 4B shown in FIG. 33 is used to adjust the axis when a received optical signal is inputted to a fiber. The polarization controller 4B has wave plates [a ¼ wave plate ($\lambda$/4 plate) 4B-11 and a ½ wave plate ($\lambda$/2 plate) 4B-12] which can be driven from the outside. The wave plates 4B-11 and 4B-12 are driven by actuators 4B-13, 4B-14, respectively, receiving parameter setting control signals from the outside.

Optical intensity can be decomposed into two kinds of polarization-mode components $\alpha$ and $\beta$ (radian). According to the second embodiment, using variability of the inter-polarization-mode variable delay unit 227, these polarization mode components $\alpha$ and $\beta$ are directly and dynamically controlled. An $\alpha$ control is performed at the ¼ wave plate 4B-11, while $\beta$ control is performed at the ½ wave plate 4B-12. In other words, a functional operation is performed in terms of the optical intensity splitting ratio $\gamma$ in the first embodiment, wherein, so to speak, a static (Static) side of the optical intensity is used. In this embodiment, using, so to speak, a dynamic (Dynamic) side of the optical intensity, a control by adjustment of a polarization angle is performed.

Next, a controlling method according to this embodiment will be described. This method is performed in a mode that the dispersion compensation controlling apparatus 225 performs a feedback control on at least either the polarization controller 4B or the inter-polarization-mode variable delay unit 227 disposed in the optical transmission line 3 such that the intensity of the first specific frequency component detected by the intensity detector 13 becomes the maximum. Namely, not determining a control quantity using a function as in the first embodiment, but determining a control quantity by feeding-back such that the detected intensity of the specific frequency becomes the maximum. In order to discriminate this control mode from the control mode 1 (control using the first function), this control mode will be referred to as a control mode 2 in the following description.

Hereinafter, as methods of controlling polarization-mode dispersion, there are a method in which the first functional operation is performed in terms of two variables γ and Δτ, and a method in which an optimum value control is performed on at least either α and β, or Δτ.

In order to perform a dynamic control in the control mode 2, the inter-polarization-mode variable delay unit 227 shown in FIG. 33 comprises polarization beam splitters (PBS) 227a and 227d and an optical attenuator 227b. Namely, the inter-polarization-mode variable delay unit 227 is configured as a device separating polarization-mode components by the polarization beam splitter 227a, giving a delay difference between the polarization mode components by the variable optical delay 272c, and multiplexing them. One of the components is delayed by the variable optical delay 227c through an optical fiber 229a and outputted to an optical fiber 229b, while the other component is subjected to a loss by the optical attenuator 227b such that optical losses in both optical paths are equal, multiplexed by the polarization beam splitter 227d still in an orthogonal state, and outputted.

As above, it is advantageously possible to not only decrease penalty by controlling using the inter-polarization-mode variable delay unit 227 as compared with a case where an inter-polarization-mode fixed delay is used but also comply with fluctuations in polarization-mode dispersion quantity of the optical transmission path due to switching of bit rate, transmission distance, signal modulation format or the like. A delay difference to be given by a variable optical delay can be changed by a control signal from the outside.

Figure 34A:
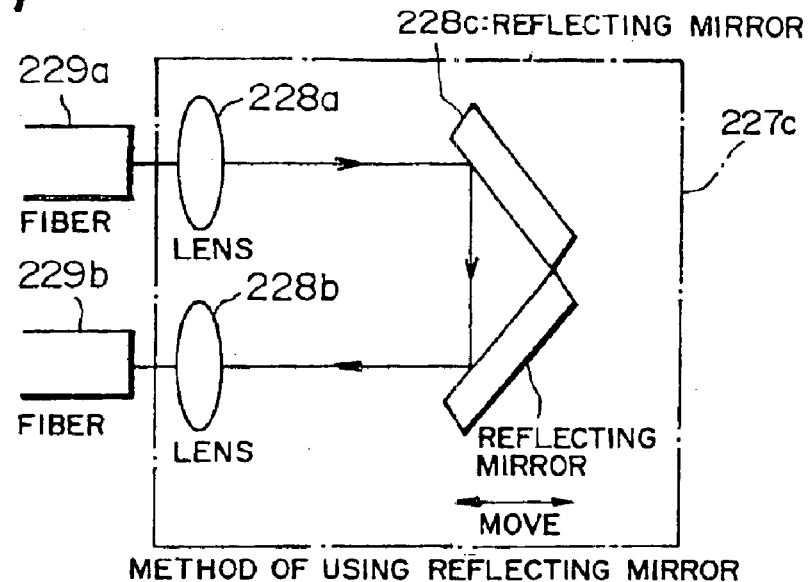
FIGS. 34(a) through 34(c) are diagrams showing an example of a variable optical delay path according to the second embodiment of this invention.
Figure 34B:
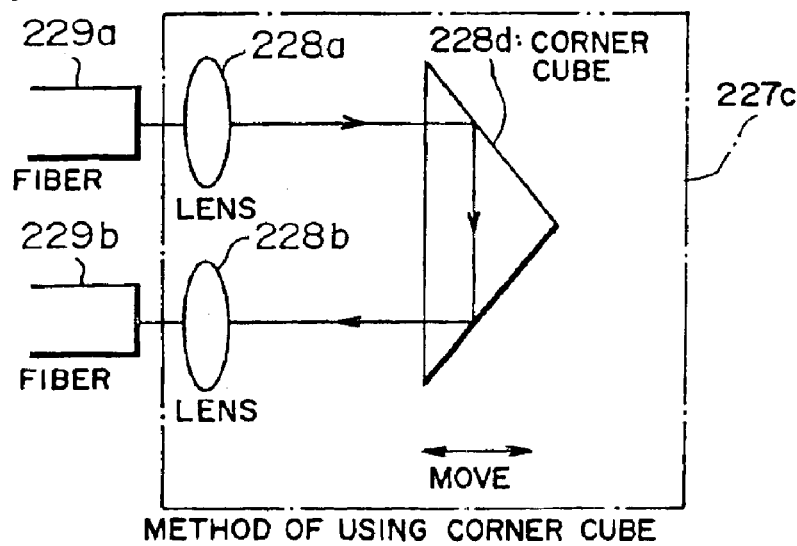
Figure 34C:
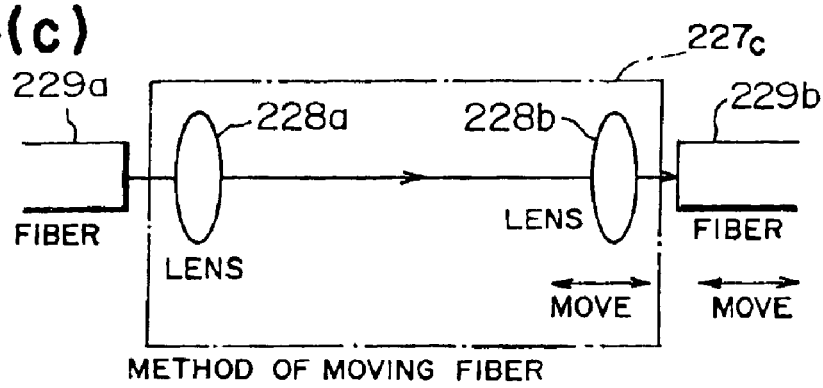

FIGS. 34(a) through 34(c) show examples of a variable optical delay path according to the second embodiment of this invention. Each of these optical delay paths functions as the variable optical delay 227c, in which an optical signal is once taken out in the air, given a delay difference, and put back again to a fiber. The optical fibers 229a and 229b correspond to optical fibers at an input and an output of the variable optical delay 227c shown in FIG. 33. FIG. 34(a) shows a method of using a reflecting mirror 228c, FIG. 34(b) shows a method of using a corner cube 228d, and FIG. 34(c) shows a method of using a method or the like moving the fiber 229b. Incidentally, in each of the drawings, reference characters 228a and 228b denote collimator lenses.

Figure 35:
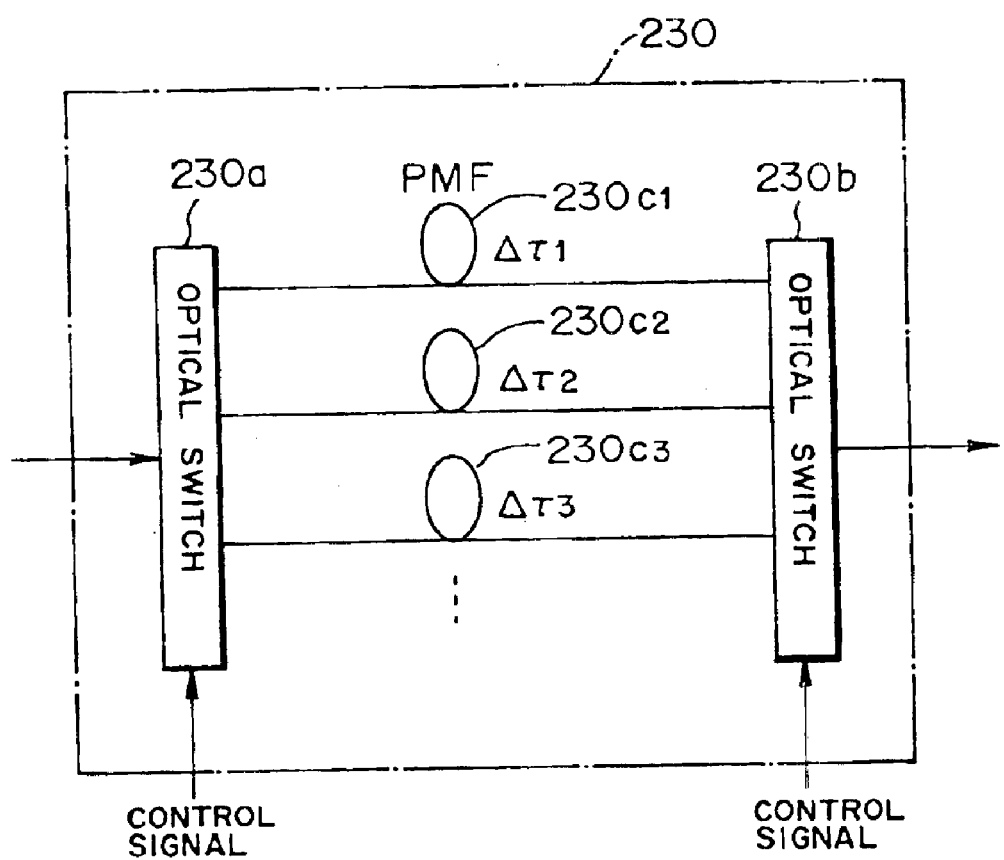
FIG. 35 is a diagram showing an example of a structure of another inter-polarization-mode variable delay element according to the second embodiment of this invention.

FIG. 35 shows an example of a structure of another inter-polarization-mode variable delay unit according to the second embodiment of this invention. In an inter-polarization-mode delay element 230 shown in FIG. 35, a plurality of polarization maintaining fibers (PMF) $230c_1$, $230c_2$, $230c_3$, having different polarization-mode dispersion values are arranged in parallel, and optical switches 230a and 230b are disposed on the input's side and the output's side thereof. These optical switches 230a (or 230b) lead an inputted optical signal to a corresponding PMF $230c_1$, $230c_2$, $230c_3$, . . . , according to a control signal from the outside. The PMFs $230c_1$, $230c_2$, $230c_3$ have polarization-mode dispersion values $\Delta\tau_1$, $\Delta\tau_2$, $\Delta\tau_3$, . . . , respectively, where $\Delta\tau_1 < \Delta\tau_2 < \Delta\tau_3$. Further, according to a control signal inputted according to a polarization dispersion quantity of an inputted optical signal, a PMF close to a value thereof is selected. In order to increase a variable quantity or a variable accuracy of polarization dispersion, it is only necessary to prepare a larger number of PMFs therefor. Namely, the inter-polarization-mode delay element (inter-polarization-mode delay unit) 230 is configured as a device in which a plurality of polarization maintaining fibers having different polarization dispersion values are arranged in parallel, and the polarization maintaining fibers transmitting an optical signal are switched by the optical switch 230a (or 230b) according to a polarization-mode dispersion quantity of the optical transmission line 3, and the inter-polarization-mode delay unit 230 is configured with polarization maintaining fibers. Further, the inter-polarization-mode delay unit 230 is configured with an inter-polarization-mode variable delay unit in a state where a delay quantity is fixed.

Again back to FIG. 32, the dispersion compensation controlling apparatus 225 shown in FIG. 32 is a dispersion compensation controlling apparatus corresponding to the dispersion compensation controlling apparatus 1 (1A, 1B, 39, 39A, 39B or the like) according to the first embodiment, which comprises a photo receiver 11, a band-pass filter 12, an intensity detector 13, and an $\alpha \cdot \beta \cdot \Delta\tau_c$ setting circuit 226. The photo receiver 11, the band-pass filter 12 and the intensity detector 13 have the same functions as those described above, further descriptions of which are thus omitted.

The $\alpha \cdot \beta \cdot \Delta\tau_c$ setting circuit 226 performs an appropriate control from a signal inputted from the intensity detector 13 to control the polarization controller 4B in the optical receiver 207a. This polarization-mode controlling function is achieved by a CPU or the like.

From the above, a flow of a signal is as follows. Namely, an optical signal at B (b/s) transmitted from the optical transmitter 2 is subjected to waveform deterioration due to polarization-mode dispersion of $\Delta\tau_F(\text{ps/km}^{1/2})$ in the optical transmission line 3, and inputted to the optical receiver 207a. In the polarization controller 4B in the optical receiver 207a, an axis of the optical signal is adjusted by the ¼ wave plate 4B-11 and the ½ wave plate 4B-12, given a delay difference $\Delta\tau_c$, between polarization modes, and compensated its polarization-mode dispersion using the inter-polarization-mode variable delay unit 227 which can change $\Delta\tau_c$. A part of the optical signal compensated is split by the optical splitting unit 5. One of the split signal is O/E-converted by the photo receiver 11 in the dispersion compensation controlling apparatus 225, a frequency component of fe (Hz) is extracted by the band-pass filter 12, and an intensity thereof is detected by the intensity detector 13. The other of the split signal is inputted to the optical receiver 6.

In this intensity detection, a component intensity of fe=B/2 (Hz) that is a half of the bit rate is detected, and three parameters of an azimuth angle α of the λ/4 plate, an azimuth angle β of the λ/2 plate and $\Delta\tau_c$ are controlled by the $\alpha \cdot \beta \cdot \Delta\tau_c$ setting circuit 226 such that this intensity becomes the maximum. Incidentally, although here are disposed these polarization dispersion compensating devices in the receiving terminal, it is alternatively possible to dispose them in the transmitting terminal or an optical repeater, detect a polarization-mode dispersion quantity at the receiving terminal and feedback-control the polarization compensation devices. The system using the fe=B/2 (Hz) component intensity can be adopted to not only NRZ waveforms but also RZ waveforms or OTDM waveforms.

As above, since an inter-polarization-mode variable delay element is used in this embodiment, waveform deterioration due to polarization-mode dispersion is decreased, and it is possible to comply with fluctuations in polarization-mode dispersion quantity of the optical transmission line due to a switching of bit rate, transmission distance, signal modulation format or the like. When an inter-polarization-mode fixed delay element is used, it is sufficient to give a reference in consideration of system conditions with respect to a design of a fixed delay quantity thereof.

(C1) Description of a First Modification of the Second Embodiment

According to the second embodiment, it is possible to provide a function of switching between before system operation (occasionally referred to as before system operation or a mode setting an initial value) and during system operation (occasionally referred to as during system operation or a normal use mode). In the same structure as the one shown in FIG. 32, a method of controlling an initial setting mode is in the control mode 2 to perform polarization-mode dispersion compensation. Since a frequency provided for intensity detection is in one system, it means that the detection form 1 is employed. In this modification, a term "dispersion" is used to mean "polarization-mode dispersion".

The method is that $\alpha$, $\beta$ and $\Delta\tau_c$ that are three parameters to be given by the $\lambda/4$ and $\lambda/2$ plates and the inter-polarization-mode variable delay element are changed in the full range at a sufficiently small pitch, and an intensity of the frequency fe (Hz) component is detected for every combination of these three parameters. A combination of the $\alpha$, $\beta$ and $\Delta\tau_c$ making the frequency fe (Hz) components the maximum is obtained as a result. At that time, optical waveform deterioration after compensation is the minimum so that the $\alpha$, $\beta$ and $\Delta\tau_c$ are set to those values when the system is started.

When a tracking control is started without performing the initial setting mode, there is a possibility that a total polarization-mode dispersion quantity after polarization-mode dispersion compensation is larger than one time slot at a point of start of the control. In such case, in the characteristic curve of $\Delta\tau$ versus fe (=B/2) (Hz) component intensity in FIG. 13, the frequency fe (Hz) component intensity increases with increasing polarization-mode dispersion quantity, so that waveform deterioration increases due to a maximum value control on the frequency fe (Hz) component. In contrast, by performing the initial setting mode, the frequency fe (Hz) component is the maximum when the polarization-mode dispersion quantity $\Delta\tau_T$ after compensation is the minimum so long as the transmission path polarization-mode dispersion quantity $\Delta\tau_P$ does not exceed one time slot, so that the tracking control can be started from a correct position.

Figure 36:
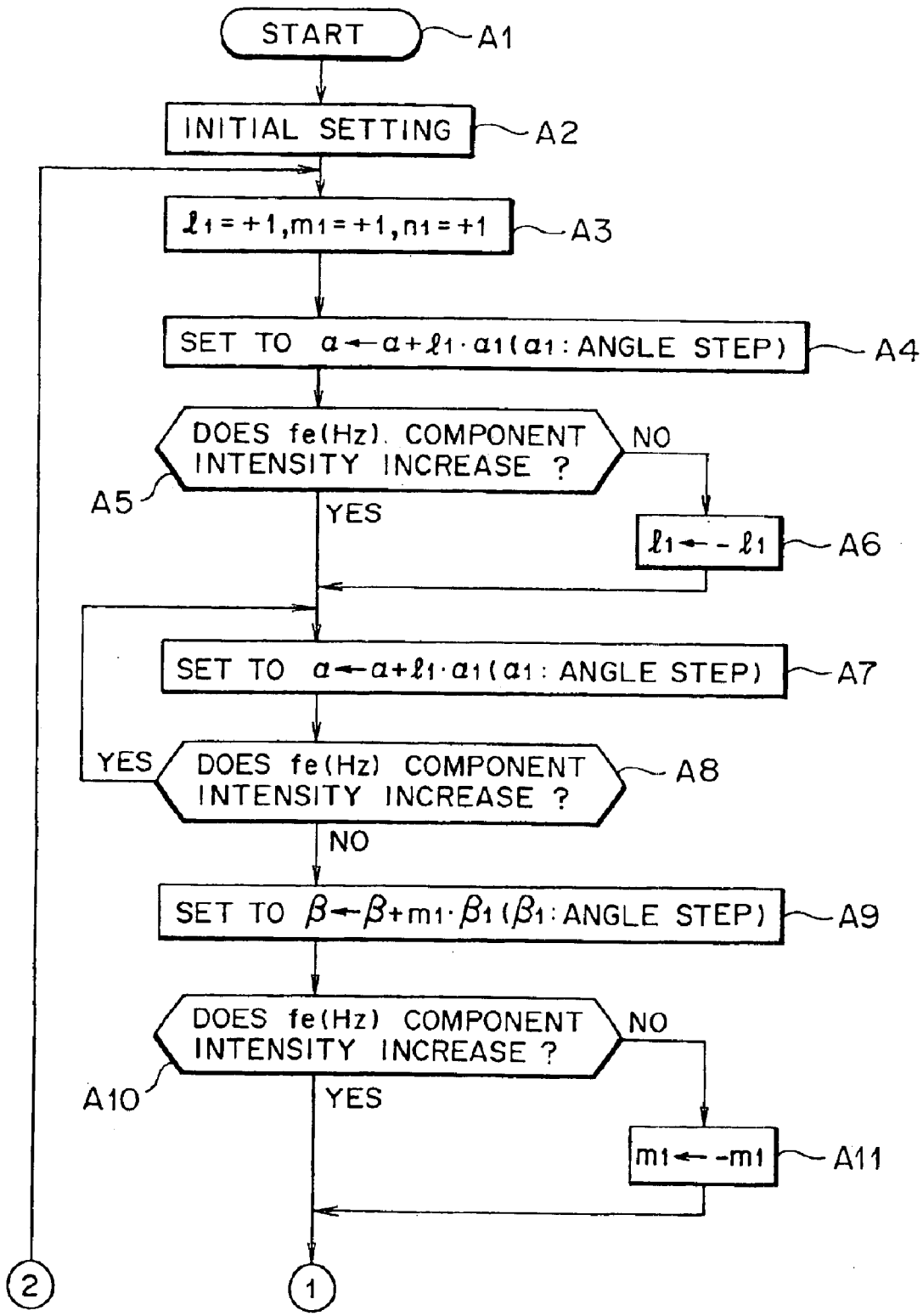
FIGS. 36 and 37 are control flowcharts for realizing PMD compensation according to the second embodiment of this invention.
Figure 37:
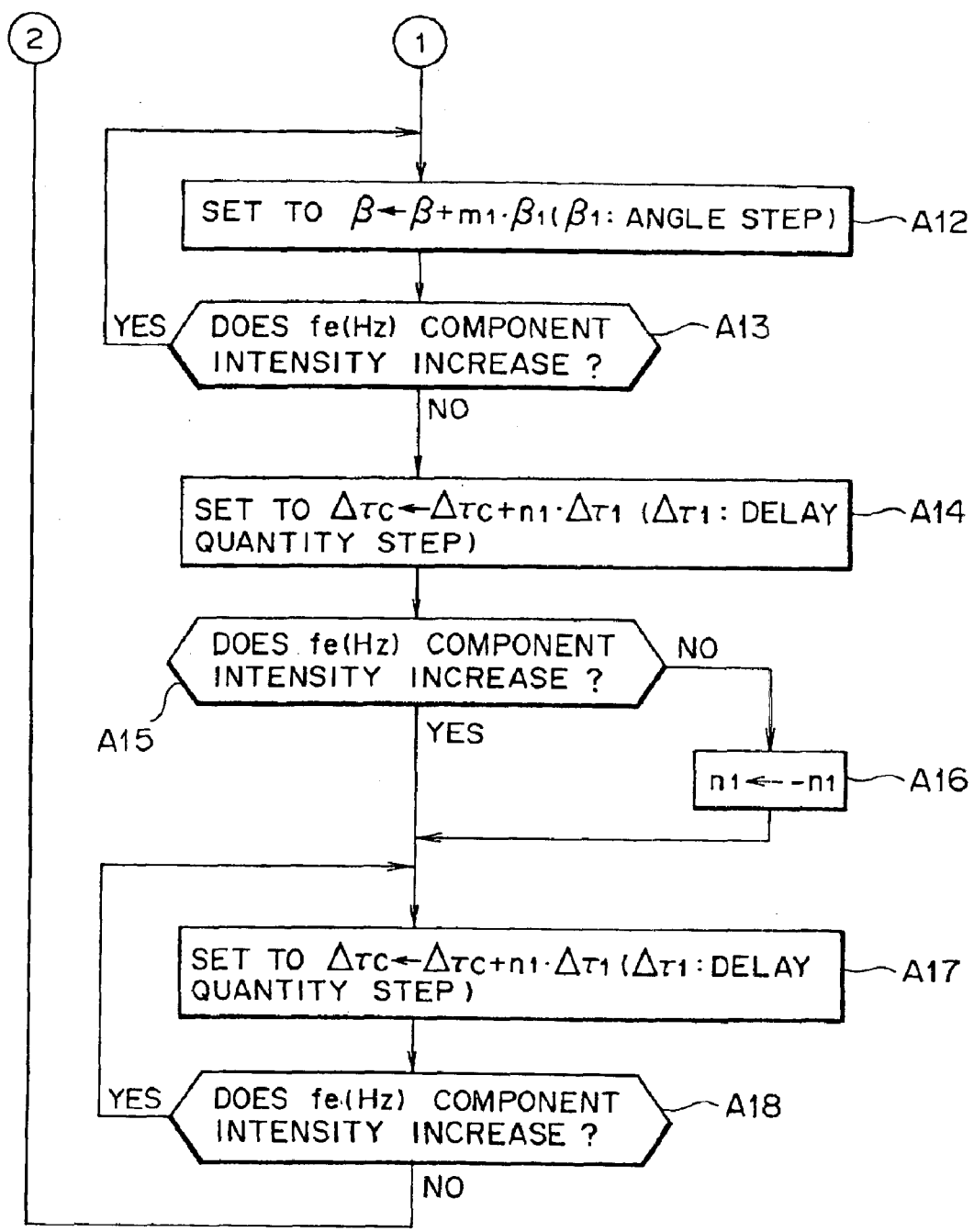

FIGS. 36 and 37 show a control flowchart for realizing polarization-mode dispersion compensation according to the second embodiment of this invention (incidentally, this flowchart will be also used in third and fourth embodiments). First, the dispersion compensation controlling apparatus (mentioned as a PMD compensation controlling unit in FIG. 32) 225 starts a program (Step A1), and performs a control of the initial setting mode when system operation is started (Step A2) Next, a direction of a change of $\alpha$, $\beta$ and $\Delta\tau_c$ is initialized (Step A3), and the dispersion compensation controlling apparatus 225 increases a by a constant pitch $\alpha1$ with $\beta$ and $\Delta\tau_c$ being fixed to not set a value of $\alpha$ (Step A4). Further, by changing $\alpha$, it is determined whether the fe (Hz) component intensity increases or not (Step A5). When the fe (Hz) component intensity increases, YES route is taken, and the dispersion compensation controlling apparatus 225 changes $\alpha$ at the same pitch $\alpha1$ in the same direction. When the fe (Hz) component intensity decreases, NO route is taken, and the dispersion compensation controlling apparatus 225, in the opposite direction (Step A6), changes a at the same pitch $\alpha1$, so that a new $\alpha$ is set in either case (Step A7). Again, it is determined whether the fe (Hz) component intensity increases or not (Step A8). When the fe (Hz) component intensity increases, YES route is taken, and the dispersion compensation controlling apparatus 225 changes $\alpha$ at the same pitch $\alpha1$. The $\alpha$ changing operation is continued until the fe (Hz) component intensity decreases (Step A7, Step A8). When the fe (Hz) component intensity does not increase at Step A8, the dispersion compensation controlling apparatus 225 takes NO route, and once terminates the control on $\alpha$ (first control mode).

Next, the dispersion compensation controlling apparatus 225 performs a control on $\beta$ in the similar manner. Namely, at Step A9, the dispersion compensation controlling apparatus 225 increases $\beta$ by a constant pitch $\beta1$ to set $\beta$, and at Step A10 determines whether or not the fe (Hz) component frequency increases by changing $\beta$. When the fe (Hz) component frequency increases, the dispersion compensation controlling apparatus 225 takes YES route via a point denoted by ① in FIG. 36, and changes $\beta$ at the same pitch $\beta1$ in the same direction (Step A12). On the contrary, when the fe (Hz) component intensity decreases at Step A10, the dispersion compensation controlling apparatus 225 takes NO route, and, in the opposite direction (Step A11), changes $\beta$ at the same pitch $\beta1$ to set a new $\beta$ in the similar manner (Step A12). At Step A13, the dispersion compensation controlling apparatus 225 again determines whether or not the fe (Hz) component intensity increases, repeats the both of Steps A12 and A13, and performs a control such that the frequency fe (Hz) component intensity becomes the maximum. When the frequency fe (Hz) component intensity does not increase at Step A13, the dispersion compensation controlling apparatus 225 takes NO route, and once terminates the control on $\beta$ (second control mode)

Finally, the dispersion compensation controlling apparatus 225 performs a control on $\Delta\tau$ in the similar manner. Namely, at Step A14, the dispersion compensation controlling apparatus 225 increases $\Delta\tau$ by a constant pitch $\Delta\tau_1$ to set $\Delta\tau$, and determines whether or not the fe (Hz) component intensity increases by changing $\Delta\tau$ (step A15) When the fe (Hz) component intensity increases, the dispersion compensation controlling apparatus 225 takes YES route, and changes $\Delta\tau$ at the same pitch $\Delta\tau_1$ in the same direction (Step A17). On the contrary, when the fe (Hz) component intensity decreases at Step A15, the dispersion compensation controlling apparatus 225 takes NO route, and in the opposite direction (Step A16), changes $\Delta\tau$ at the same pitch $\Delta\tau_1$ to set a new $\Delta\tau$ (Step A17). At Step A18, the dispersion compensation controlling apparatus 225 again determines whether or not the fe (Hz) component intensity increases. When the fe (Hz) component intensity increases, the dispersion compensation controlling apparatus 225 takes YES route, and repeats the both of Steps A17 and A18. When the frequency fe (Hz) component intensity does not increase at Step A18, the dispersion compensation controlling apparatus 225 takes NO route, once terminates the control on $\Delta\tau$ (third control), and moves back to Step A3 in FIG. 36 via a point denoted by ② in FIG. 36.

As above, one control cycle is finished, and again the next control continues from α in the similar manner. Namely, the polarization-mode dispersion controlling unit (dispersion compensation controlling apparatus 225) performs a control in a first control mode in which the polarization-mode dispersion controlling unit changes any one of an azimuth angle of the ¼ wave plate 4B-11, an azimuth angle of the ½ wave plate in the polarization controller 4B and a delay quantity between polarization modes of the inter-polarization-mode delay unit 227 such that the intensity of the first specific frequency component becomes the maximum while fixing the remaining parameters among the above azimuth angles and the delay quantity between polarization modes. After the first control mode, the dispersion-mode controlling unit performs a control in a second control mode in which the polarization-mode dispersion controlling unit changes either one of the remaining control parameters such that the intensity of the first specific frequency component becomes the maximum while fixing the parameter having been first changed and the other one of the remaining control parameters. Finally, the polarization-mode dispersion controlling unit performs a control in the third control mode in which the polarization-mode dispersion controlling unit changes the other one of the remaining parameters such that the intensity of the first specific frequency component becomes the maximum, while fixing the control parameter having been first changed and the one of the remaining control parameters.

As above, since a tracking control is performed during system operation, it is possible to capture the maximum values of changing α, β and $\Delta\tau_c$, so as to follow fluctuations in these parameters due to a change in external environment such as temperature.

Since the initial setting mode before system operation is performed as above, it is advantageously possible to obtain the optimum state even from a start of system operation. In addition, it is also advantageously possible to normally perform the tracking control during operation.

Figure 38:
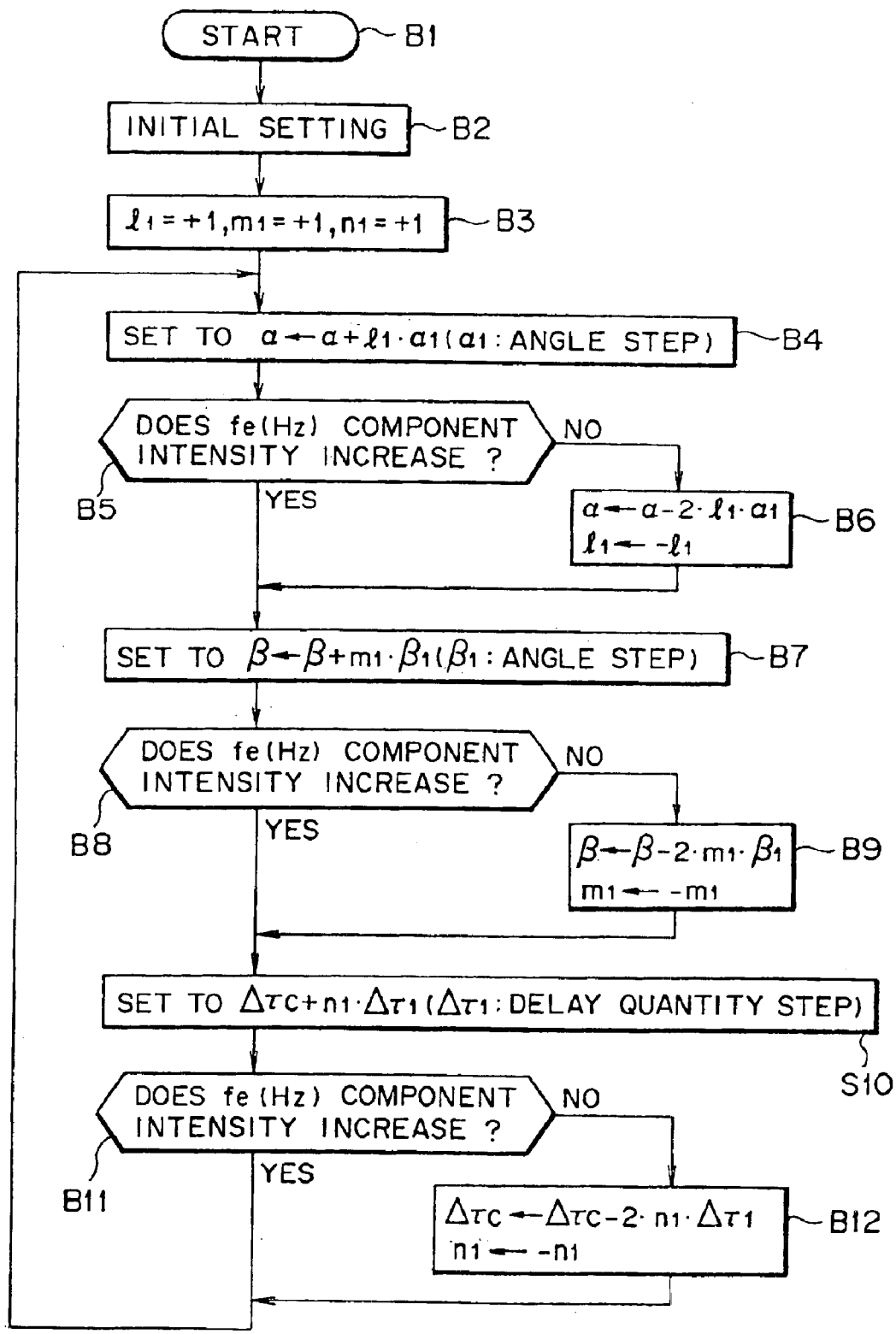
FIG. 38 is another control flowchart for realizing the PMD compensation according to the second embodiment of this invention.

FIG. 38 shows a control flowchart for realizing polarization-mode dispersion compensation according to the second embodiment of this invention (incidentally, this flowchart will be also used in the third and fourth embodiments). Although the initial setting mode at the time of start of system operation is similar to the flowchart shown in FIGS. 36 and 37 (Steps B1 through B3), here is featured that a control is switched on $\alpha \rightarrow \beta \rightarrow \Delta\tau_c \rightarrow \alpha \rightarrow \ldots$ with each change at each step in the tracking control during system operation.

Namely, the dispersion compensation controlling apparatus 225 performs the initial setting (Step B1 through Step B3), and sets a value of α at Step B4. By changing α, the dispersion compensation controlling apparatus 225 determines whether or not the fe (Hz) component intensity increases (Step B5). When the fe (Hz) component intensity increase here, the dispersion compensation controlling apparatus 225 takes YES route. On the contrary, when the fe (Hz) component intensity decreases, the dispersion compensation controlling apparatus 225 takes NO route, and changes a value of α in the opposite direction (Step B6). Whereby, a fourth control mode is performed (Step B4 through Step B6).

Further, the dispersion compensation controlling apparatus 225 changes a value of β at a pitch β1 (Step B7), and determines at Step B8 whether or not the fe (Hz) component intensity increases. When the fe (Hz) component intensity increases, the dispersion compensation controlling apparatus 225 takes YES route. On the contrary, when the fe (Hz) component intensity decreases, the dispersion compensation controlling apparatus 225 takes NO route, and changes a value of β in the opposite direction (Step B9). Whereby, a fifth control mode is performed (Step B7 through B9).

Finally, the dispersion compensation controlling apparatus 225 changes a value of Δτ at a pitch Δτ (Step B10), and at Step B11 determines whether or not the fe (Hz) component intensity increases. The fe (Hz) component intensity increases, the dispersion compensation controlling apparatus 225 takes YES route. On the contrary, when the fe (Hz) component intensity decreases, the dispersion compensation controlling apparatus 225 takes NO route, and changes a value of Δτ in the opposite direction (Step B12). Whereby, a sixth control mode is performed (Step B10 through Step B12).

The controlling method shown in FIG. 38 has a faster convergence to the optimum point than the controlling method shown in FIGS. 36 and 37. Namely, the polarization-mode dispersion controlling unit (dispersion compensation controlling apparatus 225) performs a control in a fourth control mode in which the polarization-mode dispersion controlling unit changes any one of an azimuth angle of the ¼ wave plate 4B-11, an azimuth angle of the ½ wave plate 4B-12 in the polarization controller 4B and a delay quantity between polarization modes of the inter-polarization-mode delay unit 227 such that the intensity of the first specific frequency component increases while fixing the remaining control parameters among the above azimuth angles and the delay quantity between polarization modes. After the fourth control, the polarization-mode dispersion controlling unit performs a control in a fifth control mode in which the polarization-mode dispersion controlling unit changes one of the remaining control parameters such that the intensity of the first specific frequency component increases while fixing the control parameter having been first changed and the other one of the remaining control parameters. Finally, the polarization-mode dispersion controlling unit performs the sixth control mode in which the polarization-mode dispersion controlling unit changes the other one of the remaining control parameters such that the intensity of the first specific frequency component increases while fixing the control parameter having been first changed and the one of the remaining control parameters. After that, the polarization-mode dispersion controlling unit repeatedly executes the fourth control mode, the fifth control mode and the sixth control mode described above until the intensity of the first specific frequency component becomes the maximum.

As above, since the initial setting mode before system operation is performed as shown in FIGS. 36 through 38, it is advantageously possible to obtain the optimum state even during system operation, and normally perform the tracking control during operation.

(C2) Description of a Second Modification of the Second Embodiment

Figure 39:
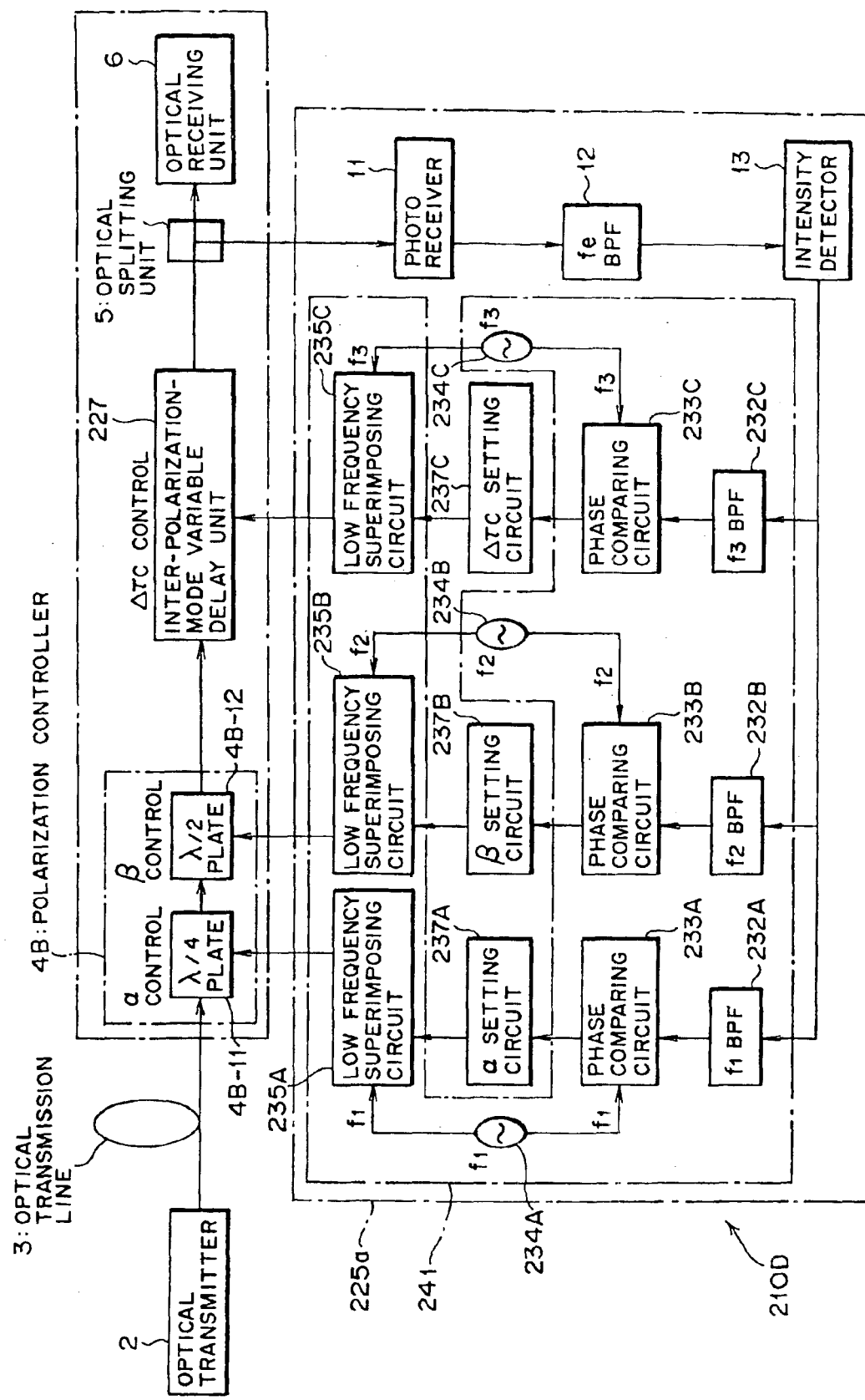
FIG. 39 is a block diagram showing a structure of an optical transmission system according to a second modification of the second embodiment of this invention.

FIG. 39 is a block diagram showing a structure of an optical transmission system according to a second modification of the second embodiment of this invention, in which a control on an inter-polarization-mode variable delay is performed in analogue, and a control using the control mode 2 is performed. The optical transmission system 210D shown in FIG. 39 is as well an optical communication system with a transmission rate B (b/s) (for example, 10 Gb/s or the like) adopting time division multiplexing. In the optical transmission system 210D, as shown in FIG. 39, an optical transmitter 2 and an optical receiver 207a are connected over an optical transmission line (transmission fiber) 3, and a dispersion compensation controlling apparatus 225a is disposed on the receiving side. The optical transmitter 2, the optical receiver 207a and the optical transmission line 3 are the same as those described above, further descriptions of which are thus omitted. Incidentally, in this modification, a term "dispersion" is used to mean "polarization-mode dispersion".

The dispersion compensation controlling apparatus 225a comprises, a photo receiver 11, a band-pass filter 12 and an intensity detector 13, along with band-pass filters ($f_1$, $f_2$, $f_3$ BPF) 232A, 232B and 232C, phase comparing circuits 233A, 233B and 233C, an $\alpha$ setting circuit 237A, a $\beta$ setting circuit 237B, a $\Delta\tau_c$ setting circuit 237C, low frequency superimposing circuits 235A, 235B and 235C, and low frequency generators 234A, 234B and 234C. The photo receiver 11, the band-pass filter 12 and the intensity detector 13 have the same functions as those described above, further descriptions of which are thus omitted.

The band-pass filters 232A, 232B and 232C extract low frequency signal components [$f_1$, $f_2$, $f_3$ (Hz) components] included in the intensity of the first specific frequency component detected by the intensity detector 13. The phase comparing circuit 233A compares the low frequency signal component extracted by the band-pass filter 232A with a low frequency signal from the low frequency generator 234A to detect a difference in phase, and controls a parameter setting in the $\alpha$ setting circuit 235A such that the low frequency signal component extracted by the band-pass filter 232A becomes zero similarly, input sides of the phase comparing circuits 233B and 233C correspond to the band-pass filters 232B and 232C, while the output sides of the same correspond to the $\beta$ setting circuit 237B and the $\Delta\tau_c$ setting circuit 237C. Further, the setting circuit 237A, the $\beta$ setting circuit 237B and the $\Delta\tau_c$ setting circuit 237C perform appropriate controls from signals inputted from the phase comparing circuits 233A, 233B and 233C to determine values of $\alpha$, $\beta$ and $\Delta\tau$, respectively.

Further, the low frequency superimposing circuits 235A and 235B superimposes predetermined low frequency signals ($f_1$, signal and $f_2$ signal) inputted from the low frequency oscillators 234A and 234B on an $\alpha$ setting control signal and a $\beta$ setting control signal outputted from the $\alpha$ setting circuit 237A and the $\beta$ setting circuit 237B, respectively, to give minute modulation thereto, and send the modulated parameter setting control signals to the polarization controlling unit 4B. Similarly, the low frequency superimposing circuit 235C superimposes a predetermined low frequency signal ($f_3$ signal) set in advance inputted from the low frequency oscillator 234C on a $\Delta\tau_c$ setting control signal outputted from the $\Delta\tau_c$ setting circuit 237C to give minute modulation thereto, and sends out the modulated parameter setting control signal to an inter-polarization-mode variable delay unit 227.

From the above, the optical transmission system 210D is provided with a compensation quantity optimization controlling unit 241 which superimposes predetermined low frequency signals set in advance on control signals to be outputted from the polarization-mode dispersion controlling unit 225a to the polarization controller 4B and the inter-polarization-mode delay unit 227, and controls the above polarization controller 4B and the inter-polarization-mode delay unit 227 such that the above low frequency components included in the intensity of the above first specific frequency component from the intensity detector (first intensity detecting unit) 13 become zero, thereby optimizing a compensation quantity of polarization-mode dispersion of the above transmission optical signal.

With the above structure, with respect to $\alpha$, a minute signal at a low frequency $f_1$ (Hz) generated by the low frequency oscillator 235A is superimposed on an $\alpha$ control signal from the $\alpha$ setting circuit 237A. A part of the optical signal after polarization-mode dispersion compensation is split and photoelectrically converted, after that, a frequency fe (Hz) component intensity is extracted so that an intensity detection is performed. When a value of $\alpha$ is at the optimum position where the frequency fe (Hz) component intensity is the maximum, the extracted frequency fe (Hz) component intensity does not have an intensity changing component of the low frequency $f_1$ (Hz). When a value of $\alpha$ is deviated from the optimum position, a component of the frequency $f_1$, (Hz) appears in a change with time of the fe (Hz) component intensity. Accordingly, a component of the frequency $f_1$ (Hz) detected from the fe (Hz) component intensity is detected, and a feedback is performed in analog such as to change a value of $\alpha$ in such a direction that that component disappears.

Namely, the phase comparing circuit 233A compares a phase of that component with a phase of the low frequency signal $f_1$, (Hz) from the low frequency oscillator 234A, and a direction in which $\alpha$ should be changed is determined according to phase information obtained as a result. The similar control is performed on $\beta$ and $\Delta\tau_c$ as well. However, since frequencies of the low frequencies are at different values, it is possible to independently perform the optimum controls even if the controls are performed simultaneously.

Namely, the compensation quantity optimization controlling unit 241 modulates an azimuth angle of the ¼ wave plate 4B-11 and an azimuth angle of the ½ wave plate 4B-12 in the polarization controller 4B and a delay quantity between polarization modes of the inter-polarization-mode delay unit 227 with low frequencies at different frequencies, detects an intensity of the first frequency component in a baseband spectrum of a transmission optical signal, and optimizes the azimuth angle of the ¼ wave plate 4B-11 and the azimuth angle of the ½ wave plate 4B-12 in the above polarization controller 4B and the delay quantity between polarization modes of the inter-polarization-mode delay unit 227 such that the intensity modulation component of the low frequency component included therein becomes zero.

As above, minute modulation is performed with different low frequencies $f_1$, $f_2$ and $f_3$ (Hz) on respective $\alpha$, $\beta$ and $\Delta\tau_c$ so that the fe (Hz) component intensity is automatically fixed to the maximum value, which enables an accurate control.

(C3) Description of a Third Modification of the Second Embodiment

Figure 40:
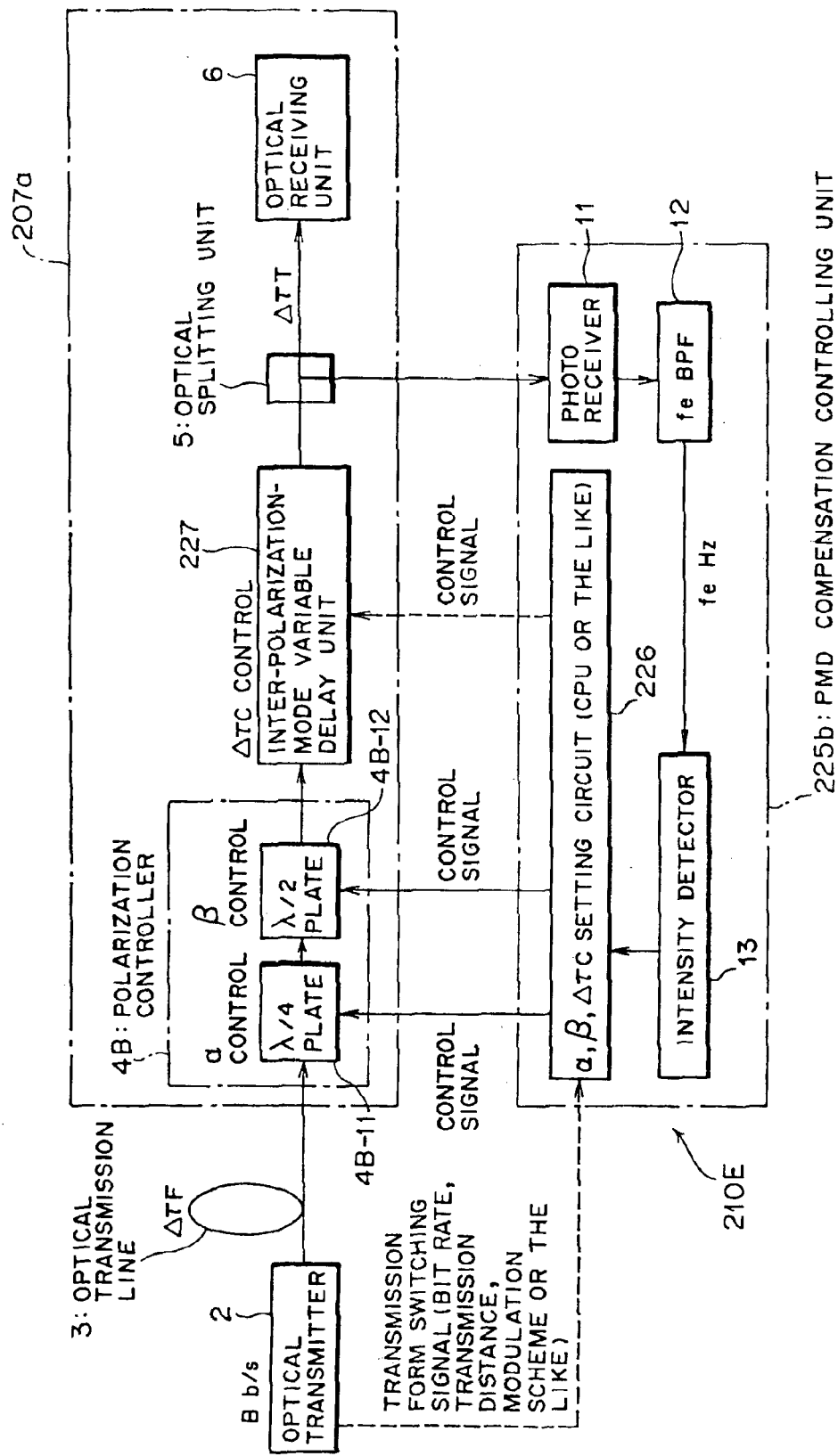
FIG. 40 is a block diagram showing a structure of an optical transmission system according to a third modification of the second embodiment of this invention.

FIG. 40 is a diagram showing a structure of an optical transmission system according to a third modification of the second embodiment of this invention, in which an object of control is changeable between before system operation (before start of system operation) and during system operation (after start of system operation), and the detection form 1 and the control mode 2 are performed.

The optical transmission system 210E shown in FIG. 40 is as well an optical communication system with a transmission rate B (b/s) (for example, 10 Gb/s or the like) adopting time division multiplexing. In the optical transmission system 210E, an optical transmitter 2 and an optical receiver 207a are connected over an optical transmission line (transmission fiber) 3, and a PMD compensation controlling unit (polarization-mode dispersion controlling unit) 225b is disposed on the receiving side. The optical transmitter 2, the optical receiver 207a and the optical transmission line 3 are the same as those described above, further descriptions of which are thus omitted. Incidentally, in this modification, a term "dispersion" is used to mean "polarization-mode dispersion".

The dispersion compensation controlling apparatus 225b comprises a photo receiver 11, a band-pass filter 12 and an intensity detector 13 along with an $\alpha \cdot \beta \cdot \Delta \tau_c$ setting circuit 226. The photo receiver 11, the band-pass filter 12 and the intensity detector 13 have the same functions as those described above, further descriptions of which are thus omitted.

The $\alpha \cdot \beta \cdot \Delta \tau_c$ setting circuit 266 can control a polarization controller 4B and an inter-polarization-mode variable delay unit 227. Namely, the $\alpha \cdot \beta \cdot \Delta \tau_c$ setting circuit 226 controls an azimuth angle of a ¼ wave plate 4B-11 and an azimuth angle of a ½ wave plate 4B-12 in the polarization controller 4B and a delay quantity between polarization modes of the inter-polarization-mode delay unit 227 in the optical receiver 207a according to a signal inputted from the intensity detector 13, and optimizes the delay quantity $\Delta \tau_c$ of the inter-polarization-mode variable delay unit 227 in order to be able to comply with fluctuation information (this information is transmitted by the optical transmitter 2) on a transmission line polarization-mode dispersion quantity such as bit rate, transmission distance, signal modulation system and the like. In consequence, it is necessary to provide an inter-polarization-mode variable delay element.

With the above structure, a delay quantity $\Delta \tau_c$ of the inter-polarization-mode variable delay element is optimized before start of system operation (before operation), and a process for complying with fluctuations in transmission line polarization-mode dispersion quantity due to a switching of bit rate, transmission distance, signal modulation system or the like is performed. When there is a switching in the system, a signal informing of the switching is sent from the optical transmitter 2 to the polarization-mode dispersion controlling unit 225b, and the delay quantity $\Delta \tau_c$ of the inter-polarization-mode variable delay element is optimized only immediately after the switching. To the contrary, during system operation, when a fluctuation due to a change in environment of the polarization dispersion quantity is smaller than a PMD tolerance (the maximum allowable polarization-mode dispersion quantity), a control on $\Delta \tau_c$ is not performed but only $\alpha$ and $\beta$ are controlled.

Whereby, the polarization-mode dispersion controlling unit (PMD compensation controlling unit) 225b performs a control on only the polarization controller 4B during system operation, while controlling the inter-polarization-mode delay unit 227 when system operation is started or when there is a switching of an element determining conditions of polarization-mode dispersion in the optical transmission line 3.

(C4) Description of a Fourth Modification of the Second Embodiment

Figure 41:
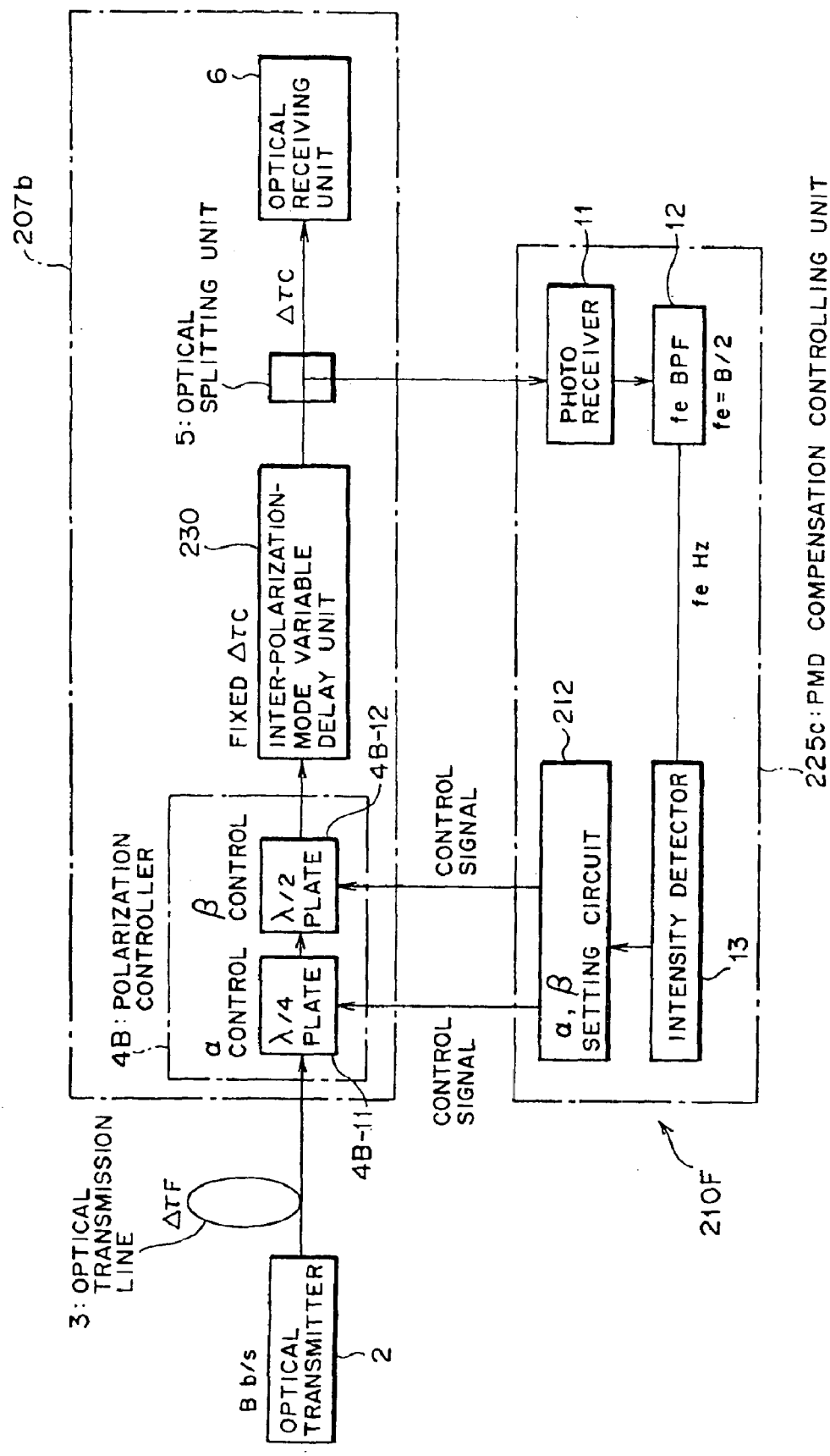
FIG. 41 is a block diagram showing a structure of an optical transmission system to which a PMD compensation controlling apparatus at the time of system operation according to a fourth modification of the second embodiment of this invention is applied.

FIG. 41 is a block diagram showing a structure of an optical transmission system to which a polarization-mode dispersion compensation controlling apparatus at the time of system operation according to a fourth modification of the second embodiment of this invention is applied. The optical transmission system 210F shown in FIG. 41 is as well an optical communication system with a transmission rate B (b/s) (for example, 10 Gb/s or the like) adopting time division multiplexing, which differs from the system shown in FIG. 40 in that an inter-polarization-mode variable delay unit 230 uses an element of a fixed value $\Delta \tau_c$. In this modification, a term "dispersion" is used to mean "polarization-mode dispersion", as well.

In the optical transmission system 210F, an optical transmitter 2 and an optical receiver 207b are connected over an optical transmission line (optical fiber) 3, and a dispersion compensation controlling apparatus 225c is disposed on the receiving side. The optical receiver 207b comprises a polarization controller 4B, the inter-polarization-mode variable delay unit 230, an optical splitting unit 5 and an optical receiving unit 6. The dispersion compensation controlling apparatus 225c comprises a photo receiver 11, a band-pass filter 12, an intensity detector 13 and an $\alpha \cdot \beta$ setting circuit 212. The $\alpha \cdot \beta$ setting circuit 212 controls values of $\alpha$ and $\beta$ such that the fe (Hz) component intensity becomes the maximum. In other words, the $\alpha \cdot \beta$ setting circuit 212 functions as a means controlling the polarization controller 4B changing a polarization state of an optical signal.

With the above structure, a PMD tolerance is measured using the inter-polarization-mode variable delay unit 230 before system operation, whereas a delay quantity of the inter-polarization-mode variable delay unit 230 is used while the delay quantity is fixed within an allowable range based on a value of the PMD tolerance, during system operation.

Measurement of the PMD tolerance before system operation is performed using the same transmitter and receiver as the ones used in the optical transmission system 210F. This method will be described with reference to FIG. 42.

Figure 42:
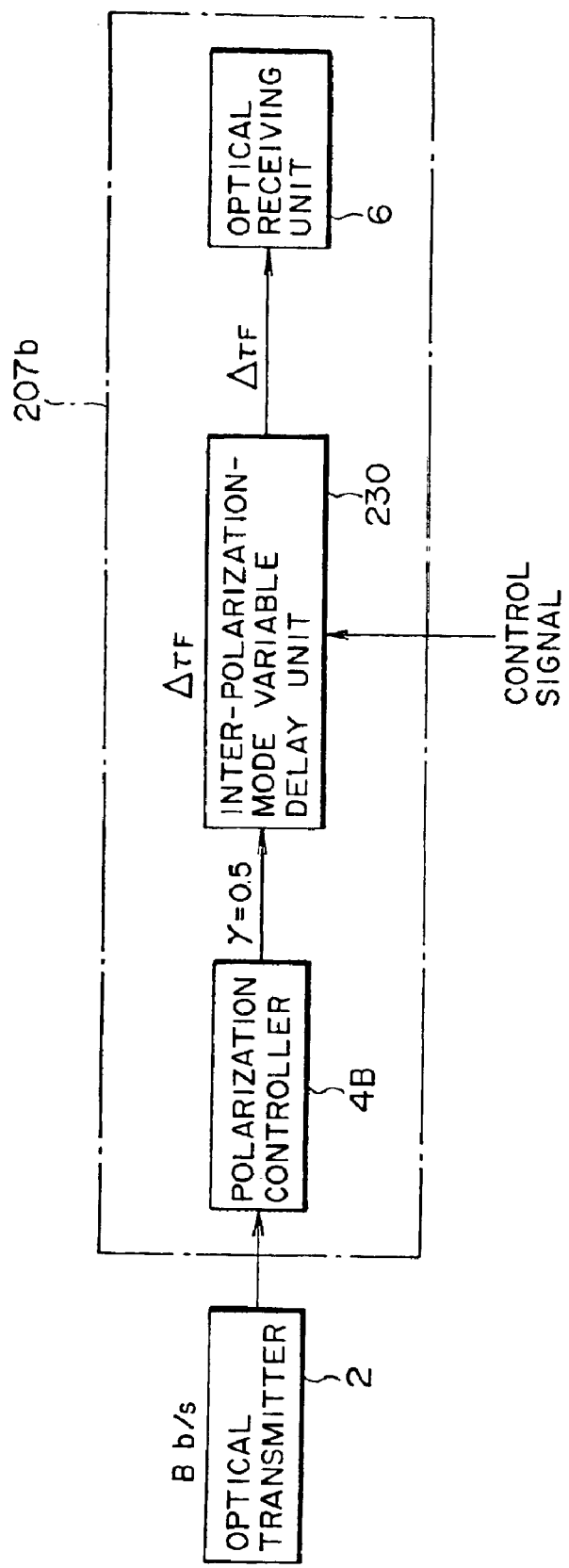
FIG. 42 is a diagram illustrating a method of measuring a PMD tolerance.

FIG. 42 is a diagram illustrating a method of measuring a PMD tolerance. Before system operation, a PMD tolerance is measured using the same transmitter and receiver as those used in actual transmission as the optical receiver 207b shown in FIG. 42. In concrete, by continuously changing a delay quantity between polarization modes using the inter-polarization-mode variable delay unit 230 shown in FIG. 42, a polarization-mode dispersion quantity $\Delta \tau_F$ of a transmission line is simulated, and a bit error rate is measured in the optical receiver 207b. Provided that penalty 1 dB or below is transmittable, for example, a PMD tolerance is determined as $\Delta \tau_{1dB}$. After that, the dispersion compensation controlling apparatus 225c sets the delay quantity $\Delta \tau_c$ of the inter-polarization-mode variable delay unit 230 in a range of $T - \Delta \tau_{1dB} < \Delta \tau_c < 2 \Delta \tau_{1dB}$, where T represents one time slot period. A way of setting in such range will be described later.

On the other hand, when the system is actually operated, a delay quantity of the inter-polarization-mode variable delay unit 230 is fixed to a predetermined set value, and inserted in a transmission line, and used, as shown in FIGS. 41 and 42.

Whereby, before system operation, a PMD tolerance is measured in response to a control signal. As this, it is advantageous that compensation conditions of polarization-mode dispersion are optimized in the initial stage, and parameters to be controlled at the time of system operation is lessen.

Next, that such compensation conditions can be optimized will be described with reference to FIGS. 43 through 51, and a reason why the delay quantity $\Delta \tau_c$ of the inter-polarization-mode variable delay unit 230 is set in a range of $T - \Delta \tau_{1dB} < \Delta \tau_c < 2 \Delta \tau_{1dB}$ will be described.

First, here is shown, using FIG. 43 and formulae (4) through (9) below, that an optical signal after given a delay difference $\Delta \tau_c$ between polarization modes by a PMF 231 for polarization-mode dispersion compensation is expressed by formula (9).

Figure 43:
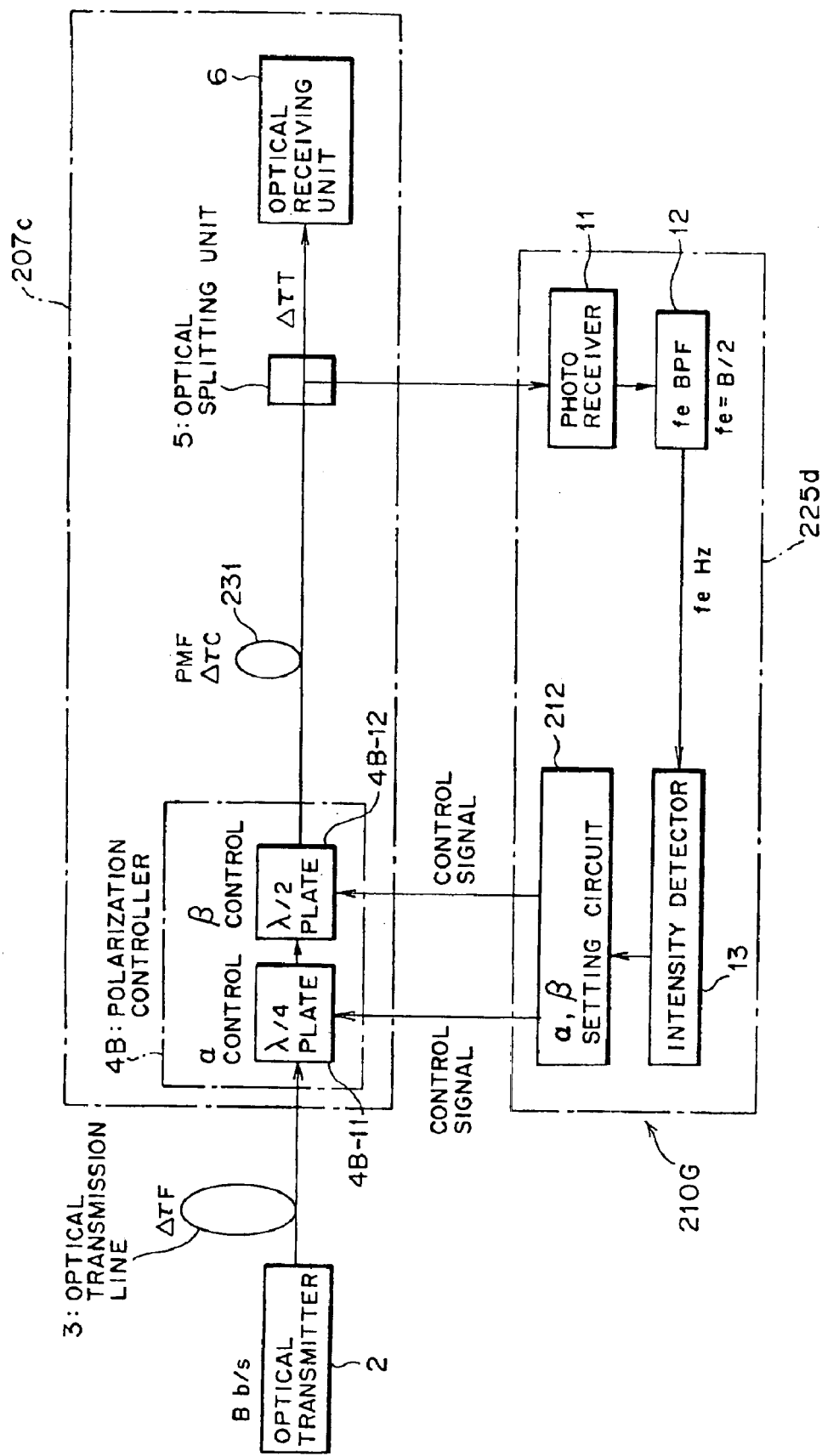
FIG. 43 is a block diagram showing a structure of an optical transmission system to which a PMD compensation controlling apparatus using a PMF for PMD compensation according to the fourth modification of the second embodiment of this invention is applied.

FIG. 43 is a block diagram showing a structure of an optical transmission system to which a polarization-mode dispersion compensation controlling apparatus using a PMF for polarization-mode dispersion compensation according to the fourth modification of the second embodiment of this invention is applied. The optical transmission system 210G is as well an optical communication system with a transmission rate B (b/s) (for example, 10 Gb/s or the like)

adopting time division multiplexing, which has a function of compensating polarization-mode dispersion of a transmission line. In the optical transmission system 210G, an optical transmitter 2 and an optical receiver 207c are connected over an optical transmission line (transmission fiber) 3, and a dispersion compensation controlling apparatus 225d is disposed on the receiving side. The optical receiver 207c comprises a polarization controller 4B, a polarization maintaining fiber (PMF) 231, an optical splitting unit 5 and an optical receiving unit 6.

With these, in the optical receiver 207c, a received light passes through the polarization controller 4B, and is inputted to the PMF 231. Here, the optical signal is polarization-mode-dispersion-compensated (given a delay difference $\Delta\tau_c$ between polarization modes), and split by the optical splitting unit 5. One of the optical signal undergoes a light receiving process in the optical receiving unit 6. With respect to the other optical signal, an fe=B/2 (Hz) component intensity in a baseband spectrum of a signal at B (Gb/s) is detected in the band-pass filter 12 of the dispersion compensation controlling apparatus 225d.

Here, when a transmission light is linearly polarized light expressed by a formula (4) below in Jones vector representation, the transmit light split into polarization mode components at an intensity ratio γ due to polarization-mode dispersion of the transmission line, and given a delay difference $\Delta\tau_F$ is expressed in vector representation as a formula (5):

$$\begin{pmatrix} A(t) + j \cdot B(t) \\ 0 \end{pmatrix} \quad (4)$$

(where j is imaginary unit,)

$$P = \begin{pmatrix} \sqrt{\gamma} \cdot (A(t - \Delta\tau_F) + j \cdot B(t - \Delta\tau_F)) \\ \sqrt{(1-\gamma)} \cdot (A(t) + j \cdot B(t)) \end{pmatrix} \quad (5)$$

Further, when azimuth angles of the ¼ wave Plate 4B-11 and the ½ wave plate 4B-12 in the polarization controller 4B are α and β (radian) an optical waveform after passing through the polarization controller 4B is determined in matrix calculation as a formula (6) with matrixes expressed by formulae (7) and (8):

$$R = H \cdot Q \cdot P \quad (6)$$

$$Q = \frac{1}{\sqrt{2}} \begin{pmatrix} 1 + j \cdot \cos(2\alpha) & j \cdot \sin(2\alpha) \\ j \cdot \sin(2\alpha) & 1 - j \cdot \cos(2\alpha) \end{pmatrix} \quad (7)$$

$$H = j \begin{pmatrix} \cos(2\beta) & \sin(2\beta) \\ \sin(2\beta) & -\cos(2\beta) \end{pmatrix} \quad (8)$$

As a result, assuming that the optical waveform is expressed in a form of R below:

$$R = \begin{pmatrix} C(t) + j \cdot D(t) \\ E(t) + j \cdot F(t) \end{pmatrix}$$

The optical waveform after given a delay difference $\Delta\tau_F$ between polarization modes by the PMF 231 for PMD compensation is finally expressed by a formula (9):

$$R' = \begin{pmatrix} C(t + \Delta\tau_c) + j \cdot D(t + \Delta\tau_c) \\ E(t) + j \cdot F(t) \end{pmatrix} \quad (9)$$

Here, although axes are such set that the fast axis of polarization-mode dispersion of the transmission line and the slow axis of the PMF are in parallel for the sake of convenience, it is possible to realize the similar state by adjusting α (QWP) and β (HWP) even if they are in a rotated relation, in general.

Next, here is shown that α and β yielding the maximum value of the 20 GHz component intensity are the same as α and β yielding the maximum value of the eye opening, with reference to FIGS. 44 through 47. These drawings are made in computer simulation, wherein the transverse axis is α (QWP), while the vertical axis is β (HWP), and the magnitude of the intensity is represented by contour lines along the Z axis (in a direction penetrating from the back of the paper to the front thereof).

Figure 44A:
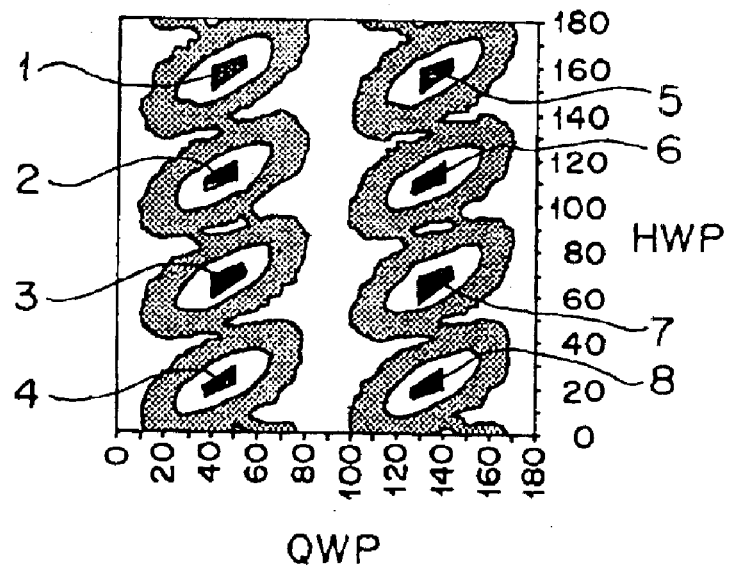
FIG. 44(a) is a diagram showing a 20 GHz component intensity in a received baseband signal to $\alpha$ and $\beta$.
Figure 44B:
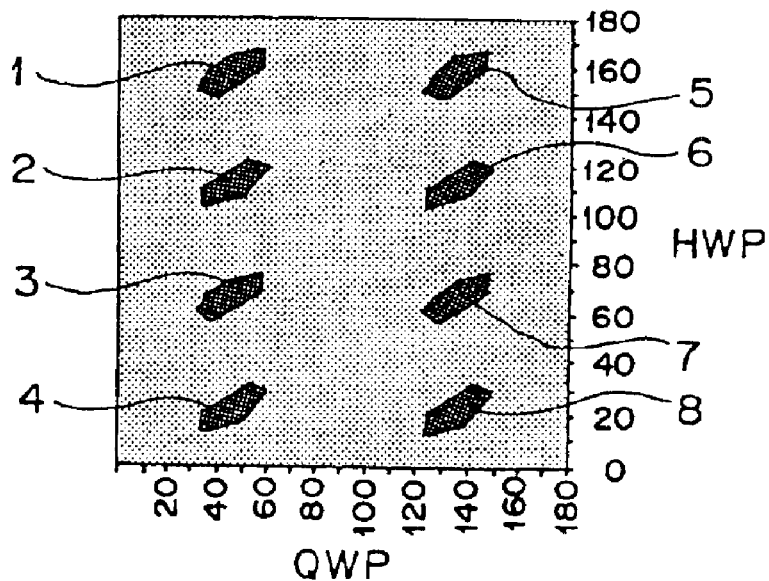
FIG. 44(b) is a diagram showing an eye opening of a received waveform in the received baseband signal to $\alpha$ and $\beta$.

FIGS. 44(a) and 44(b) show 20 GHz component intensity in a received baseband signal and eye opening of a received waveform with respect to α (degree: degree) and β (degree: degree) when these controls are performed on an NRZ signal where a delay quantity $\Delta\tau_c$ is 0 (ps). From these drawings, it is seen that a combination of α and β yielding the maximum of the 20 GHz component intensity [peaks of the contour lines in FIG. 44(a), parts denoted by 1 through 8] and a combination of α and β yielding the maximum of the eye opening [peaks of the contour line, parts denoted by 1 through 8 in FIG. 448b] coincide. Incidentally, γ is fixed to 0.5 so that waveform deterioration due to polarization-mode dispersion is the maximum.

Figure 45A:
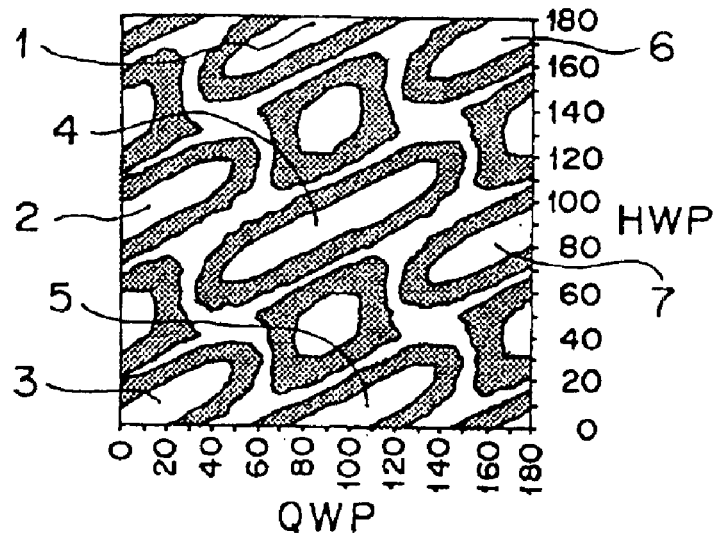
FIG. 45(a) is a diagram showing a 20 GHz component intensity in a received baseband signal to $\alpha$ and $\beta$.
Figure 45B:
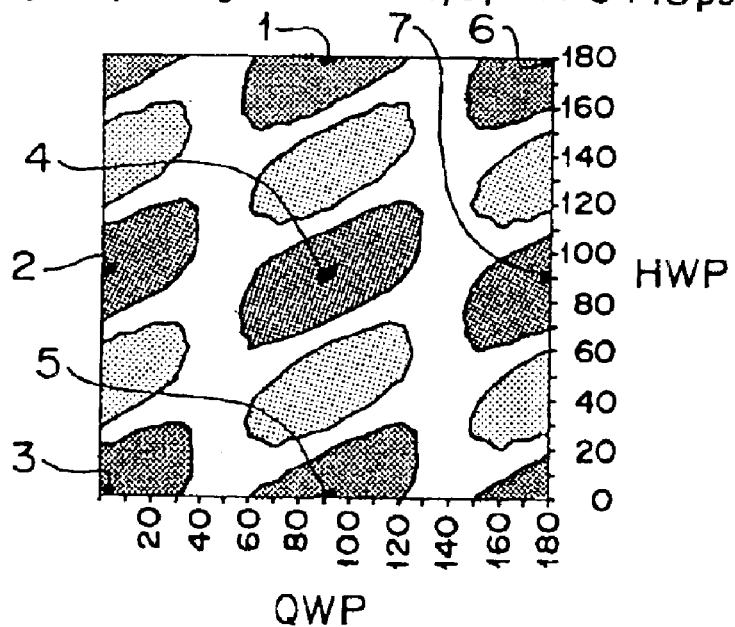
FIG. 45(b) is a diagram showing an eye opening of a received waveform in the received baseband signal to $\alpha$ and $\beta$.
Figure 46A:
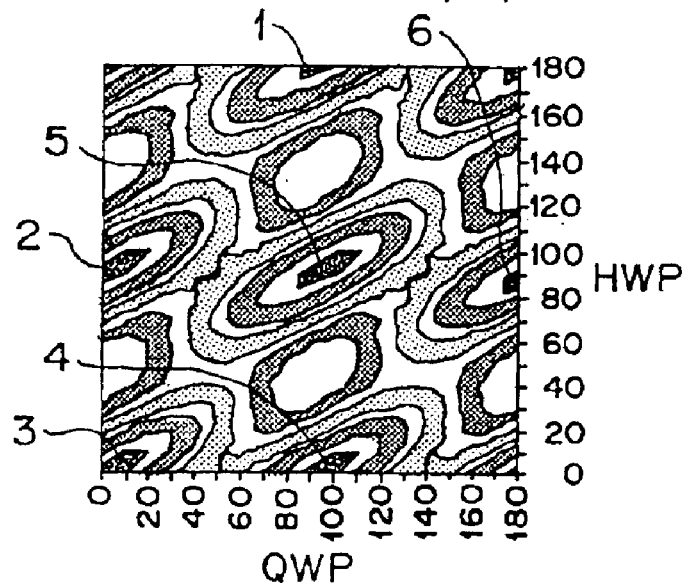
FIG. 46(a) is a diagram showing a 20 GHz component intensity in a received baseband signal to and $\beta$.
Figure 46B:
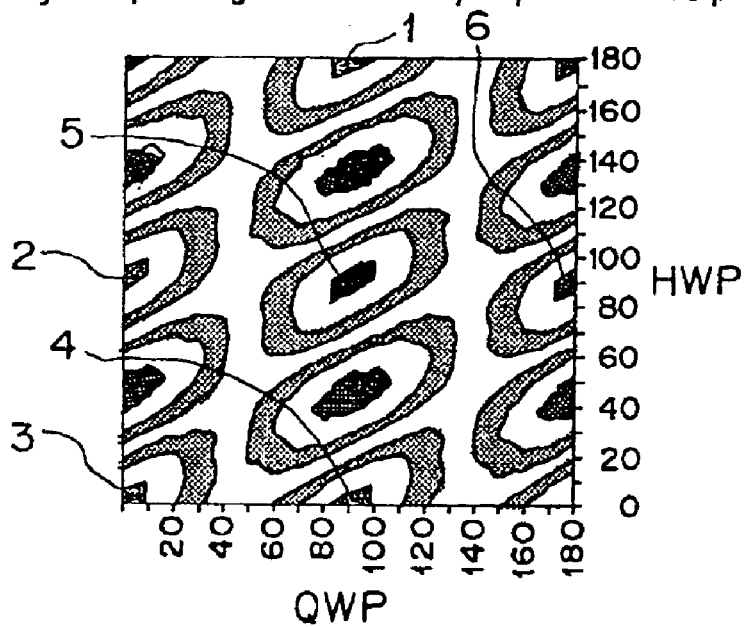
FIG. 46(b) is a diagram showing an eye opening of a received waveform in the received baseband signal to $\alpha$ and $\beta$.
Figure 47A:
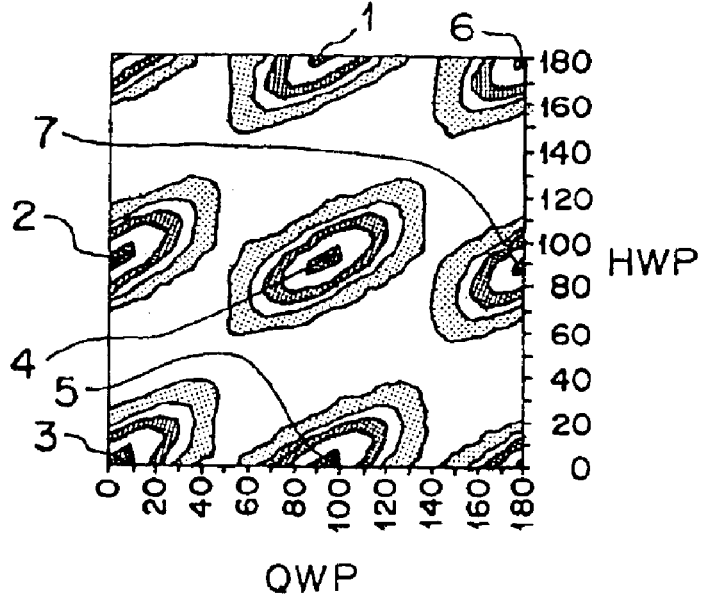
FIG. 47(a) is a diagram showing a 20 GHz component intensity in a received baseband signal to $\alpha$ and $\beta$.
Figure 47B:
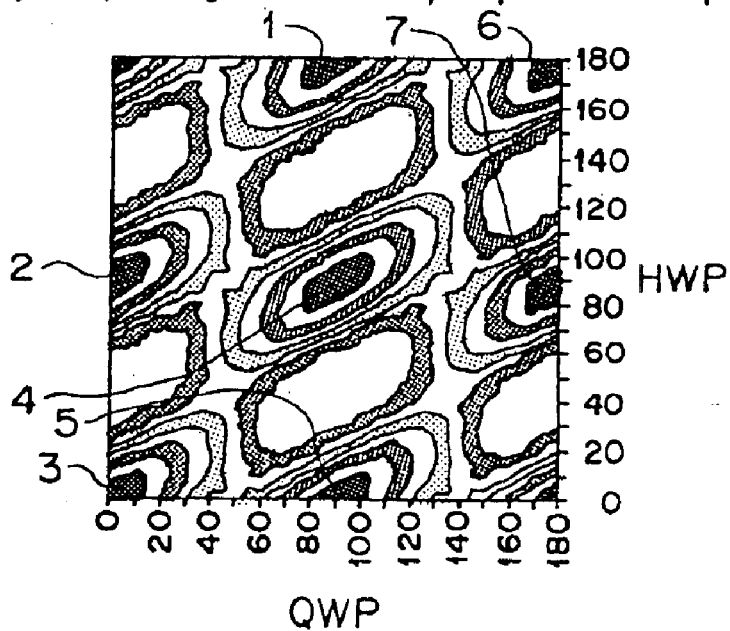
FIG. 47(b) is a diagram showing an eye opening of a received waveform in the received baseband signal to $\alpha$ and $\beta$.

Similarly, FIGS. 45(a) and 45(b) show 20 GHz component intensity in a received baseband signal and eye opening of a received waveform where a delay quantity $\Delta\tau_F$ is 5 (ps), wherein positions 1 through 7 of peaks of the contour lines in FIG. 45(a) coincide with positions 1 through 7 of peaks of the contour lines in FIG. 45(b). FIGS. 46(a) and 46(b) show 20 GHz component intensity of a received baseband signal and eye opening of a received waveform where a delay quantity $\Delta\tau_F$ is 10 (ps), wherein positions 1 through 6 of peaks of the contour lines in FIG. 46(a) coincide with positions 1 through 6 of peaks of the contour lines in FIG. 46(b). Further, FIGS. 47(a) and 47(b) show 20 GHz component intensity in a received baseband signal and eye opening of a received waveform where a delay quantity $\Delta\tau_F$ is 20 (ps), wherein positions 1 through 7 of peaks of the contour lines in FIG. 47(a) coincide with positions 1 through 7 of peaks of the contour lines in FIG. 47(b).

From FIGS. 44(a) and 44(b) through 47(a) and 47(b) all, it is seen that a combination of α and β yielding the maximum and the minimum of the 20 GHz component intensity and a combination of α and β yielding the maximum and the minimum at the peaks of the contour lines) of the eye opening coincide to each other. This relationship coincides with respect to the PMD value (polarization-mode dispersion value of all transmission lines. From this, it is seen that a polarization-mode dispersion compensating method maximizing a frequency component intensity that is a half of the bit rate in the baseband spectrum is effective. With respect to not only the NRZ signal but also the 40 Gb/s OTDM waveform, it has been confirmed that a control using the 20 GHz component intensity can be performed in the similar manner.

Next, eye opening penalty will be described with reference to FIGS. 48(a) and 48(b), and 49(a) and 49(b).

Figure 48A:
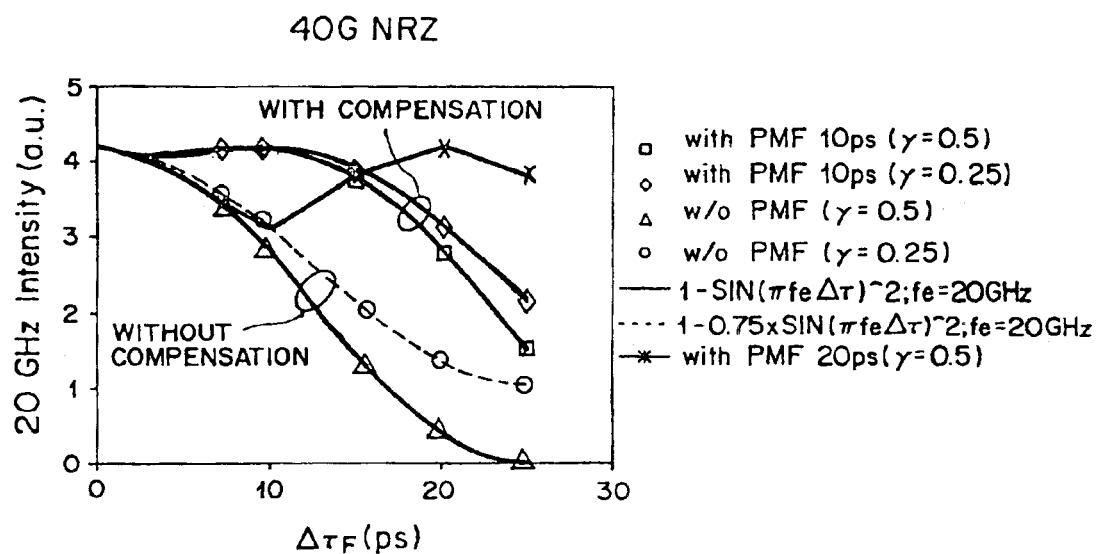
FIG. 48(a) is a diagram showing results of calculation of transmission line PMD versus 20 GHz component intensity when transmission is performed using a 40 Gb/s NRZ signal.
Figure 48B:
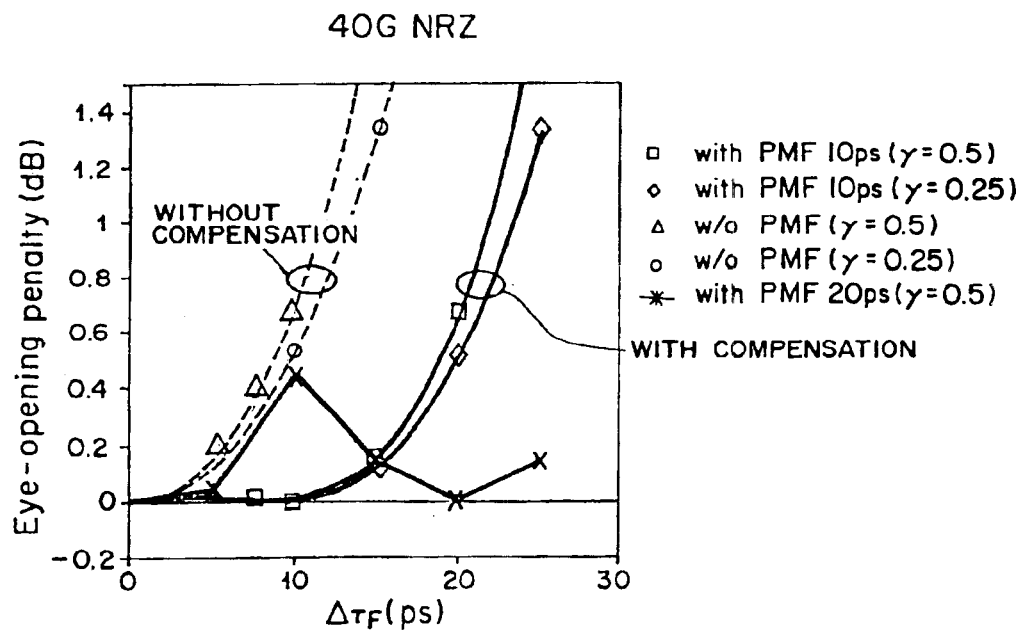
FIG. 48(b) is a diagram showing results of calculation of transmission line PMD versus eye opening penalty when transmission is performed using a 40 Gb/s NRZ signal.

FIG. 48(a) is a diagram showing results of calculation of transmission path PMD versus 20 GHz component intensity in the case where transmission is performed using a 40 Gb/s NRZ signal with/without polarization-mode dispersion compensation, wherein two kinds, with compensation and without compensation, are shown. The transverse axis in FIG. 48(a) shows PMD $\Delta\tau_F$ of the transmissin line, whereas the vertical axis shows the maximum value of 20 GHz component intensity. $\Delta\tau_F$ shows a delay quantity of the transmission path, and eye opening penalty signifies an amount of the eye opening deteriorated from when the transmitter and the receiver face to each other. FIG. 48(b) is a diagram showing results of calculation of transmission PMD $\Delta\tau_F$ (transverse axis) versus eye opening penalty (vertical axis). Here, $\Delta\tau_F$=10 ps and 20 PS are set as a value of PMF for compensation. Incidentally, values of $\alpha$ and $\beta$ are varied according to a value of $\Delta\tau_F$, and these values are such set that they become the optimum values when they are calculated.

As shown in FIGS. 48(a) and 48(b), in the case of $\Delta\tau_F$=10 ps, a combination of $\alpha$=45° and 1=22.5° yields the maximum 20 GHz component intensity (refer to FIG. 48(a)), and yeilds the minimum value 0 of the eye opening penalty (refer to FIG. 48(b)) when the transmission PMD is $\Delta\tau_F$=0 ps. This corresponds to a case where an optical signal inputted to the PMF 231 is linearly polarized light coinciding with the polarization primary axis direction of the PMF 231 by the polarization controller 4B. In this case, the optical signal is not affected by polarization dispersion of the PMF 231 so that the same eye opening is obtained as when the transmitter and the receiver face to each other.

Figure 49A:
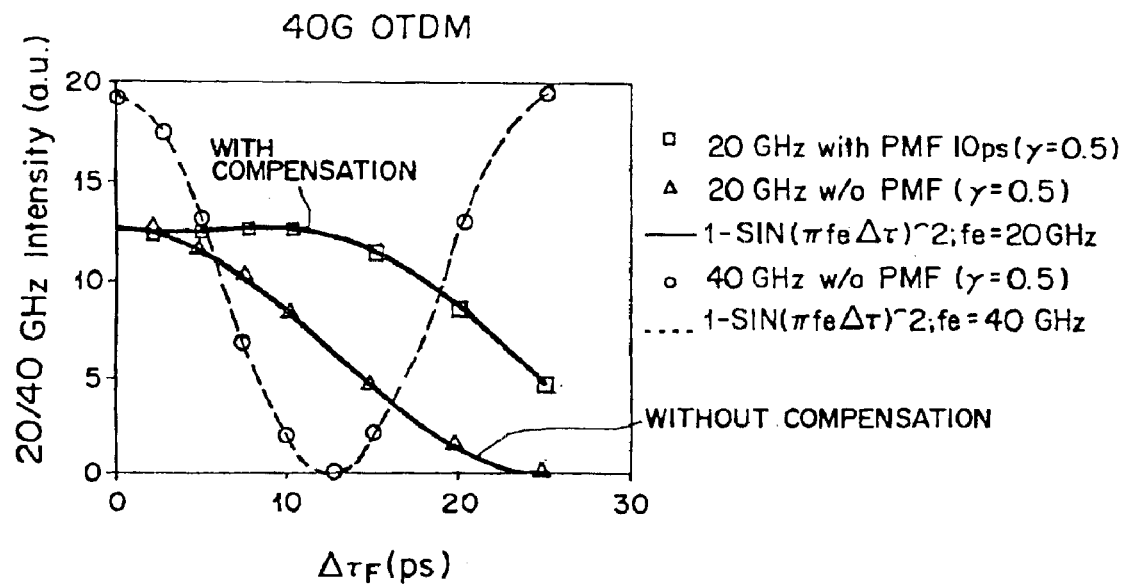
FIG. 49(a) is a diagram showing results of calculation of transmission line PMD versus 20 GHz component intensity when transmission is performed using a 40 Gb/s OTDM signal.

To the contrary, if the transmission line PMD is as sufficiently large as $\Delta\tau_F$>10 ps, the 20 GHz component intensity is the maximum when $\alpha$=$\beta$=0° [refer to FIG. 49(a)], and the eye opening penalty is the minimum. This corresponds to a case where a polarization direction of light passing through the fast axis of the polarization primary axis of the transmission line coincides with the slow axis of the PMF 23, while a polarization direction of light passing through the slow axis coincides with the fast axis of the PMF. As a result, this coincides with a state where the optical waveform is subjected to polarization dispersion of a deduction of $\Delta\tau_F$-$\Delta\tau_c$, and deterioration is therefore more suppressed than in the a case where the optical waveform is subjected to polarization dispersion of $\Delta\tau_F$ without compensation.

In the case of an intermediate range of 0 ps<$\Delta\tau_F$<10 ps, a combination of $\alpha$ and $\beta$ yielding the maximum 20 GHz component intensity continuously changes from $\alpha$=45° and $\beta$=22.5° to $\alpha$=$\beta$=0° with increasing $\Delta\tau_F$. In such case, the eye opening penalty increases from 0 dB at a point in the vicinity of $\Delta\tau_F$=$\Delta\tau_c$/2=5 ps, after that, slightly decreases, and again becomes 0 db at $\Delta\tau_F$=$\Delta\tau_c$=10 ps. Back to FIG. 48(b), when the PMF for compensation is $\Delta\tau_c$=20 ps, it is seen that an increase of the panelty in the vicinity of $\Delta\tau_F$=$\Delta\tau_c$/2=10 ps is noticeable. In order to compensate polarization-mode dispersion within as a larger range $\Delta\tau_F$ as possible, it is necessary to set $\Delta\tau_c$ to a large value to some extent. But, if $\Delta\tau_F$ is set to an excessively lager value, an increase of the penalty at $\Delta\tau_F$=$\Delta\tau_c$/2 becomes large. Therefore, there exists a range of appropriate $\Delta\tau_c$.

Figure 49B:
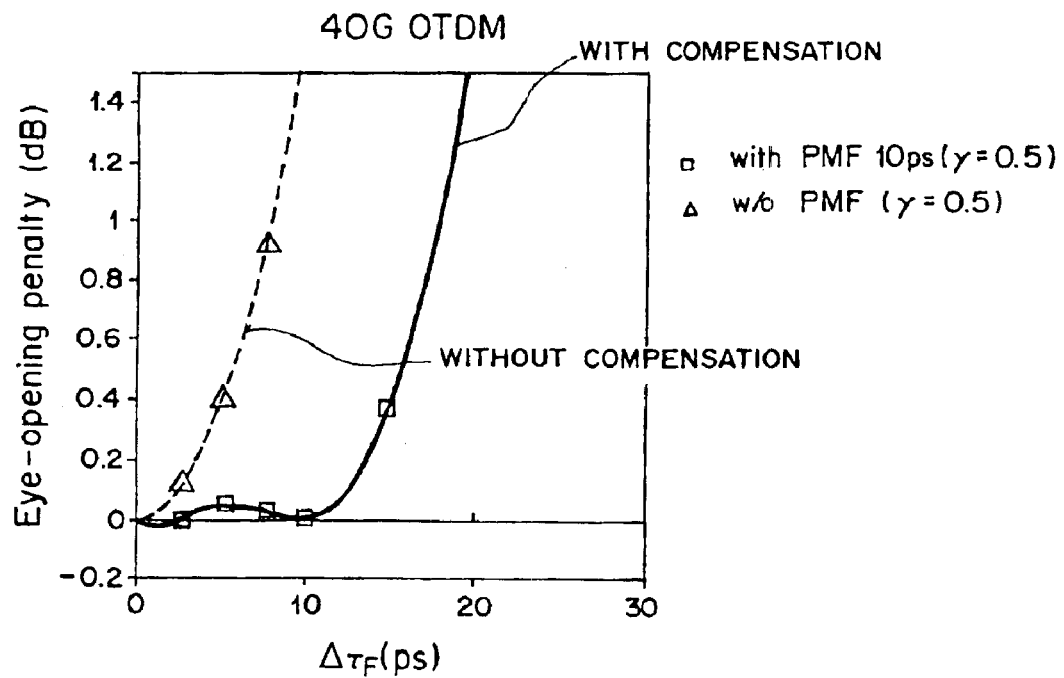
FIG. 49(b) is a diagram showing results of calculation of transmission line PMD versus eye opening penalty when transmission is performed using a 40 Gb/s OTDM signal.

Similarly, FIGS. 49(a) and 49(b) show results of calculation of transmission path PMD $\Delta\tau_F$ versus 20 GHz component intensity, and transmission path PMD $\Delta\tau_F$ versus eye opening penalty when transmission is performed with a 40 Gb/s OTDM signal with/without polarization-mode dispersion compensation, wherein two kinds, that is, with compensation and without compensation, are shown. In this case, results similar to those in the case of an NRZ signal are obtained.

Figure 50A:
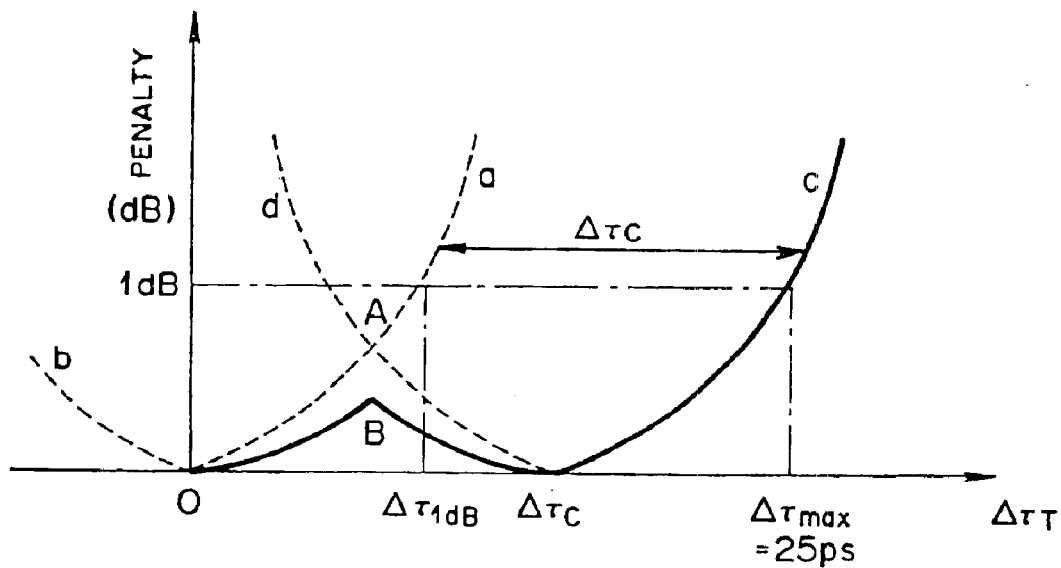
FIG. 50(a) is a diagram showing a relationship of transmission line PMD versus eye opening penalty when a delay quantity $\Delta\tau_c$ is the smallest.
Figure 50B:
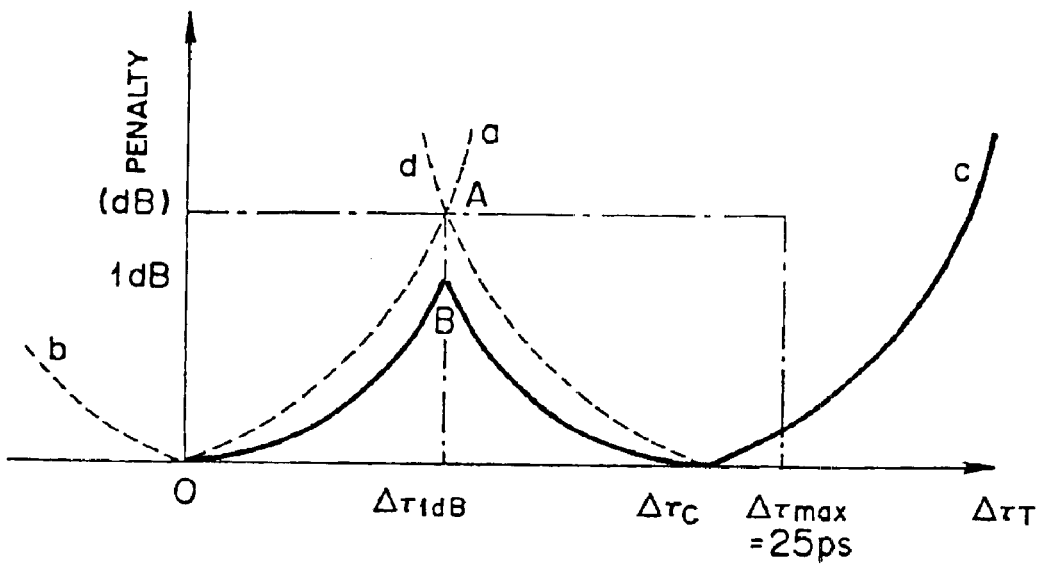
FIG. 50(b) is a diagram showing a relationship of transmission line PMD versus eye opening penalty when a delay quantity $\Delta\tau_c$ is the largest.

Next, a way of determining a set range of appropriate $\Delta\tau$ will be described with reference to FIGS. 50(a) and 50(b). FIG. 50(a) is a diagram showing a relationship of transmission path PMD versus eye opening penalty in the case where the delay quantity $\Delta\tau_C$ is the minimum. FIG. 50(b) is a diagram showing a relationship of transmission PMD versus eye opening penalty in the case where the delay quantity $\Delta\tau_C$ is the maximum. These drawings are drawings schematically showing a way of determining the set range, in which what shown by a broken line a and a broken line b are penalty changes (relationship of PMD $\Delta\tau_F$ versus penalty) due to polarization-mode dispersion without a polarization-mode dispersion compensator, and what shown by a solid line are penalty changes due to polarization-mode dispersion at the time of polarization-mode dispersion with PMF. Here, when penalty 1 db or below is a deterioration allowable reference, a PMD tolerance (the maximum allowable polarization-mode dispersion quantity) is indicated at 1 dB along $\Delta\tau$ (vertical axis) in FIGS. 50(a) and 50(b). Incidentally, $\Delta\tau_{max}$ along the transverse axis corresponds to a period of one time slot.

In $\Delta\tau_F$>$\Delta\tau_c$ in a part indicated by a solid line in FIG. 50(a) (relationship of transmission line PMD $\Delta\tau_F$ versus penalty when polarization-mode dispersion compensation is performed with the polarization controller and the PMF with a delay difference $\Delta\tau_c$), the penalty changes follow a solid line c that is obtained by moving a broken line a in parallel by $\Delta\tau$x in a direction of the $\Delta\tau_F$ axis. In 0<$\Delta\tau_F$<$\Delta\tau_c$, there is a penalty increase with the maximum at a point B in the vicinity of $\Delta\tau_F$=$\Delta\tau_c$/2 but the penalty thereat is smaller than that at an intersection of a broken line d and a broken line a that is obtained by moving the broken line b by $\Delta\tau_c$ a direction of the $\Delta\tau_F$ axis in parallel. When $\Delta\tau_c$ is set to a large value, a point B moves in a direction closer to a point A, and exceeds the deterioration allowable reference of below 1 dB. Therefore, it is necessary that the point A satisfies the allowable reference of penalty 1 dB or below. In consequence, as shown in FIG. 50(b), the maximum value of $\Delta\tau_c$ is a double of a PMD tolerance $\Delta\tau_{1dB}$ and the point A is practically a point reaching the deterioration allowable reference.

Figure 51A:
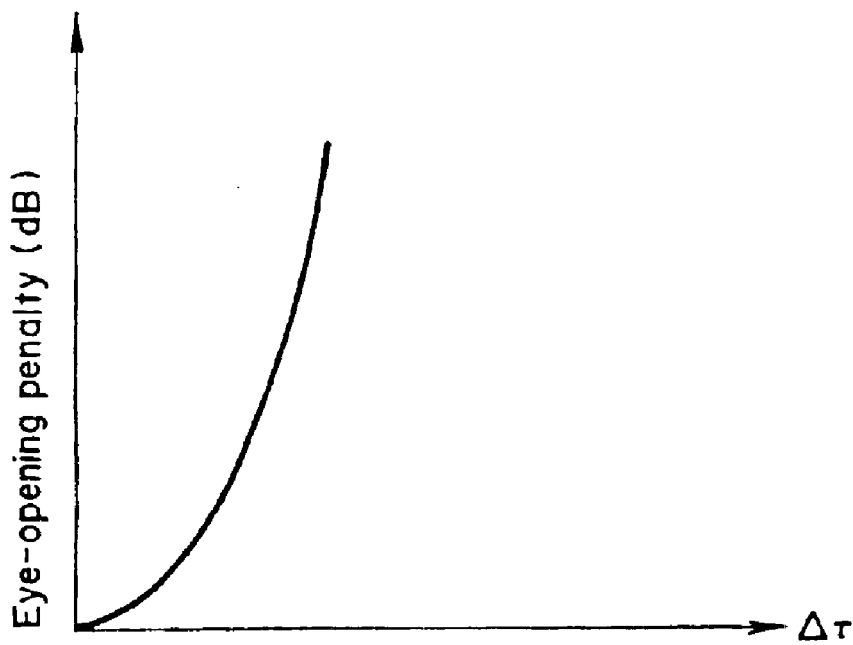
FIGS. 51(a) and 51(b) are diagrams illustrating a case where a delay quantity $\Delta\tau$ exceeds one time slot.
Figure 51B:
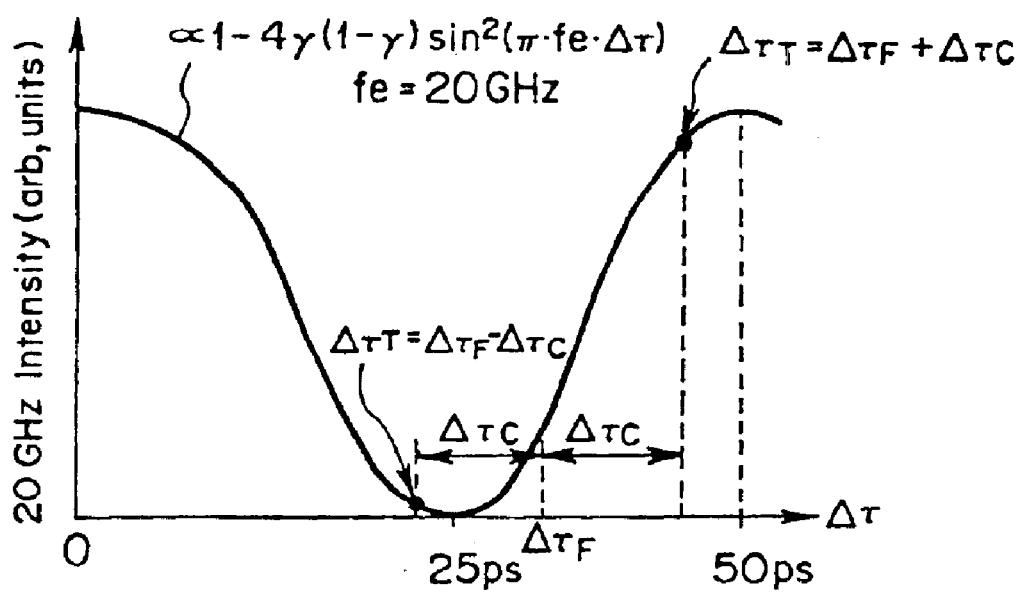

When $\Delta\tau_F$ exceeds one time slot, this polarization-mode dispersion compensating method cannot be principally applied. A reason of this will be described with reference to FIGS. 51(a) and 51(b). FIGS. 51(a) and 51(b) are diagrams illustrating a case where a delay quantity $\Delta\tau$ exceeds one time slot. When $\Delta\tau_F$ exceeds one time slot (25 ps) as shown in FIG. 51(b), the monitor intensity becomes the maximum when $\Delta\tau_T$=$\Delta\tau_F$+$\Delta\tau_c$. Namely, in FIG. 51(b), although waveform deterioration in the case of a combination of $\alpha$ and $\beta$ by which a total PMD quantity after polarization-mode dispersion compensation is $\Delta\tau_T$=$\Delta\tau_F$-$\Delta\tau_c$ is larger than that in the case where a combination of $\alpha$ and $\beta$ by which $\Delta\tau_T$=$\Delta\tau_F$-$\Delta\tau_c$, the detected B/2 GHz component intensity is larger.

When $\Delta\tau_F$=(one time slot) is assumed to be the maximum value of the polarization-mode dispersion quantity in polarization-mode dispersion compensation, $\Delta\tau_c$=(one time slot)−(PMD tolerance $\Delta\tau_{1dB}$), as shown in FIG. 50(b).

Namely, the polarization-mode dispersion controlling unit 225c (refer to FIG. 41) comprises a maximum allowable polarization-mode dispersion setting means ($\alpha$·$\beta$ setting circuit 212) setting a maximum allowable polarization-mode dispersion quantity. In addition, when the polarization-mode dispersion controlling unit 225C feedback-controls at least either the polarization controller 4B or the inter-polarization-mode delay unit 230 disposed in the optical transmission line 3 such that an intensity of the frequency component corresponding to ½ of the bit rate as the first specific frequency component detected by the first intensity detecting unit (intensity detector 13) becomes the maximum, the polarization-mode dispersion controlling unit 225C sets a delay quantity $\Delta\tau_c$ of the inter-polarization-mode delay unit 230 to a value above the lower limit value defined as a value obtained by subtracting the maximum allowable polarization-mode dispersion quantity $\Delta\tau_{1dB}$ from one time slot and below the upper limit value defined as a value having a magnitude two times the maximum allowable polarization-mode dispersion quantity $\Delta\tau_{1dB}$, at the time of system operation. The polarization-mode dispersion controlling unit 225c may set a delay quantity of the inter-polarization-mode delay unit 230 at the time of system operation to the upper limit value or the lower limit value.

Again back to FIG. 41, the dispersion compensation controlling apparatus 225c measures a PMD tolerance using the same transceiver as one used in an actual optical transmission system before system operation, and determines a PMD tolerance $\Delta\tau_{1dB}$ with penalty 1 dB as a reference of transmission capability. After that, the dispersion compensation controlling apparatus 225c sets a delay quantity $\Delta\tau_c$ of the inter-polarization-mode variable delay unit 230 to a range of $T-\Delta\tau_{1dB}<\Delta\tau_c<2\Delta\tau_{1dB}$.

As above, it is advantageously possible to optimize compensation conditions of polarization-mode dispersion in the initial stage, and lessen parameters to be controlled at the time of system operation. If the control mode is developed to a control mode in which an inter-polarization-mode variable delay element (refer to FIG. 41) is used to control in lieu of an inter-polarization-mode fixed delay element as the PMF 231 (refer to FIG. 43), it is possible to more lessen waveform deterioration. Namely, by performing a control such as to harmonize a delay quantity $\Delta\tau_c$ of the variable delay element with a PMD quantity $\Delta\tau_F$ of the transmission line, it is possible to make a PMD quantity after compensation be $\Delta\tau_T=\Delta\tau_F-\Delta\tau_c=0$. As above, it is possible to effectively perform polarization-mode dispersion compensation of a transmission line that is a transmission limiting factor in a very high-speed optical transmission system.

(D) Description of a Third Embodiment

In actual transmission, both of chromatic dispersion and polarization-mode dispersion of a transmission line become factors limiting a transmission rate and a transmission distance. In order to overcome them, it is required a system simultaneously monitoring a chromatic dispersion value and a polarization-mode dispersion value of the transmission line, and simultaneously compensating transmission optical waveform deterioration due to them. Although a term "dispersion" is generally used to mean "chromatic dispersion", the term "dispersion" is used to mean both "polarization-mode dispersion" and "chromatic dispersion" in a third embodiment.

Figure 52:
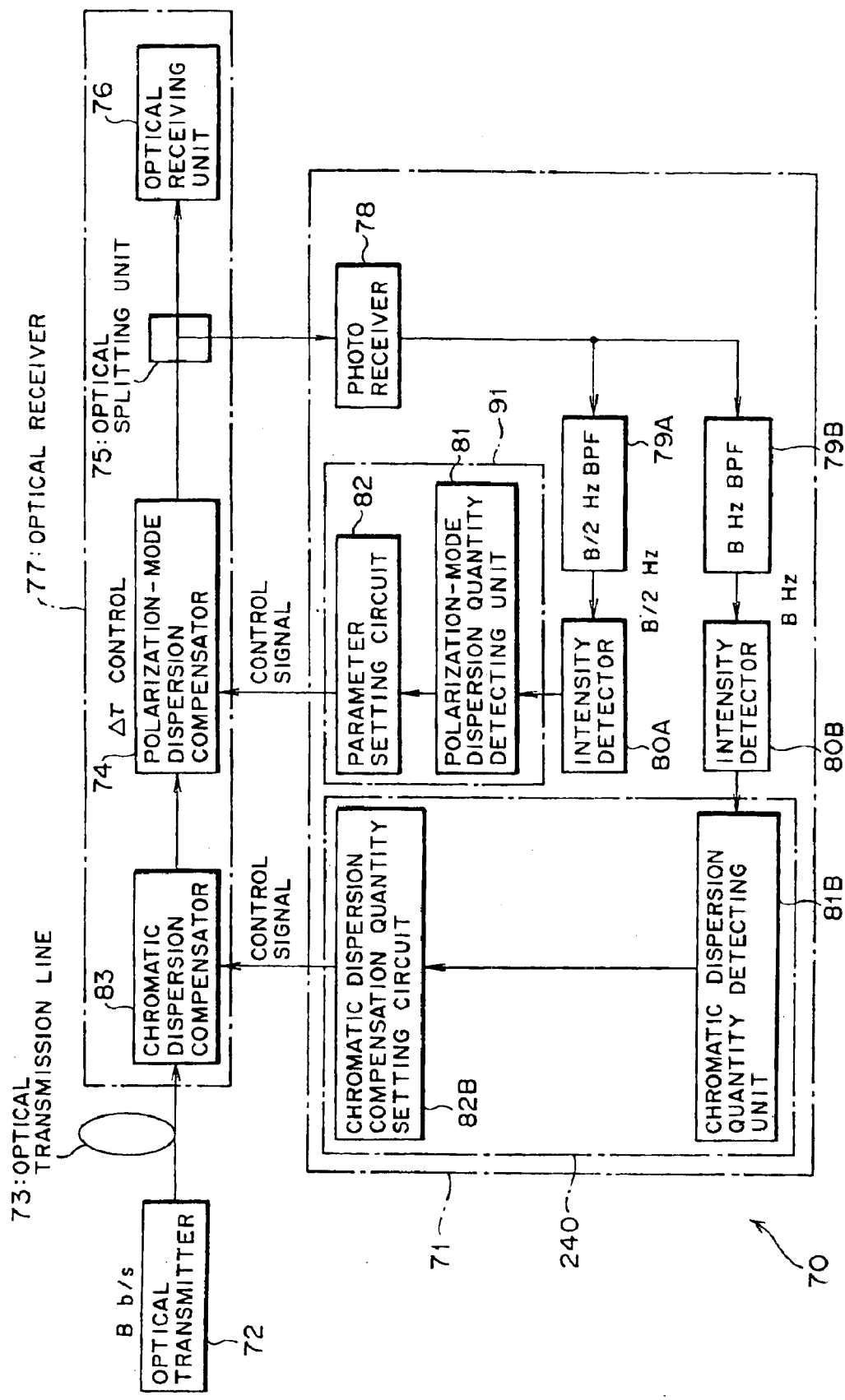
FIGS. 52 and 53 are block diagrams showing a structure of an optical transmission system according to a third embodiment of this invention.

An optical transmission system 70 shown in FIG. 52 is an optical communication system with a transmission rate B (b/s) (for example, 40 Gb/s, 10 Gb/s or the like) adopting time division multiplexing. The optical transmission system 70 differs from the optical transmission system 10 according to the first embodiment in that the optical transmission system 70 compensates not only polarization-mode dispersion of a transmission optical signal but also chromatic dispersion of the transmission optical signal, the other parts of which are similar to those of the optical transmission system 10 according to the first embodiment.

Namely, in the optical transmission system 70, an optical transmitter 72 as a transmitting terminal apparatus transmitting a transmission optical signal and an optical receiver 77 as a receiving terminal apparatus receiving the transmission optical signal are connected over an optical transmission line (transmission fiber) 73, and a dispersion compensation controlling apparatus 71 is disposed on the receiving side. Incidentally, the dispersion compensation controlling apparatus 71 signifies "polarization-mode dispersion-chromatic dispersion compensation controlling apparatus 71".

The optical receiver 77 comprises a chromatic dispersion compensator 83, a polarization-mode dispersion compensator 74, an optical splitting unit and an optical receiving unit 76. The chromatic dispersion compensator 83 compensates chromatic dispersion of a transmission optical signal. The polarization-mode dispersion compensator 74 compensates polarization-mode dispersion generated in a transmitted optical signal. Incidentally, the optical splitting unit 74 and the optical receiving unit 76 are similar to those described above, further descriptions of which are thus omitted.

The dispersion compensation controlling apparatus 71 monitors a state of polarization-mode dispersion and a state of chromatic dispersion generated in an optical signal transmitted over the optical transmission line 73 on the basis of an optical signal taken out by the optical splitting unit 75, and controls the polarization-mode dispersion compensator 74 and the chromatic dispersion compensator 83 according to results of the monitoring, which comprises a photo receiver 78, a band-pass filter [B/2 (Hz) BPF] 79A, a band-pass filter [B (Hz) BPF] 79B, intensity detectors 80A and 80B, a polarization-mode dispersion controlling unit 91 and a chromatic dispersion controlling unit 240.

The photo receiver 78 receives an optical signal taken out by the optical splitting unit 75, and converts it into an electric signal. The band-pass filter [B/2 (Hz) BPF] 79A detects a first specific frequency component [B/s (Hz) component] in a baseband spectrum in a transmission optical signal inputted to the receiving side over the optical transmission line 73, which functions as a first specific frequency component detecting unit. The first specific frequency component is appropriately set according to a transmission rate or a signal waveform of an optical signal, a frequency of which is set to a frequency corresponding to ½ of the bit rate.

The intensity detector 80A detects information on an intensity of the above first specific frequency component detected by the band-pass filter 79A, which functions as a first intensity detecting unit.

The polarization-mode dispersion controlling unit 91 controls a polarization-mode dispersion quantity of the optical transmission line 73 such that the intensity of the first specific frequency component detected by the intensity detector 80A is the maximum, which comprises a polarization-mode dispersion quantity detecting unit 81 and a chromatic dispersion quantity detecting unit 81B. The polarization-mode dispersion quantity detecting unit 81 detects a polarization-mode dispersion quantity. A parameter setting circuit 82 outputs a parameter setting control signal having parameter information as a control quantity for compensating polarization-mode dispersion of the transmission optical signal on the basis of the polarization-mode dispersion quantity detected by the polarization-mode dispersion quantity detecting unit 81 to the polarization-mode dispersion compensator 74 in the optical receiver 77. The polarization-mode dispersion controlling unit 91 uses a control mode 2 (or a control mode 12 to be described later).

The band-pass filter [B (Hz) BPF] 79B detects a second specific frequency component [B (Hz) component] in a baseband spectrum in a transmission optical signal inputted to the receiving side over the optical transmission line 73, which functions as a second specific frequency component detecting unit. A frequency of the second specific frequency component is set to a frequency corresponding to the bit rate. The intensity detector 80B detects information on an intensity fo the above second specific frequency component detected by the band-pass filter 79B, which functions as a second intensity detecting unit. Incidentally, the intensity detector 80B may output information on the intensity of the above second specific frequency component detected by the intensity detector 80B as a monitor signal.

The chromatic dispersion controlling unit 240 controls a chromatic dispersion quantity of the transmission line 73 such that the intensity of the second specific frequency component detected by the intensity detector 80B becomes the maximum or the minimum, which comprises the chromatic dispersion quantity detecting unit 81B and a chromatic dispersion quantity setting circuit 82B.

The chromatic dispersion quantity detecting unit 81B detects a chromatic dispersion quantity of the above transmission optical signal from the intensity of the above second specific frequency component detected by the intensity detector 80B by performing a predetermined second functional operation. The chromatic dispersion compensation quantity setting circuit 82B sets a chromatic dispersion control quantity in the chromatic dispersion compensator 83 disposed in the optical transmission line 73 in order to compensate chromatic dispersion of the above transmission optical signal on the basis of the above chromatic dispersion quantity detected by the chromatic dispersion quantity detecting unit 81B, which functions as a chromatic dispersion control quantity setting unit.

This control method is a method in which the chromatic dispersion compensator 83 disposed in the optical transmission line 73 is feedback-controlled such that the intensity of the second specific frequency component detected by the second intensity detector (intensity detecting unit 80B) becomes the maximum or the minimum. Namely, a control quantity is determined by feeding-back such that the intensity of the detected specific frequency becomes the maximum or the minimum without the first function. Although the control mode 2 is defined as "becoming the maximum" in the above second embodiment, the control mode 2 will include a feedback control such as "becoming the maximum or the minimum" hereinafter.

In simultaneous monitoring of a chromatic dispersion value and a polarization-mode dispersion value, the same frequency B (Hz) as the transmission rate B (b/s) is used as a chromatic dispersion monitor frequency $f_{GVD}$, while a frequency B/2 (Hz) that is a half of the transmission rate B (b/s) is used as a PMD monitor frequency $f_{PMD}$, which are different from each other. According to this embodiment, an output of the photo receiver 78 is split into two, and frequency values at which the specific frequency components are detected are of two kinds, but the detection form 1 is used. A reason why the detection form 2 is not used is that a signal system (the band-pass filter 79A, the intensity detector 80A and the polarization-mode dispersion controlling unit 91) performing a polarization-mode dispersion control uses one kind of frequency, while a signal system (the band-pass filter 79B, the intensity detector 80B and the chromatic dispersion controlling unit 240) performing a chromatic dispersion control also uses one kind of frequency.

According to this embodiment, when the above transmission optical signal is an NRZ optical signal, the first specific frequency component detecting unit (the band-pass filter 79A) detects a frequency corresponding to a half of the bit rate as the first specific frequency component, while the second specific frequency component detecting unit (the band-pass filter 79B) detects a frequency corresponding to the bit rate as the second specific frequency component. In the case of the 40 Gb/s NRZ system, there are set $f_{GVD}$=40 GHz and $f_{PMD}$=20 GHz. Incidentally, as an example of frequency setting, a value other than the above may be used.

From this, even if polarization-mode dispersion and chromatic dispersion have dependency on each other, it is possible to perform the controls simultaneously and independently. For example, in the case of the 40 Gb/s NRZ system, it is sufficient to control such that the $f_{GDV}$=40 GHz intensity becomes the minimum, while the $f_{PMD}$=20 GHz intensity becomes the maximum.

Whereby, a flow of an otpical signal is as follows. An optical signal at a transmission rate B (b/s) transmitted from the optical transmitter 72 is transmitted to the optical receiver 77 over the optical transmission line 73, a part of the optical signal transmitted over the optical transmission line 73 is taken out by the optical splitting unit 75, and the optical signal (monitor light) taken out is sent to the dispersion quantity detecting apparatus 71.

In the dispersion quantity detecting apparatus 71, a state of polarization-mode dispersion and a state of chromatic dispersion generated in the optical signal transmitted over the optical transmission line 73 are monitored on the basis of the optical signal taken out by the optical splitting unit 75, and a control in the control mode 2 is performed by the polarization-mode dispersion compensator 74 and the chromatic dispersion compensator 83 according to results of the monitoring. Namely, a maximum value control is such performed that predetermined compensation values are obtained.

In concrete, the optical signal taken out by the optical splitter 75 is received by the photo receiver 78, converted into an electric signal, and inputted to the band-pass filters 79A and 79B. In the band-pass filter 79A, the first specific frequency component [B/2 (Hz) component] in a baseband spectrum in the transmission optical signal is detected, an intensity of the above first specific frequency component detected by the band-pass filter 79A is detected by the intensity detector 80A, and the feedback control is performed such that the intensity of the specific frequency component becomes the maximum or the minimum.

From the parameter setting circuit 82, a parameter setting signal for setting such parameter information (delay quantity Δτ) as to cancel a polarization-mode dispersion quantity detected by the polarization-mode dispersion quantity detecting unit 81 to the polarization-mode dispersion compensator 74 disposed in the optical receiver 77 in order to compensate polarization-mode dispersion in the transmission optical signal.

In the polarization-mode dispersion compensator 74, parameter information is set on the basis of the control signal when the polarization-mode dispersion compensator 74 receives the parameter setting control signal, polarization-mode dispersion generated in the optical signal transmitted over the optical line 74 is thereby compensated.

On the other hand, in the band-pass filter 79B in the dispersion compensation controlling apparatus 71, the second specific frequency component [B (Hz) component] in the baseband spectrum in the transmission optical signal is detected, an intensity of the above second specific frequency component detected by the band-pass filter 79B is detected by the intensity detector 80B, and a feedback control is such performed that the intensity of the specific frequency component becomes the maximum or the minimum.

In the chromatic dispersion compensator 83, chromatic dispersion generated in the optical signal transmitted over the optical transmission line 73 is compensated on the basis of the control signal when the chromatic dispersion compensator 83 receives the control signal. Namely, this dispersion compensation controlling steps are as follows. The first specific frequency component in a baseband spectrum in a transmission optical signal inputted to the receiving side over a transmission fiber as the transmission line is detected (first specific frequency component detecting step), information on an intensity of the above first specific frequency component detected at the first specific frequency component detecting step is detected (first intensity detecting step), a polarization-mode dispersion quantity of the optical transmission line 73 is such controlled that the intensity of the first specific frequency component detected at the first intensity detecting step becomes the maximum (polarization-mode dispersion controlling step), the second specific frequency component in the baseband spectrum in the transmission optical signal is detected (second specific frequency component detecting step), information on an intensity of the above second specific frequency component detected at the second specific frequency component detecting step is detected (second intensity detecting step), and a chromatic dispersion quantity of the optical transmission line 73 is such controlled that the intensity of the second specific frequency component detected at the second intensity detecting step becomes the maximum or the minimum (chromatic dispersion controlling step).

Whereby, the controls can be performed independently and simultaneously.

With the above structure, it is possible to simultaneously optimize chromatic dispersion compensation and polarization-mode dispersion compensation that become factors limiting a transmission rate and a transmission distance in a very high-speed optical transmission system in TDM system.

As above, according to the dispersion compensation controlling apparatus 71 of the third modification of this invention, it is possible to attain the similar advantages to the first embodiment described above. Since it is also possible to compensate not only polarization-mode dispersion of a transmission optical signal but also chromatic dispersion of the transmission optical signal, this embodiment can prevent deterioration of a transmission waveform of an optical signal due to effects by polarization-mode dispersion and chromatic dispersion, and further contributes to long-distance transmission of a high-speed optical signal.

Conversely, it is possible to perform a control in the control mode 1 on a polarization-mode dispersion control quantity and a chromatic dispersion control quantity. Namely, a polarization-mode dispersion quantity can be determined with the first function, and a chromatic dispersion control quantity can be determined with the second function. Here, determining with the first function means that a polarization-mode dispersion quantity of the above transmission optical signal is detected by performing a predetermined first functional operation (that is, a functional operation using the above formulae (2) and (3)]. Determining with the second function means that chromatic dispersion value dependency of a predetermined frequency component intensity is measured in advance and stored as data, a function based on this data is made, and determined as a second function.

Namely, the polarization-mode dispersion controlling unit (polarization-mode dispersion quantity detecting unit 81, parameter setting circuit 82) may set a polarization-mode dispersion control quantity in the polarization-mode dispersion compensator 74 disposed in the optical transmission line 73 such that the intensity of the first specific frequency component detected by the first intensity detecting unit becomes the maximum, and the chromatic dispersion controlling unit 240 may set a chromatic dispersion control quantity in the chromatic dispersion compensator 83 disposed in the optical transmission line 73 such that the intensity of the second specific frequency component detected by the intensity detector 80B becomes the maximum or the minimum. Here, the chromatic dispersion quantity detecting unit 81B detects a chromatic dispersion quantity of a transmission optical signal from the intensity of the above second specific frequency component detected by the intensity detector 80B (second intensity detecting unit) by performing an operation with a predetermined second function (second functional operation). The chromatic dispersion compensation quantity setting circuit 82B sets a chromatic dispersion control quantity in the chromatic dispersion compensator 83 disposed in the optical transmission line 73 in order to compensate chromatic dispersion in the transmission optical signal on the basis of the chromatic dispersion quantity detected by the chromatic dispersion quantity detecting unit 81B, which functions as a chromatic dispersion quantity setting unit.

A flow of a signal in this case is as follows. Namely, in the polarization-mode dispersion quantity detecting unit 81 shown in FIG. 52, a polarization-mode dispersion quantity of the above transmission optical signal is detected from the intensity of the first specific frequency component detected by the intensity detector 80A by performing a predetermined first functional operation [that is, a functional operation using the above formulae (2) and (3)]. In the chromatic dispersion quantity detecting unit 81B, a chromatic dispersion quantity of the above transmission optical signal is detected from the intensity of the second specific frequency component detected by the intensity detector 80B by performing a predetermined second functional operation. In the chromatic dispersion compensation quantity setting circuit 82B, a control signal for setting a chromatic dispersion control quantity is outputted to the chromatic dispersion compensator 83 disposed in the optical transmission line 73 on the basis of the above chromatic dispersion quantity detected by the chromatic dispersion quantity detecting unit 81B in order to compensate chromatic dispersion of the above transmission optical signal.

As having been described in the above second embodiment, when a feedback control is automatically performed using low-frequency-superimposing, it is possible to independently control the polarization-mode dispersion compensator 74 and the chromatic dispersion compensator 83 by using different frequencies of low frequency signals to be superimposed on control signals for the polarization-mode dispersion compensator 74 and the chromatic dispersion compensator 83.

Figure 53:
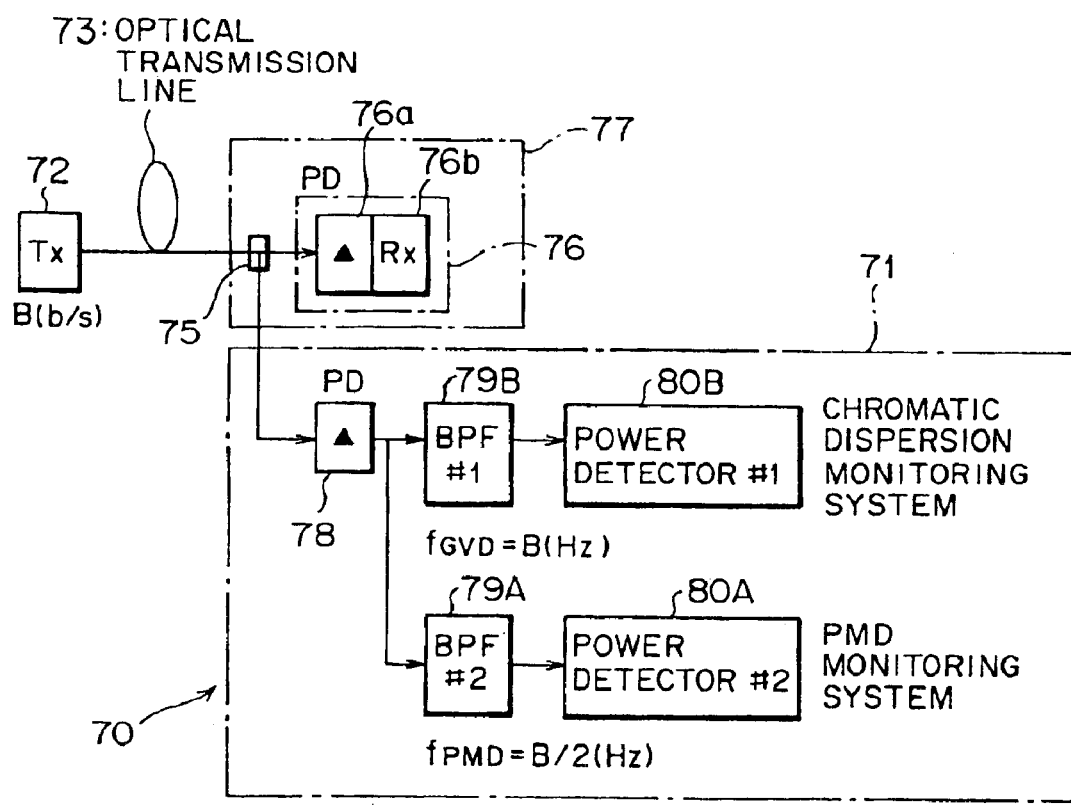

FIG. 53 is a block diagram showing a structure of an optical transmission system according to the third embodiment of this invention. FIG. 53 is a diagram showing a system equivalent to the optical transmission system shown in FIG. 52, which is drawn paying attention to a position at which a signal provided for monitoring is taken out (extracted) when a chromatic dispersion value and a polarization-mode dispersion value are simultaneously monitored. Received signal light is split into two in an optical stage (optical splitting unit 75). One of the signal light is inputted as a main signal system to the optical receiving unit 76, O/E-converted by a photo receiver 76*a*

[denoted as PD (Photo Diode) in FIG. 53] and undergoes a receiving process in an optical receiving unit 76b (denoted as Rx in FIG. 53). The other is inputted as a monitor system to a photo receiver 78 (denoted as PD in FIG. 53) and O/E-converted, and an electric signal is processed.

Further, the light is split into two in an electric stage (photo receiver 78) and inputted to a narrow band band-pass filter 79B of a center wavelength $F_{GVD}$ (Hz), a monitor value is detected by an intensity detector 80A, while the other is inputted to a narrow-band band-pass filter 79B of a center wavelength $f_{PMD}$ and a monitor value is detected by an intensity detector 80B. Namely, a first intensity detecting unit (intensity detector 80A) can output information on the intensity of the above first specific frequency component as a monitor signal, while a second intensity detecting unit (intensity detector 80B) can output information on the detected intensity of the above second specific frequency component as a monitor signal. Incidentally, each of the monitoring system uses one kind of frequency value, so that the detection form 1 is used.

Figure 54:
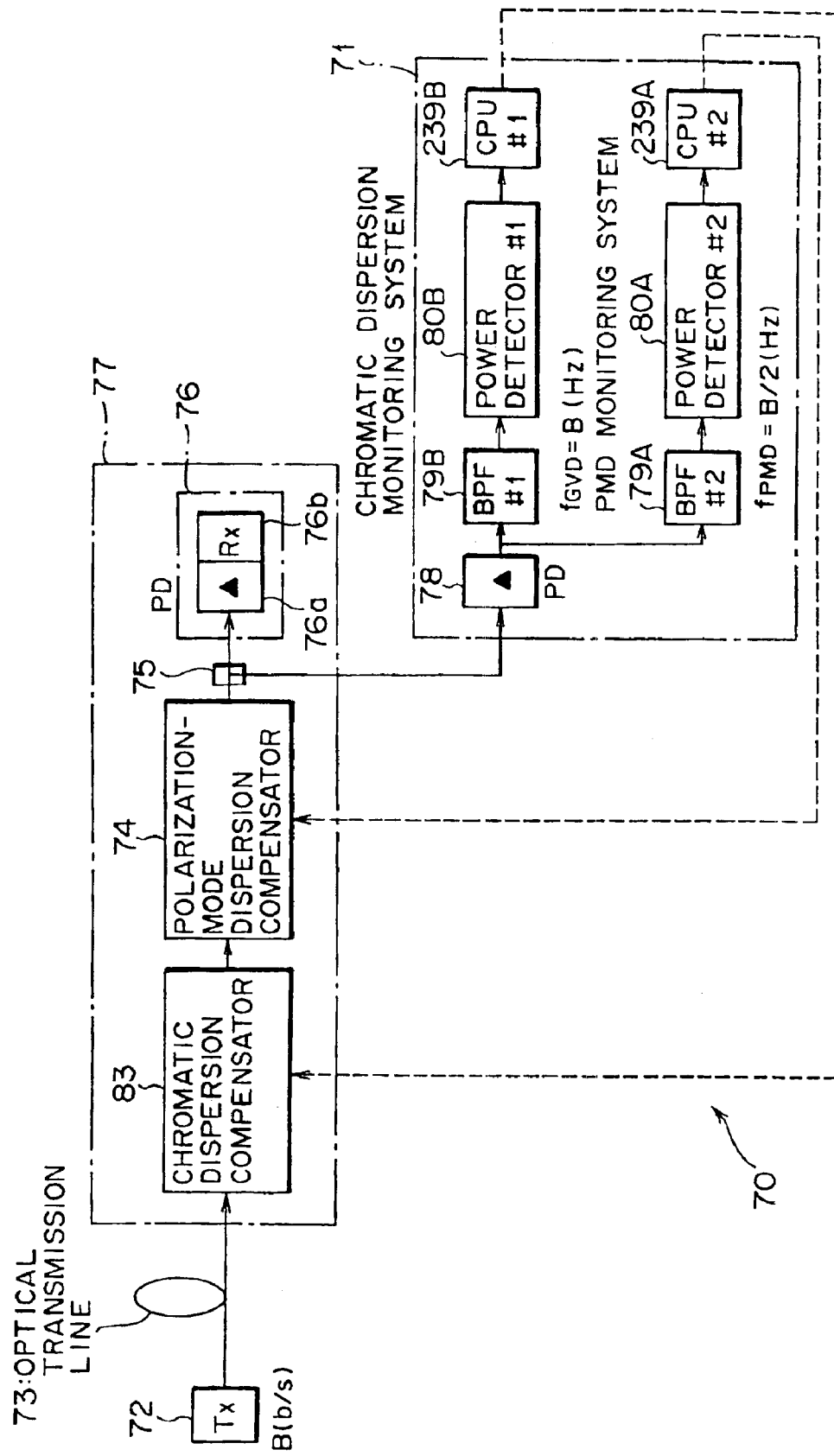
FIG. 54 is a block diagram showing a structure of an optical transmission system according to the third embodiment of this invention.

FIG. 54 is a detailed block diagram of an optical transmission system according to the third embodiment of this invention. The optical transmission system 70 shown in FIG. 54 comprises an optical transmitter 72, an optical transmission line 73, an optical receiver 77 and a dispersion compensation controlling apparatus 71.

A chromatic dispersion compensator 83 and a polarization-mode dispersion compensator 74 in the optical receiver 77 are of variable type, in which a chromatic dispersion compensation quantity and a polarization-mode dispersion compensation quantity can be optimum-value-controlled at any time during system operation. An output signal from an optical splitting unit 75 is inputted to a photo receiver 78 in the dispersion compensation controlling apparatus 71. An output of the photo receiver 78 is split and inputted to band-pass filters 79A and 79B. Outputs of the band-pass filters 79A and 79B are inputted to intensity detectors 80A and 80B. Further, outputs of the intensity detectors 80A and 80B are inputted to CPUs 239A and 239B. The CPUs 239A and 239B feedback-control the polarization-mode dispersion compensator 74 and the chromatic dispersion compensator 83 arranged in the receiving terminal using a simultaneous monitoring method, which function as a polarization-mode dispersion controlling unit and a chromatic dispersion controlling unit.

Incidentally, when a chromatic dispersion quantity and a polarization-mode dispersion quantity are set to optimum values only at the time of start of system operation, the compensators are not necessarily "variable". For example, a "fixed" dispersion compensator such as a dispersion compensating fiber, a dispersion compensator of a fiber grating type or the like may be inserted.

As a method of switching the controls when a chromatic dispersion compensation quantity and a polarization-mode dispersion compensation quantity are optimum-value-controlled at all times during system operation, a method in which the above controls are performed independently and in parallel with respect to time, that is, a method in which the above polarization-mode dispersion controlling step and the chromatic dispersion controlling step are executed independently, may be employed. Or, a method in which the above steps are executed in time series in order to prevent them from being overlapped with respect to time, that is, a method in which the above polarization-mode dispersion controlling step and the chromatic dispersion controlling step are exectued in time series, may be employed.

Although the polarization-mode dispersion compensator and the chromatic dispersion compensator are controlled by the CPUs 239A and 239B, it is alternatively possible to use a control method by an analog circuit using synchronous detection or the like, not limited to the above example. It is also possible to insert an A/D converter (not shown) and a D/A converter (not shown) in front of and behind the CPUs 239A and 239B.

(D1) Description of a First Modification of the Third Embodiment

Figure 55:
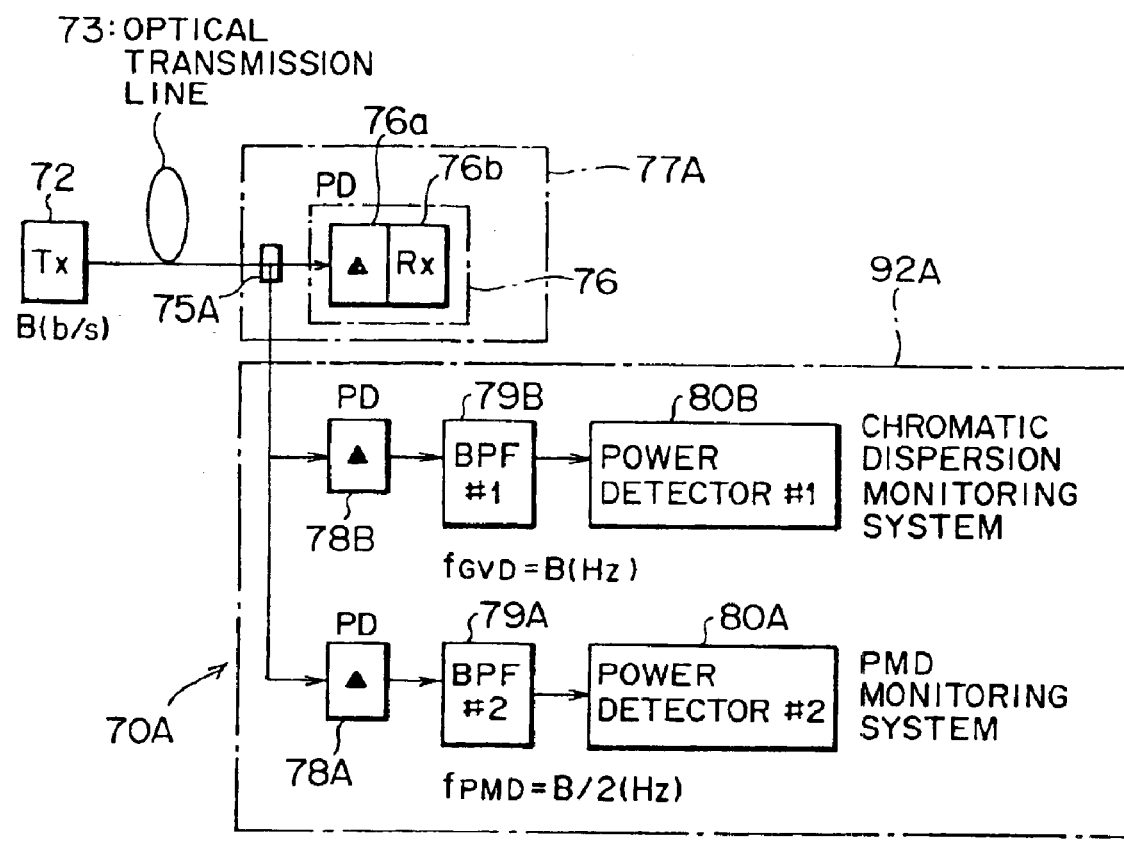
FIGS. 55 and 56 are block diagrams of an optical transmission system according to a first modification of the third embodiment of this invention.

As to simultaneous monitoring of a chromatic dispersion value and a polarization-mode dispersion value, a position at which signals to be provided for the monitoring may be set in a various position to execute the monitoring. FIG. 55 is a diagram showing a block diagram of an optical transmission system according a first modification of the third embodiment of this invention. In the optical transmission system 70A shown in FIG. 55, an optical transmitter 72 and an optical receiver 77A are connected over an optical transmission line 73, and a compensation quantity monitoring apparatus 92A is disposed on the receiving side. The compensation quantity monitoring apparatus 92A comprises photo receivers (PD) 78A and 78B, band-pass filters 79B and 79A, and intensity detectors 80A and 80B. Incidentally, as an example of a frequency setting, $f_{GVD}$=B (GHz) and $f_{PMD}$=B/2 (GHz) in the case of a B (Gb/s) NRZ signal. However, values other than the above may be used.

At the receiving terminal, signal light is split into three by an optical splitting unit 75A (optical stage), one of the split signal light is used in a main signal system (optical receiving unit) and the other two are used for monitoring chromatic dispersion and polarization-mode dispersion. Further, the monitoring system optical signals are received by the optical receivers 78A and 78B, different frequency components are extracted by the narrow-band band-pass filters 79B and 79A having different center wavelengths $f_{GVD}$ and $f_{PMD}$, and monitor values are detected by the intensity detectors 80B and 80A. Incidentally, each of the monitoring system uses one kind of frequency value, so that the detection form 1 is used.

Figure 56:
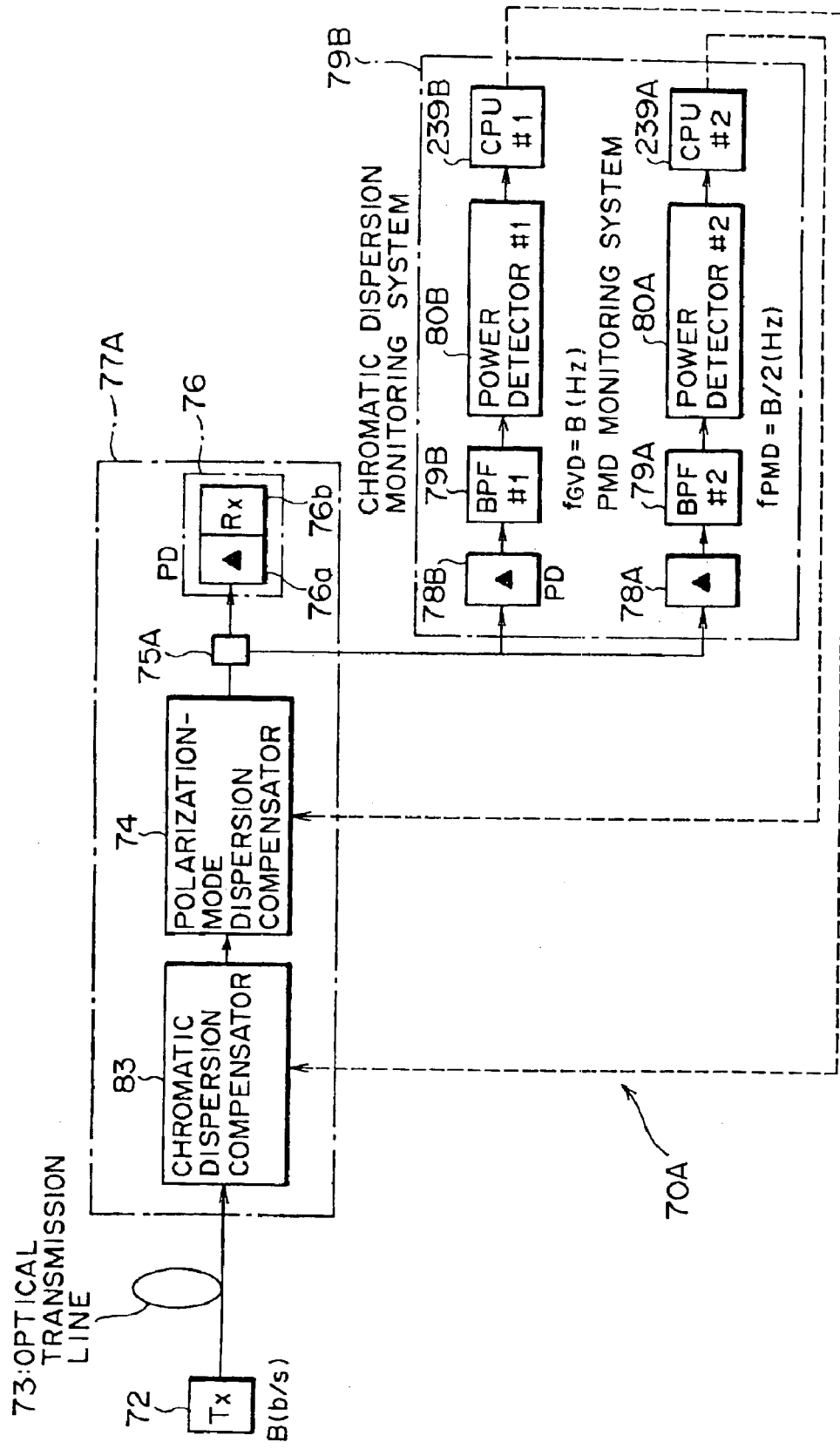

FIG. 56 is a block diagram of an optical transmission system according to the first modification of the third embodiment of this invention, which shows a structure in the case where attention is further paid to a loop simultaneously compensating chromatic dispersion and polarization-mode dispersion in FIG. 55. In FIG. 56, the same reference characters designate like or corresponding parts in FIG. 55. Here, a chromatic dispersion compensator 83 and a polarization-mode compensator 74 are of variable type, in which a chromatic dispersion compensation quantity and a polarization-mode dispersion compensation quantity can be optimum-value-controlled at all times during system operation. In this modification, a term "dispersion" is used to mean both "polarization-mode dispersion" and "chromatic dispersion". In the case of NRZ system, it is only necessary to control such that the $f_{GVD}$=40 (GHz) intensity is the maximum, while the $f_{PMD}$=20 (GHz) intensity is the minimum. Whereby, it is possible to perform the controls simultaneously and independently even if they have dependency on each other.

Outputs of intensity detectors 80A and 80B shown in FIG. 56 are inputted to CPUs 239A and 239B (detection form 1). These CPUs 239A and 239B use the simultaneous monitoring method in FIG. 55, and function as a polarization-mode dispersion controlling unit and a chromatic dispersion controlling unit to feedback-control the chromatic dispersion compensator 83 and the polarization-mode dispersion compensator 74 arranged in the receiving terminal.

When a chromatic dispersion compensation quantity and a polarization-mode dispersion compensation quantity are set to the optimum values only at the time of start of system operation, the compensators are not necessarily "variable". For example, a "fixed" dispersion compensator such as a dispersion compensating fiber, a dispersion compensator of a fiber grating type or the like may be inserted.

The method of controlling a polarization-mode dispersion quantity and a chromatic dispersion quantity may use the control mode 1 using the first function and the second function. As a method of switching the controls when a chromatic dispersion compensation quantity and a polarization-mode dispersion compensation quantity are optimum-value-controlled at all times during system operation, a method in which the above controls are executed independently and in parallel with respect to time, that is, a method in which the above polarization-mode dispersion controlling step and the chromatic dispersion controlling step are executed independently, may be employed. Or a method in which the above steps are executed in time series in order to prevent them from being overlapped with respect to time, that is, a method in which the above polarization-mode dispersion controlling step and the chromatic dispersion controlling step are executed in time series, may be employed.

Further, although the polarization-mode dispersion compensator and the chromatic dispersion compensator are controlled by the CPUs 239A and 239B, it is alternatively possible to use a controlling method by an analog circuit using simultaneous detection or the like, not limited to the above example. It is also possible to insert an A/D converter (not shown) and a D/A converter (not shown) in front of and behind each of the CPUs 239A and 239B.

Incidentally, either one of two different frequency components extracted in the electric stage, or the both may be used for extracting a timing in the main signal system.

(D2) Description of a Second Modification of the Third Embodiment

Figure 57:
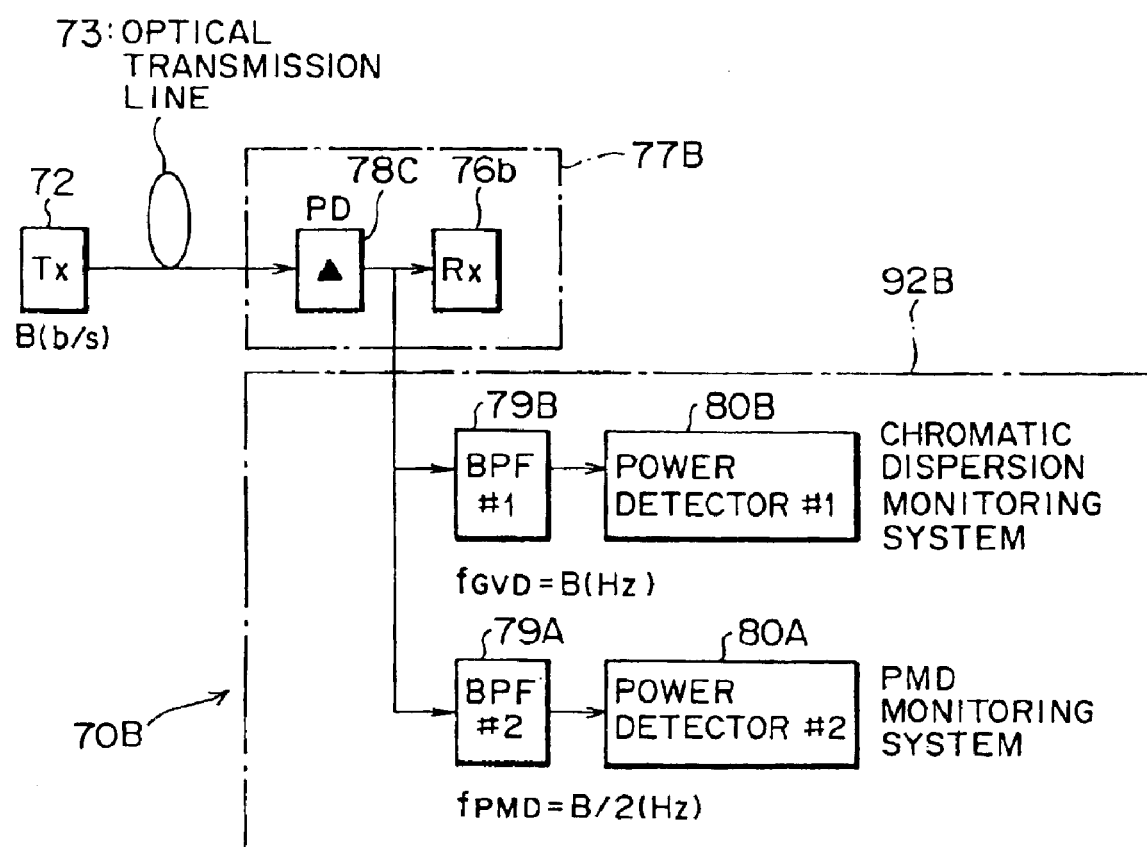
FIG. 57 is a block diagram of an optical transmission system according to a second modification of the third embodiment of this invention.

The signal splitting may be performed in the electric stage. FIG. 57 is a block diagram of an optical transmission system 70B according to a second modification of the third embodiment of this invention. In the optical transmission system 70B shown in FIG. 57, an optical transmitter 72 and an optical receiver 77B are connected over an optical transmission line 73, and a compensation quantity monitoring apparatus 92B is disposed on the receiving side. The optical receiver 77B comprises a photo receiver 78C, while the compensation quantity monitoring apparatus 92B comprises band-pass filters 79A and 79B, and intensity detectors 80A and 80B. As an example of setting frequencies, $f_{GVD}$=B (GHz) and $f_{PMD}$=B/2 (GHz) in the case of a B (Gb/s) NRZ signal. Values other than the above may be employed.

At the receiving terminal, signal light is received by the photo receiver 78C in the optical receiver 77B, and split into three in the electric stage. One of the signal light is inputted to an optical receiving unit 76b as a main signal system, and the other two are used for monitoring chromatic dispersion and polarization-mode dispersion. The monitoring system optical signals are received by photo receivers 78A and 78B, different frequency components are extracted by narrow-band band-pass filters 79B and 79A having different center wavelengths $f_{GVD}$ and $f_{PMD}$ in the electric stage, and monitor values are detected by the intensity detectors 80B and 80A. Therefore, the detection form 1 is employed.

Figure 58:
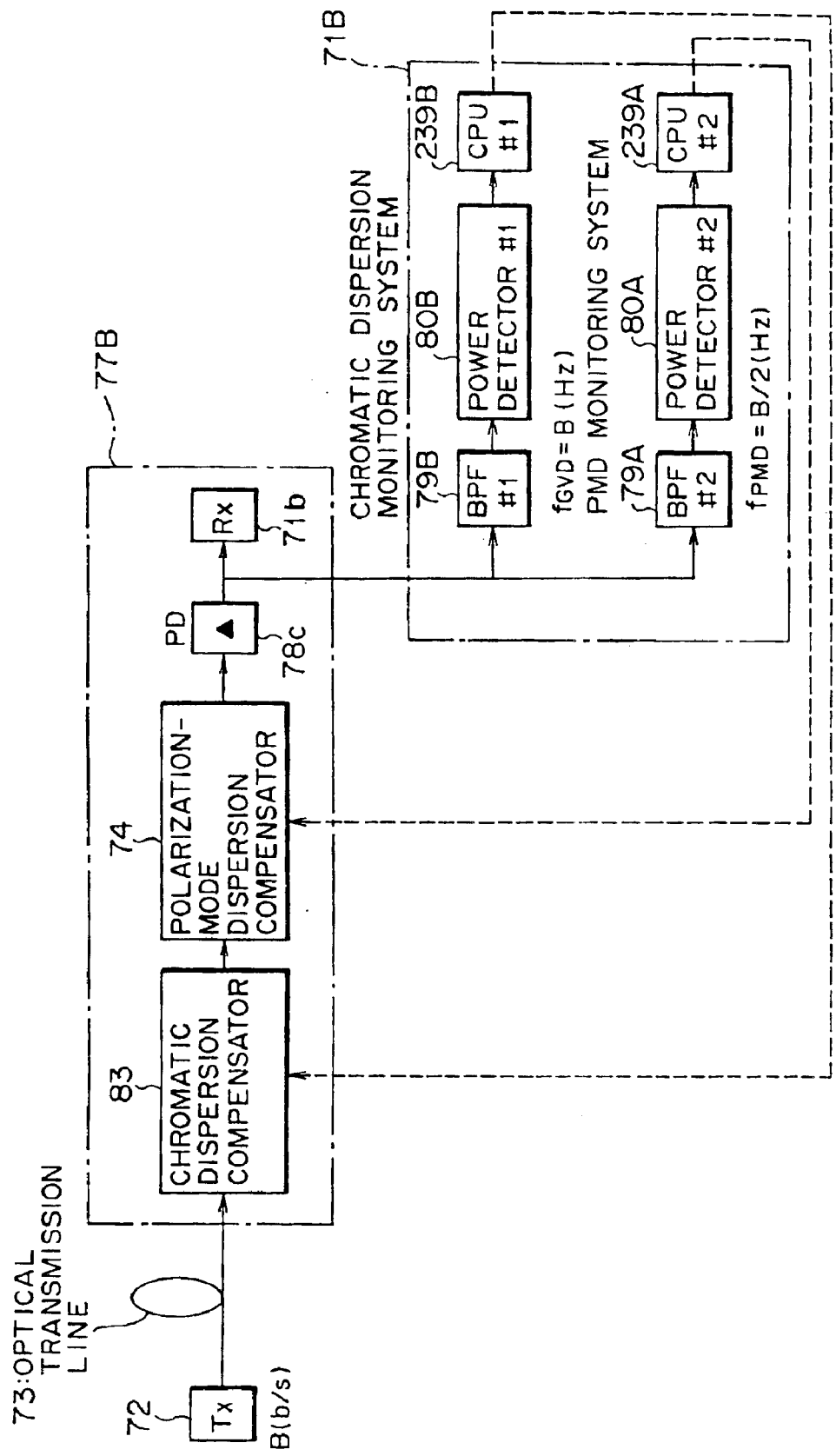
FIG. 58 is a block diagram according to the second modification of the third embodiment of this invention.

FIG. 58 is a block diagram of an optical transmission system according to the second modification of the third embodiment of this invention, which shows a structure when paying attention to a loop simultaneously compensating chromatic dispersion and polarization-mode dispersion. A chromatic dispersion compensator 83 and a polarization-mode dispersion compensator 74 are of variable type, in which a chromatic dispersion quantity and a polarization-mode dispersion quantity can be optimum-value-controlled at all times during system operation. Like reference characters in FIG. 58 designate like or corresponding parts in FIG. 57. In this modification, a term "dispersion" is used to mean both "polarization-mode dispersion" and "chromatic dispersion".

Outputs of intensity detectors 80A and 80B shown in FIG. 58 are inputted to CPUs 239A and 239B. These CPUs 239A and 239B use the simultaneous monitoring method in FIG. 57, function as a polarization-mode dispersion controlling unit and a chromatic dispersion controlling unit to feedback-control the chromatic dispersion compensator 83 and the polarization-mode dispersion compensator 74 arranged in the receiving terminal.

Incidentally, when a chromatic dispersion compensation quantity and a polarization-mode dispersion compensation quantity are set to the optimum values only at the time of start of system operation, the compensators are not necessarily "variable". For example, a "fixed" dispersion compensator such as a dispersion compensating fiber, a dispersion compensator of a fiber grating type or the like may be inserted.

Since it is only necessary to control the compensation values to be the maximum or the minimum values in the control mode 2 in the feedback control of the compensators, the controls are executed independently and in paralle even if they have dependency on each other. For example, in the case of 40 Gb/s NRZ system, it is only necessary to control the $f_{GVD}$=40 GHz intensity to be the minimum while the $f_{PMD}$=20 GHz intensity to be the maximum. It is alternatively possible to control a monitor value to be an absolute value using the control mode 1.

As a method of switching controls when a chromatic dispersion compensation value and a polarization-mode dispersion compensation value are controlled to be the optimum values at all times during system operation, a method in which the above controls are executed independently and in parallel with respect to time, that is, a method in which the above polarization-mode dispersion controlling step and the chromatic dispersion controlling step are executed independently, may be employed. Or a method in which the controls are executed in time series in order to prevent them from being overlapped with respect to time, that is, a method in which the above polarization-mode dispersion controlling step and the chromatic dispersion controlling step are executed in time series, may be employed.

Although the polarization-mode dispersion compensator and the chromatic dispersion compensator are controlled by the CPUs 239A and 239B, it is alternatively possible to use a control method by an analog circuit using synchronous detection, not limited to the above example. It is also possible to insert an A/D converter (not shown) and a D/A converter (not shown) in front of and behind each of the CPUs 239A and 239B.

Meanwhile, either one or both of the two different frequency components extracted in the electric stage may be used for extracting a timing of a main signal system.

(D3) Description of a Third Modification of the Third Embodiment

Figure 59:
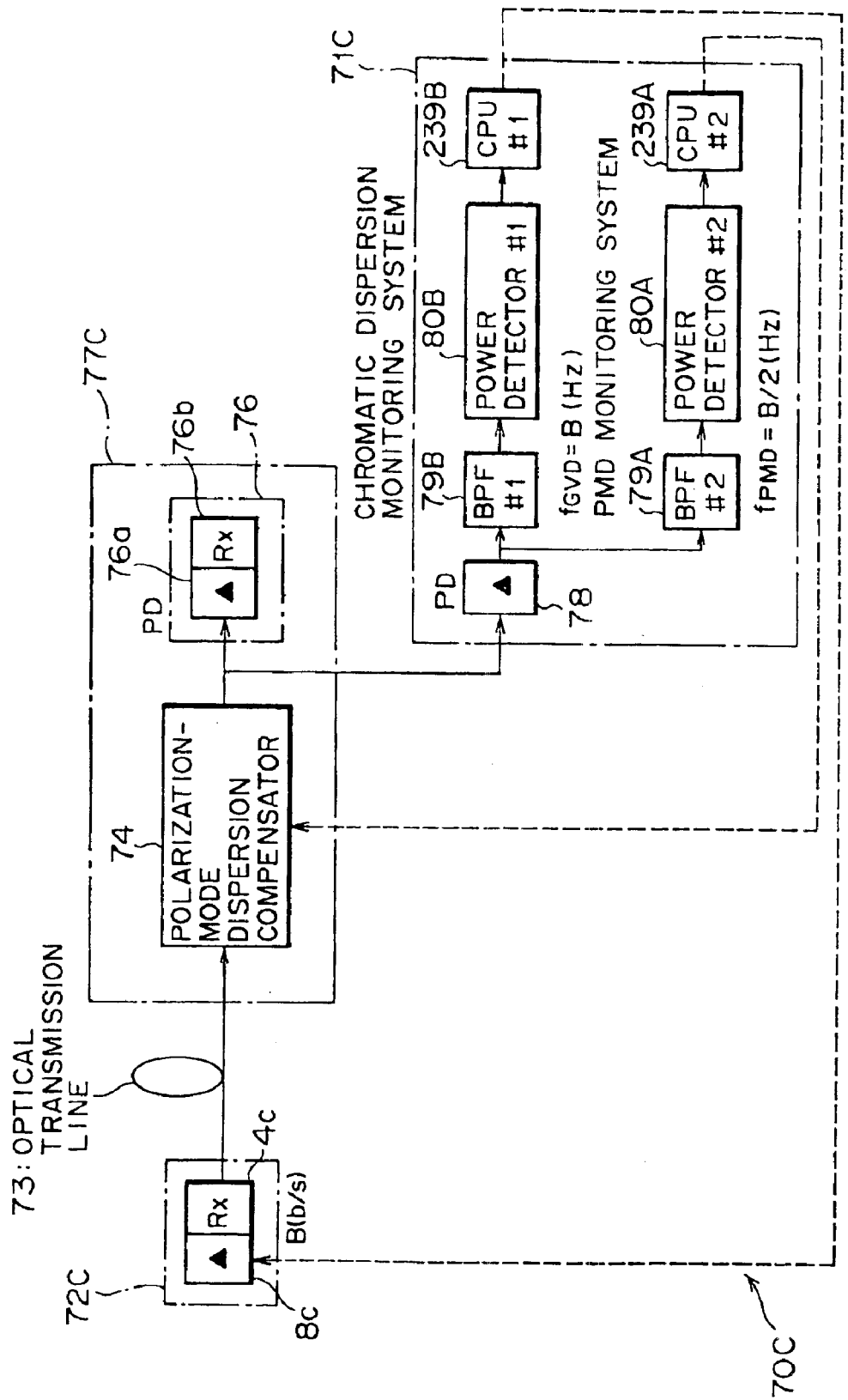
FIG. 59 is a block diagram of an optical transmission system according to a third modification of the third embodiment of this invention.

FIG. 59 is a block diagram of an optical transmission system according to a third modification of the third embodiment of this invention. In the optical transmission system 70C shown in FIG. 59, an optical transmitter 72C and an optical receiver 77C are connected over an optical transmission path 73, and a dispersion compensation controlling apparatus 71C is disposed on the receiving side.

The optical transmitter 72C comprises a signal light source 8C and a chromatic dispersion compensator 4C (denoted as Tx in FIG. 59) of a chromatic dispersion compensation quantity variable type. As a chromatic dispersion equalizer, the signal light source 8C is configured with a laser diode of a variable wavelength or the like, and a signal optical wavelength is optimized according to chromatic dispersion of a transmission line by the chromatic dispersion compensator 4C. The optical receiver 77C comprises a polarization-mode dispersion compensator 74 of a polarization-mode dispersion compensation quantity variable type and a photo receiving unit 76, thereby performing an optimum value control at all times during system operation. Incidentally, parts in FIG. 59 designated by the same reference characters in FIG. 59 have the same or similar functions. In this modification, a term "dispersion" is used to mean both "polarization-mode dispersion" and "chromatic dispersion". When a chromatic dispersion compensation quantity and a polarization-mode dispersion compensation quantity are set to optimum values only at the time of start of system operation, it is not necessarily that the compensators are "variable". For example, it is alternatively possible to insert a "fixed" dispersion compensator such as a dispersion compensating fiber, a dispersion compensator of a fiber grating type, or the like.

As this control method, the dispersion compensation controlling apparatus 71C, using the control mode 2, feedback-controls a chromatic dispersion compensator 83 disposed in the optical transmission line 73 such that the intensity of the second specific frequency component detected by a second intensity detecting unit (intensity detector 80B) becomes the maximum or the minimum. Since it is only necessary to control the value to be the maximum value or the minimum value, it is possible to perform the controls simultaneously and independently even if they have dependency on each other. For example, in the case of 40 Gb/s NRZ system, it is only necessary to control such that the $f_{GVD}$=40 GHz intensity becomes the minimum while the $f_{PMD}$=20 GHz intensity becomes the maximum value. It is alternatively possible to control a monitor value to be an absolute value in the control mode 1.

As a method of switching the controls when a chromatic dispersion compensation value and a polarization-mode dispersion compensation value are controlled to be the optical values at all times during system operation, a method in which the above controls are executed independently and in parallel with respect to time, that is, a method in which the above polarization-mode dispersion controlling step and the chromatic dispersion controlling step are executed independently, may be employed. Or a method in which the controls are executed in time series in order to prevent them from being overlapped with respect to time, that is, a method in which the above polarization-mode dispersion controlling step and the chromatic dispersion controlling step are executed in time series, many be employed.

Although the polarization-mode dispersion compensator and the chromatic dispersion compensator are controlled by the CPUs 239A and 239B, it is alternatively possible to use a control method by an analog circuit using synchronous detection or the like, not limited to the above example. It is also possible to insert an A/D converter (not shown) and a D/A converter (not shown) in front of and behind each of the CPUs 239A and 239B.

The other parts denoted by the same reference characters as those described above have the same or similar functions, further descriptions of which are thus omitted. Here is used a simultaneous monitoring method in a system corresponding to FIG. 57, but this invention is not limited to this example. It is alternatively possible to use a simultaneous monitoring method in a system corresponding to FIG. 53 or FIG. 55.

(D4) Description of a Fourth Modification of the Third Embodiment

Figure 60:
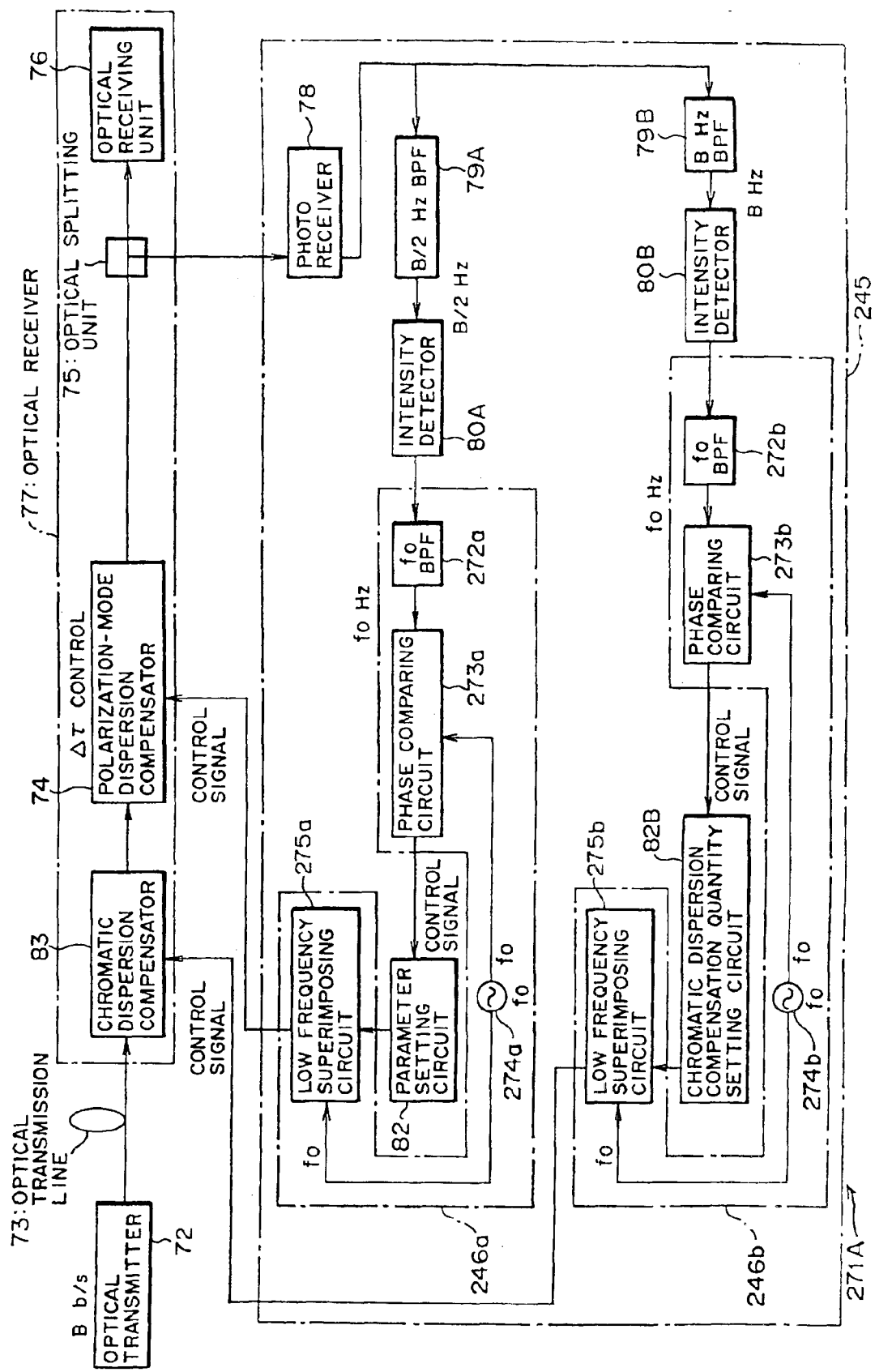
FIG. 60 is a block diagram showing a structure of an optical transmission system to which a dispersion compensation controlling apparatus according to a fourth modification of the third embodiment of this invention is applied.

FIG. 60 is a block diagram showing a structure of an optical transmission system to which a dispersion compensation controlling apparatus according to a fourth modification of the third embodiment of this invention is applied. This dispersion compensation controlling apparatus differs from the dispersion compensation controlling apparatus according to the third embodiment in that parameter information inputted to a chromatic dispersion compensating unit 83 and a polarization-mode dispersion compensating unit 74 are optimized.

Namely, in the optical transmission system 271A shown in FIG. 60, an optical transmitter 72 as a transmitting terminal apparatus transmitting a transmission optical signal and an optical receiver 77 as a receiving terminal apparatus receiving the transmission optical signal are connected over an optical transmission line (transmission fiber) 73. Here, the optical transmitter 72 and the optical transmitter 73 and the optical receiver 77 are similar to those described above, further descriptions of which are thus omitted. In this modification, a term "dispersion" is used to mean both "polarization-mode dispersion" and "chromatic dispersion".

A dispersion compensation controlling apparatus 245 is disposed on the receiving side. The dispersion compensation controlling apparatus 245 comprises a photo receiver 78, band-pass filters 79A and 79B, intensity detectors 80A and 80B, a parameter setting circuit 82 and a chromatic dispersion compensation quantity setting circuit 82B similar to those of the dispersion compensation controlling apparatus 71 according to the third embodiment, along with compensation quantity optimization controlling units 246a and 246b. The photo receiver 78, the band-pass filters 79A and 79B, the intensity detectors 80A and 80B, the parameter setting circuit 82 and the chromatic dispersion compensation quantity setting circuit 82B have similar functions and structures to those according to the third embodiment, further descriptions of which are thus omitted. Therefore, the detection form 1 is employed.

The compensation quantity optimization controlling units 246a and 246b automatically perform feedback controls when polarization-mode dispersion and chromatic dispersion are compensated during system operation, in which the control mode 2 is used. The compensation quantity optimization controlling units 246a and 246b superimpose predetermined low frequency signals set in advance on a parameter setting control signal and a chromatic dispersion compensation quantity control signal outputted from the parameter setting circuit 82 and the chromatic dispersion compensation quantity setting circuit 82B, respectively, and control parameter settings in the parameter setting circuit 82 and the chromatic dispersion quantity setting circuit 82B such that the above low frequency signal components included in the intensity of the above first specific frequency component from a first intensity detecting unit (intensity detectors 80A and 80B) becomes zero, thereby optimizing a polarization-mode dispersion compensation quantity and a chromatic dispersion compensation quantity of the above transmission optical signal. The compensation quantity optimization controlling units 246a and 246b comprises band-pass filters 272a and 272b, phase comparing circuits 273a and 273b, low frequency oscillators 274a and 274b, and low frequency superimposing circuits 275a and 275b, respectively. The band-pass filters 272a and 272b, the phase comparing circuits 273a and 273b, the low frequency oscillators 274a and 274b and the low frequency superimposing circuits 275a and 275b are similar to the band-pass filter 32, the phase comparing circuit 33, the low frequency oscillator 34 and the low frequency superimposing circuit 35 described in the fifth modification of the first embodiment, respectively, further descriptions of which are thus omitted.

The compensation optimization controlling units 246a and 246b minutely modulate a chromatic dispersion compensation quantity to be given by the chromatic dispersion compensator 83 and a delay quantity $\Delta\tau$ to be given by the polarization-mode dispersion compnesator 74 with low frequency $f_0$ (Hz) in order to automatically fix the intensity of the first specific frequency component in a baseband spectrum of a transmission optical signal inputted to the receiving side over the optical transmission line 73 to the maximum value. During system operation, the compensation optimization controlling units 246a and 246b perform a tracking control to keep a chromatic dispersion compensation quantity and a polarization-mode delay quantity $\Delta\tau$ at optimum values at all times against a change with time of the optical transmission line 73. As an example of this tracking control, a delay quantity $\Delta\tau$ is minutely changed (dithered) in the vicinity of the maximum point $\Delta\tau_0$ to detect a new maximum point, thereby automatically determining it in the feedback control when polarization-mode dispersion is compensated. In the feedback control when chromatic dispersion is compensated, a chromatic dispersion compensation quantity is minutely changed in the vicinity of the maximum point to detect a new maximum point, thereby automatically determining it. A method of the feedback control by the compensation quantity optimization controlling units 246a and 246b is similar to that described above, further description of which is thus omitted.

It is alternatively possible to employ the control mode 1 in lieu of the control mode 2. Although not shown, it is possible to provide a polarization-mode dispersion detecting unit and a chromatic dispersion detecting unit for determining optimum values of parameter information showing a polarization-mode dispersion compensation quantity and a chromatic dispersion compensation quantity before system operation, and switches for switching outputs of the intensity detectors 80A and 80B, respectively.

With the above structure, in the optical transmission system 271A, an optical signal at a transmission rate B (b/2) transmitted from the optical transmitter 72 is transmitted to the optical receiver 77 over the optical transmission line 73. In order to compensate chromatic dispersion and polarization-mode dispersion generated in the transmitted optical signal, a part of the optical signal transmitted over the optical transmission line 73 is taken out by an optical splitting unit 75, and the optical signal taken out (monitor light) is sent to the dispersion compensation controlling apparatus 245. The optical signal taken out by the optical splitting unit 75 is O/E-converted by the photo receiver 78, split into two, and inputted to the band-pass filters 79A and 79B. The first specific frequency component [B/2 (Hz) component] in a baseband spectrum is detected by the band-pass filter 79A, while the second specific frequency component [B (Hz) component] in the baseband spectrum is detected by the band-pass fitler 79B (specific frequency components detecting step). Following that, intensities of the above first specific frequency component and the second specific frequency component detected by the band-pass filters 79A and 79B, respectively, are detected by the intensity detectors 80A and 80B (intensities detecting step).

Following that, a parameter setting in the parameter setting circuit 82 is such controlled by the compensation quantity optimization controlling unit 246a that a low frequency signal component included in the intensity of the first specific frequency component from the intensity detector 80A becomes zero, whereby a compensation quantity of polarization-mode dispersion of the above transmission optical signal is optimized. A parameter setting control signal is outputted to the polarization-mode dispersion compensator 74 disposed in the optical receiver 77 via the low frequency superimposing circuit 275a in the compensation quantity optimization controlling unit 246a. When the polarization-mode dispersion compensator 74 receives the parameter setting control signal, parameter information is set on the basis of the control signal therein, whereby polarization-mode dispersion generated in an optical signal transmitted over the optical transmission line 73 is compensated. Incidentally, the parameter setting circuit 82 detects a code of a signal obtained as a result of phase comparison by the phase comparing circuit 273a, thereby determining whether a delay quantity $\Delta\tau$ is shifted to a negative or a positive direction, so that a parameter setting control signal for changing the delay quantity $\Delta\tau$ in such a direction that the $f_0$ component intensity modulation component in the B/2 (Hz) component is generated and outputted. Further, the low frequency superimposing circuit 275a superimposes a low frequency signal ($f_0$ [Hz] signal) from the low frequency oscillator 274a on the parameter setting control signal from the parameter setting circuit 82, and outputs it.

Similarly, the compensation quantity optimization controlling unit 246b controls a chromatic dispersion compensation quantity in the chromatic dispersion compensation quantity setting circuit 82B such that a low frequency signal component included in the intensity of the second specific frequency component from the intensity detector 80B becomes zero, thereby optimizing a chromatic dispersion compensation quantity of the above transmission optical signal.

The dispersion compensation controlling apparatus 245 according to the fourth modification of the third embodiment of this invention detects intensities of the first specific frequency component and the second specific frequency component in a baseband spectrum of a transmission optical signal, detects a polarization-mode dispersion quantity of the transmission optical signal from the intensity of the first specific frequency component by performing a predetermined first functional operation, thereby easily detecting polarization-mode dispersion generated in the transmission optical signal, while detecting a chromatic dispersion compensation quantity of the transmission optical signal from the intensity of the second specific frequency component by performing a predetermined second functional operation, thereby easily detecting a chromatic dispersion quantity generated in the transmission optical signal.

As above, it is advantageous that a delay quantity $\Delta\tau$ can be at all times kept at the optimum value against a change with time of the optical transmission line 23 during system operation, and deterioration of the transmission waveform of an optical signal can be prevented by detecting a polarization-mode dispersion quantity and a chromatic dispersion quantity, setting parameter information generated in the transmission optical signal on the basis of the detected quantities and compensating the polarization-mode dispersion and a chromatic dispersion quantity, which largely contributes to a long-distance transmission of a high-speed optical signal. Further, with the compensation quantity optimization controlling units 246a and 246b, it is possible to optimize compensation quantities of polarization-mode dispersion and chromatic dispersion quantity of a transmission optical signal, and automatically perform a feedback control when polarization-mode dispersion and chromatic dispersion are compensated.

(D5) Description of a Fifth Modification of the Third Embodiment

Figure 61:
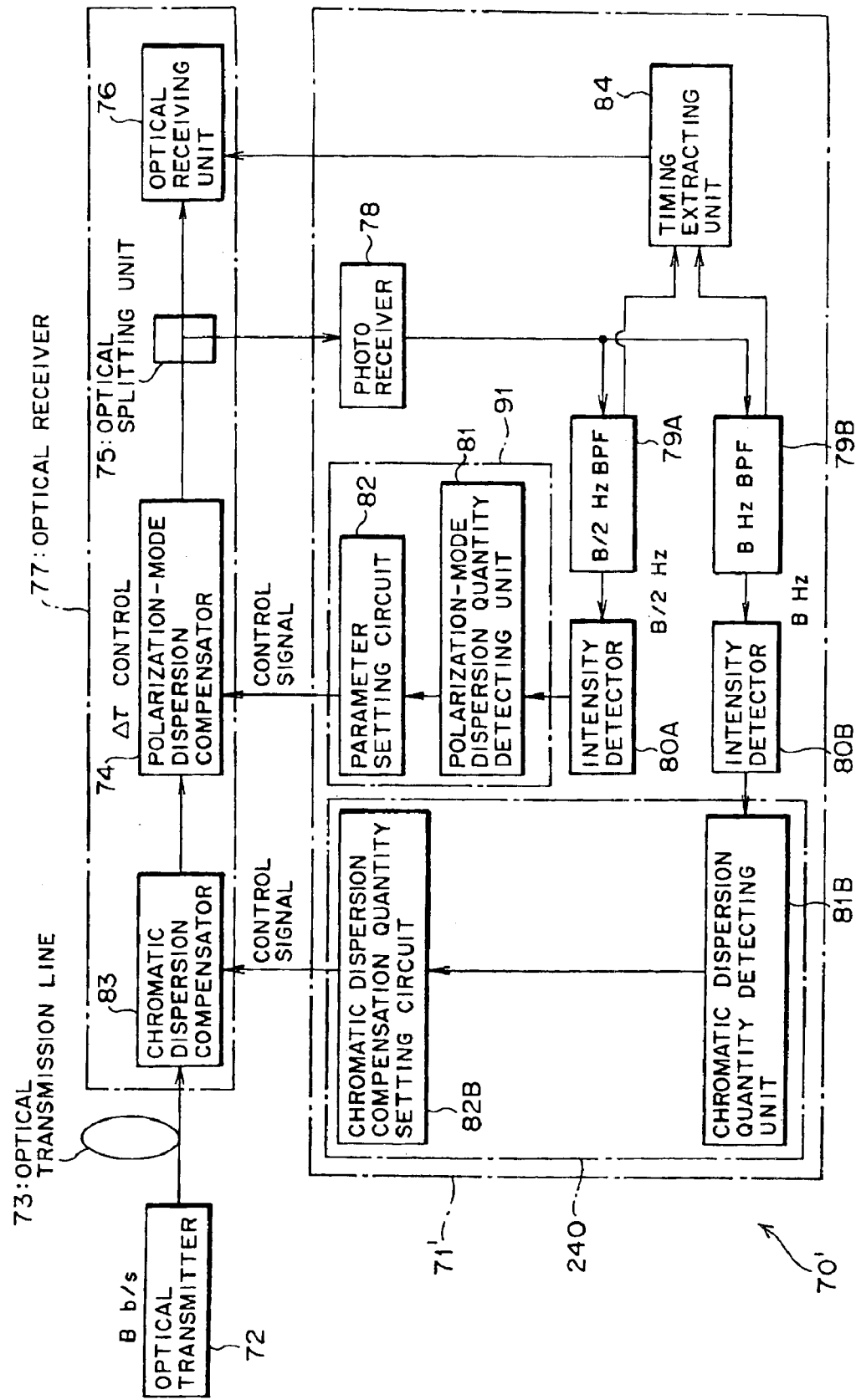
FIG. 61 is another block diagram of an optical transmission system according to a fifth modification of the third embodiment of this invention.

It is alternatively possible to extract a timing in the electric stage. FIG. 61 is a structure of an optical transmission system according to a fifth modification of the third embodiment of this invention. A dispersion compensation controlling apparatus 70' on the receiving side shown in FIG. 61 comprises a timing extracting unit 84. Other parts denoted by the same reference characters have the same or similar functions to those described above, further descriptions of which are thus omitted. Further, in this modification, a term "dispersion" is used to mean both "polarization-mode dispersion" and "chromatic dispersion", as well.

The timing extracting unit 84 extracts a timing of a received signal on the basis of a specific frequency component detected by at least either band-pass filters 79A or 79B. On the basis of the specific frequency components detected by these band-pass filters 79A and 79B, a timing of the received signal is extracted, and a clock signal taken out is sent to an optical receiving unit 76 of an optical receiver 77. In the optical receiving unit 76 of the optical receiver 76, this clock signal is used for discrimination or the like.

With the above structure, frequency components of a received signal O/E-converted by a photo receiver 78 are detected by the band-pass filters 79A and 79B. Since these frequency components are signals in synchronization with a received waveform, a clock signal is taken out by the timing extracting unit 84, inputted to the optical receiver 76 to be used for timing discrimination or the like in the main signal system. An optical transmission system 70' to which a dispersion compensation controlling apparatus 71' according to the fifth modification of the third embodiment is applied operates in a similar manner to the optical transmission system 70 to which the dispersion compensation controlling apparatus 71 according to the above third embodiment is applied.

As above, according to the dispersion compensation controlling apparatus 71' according to the fifth modification of the third embodiment of this invention, it is possible to attain similar advantages to the case of the fourth embodiment described above. In addition, it is possible to improve functions of the optical receiver 77 of the optical transmission system 70' by extracting a clock signal by the timing extracting unit 84.

(E) Description of a Fourth Embodiment of this Invention

According to the third embodiment, there are obtained two systems of frequency numeral values to be monitored. However, it is alternatively possible to unify them into one system, simultaneously monitor both a chromatic dispersion value and a polarization-mode dispersion value of a transmission line, and simultaneously compensate transmission optical waveform deterioration due to the both. Incidentally, a term "dispersion" is used to mean both "polarization-mode dispersion" and "chromatic dispersion", as well.

Figure 62:
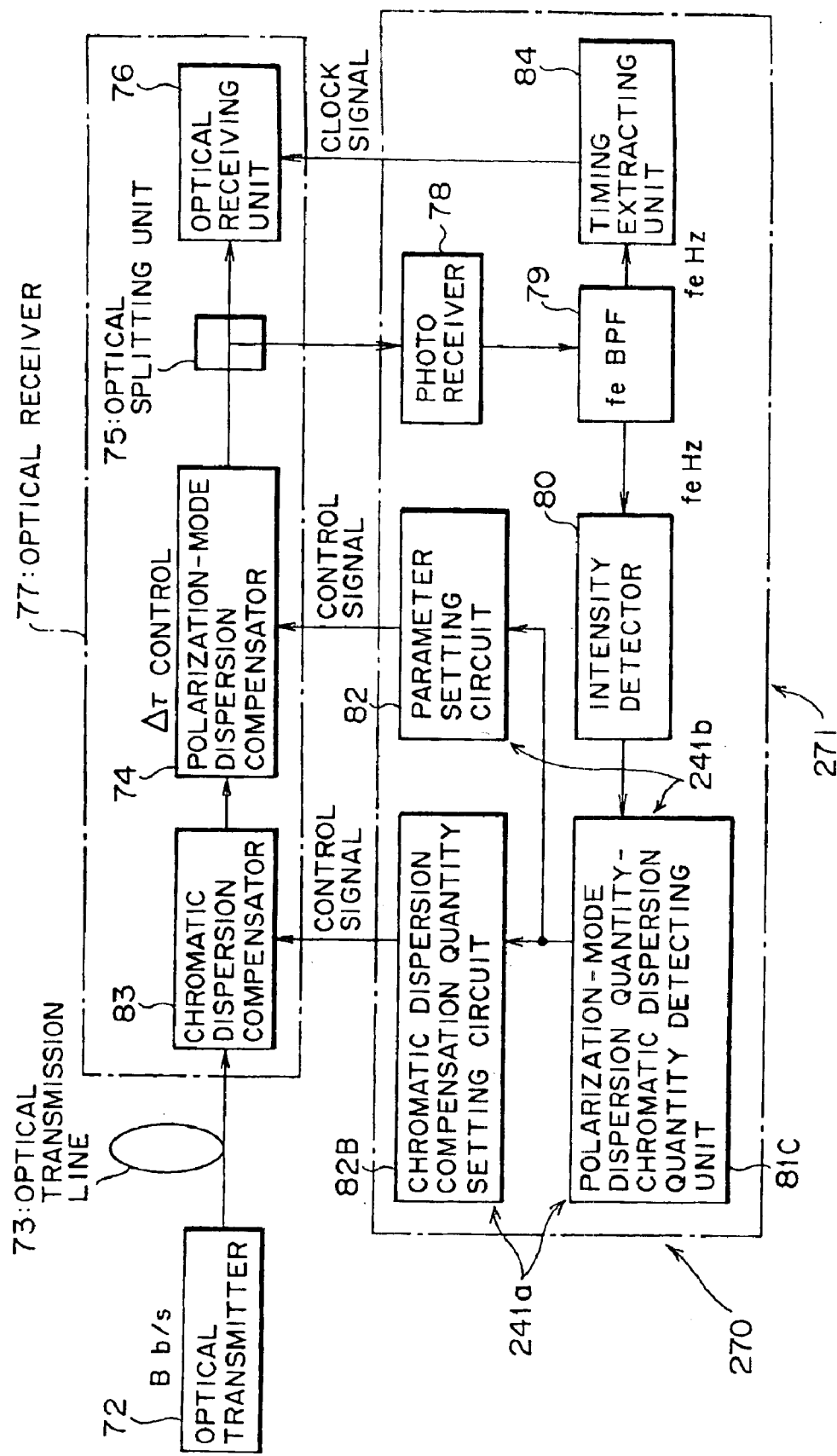
FIG. 62 is a block diagram of an optical transmission system according to a fourth embodiment of this invention.

FIG. 62 is a block diagram of an optical transmission system according to a fourth embodiment of this invention. The optical transmission system 270 shown in FIG. 62 is an optical communication system with a transmission rate B (b/s) (for example, 40 Gb/s, 10 Gb/s or the like) adopting time division multiplexing. The optical transmission system 270 differs from the optical transmission system 70 according to the third embodiment in that a band-pass filter disposed at an output of a photo receiver 78 is of one system. Other parts are almost similar to those of the optical transmission system 70 according to the third embodiment.

Namely, in the optical transmission system 270, an optical transmitter 72 as a transmitting terminal apparatus transmitting a transmission optical signal and an optical receiver 77 as a receiving terminal apparatus receiving the transmission optical signal are connected over an optical transmission line (transmission fiber) 73, and a dispersion compensation controlling apparatus 271 is disposed on the receiving side. The optical transmitter 72 and the optical transmission line 73 are similar to those described above, further descriptions of which are thus omitted.

The optical receiver 77 comprises a chromatic dispersion compensator 83, a polarization-mode dispersion compensator 74, an optical splitting unit 75 and an optical receiving unit 75. Similarly to the above third embodiment, both of the chromatic dispersion compensator 83 and the polarization-mode dispersion compensator 74 are of variable type. A chromatic dispersion compensation quantity and a polarization-mode dispersion compensation quantity can be at all times optimum-value-controlled in the control mode 2 during system operation. Incidentally, the optical splitting unit 75 and the optical receiving unit 75 are similar to those described above.

The dispersion compensation controlling apparatus 271 monitors a state of polarization-mode dispersion and a state of chromatic dispersion generated in an optical signal transmitted over the optical transmission line 73 on the basis of an optical signal taken out by the optical splitting unit 75 in the optical receiver 77, and controls the polarization-mode dispersion compensator 74 and the chromatic dispersion compensator 83 according to results of the monitoring. The dispersion compensation controlling apparatus 271 comprises a photo receiver 78, a band-pass filter (fe BPF) 79, an intensity detector 80, a polarization-mode dispersion quantity-chromatic dispersion quantity detecting unit 81C, a chromatic dispersion compensation quantity setting circuit 82B and a parameter setting circuit 82. The photo receiver 78, the band-pass filter 79 and the intensity detector 80 are similar to those described in the third embodiment.

The polarization-mode dispersion quantity-chromatic dispersion quantity detecting unit 81C detects the above polarization-mode dispersion quantity and the chromatic dispersion quantity on the basis of a frequency of the first specific frequency component detected by the intensity detector 80. Incidentally, the first specific frequency component is appropriately set according to a transmission rate or a signal waveform of an optical signal. With respect to this frequency, when above transmission optical signal is an RZ optical signal or an optical time division multiplex signal, a first specific frequency component detecting unit (polarization-mode dispersion quantity-chromatic dispersion quantity detecting unit 81C) detects a frequency corresponding to the bit rate or ½ of the bit rate as the first specific frequency component. When the above transmission optical signal is an NRZ signal, the first specific frequency component detecting unit (polarization-mode dispersion quantity-chromatic dispersion quantity detecting unit 81C) detects a frequency corresponding to ½ of the bit rate as the first specific frequency component.

The chromatic dispersion compensation quantity setting circuit 82B feedback-controls the chromatic dispersion compensator 83 disposed in the optical transmission line 73 such that the intensity of the first specific frequency component detected by the polarization-mode dispersion quantity-chromatic dispersion quantity detecting unit 81C becomes the maximum or the minimum. The polarization-mode dispersion quantity-chromatic dispersion quantity detecting unit 81C and the chromatic dispersion compensation quantity setting circuit 82B function as a chromatic dispersion controlling unit 241a.

Namely, the chromatic dispersion controlling unit 241a feedback-controls the chromatic dispersion comensator 83 disposed in the optical transmission line 73 such that the intensity of the first specific frequency component detected by the intensity detector 80 becomes the maximum or the minimum, in other words, the control mode 2 is employed.

The parameter setting circuit 82 outputs a parameter setting control signal having parameter information as a control quantity for compensating polarization-mode dispersion of the transmission optical signal on the basis of a polarization-mode dispersion quantity detected by the polarization-mode dispersion quantity-chromatic dispersion quantity detecting unit 81C to the polarization-mode dispersion compensator 74 in the optical receiver 77. The polarization-mode dispersion quantity-chromatic dispersion quantity detecting unit 81C and the parameter setting circuit 82 function as the polarization-mode dispersion controlling unit 241b.

From the above, the dispersion compensation controlling apparatus 271 is configured with the first specific frequency detecting unit (band-pass filter 79) detecting the first specific frequency component in a baseband spectrum in a transmission optical signal inputted to the receiving side over a transmission fiber as a transmission line, a first intensity detecting unit (intensity detector 80) detecting information on an intensity of the above first specific frequency component detected by the first specific frequency component detecting unit (band-pass filter 79), a polarization-mode dispersion controlling unit (polarization-mode dispersion quantity-chromatic dispersion quantity detecting unit 81C and parameter setting circuit 82) controlling a polarization-mode dispersion quantity of the transmission line (optical transmission line 73) such that the intensity of the first specific frequency component detected by the first intensity detecting unit (intensity detector 80) becomes the maximum, and a chromatic dispersion controlling unit (polarization-mode dispersion quantity-chromatic dispersion quantity detecting unit 81C and chromatic dispersion compensation quantity setting circuit 82B) controlling a chromatic dispersion quantity of the transmission line (optical transmission line 73) such that the intensity of the first specific frequency component detected by the first intensity detecting unit (intensity detector 80) becomes the maximum.

A flow of a signal in the dispersion compensation controlling apparatus 271 according to the fourth embodiment shown in FIG. 62 is as follows.

An optical signal taken out by the optical splitting unit 75 is first received by the photo receiver 78, O/E-converted into an electric signal, inputted to the band-pass filter 79, the first specific frequency component [fe (Hz) component] in a baseband spectrum in the transmission optical signal is detected by the band-pass filter 79, and an intensity of the above first specific frequency component detected by the band-pass filter 79 is detected by the intensity detector 80.

A polarization-mode dispersion quantity and a chromatic dispersion quantity of the above transmission optical signal are detected by the polarization-mode dispersion quantity-chromatic dispersion quantity detecting unit 81C such that the intensity of the first specific frequency component detected by the intensity detector 80 becomes the maximum, a parameter setting control signal for setting such parameter information (delay quantity $\Delta\tau$ and optical intensity splitting ratio $\gamma$) as to cancel the polarization-mode dispersion quantity detected by the polarization-mode dispersion quantity-chromatic dispersion quantity detecting unit 81C is outputted from the parameter setting circuit 82 to the polarization-mode dispersion compensator 74 disposed in the optical receiver 77 in order to compensate polarization-mode dispersion of the transmission optical signal, and a control signal for setting a chromatic dispersion control quantity is outputted from the chromatic dispersion compensation quantity setting circuit 82B to the chromatic dispersion compensator 83 disposed in the optical transmission line 73 on the basis of the above chromatic dispersion quantity detected by the polarization-mode dispersion quantity-chromatic dispersion quantity detecting unit 81C in order to compensate chromatic dispersion of the above transmission optical signal. In the case of the 40 Gb/s NRZ system, for example, the $f_{GVD}$=40 GHz intensity is such controlled as to be the minimum while the $f_{PMD}$=20 GHz intensity is such controlled as to be the maximum.

When the polarization-mode dispersion compensator 74 receives the parameter setting control signal, parameter information is set on the basis of the control signal therein, whereby polarization-mode dispersion generated in an optical signal transmitted over the optical transmission line 73 is compensated. When the chromatic dispersion compensator 83 receives the control signal, chromatic dispersion generated in the optical signal transmitted over the optical transmission line 73 is compensated on the basis of the control signal.

As above, the intensity can be controlled to be the maximum or the minimum, and the controls can be performed simultaneously and independently.

Meanwhile, a method of controlling the chromatic dispersion compensator 83 and the polarization-mode dispersion compensator 74 may be in the control mode 1, in which the monitor values can be controlled to be absolute values. Namely, the chromatic dispersion controlling unit 241a may set a chromatic dispersion control quantity in the chromatic dispersion compensator 83 disposed in the optical transmission line 73 such that the intensity of the first specific frequency component detected by the first intensity detecting unit (intensity detector 80) becomes the maximum or the minimum. In such case, the polarization-mode dispersion quantity-chromatic dispersion quantity detecting unit 81C detects a chromatic dispersion quantity of the above transmission optical signal from the intensity of the above first specific frequency component detected by the first intensity detecting unit (intensity detector 80) by performing a predetermined operation with a predetermined second function, detects a polarization-mode dispersion quantity of the above transmission optical signal from the intensity of the first specific frequency component detected by the intensity detector 80 by performing a predetermined first functional operation, the chromatic dispersion compensation quantity setting circuit 82B sets a chromatic dispersion control quantity in the chromatic dispersion compensator 83 on the basis of the above chromatic dispersion quantity detected by the chromatic dispersion quantity detecting unit (polarization-mode dispersion quantity-chromatic dispersion quantity detecting unit 81C) in order to compensate chromatic dispersion in the above transmission optical signal.

The dispersion compensation controlling apparatus 271 may output information on the intensity of the above first specific frequency component detected by the intensity detector 80 shown in FIG. 62 as a monitor signal.

When a chromatic dispersion quantity and a polarization-mode dispersion quantity are set to the optimum values only at the time of start of system operation, the compensators are not necessarily "variable". For example, it is possible to insert a "fixed" dispersion compensator such as a dispersion compensating fiber, a dispersion compensator of a fiber grating type, or the like.

As a method of switching the controls in the case where a chromatic dispersion compensation quantity and a polarization-mode dispersion compensation quantity are controlled to be the optimum values at all times during system operation, a method in which the above controls are performed in parallel with respect to time, that is, a method in which the above polarization-mode dispersion controlling step and the chromatic dispersion controlling step are performed independently, may be employed. Or a method in which the controls are performed in time series in order to prevent them from being overlapped with respect to time, that is, a method in which the above polarization-mode dispersion controlling step and the chromatic dispersion controlling step are executed in time series, may be employed.

Further, the polarization-mode dispersion compensator and the chromatic dispersion compensator are controlled by CPUs 239A and 239B. However, this embodiment is not limited to the above example. A control method by an analog circuit using synchronous detection or the like may be employed. It is also possible to insert an A/D converter (not shown) and a D/A converter (not shown) in front of and behind each of the CPUs 239A and 230B.

The optical transmission system 270 to which the dispersion compensation controlling apparatus 271 according to the fourth embodiment with the above structure operates in a similar manner to the optical transmission system 70 to which the dispersion compensation controlling apparatus 71 according to the above third embodiment described above. Namely, this dispersion compensation controlling step comprises a step of detecting the first specific frequency component in a baseband spectrum in a transmission optical signal inputted to the receiving side over a transmission fiber as a transmission line (first specific frequency component detecting step), a step of detecting information on an intensity of the first specific frequency component detected at the first specific frequency detecting step (first intensity detecting step), a step of controlling a polarization-mode dispersion quantity of the optical transmission line 73 such that the intensity of the first specific frequency component detected at the first intensity detecting step becomes the maximum (polarization-mode dispersion controlling step), and a step of controlling a chromatic dispersion quantity of the optical transmission line 73 such that the intensity of the first specific frequency component detected at the first intensity detecting step becomes the maximum or the minimum (chromatic dispersion controlling step).

As above, according to the dispersion compensation controlling apparatus 271 of the fourth embodiment of this invention, it is possible to attain the similar advantages to the case of the third embodiment described above.

(E1) Description of a First Modification of the Fourth Embodiment

Figure 63:
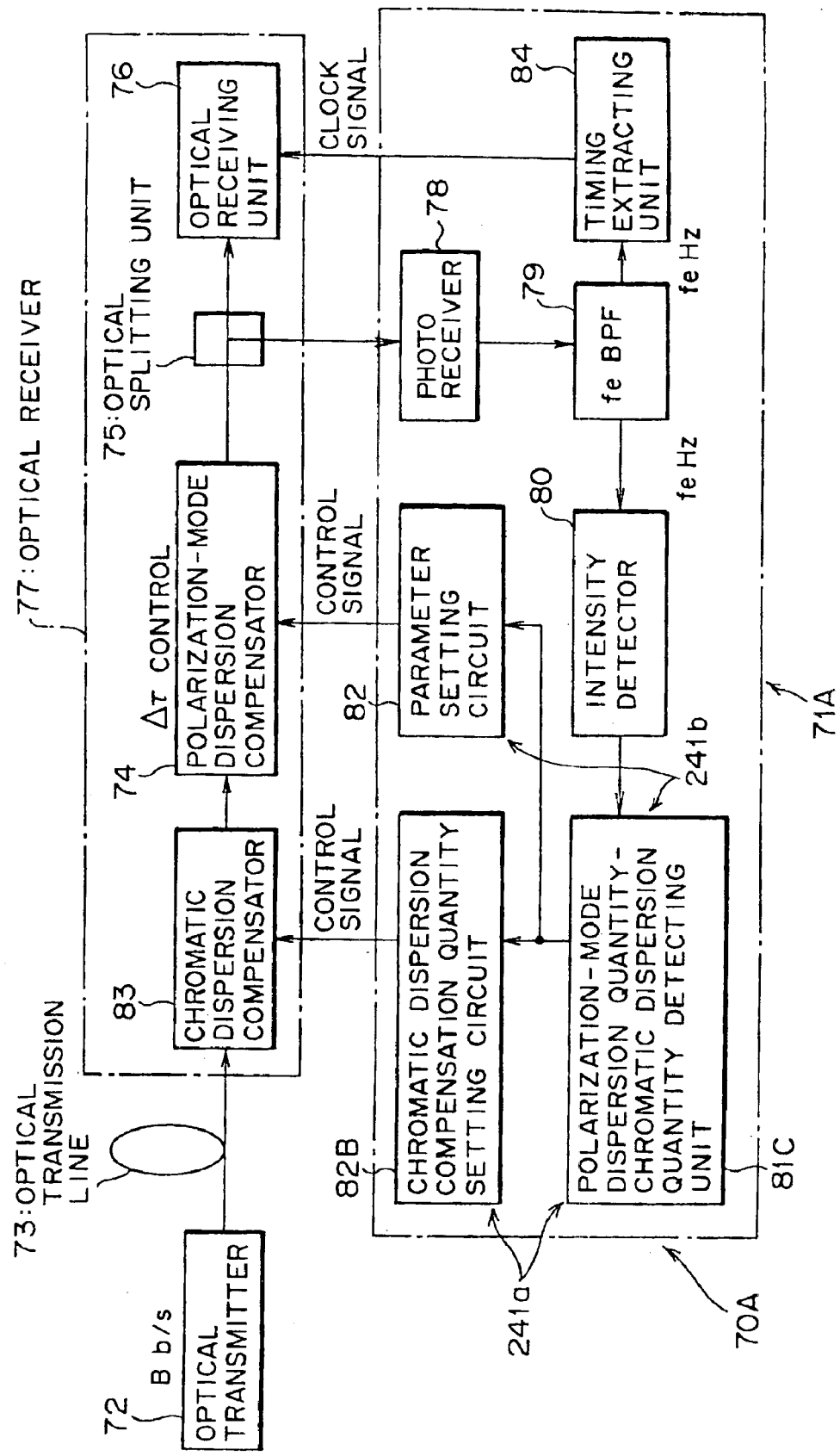
FIG. 63 is a block diagram of an optical transmission system according to a first modification of the fourth embodiment of this invention.

In the fourth embodiment, either one or both of the two different frequency components extracted in the electric stage may be used to extract a timing for the main signal system. FIG. 63 is a block diagram of an optical transmission system according to a first modification of the fourth embodiment of this invention. A dispersion compensation controlling apparatus 70A shown in FIG. 63 is of a structure in the case where a timing extracting unit 84 is provided. A signal from the timing extracting unit 84 is inputted to an optical receiving unit 6 to time the main signal system.

The optical transmission system 70A shown in FIG. 63 is an optical communication system with a transmission rate B (b/s) (for example, 40 Gb/s, 10 Gb/s, or the like) adopting time division multiplexing. The optical transmission system 70A differs from the optical transmission system 270 according to the fourth embodiment in that the timing extracting unit 84 is provided, but the other parts are similar to those of the optical transmission system 270 according to the fourth embodiment. In this modification, a term "dispersion" is used to mean both "polarization-mode dispersion" and "chromatic dispersion".

Namely, a dispersion compensation controlling apparatus 70A monitors a state of polarization-mode dispersion and a state of chromatic dispersion generated in an optical signal transmitted over an optical transmission line 73 on the basis of an optical signal taken out by an optical splitting unit 75, and controls a polarization-mode dispersion compensator 74 and a chromatic dispersion compensator 83. The dispersion compensation controlling apparatus 71A comprises, as shown in FIG. 62, a photo receiver 78, a band-pass filter (fe BPF) 79, an intensity detector 80, a polarization-mode dispersion quantity-chromatic dispersion quantity detecting unit 81C, a parameter setting circuit 82, a chromatic dispersion compensation quantity setting circuit 82B and the timing extracting unit 84.

The photo receiver 78, the intensity detector 80, the parameter setting circuit 82 and the chromatic dispersion compensation quantity setting circuit 82B have similar functions and structures to those described above in the fourth embodiment. The detection form 1 is employed.

The band-pass filter 79 detects the first specific frequency component [fe (Hz) component] in a baseband spectrum of a transmission optical signal inputted to the receiving side over the optical transmission line 73. Incidentally, the first specific frequency component is appropriately set according to a transmission rate or a signal waveform of an optical signal. In the optical transmission system 70A shown in FIG. 63, a frequency of the first specific frequency component used when the above polarization-mode dispersion quantity and the chromatic dispersion quantity are detected by the polarization-mode dispersion quantity-chromatic dispersion quantity detecting unit 81C is set to a frequency corresponding to the bit rate.

Further, the polarization-mode dispersion quantity-chromatic dispersion quantity detecting unit 81C has a function as the polarization-mode dispersion quantity detecting unit 81 and the chromatic dispersion quantity detecting unit 81B according to the fourth embodiment described above.

Namely, the dispersion compensation controlling apparatus 71A is configured with a chromatic dispersion quantity detecting unit detecting a chromatic dispersion quantity of a transmission optical signal from an intensity of the above first specific frequency component detected by the intensity detector 80 by performing the predetermined second functional operation described above, and a chromatic dispersion compensation quantity setting circuit 82B setting a chromatic dispersion control quantity in the chromatic dispersion compensator 83 disposed in the optical transmission line 73 on the basis of the chromatic dispersion quantity detected by the chromatic dispersion quantity detecting unit in order to compensate chromatic dispersion of the transmission optical signal.

Meanwhile, a method of controlling the chromatic dispersion compensator 83 and the polarization-mode dispersion compensator 74 may be in the control mode 1. It is possible to insert an A/D converter (not shown) and a D/A converter (not shown) in front of and behind a CPU, thereby using a control method by an analog circuit using synchronous detection or the like. When a chromatic dispersion compensation quantity and a polarization-mode dispersion compensation quantity are set to the optimum values only at the time of start of system operation, the compensators are not necessarily "variable". For example, a "fixed" dispersion compensator such as a dispersion compensating fiber, a dispersion compensator of a fiber grating type or the like may be inserted. As a method of switching the controls in the case where a chromatic dispersion compensation quantity and a polarization-mode dispersion compensation quantity are controlled to be the optimum values at all times during system operation, a method in which the above controls are executed independently and in parallel with respect to time, that is, the above polarization-mode dispersion controlling step and the chromatic dispersion controlling step are executed independently, may be employed. Or, a method in which the controls are executed in time series in order to prevent them from being overlapped, that is, a method in which the above polarization-mode dispersion controlling step and the chromatic dispersion controlling steps are executed in time series, may be employed.

The timing extracting unit 84 extracts a timing of a received signal on the basis of the specific frequency component detected by the band-pass filter 79. As the timing extracting unit 84, PLL or the like is used. A timing of a received signal is extracted on the basis of the specific frequency component detected by the band-pass filter 79, and the clock signal taken out is sent to an optical receiving unit 76 of the optical receiver 77. In the optical receiving unit 76 of the optical receiver 76, this clock signal is used for discrimination or the like.

Namely, since the fe (Hz) component is a signal in synchronization with a received waveform, a clock signal can be taken out by the timing extracting unit 84, and used for discrimination in the optical receiver 76.

With the above structure, the optical transmission system 70A to which the dispersion compensation controlling apparatus 71A according to the first modification of the fourth embodiment operates in almost a similar manner to the optical transmission system 270 to which the dispersion compensation controlling apparatus 271 according to the fourth embodiment described above is applied.

As above, according to the dispersion compensation controlling apparatus 71A according to the first modification of the fourth embodiment of this invention, it is possible to attain the similar advantages to the fourth embodiment described above. It is also possible to improve functions of the optical receiver 77 of the optical transmission system 70A by extracting a clock signal by the timing extracting unit 84.

(E2) Description of a Second Modification of the Fourth Embodiment

Figure 64:
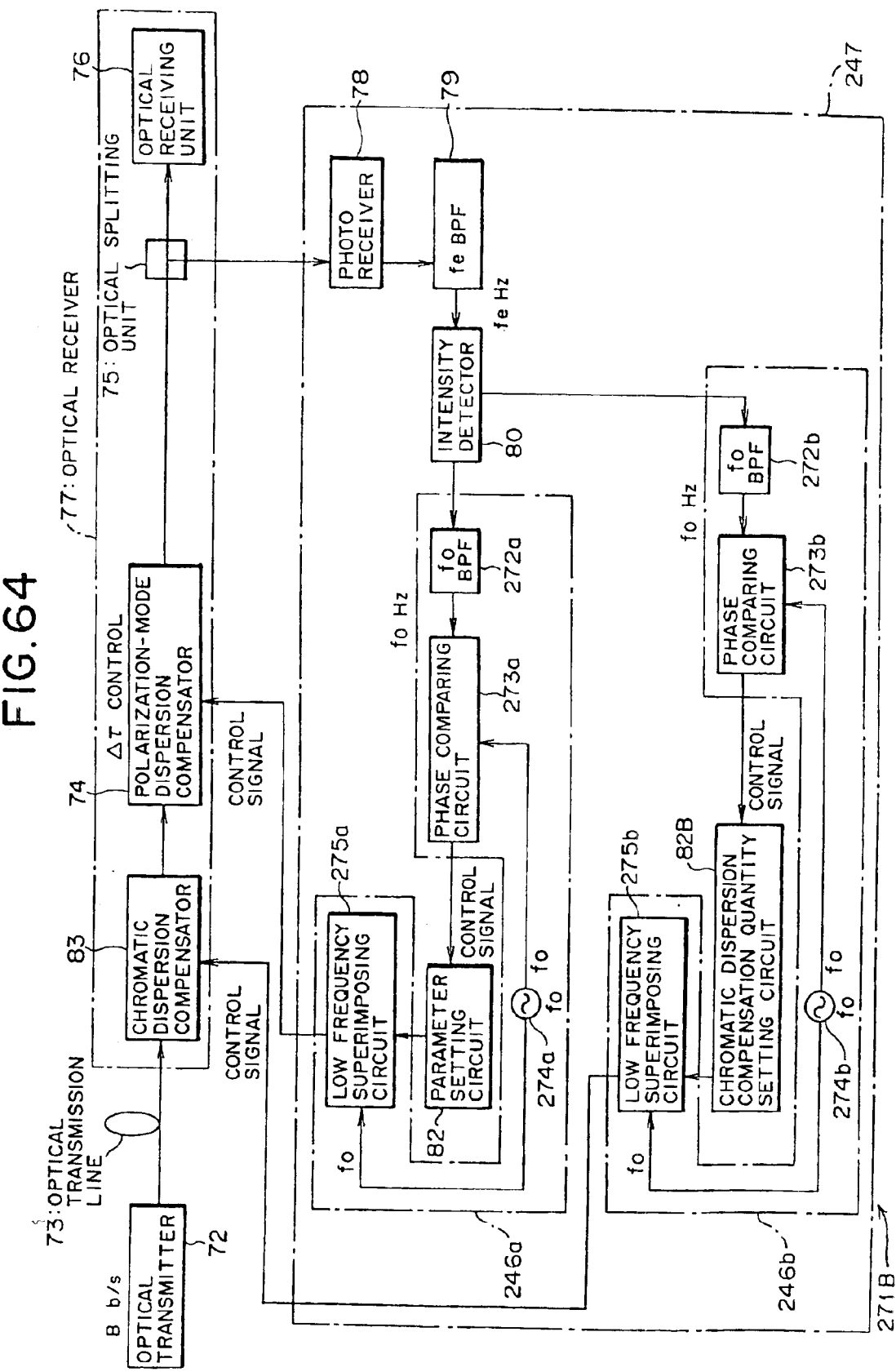
FIG. 64 is a block diagram of an optical transmission system according to a second modification of the fourth embodiment of this invention.

FIG. 64 is a block diagram of an optical transmission system according to a second modification of the fourth embodiment of this invention, which differs in that the band-pass filer is in one system. Namely, unlike the dispersion compensation controlling apparatus 245 in FIG. 60 corresponding to the fourth modification of the third embodiment, an output of the photo receiver 78 is outputted only to the band-pass filter [fe BPF] 79.

Namely, the optical transmission system 271B shown in FIG. 64 comprises an optical transmitter 72, an optical receiver 77 and an optical transmission line (transmission fiber) 73 along with a dispersion compensation controlling apparatus 247. The dispersion compensation controlling apparatus 247 comprises a photo receiver 78, a band-pass filter [fe BPF] 79, an intensity detector 80, a parameter setting circuit 82, a chromatic dispersion compensation quantity setting circuit 82B and compensation quantity optimization controlling units 246*a* and 246*b*. The photo receiver 78, the band-pass filter 79, the intensity detector 80, the parameter setting circuit 82, the chromatic dispersion compensation quantity setting circuit 82B, the parameter setting circuit 82, the chromatic dispersion compensation quantity setting circuit 82B and the compensation quantity optimization controlling units 246*a* and 246*b* have similar functions and structures to those described above, further descriptions of which are thus omitted. The compensation quantity optimization controlling units 246*a* and 246*b* comprise band-pass filters 272*a* and 272*b*, phase comparing circuits 273*a* and 273*b*, low frequency oscillators 274*a* and 274*b* and low frequency superimposing circuits 275*a* and 275*b*, respectively. The band-pass filters 272*a* and 272*b*, the phase comparing circuits 273*a* and 273*b*, the low frequency oscillators 274*a* and 274*b*, and the low frequency superimposing circuits 275*a* and 275*b* are similar to those described above, further descriptions of which are thus omitted.

In this modification, a term "dispersion" is used to mean both "polarization-mode dispersion" and "chromatic dispersion", as well.

As not shown, the optical transmission system 271B may further comprise a polarization-mode dispersion quantity detecting unit and a chromatic dispersion detecting unit for determining optimum values of parameter information showing a polarization-mode dispersion compensation quantity and a chromatic dispersion compensation quantity before system operation, and a switch for switching an output of the intensity detector 80.

It is also possible to use a control method by an analog circuit using synchronous detection by inserting an A/D converter (not shown) and a D/A converter (not shown) in front of and behind a CPU. When a chromatic dispersion compensation quantity and a polarization-mode dispersion compensation quantity are set to the optimum values only at the time of start of system operation, the compensators are not necessarily "variable". For example, a "fixed" dispersion compensator such as a dispersion compensating fiber, a dispersion compensator of a fiber grating type or the like may be inserted.

Although this control method uses the control mode 2, the control mode 1 may be used. As a method of switching the controls in the case where a chromatic dispersion compensation quantity and a polarization-mode dispersion compensation quantity are controlled to be the optimum values at all times during system operation, a method in which the above controls are executed in parallel with respect to time, that is, a method in which the above polarization-mode dispersion controlling step and the chromatic dispersion controlling step are executed independently, maybe employed. Or, a method in which the controls are executed in time series in order to prevent them from being overlapped with respect to time, that is, a method in which the above polarization-mode dispersion controlling step and the chromatic dispersion controlling step are executed in time series, may be employed.

In the optical transmission system 271B with the above structure, an optical signal at a transmission rate B (b/s) transmitted from the optical transmitter 72 is transmitted to the optical receiver 77 over the optical transmission line 73. In order to compensate chromatic dispersion and polarization-mode dispersion generated in a transmitted optical signal, a part of the optical signal transmitted over the optical transmission line 73 is taken out by an optical splitting unit 75, and the optical signal taken out (monitor light) is sent to the dispersion compensation controlling apparatus 247. The optical signal taken out by the optical splitting unit 75 is O/E-converted by the photo receiver 78, and inputted to the band-pass filter 79. In the band-pass filter 79, the first specific frequency component [fe (Hz) component] in the baseband spectrum is detected (specific frequency component detecting step). Following that, an intensity of the above first specific frequency component detected by the band-pass filter 79 is detected by the intensity detector 80 (intensity detecting step).

Thereafter, in the compensation quantity optimization controlling unit 246a, parameter setting in the parameter setting circuit 82 is such controlled that a low frequency signal component included in the intensity of the first specific frequency component from the intensity detector 80 becomes zero, whereby a compensation quantity of polarization-mode dispersion of the above transmission optical signal is optimized. A parameter setting control signal is outputted to the polarization-mode dispersion compensator 74 disposed in the optical receiver 77 via the low frequency superimposing circuit 275a of the compensation quantity optimization controlling unit 246a. When the polarization-mode dispersion compensator 74 receives the parameter setting signal, parameter information is set therein on the basis of the control signal, whereby polarization-mode dispersion generated in an optical signal transmitted over the optical transmission path 73 is compensated. The parameter setting circuit 82 detects a code of a signal obtained as a result of phase comparison by the phase comparing circuit 273a to determine whether a delay quantity $\Delta\tau$ is shifted to the positive or negative direction, so that a parameter setting control signal for changing the delay quantity $\Delta\tau$ in such a direction that the $f_0$ (Hz) intensity modulation component in the B/2 (Hz) component is cancelled is generated, and outputted. The low frequency superimposing circuit 275a superimposes a low frequency signal ($f_0$ (Hz) signal) from the low frequency oscillator 274a on the parameter setting control signal from the parameter setting circuit 82, and output it.

Similarly, the compensation quantity optimization controlling unit 246b controls a chromatic dispersion compensation quantity in the chromatic dispersion compensation quantity setting circuit 82B such that a low frequency signal component included in the intensity of the first specific frequency component from the intensity detector 80 becomes zero, as well, whereby a chromatic dispersion compensation quantity of the above transmission optical signal is optimized.

According to the dispersion compensation controlling apparatus 247 of the second modification of the fourth embodiment of this invention, it is possible to detect an intensity of the first specific frequency component in a baseband spectrum of a transmission optical signal and detect a polarization-mode dispersion quantity of the transmission optical signal from the detected intensity of the first specific frequency by performing a predetermined first functional operation, thereby easily detecting polarization-mode dispersion generated in the transmission optical signal.

As above, it is possible to keep a delay quantity $\Delta\tau$ at the optimum value against a change with time of the optical transmission line 73 during system operation. It is also possible to prevent deterioration of a transmission waveform of an optical signal by detecting a polarization-mode dispersion quantity and a chromatic dispersion quantity, setting parameter information generated in a transmission optical signal on the basis of the detected quantities to compensate polarization-mode dispersion and chromatic dispersion. These advantageously contribute to long-distance transmission of a high-speed optical signal. With the compensation quantity optimization controlling units 246a and 246b, it is possible to optimize compensation quantities of polarization-mode dispersion and chromatic dispersion, and automatically perform a feedback control when polarization-mode dispersion and chromatic dispersion are compensated.

(F) Others

In the controlling methods according to the third embodiment, the modifications of the third embodiment, the fourth modification and the modifications of the fourth embodiment, polarization-mode dispersion and chromatic dispersion are both controlled in the same control mode 2 or the control mode 1. However, it is alternatively possible to mix them and perform the control. Namely, the polarization-mode dispersion control may be performed in the control mode 1, while the chromatic dispersion control may be performed in the control mode 2. Conversely, the polarization-mode dispersion control may be performed in the control mode 2, while the chromatic dispersion control may be performed in the control mode 1. The control method performed at the time of the compensation optimizing control may be performed in the control mode 1. Further, in the third embodiment and the modifications thereof, and the fourth embodiment and the modifications thereof, a position of the chromatic dispersion compensator 83 and a position of the polarization-mode dispersion compensator 74 are exchangeable.

Still further, in the polarization-mode dispersion control in the second embodiment, the control on $\gamma$ and $\Delta\tau_c$, and the control on $\alpha \cdot \beta$ and $\Delta\tau_c$ may be performed in a mixture of the two kinds of the control modes, as well. In order to find a predetermined control value, it is possible to combine the control mode 1 and the control mode 2. First, a value in the vicinity of a predetermined control value may be roughly obtained in the control mode 1, after that, an extreme value may be searched in the vicinity thereof in the control mode 2. These are shown in (1) and (2) below.

(1) Control on $\gamma$ and $\Delta\tau_c$

In the first embodiment, an optical intensity split light $\gamma$ can be controlled on only the receiving side. A structure being capable of such control is shown in FIGS. 19, 21 and 27 through 30. In these structures, control values for $\gamma$ and $\Delta\tau_c$ are obtained in the control mode 1. However, it is alternatively possible to obtain control values for $\gamma$ in the control mode 2 and $\Delta\tau_c$ in the control mode 2, or control values for $\gamma$ in the control mode 2 and $\Delta\tau_c$ in the control mode 1, or control values for both $\gamma$ and $\Delta\tau_c$ in the control mode 2. Still alternatively, a control mode in which a value in the vicinity of a predetermined control value is roughly obtained in the control mode 1, an extreme value is then searched in the vicinity thereof in the control mode 2 is possible.

(2) Control on $\alpha$, $\beta$ and $\Delta\tau_c$

Similarly, in the control in the second embodiment, control values for $\alpha$, $\beta$ and $\Delta\tau_c$ are obtained in the control mode 2. However, it is possible to obtain $\alpha$ and $\beta$ still in the control mode 2, while $\Delta\tau_c$ in the control mode 1. It is alternatively possible to employ such a control mode that a value in the vicinity of a predetermined control value is roughly obtained in the control mode 1, after that, an extreme value is searched in the vicinity thereof in the control mode 2.

As detection frequency values in each of the embodiments and modifications, fe=B (Hz) is used for an RZ signal and an OTDM signal, while fe=B/2 (Hz) for an NRZ signal. As these frequency values, it is possible to set another frequency so long as a component in a baseband spectrum in a transmission optical signal is stably obtained with resepct to time as the first specific frequency component in a baseband spectrum in a transmission optical signal extracted by the band-pass filter.

Further, when the specific frequency is set to a frequency corresponding to ½ of the bit rate, the transmission optical signal in each of the embodiments and modifications described above may be applied any modulation system including an NRZ signal, an RZ optical signal, optical time division multiplex signal.

Figure 65:
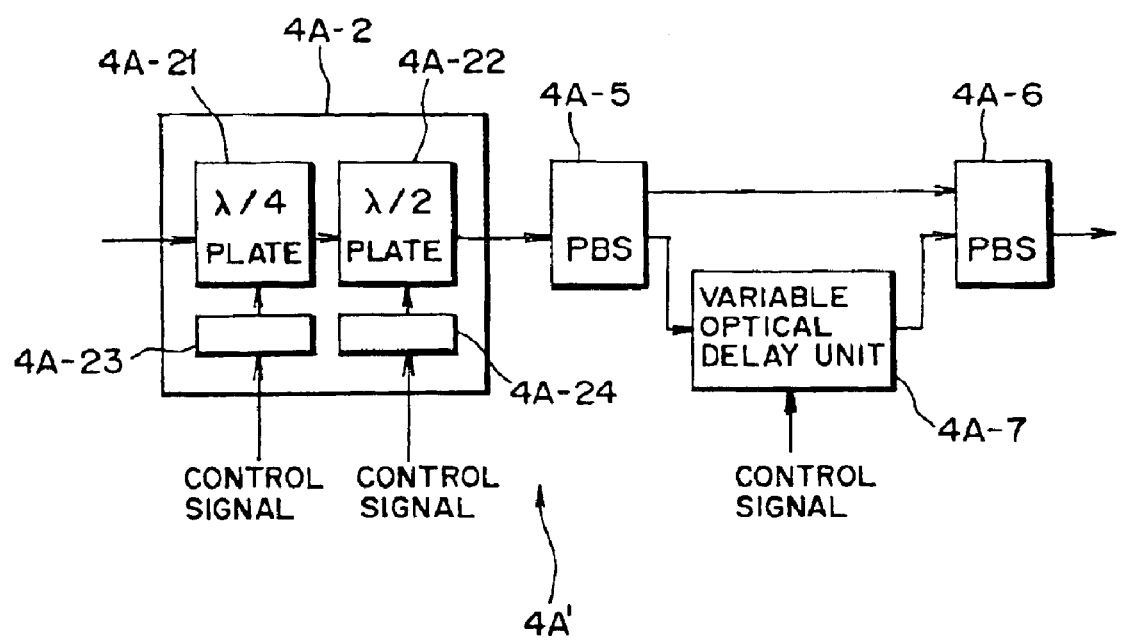
FIG. 65 is a diagram showing a structure of another delay quantity compensator.
Figure 66:
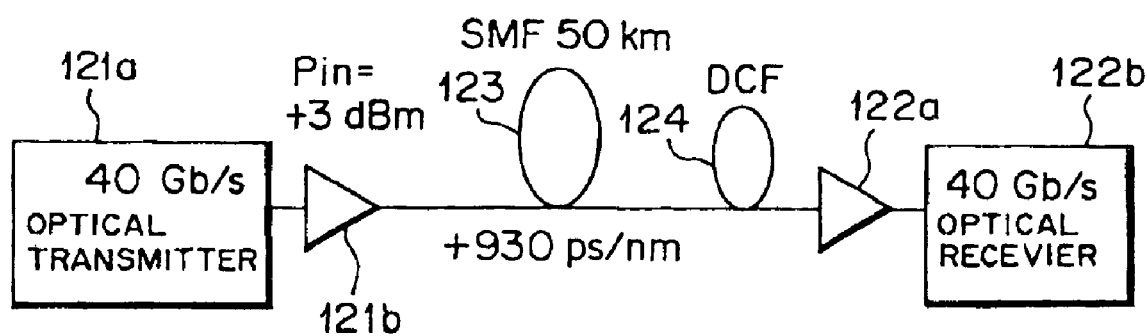
FIG. 66 is a diagram showing a structure of an evaluation experimental system for dispersion compensation tolerance after 1.3 μm SMF 50 km transmission in 40 Gb/s optical time division multiplexing.
Figure 67:
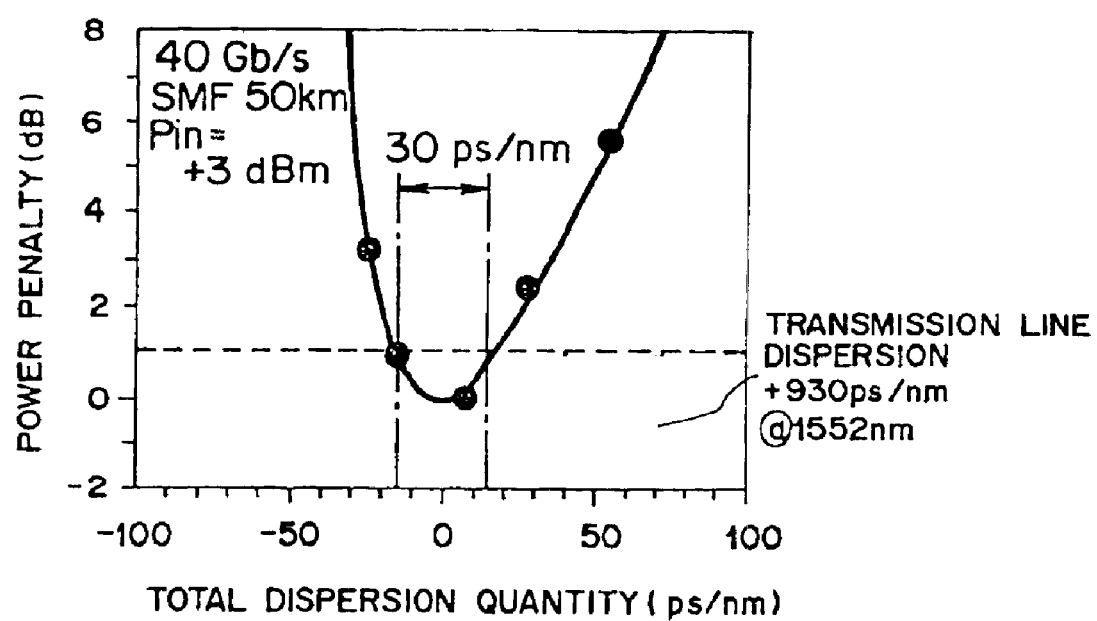
FIG. 67 is a diagram showing results of an evaluation experiment in the experimental system in FIG. 66.
Figure 68:
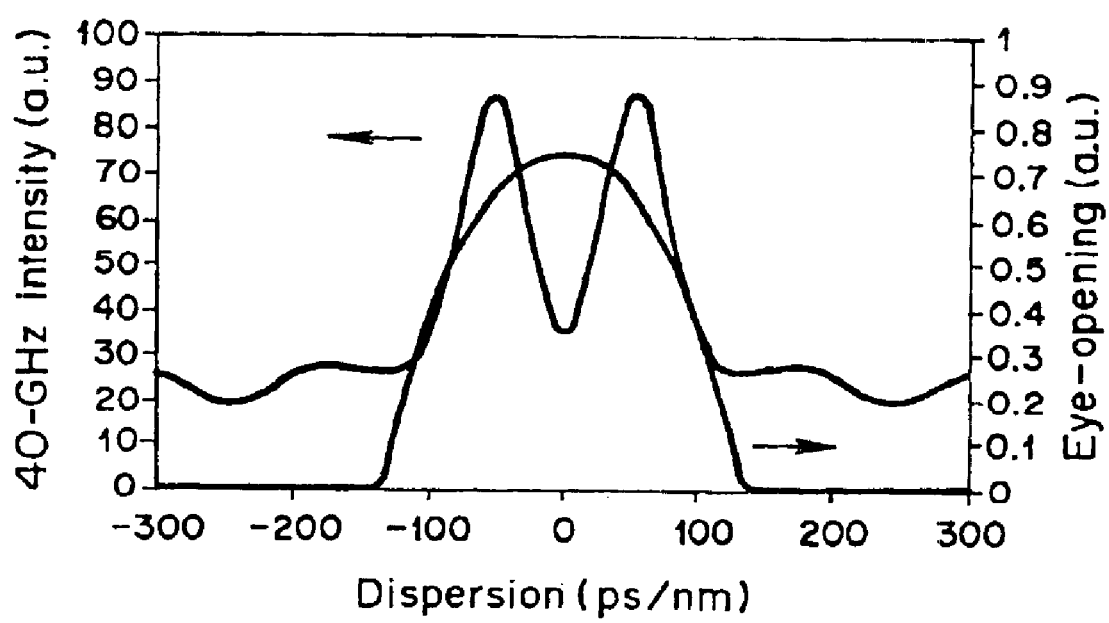
FIG. 68 is a diagram showing a relationship (simulation results) between 40 GHz component intensity and eye opening to a dispersion quantity of a 40 Gb/s OTDM signal.
Figure 69:
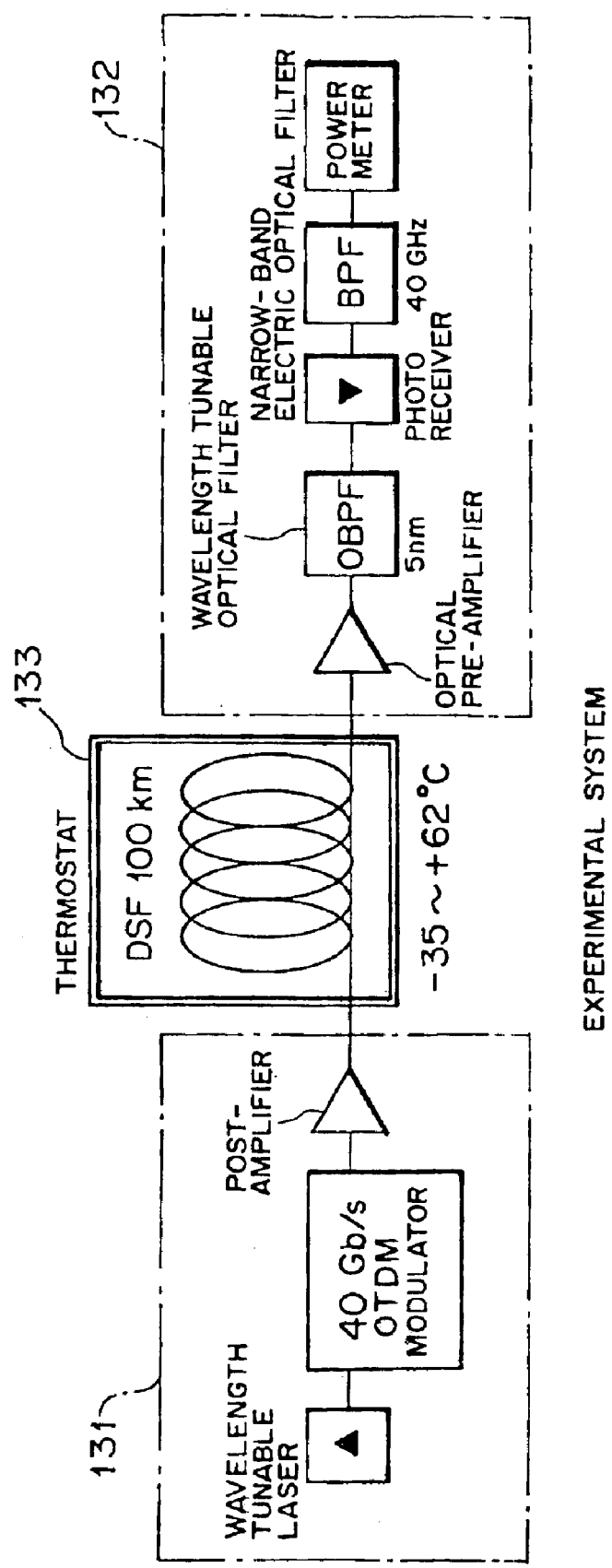
FIG. 69 is a diagram showing a structure of an experimental system at the time of DSF 100 km transmission.
Figure 70:
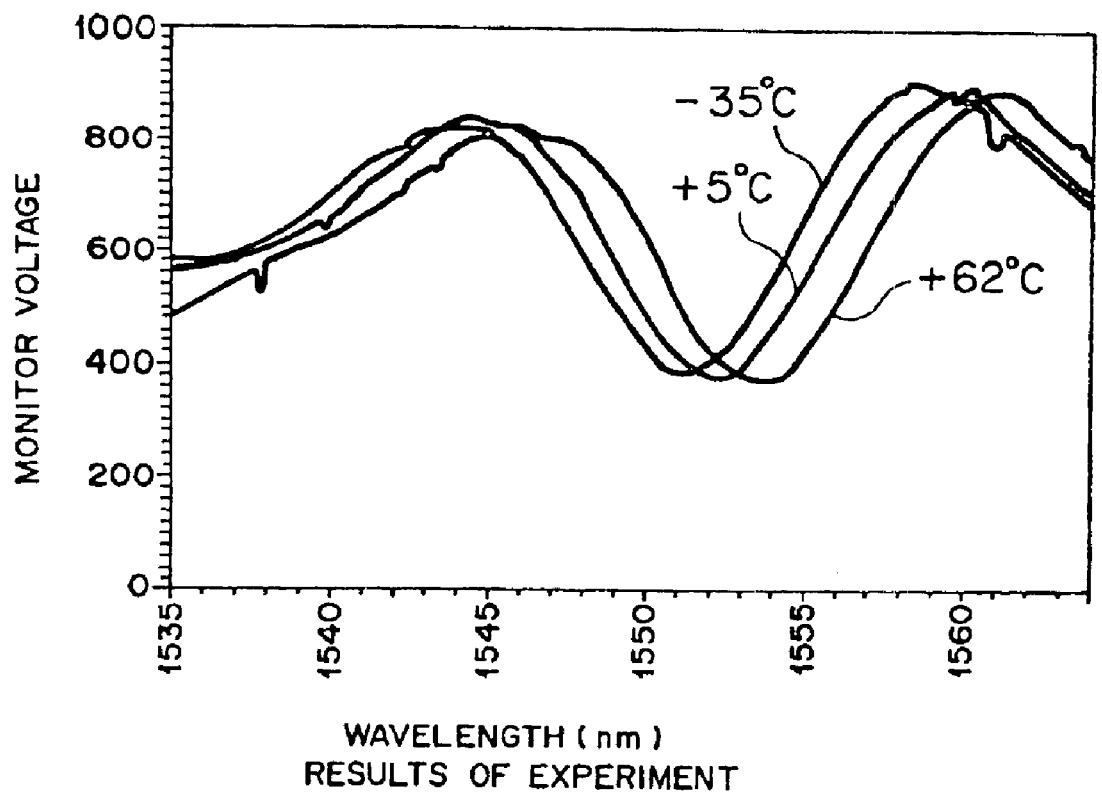
FIG. 70 is a diagram showing experiment results in the experimental system in FIG. 69.
Figure 71A:
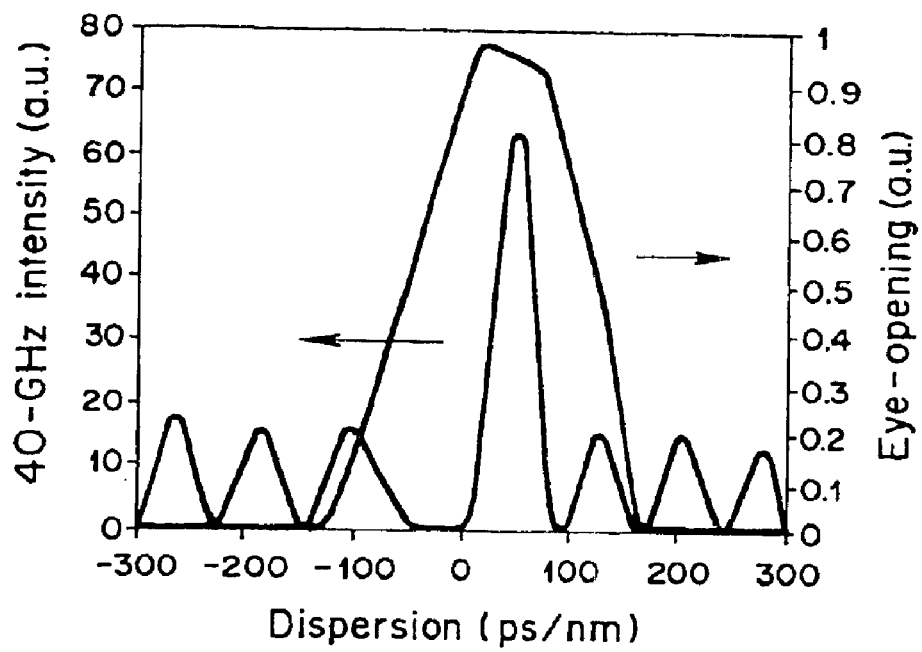
FIG. 71(*a*) is a diagram showing a relationship (simulation results) between 40 GHz component intensity and eye opening to a dispersion quantity of a 40 Gb/s NRZ signal ($\alpha=-0.7$)
Figure 71B:
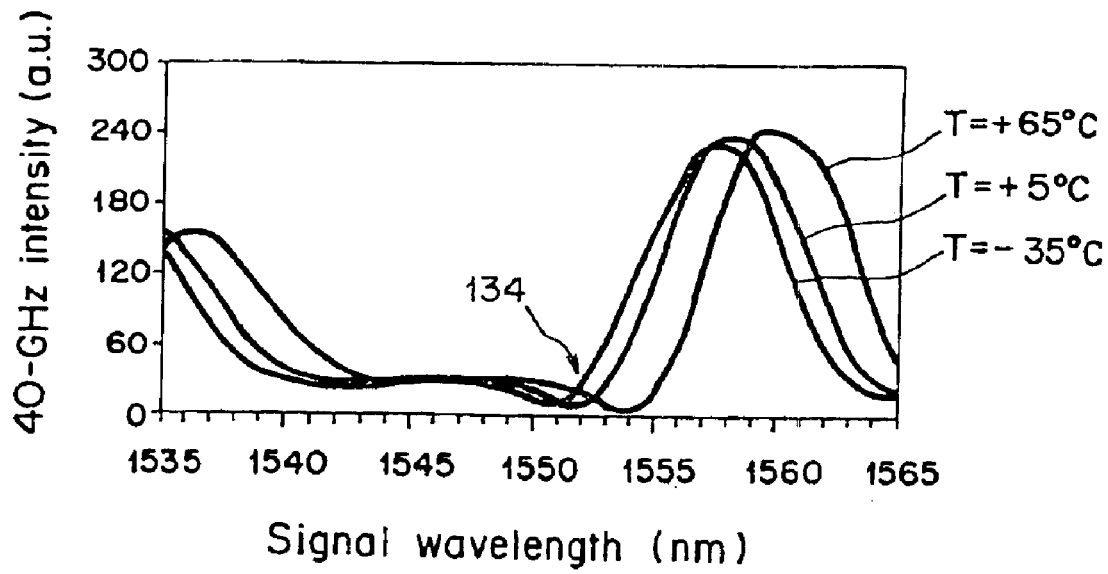
Figure 72A:
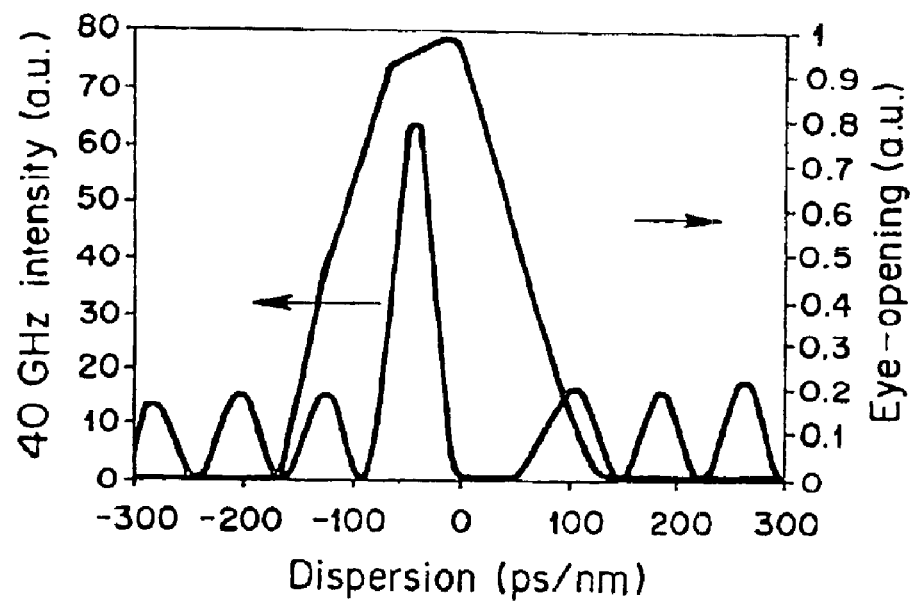
FIG. 72(*a*) is a diagram showing results of simulation in the case of a 40 Gb/s NRZ signal ($\alpha=+0.7$)
Figure 72B:
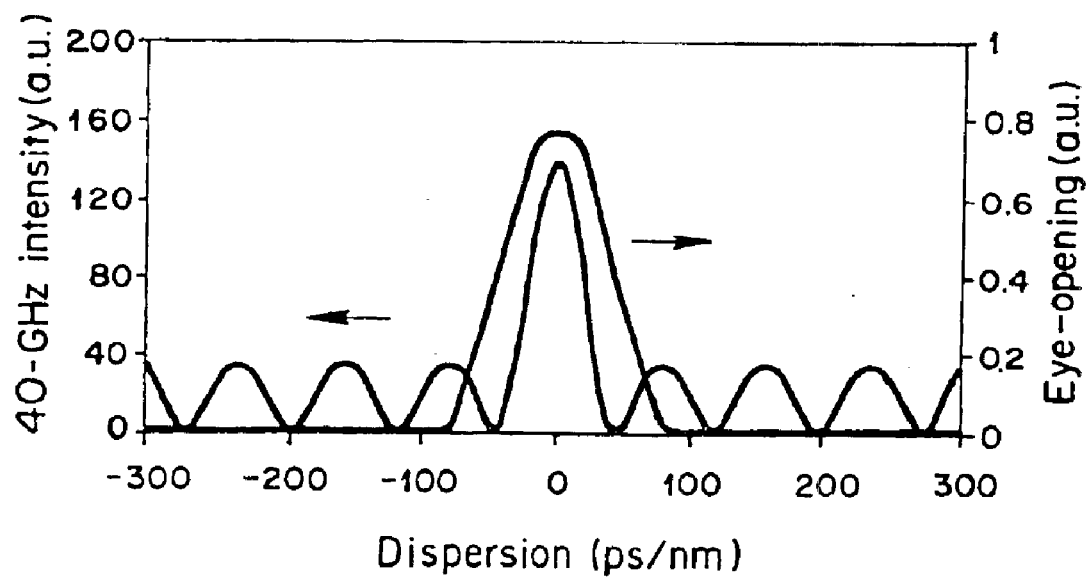
Figure 73:
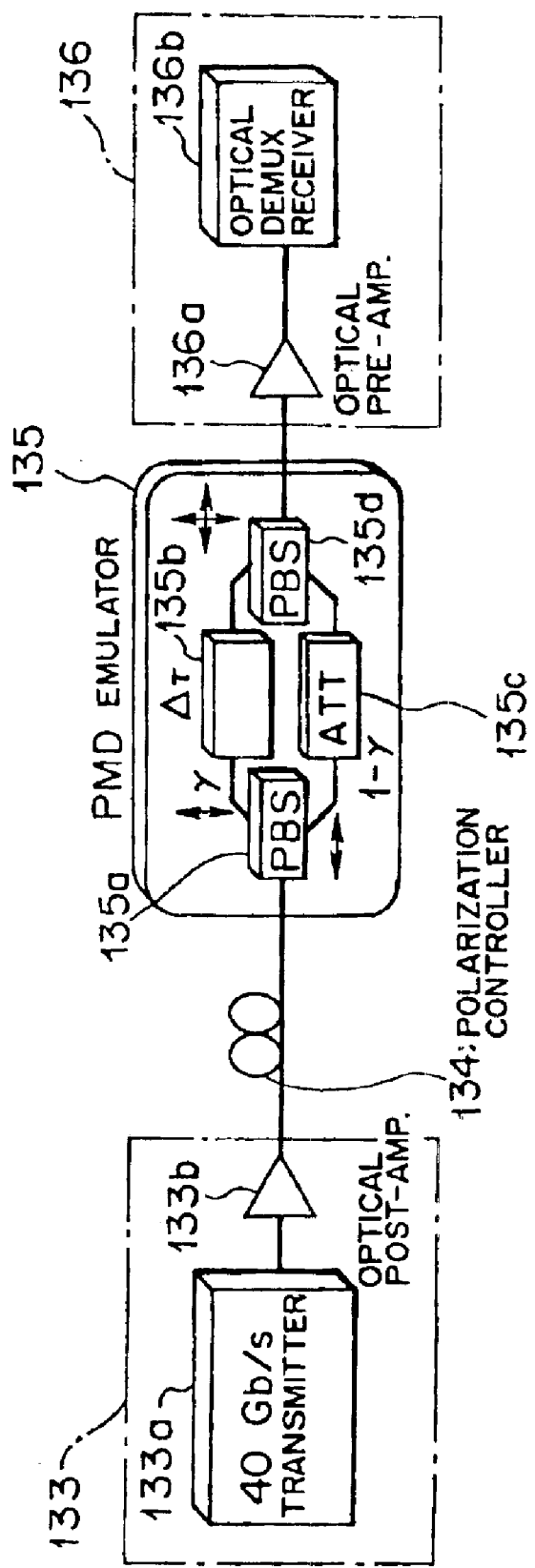
FIG. 73 is a diagram showing an experimental system for researching transmission waveform deterioration due to PMD in a 40 Gb/s signal.
Figure 75:
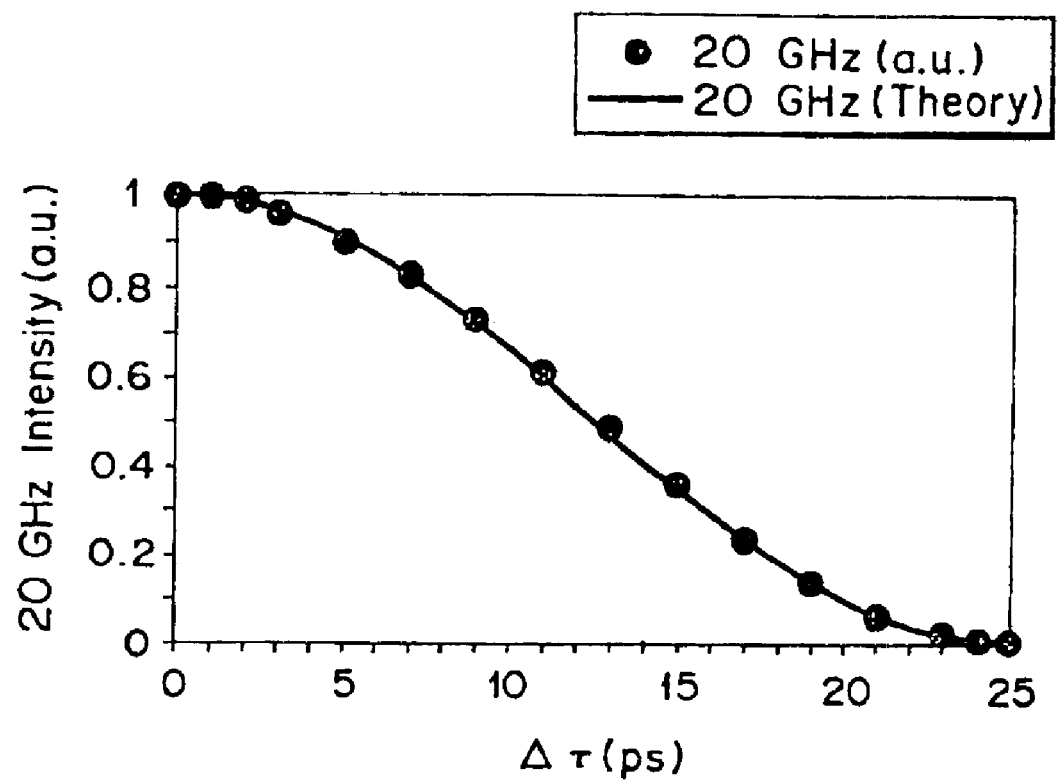
FIG. 75 is a diagram showing experimental results showing $\Delta\tau$ dependency of 20 GHz component intensity when $\gamma=0.5$ in a 40 Gb/s NRZ system.

As the delay quantity compensator described in the first embodiment, a delay quantity compensator 4A' shown in FIG. 65 may be used, other than one shown in FIG. 5. The delay quantity compensator 4A' is a delay quantity compensator whose delay quantity is variable. As shown in FIG. 65, the delay quantity compensator 4A' comprises a polarization controller 4A-2, polarization beam splitters (PBS: Polarization Beam Splitter) 4A-5 and 4A-6 and a variable optical delay 4A-7.

The polarization controller 4A-2 such controls that polarization-mode primary axis component of two transmission paths are TE and TM polarized waves, which comprises a ¼ wave plate (λ/4 plate) 4A-21, a ½ wave plate (λ/2 plate) 4A-22 and actuators 4A-23 and 4A-24. The polarization beam splitter 4A-5 splits an optical signal inputted via the polarization controller 4A-2 into two. The variable optical delay 4A-7 variably gives a delay difference to one of the optical components split by the polarization beam splitter 4A-5. The polarization beam splitter 4A-6 multiplexes an optical component from the polarization beam splitter 4A-5 and an optical component from the polarization beam splitter 4A-7.

The actuators 4A-23 and 4A-24 configuring the polarization controller 4!-2, and the variable optical delay 4A-7 receive parameter setting control signals from the parameter setting circuit 15. The optimal control as the delay quantity compensator 4A' is performed on a polarization direction in the polarization controller 4A-2 and a delay difference to be given by the variable optical delay 4A-7.

In each of the embodiments described above, the polarization-mode dispersion compensator or the chromatic dispersion compensator is disposed in the optical transmitter or the optical receiver. However, this invention is not limited to the above examples, but they may be disposed in a repeating apparatus repeating a transmission optical signal. In such case, the parameter setting circuit or the chromatic dispersion compensation quantity setting circuit outputs each control signal to the polarization-mode dispersion compensator or the chromatic dispersion compensator disposed in the above repeating apparatus.

INDUSTRIAL APPLICABILITY

As having been fully described, the polarization-mode dispersion quantity detecting method of this invention has an advantage that an intensity of a specific frequency component in a baseband spectrum in a transmission optical signal is detected, and a polarization-mode dispersion quantity of the transmission optical signal is detected from the detected intensity of the specific frequency component by performing a predetermined functional operation or in a maximum value control, thereby easily detecting polarization-mode dispersion generated in the transmission optical signal.

According to this invention, a polarization-mode dispersion quantity is detected and polarization-mode dispersion generated in a transmission optical signal is compensated on the basis of the detected polarization-mode dispersion quantity, whereby deterioration of a transmission waveform of an optical signal is prevented. This contributes to realization of long-distance transmission of a high-speed optical signal.

According to this invention, a polarization-mode dispersion quantity is detected, polarization-mode dispersion generated in a transmission optical signal is compensated on the basis of the detected polarization-mode dispersion quantity, a chromatic dispersion quantity is also detected, and chromatic dispersion generated in the transmission optical signal is compensated on the basis of the detected chromatic dispersion quantity, whereby deterioration of a transmission waveform of an optical signal due to polarization-mode dispersion and chromatic dispersion is prevented. This contributes to realization of long-distance transmission of a high-speed optical signal.

What is claimed is:

1. A dispersion compensation controlling apparatus comprising:
    a first specific frequency component detecting unit detecting a first specific frequency component in a baseband spectrum in a transmission optical signal inputted to a receiving side over a transmission fiber as a transmission line;
    a first intensity detecting unit detecting information on an intensity of said first specific frequency component detected by said first specific frequency component detecting unit;
    a polarization-mode dispersion controlling unit controlling a polarization-mode dispersion quantity of said transmission line with the intensity of said first specific frequency component detected by said first intensity detecting unit becoming the maximum;
    a second specific frequency component detecting unit detecting a second specific frequency component in the baseband spectrum in said transmission optical signal;
    a second intensity detecting unit detecting information on the intensity of said second specific frequency component detected by said second specific frequency component detecting unit; and
    a chromatic dispersion controlling unit controlling a chromatic dispersion quantity of said transmission line with the intensity of said second specific frequency component detected by said second specific frequency intensity detecting unit becoming the maximum or the minimum.

2. The dispersion compensation controlling apparatus according to claim 1, wherein when said transmission optical signal is an NRZ optical signal, said first specific frequency component detecting unit detects a frequency corresponding to ½ of a bit rate as said first specific frequency component; and
    said second specific frequency component detecting unit detects a frequency corresponding to the bit rate as said second specific frequency.

3. The dispersion compensation controlling apparatus according to claim 1, wherein said chromatic dispersion controlling unit sets a chromatic dispersion control quantity in a chromatic dispersion compensator disposed in said transmission line with the intensity of said second specific frequency component detected by said second intensity detecting unit becoming the maximum or the minimum.

4. The dispersion compensation controlling apparatus according to claim 3, wherein said chromatic dispersion controlling unit comprises:
- a chromatic dispersion quantity detecting unit detecting a chromatic dispersion quantity of said transmission optical signal from the intensity of said second specific frequency component detected by said second intensity detecting unit by performing an operation with a predetermined second function; and
- a chromatic dispersion control quantity setting unit setting a chromatic dispersion control quantity in said chromatic dispersion compensator on the basis of said chromatic dispersion quantity detected by said chromatic dispersion quantity detecting unit in order to compensate chromatic dispersion of said transmission optical signal.

5. The dispersion compensation controlling apparatus according to claim 1, wherein said chromatic dispersion controlling unit feedback-controls a chromatic dispersion compensator disposed in said transmission line with the intensity of said second specific frequency component detected by said second intensity detecting unit becoming the maximum or the minimum.

6. The dispersion compensation controlling apparatus according to claim 1, wherein said second intensity detecting unit can output information on the detected intensity of said second specific frequency component as a monitor signal.

7. A dispersion compensation controlling apparatus comprising:
- a first specific frequency component detecting unit detecting a first specific frequency component in a baseband spectrum in a transmission optical signal inputted to a receiving side over a transmission fiber as a transmission line;
- a first intensity detecting unit detecting information on an intensity of said first specific frequency component detected by said first specific frequency component detecting unit;
- a polarization-mode dispersion controlling unit controlling a polarization-mode dispersion quantity of said transmission line with the intensity of said first specific frequency component detected by said first intensity detecting unit becoming the maximum; and
- a chromatic dispersion controlling unit controlling a chromatic dispersion quantity of said transmission line with the intensity of said first specific frequency component detected by said first intensity detecting unit becoming the maximum or the minimum.

8. The dispersion compensation controlling apparatus according to claim 7, wherein when said transmission optical signal is an RZ optical signal or an optical time division multiplex signal, said first specific frequency component detecting unit detects a frequency corresponding to a bit rate or ½ of the bit rate as said first specific frequency component, and when said transmission optical signal is an NRZ optical signal, said first specific frequency component detecting unit detects a frequency corresponding to ½ of the bit rate as said first specific frequency component.

9. The dispersion compensation controlling apparatus according to claim 7, wherein said chromatic dispersion controlling unit sets a chromatic dispersion control quantity in a chromatic dispersion compensator disposed in said transmission line with the intensity of said first specific frequency component detected by said first intensity detecting unit becoming the maximum or the minimum.

10. The dispersion compensation controlling apparatus according to claim 9, wherein said chromatic dispersion controlling unit comprises:
- a chromatic dispersion quantity detecting unit detecting a chromatic dispersion quantity of said transmission optical signal from the intensity of said first specific frequency component detected by said first intensity detecting unit by performing an operation with a predetermined second function; and
- a chromatic dispersion control quantity setting unit setting a chromatic dispersion control quantity in said chromatic dispersion compensator on the basis of said chromatic dispersion quantity detected by said chromatic dispersion quantity detecting unit in order to compensate chromatic dispersion of said transmission optical signal.

11. The dispersion compensation controlling apparatus according to claim 7, wherein said chromatic dispersion controlling unit feedback-controls a chromatic dispersion compensator disposed in said transmission line with the intensity of said first specific frequency component detected by said first detecting unit becoming the maximum or the minimum.

12. A dispersion compensation controlling method comprising the steps of:
- a first specific frequency component detecting step of detecting a first specific frequency component in a baseband spectrum in a transmission optical signal inputted to a receiving side over a transmission fiber as a transmission line;
- a first intensity detecting step of detecting information on an intensity of said first specific frequency component detected at said first specific frequency component detecting step;
- a polarization-mode dispersion controlling step of controlling a polarization-mode dispersion quantity of said transmission line with the intensity of said first specific frequency component detected at said first intensity detecting step becoming the maximum;
- a second specific frequency component detecting step of detecting a second specific frequency component in the baseband spectrum in said transmission optical signal;
- a second intensity detecting step of detecting information on an intensity of said second specific frequency component detected at said second specific frequency component detecting step; and
- a chromatic dispersion controlling step of controlling a chromatic dispersion quantity of said transmission line with the intensity of said second specific frequency component detected at said second intensity detecting step becoming the maximum or the minimum.

13. A dispersion compensation controlling method comprising the steps of:
- a first specific frequency component detecting step of detecting a first specific frequency component in a baseband spectrum in a transmission optical signal inputted to a receiving side over a transmission fiber as a transmission line;
- a first intensity detecting step of detecting information on an intensity of said first specific frequency component detected at said first specific frequency component detecting step;

a polarization-mode dispersion controlling step of controlling a polarization-mode dispersion quantity of said transmission line with the intensity of said first specific frequency component detected at said first intensity detecting step becoming the maximum; and a chromatic dispersion controlling step of controlling a chromatic dispersion quantity of said transmission line with the intensity of said first specific frequency component detected at said first intensity detecting step becoming the maximum or the minimum.

14. The dispersion compensation controlling method according to claim 13, wherein said polarization-mode dispersion controlling step and said chromatic dispersion controlling step are independently executed.

15. The dispersion compensation controlling method according to claim 13, wherein said polarization-mode dispersion controlling step and said chromatic dispersion controlling step are executed in time series.

* * * * *

UNITED STATES PATENT AND TRADEMARK OFFICE
CERTIFICATE OF CORRECTION

PATENT NO. : 7,035,548 B2 Page 1 of 1
APPLICATION NO. : 10/779797
DATED : April 25, 2006
INVENTOR(S) : Hiroki Ooi et al.

It is certified that error appears in the above-identified patent and that said Letters Patent is hereby corrected as shown below:

Title page, Col. 2,

Abstract, line 5,
delete "frequency-component" and insert --frequency component--, therefor.

Abstract, line 10,
delete "(2a" and insert --(2a)--, therefor.

Abstract, line 12,
delete "con trolling" and insert --controlling--, therefor.

Abstract, line 15,
after "unit" delete "."

Signed and Sealed this

Fifteenth Day of August, 2006

JON W. DUDAS
*Director of the United States Patent and Trademark Office*